(12) United States Patent
Novek

(10) Patent No.: US 10,961,975 B2
(45) Date of Patent: *Mar. 30, 2021

(54) LOW DENSITY FLUID DISPLACEMENT TO STORE OR GENERATE POWER

(71) Applicant: Ethan J. Novek, Greenwich, CT (US)

(72) Inventor: Ethan J. Novek, Greenwich, CT (US)

(73) Assignee: Innovator Energy, LLC, Princeton, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/932,429

(22) Filed: Jul. 17, 2020

(65) Prior Publication Data
US 2020/0399848 A1 Dec. 24, 2020

Related U.S. Application Data

(63) Continuation-in-part of application No. 16/807,278, filed on Mar. 3, 2020, now Pat. No. 10,737,677, which is a continuation-in-part of application No. 16/776,078, filed on Jan. 29, 2020, now abandoned, which is a continuation-in-part of application No. 16/409,790, filed on May 11, 2019, now Pat. No. 10,562,511.

(60) Provisional application No. 62/670,133, filed on May 11, 2018.

(51) Int. Cl.
*H02J 15/00* (2006.01)
*F03B 13/06* (2006.01)
*E02B 9/08* (2006.01)

(52) U.S. Cl.
CPC .............. *F03B 13/06* (2013.01); *E02B 9/08* (2013.01); *H02J 15/003* (2013.01); *F05B 2260/422* (2020.08)

(58) Field of Classification Search
CPC .. E02B 9/08; F03B 13/06; F03B 13/10; H02J 15/003; H02J 15/006; F05B 2260/422; F05B 2240/95; F05B 2240/97; Y02E 60/15; Y02E 60/16; Y02E 60/17; F03G 3/00; B65D 88/78; F17C 2270/0128; F17C 3/005; F17C 5/00; F17C 5/02; F17C 6/00; F17C 2227/00; F17C 2227/04
See application file for complete search history.

(56) References Cited

U.S. PATENT DOCUMENTS

| 6,672,054 | B2* | 1/2004 | Merswolke | F03D 9/008 60/398 |
| 7,743,609 | B1* | 6/2010 | Brostmeyer | F02C 6/16 60/398 |
| 2009/0140523 | A1* | 6/2009 | DeAngeles | F03B 17/005 290/43 |
| 2010/0307147 | A1* | 12/2010 | Ivy | F03G 3/00 60/415 |

(Continued)

FOREIGN PATENT DOCUMENTS

JP 58202314 A * 11/1983 ............... F17C 9/04

*Primary Examiner* — Mark A Laurenzi
*Assistant Examiner* — Xiaoting Hu
(74) *Attorney, Agent, or Firm* — Gregory L. Porter; Hunton Andrews Kurth LLP

(57) ABSTRACT

The present invention relates to systems and methods for pumping or removing a fluid from a region within or on top of or in contact with a water or liquid body and applications for said systems and methods. Some embodiments may also relate to anti-fouling or reducing fouling structures like docks.

29 Claims, 41 Drawing Sheets

(56) References Cited

U.S. PATENT DOCUMENTS

2012/0305411 A1\* 12/2012 Elazari-Volcani ..... B65D 88/02
   206/0.6
2013/0108369 A1\* 5/2013 Splittstoesser ...... E21B 43/0122
   405/63

\* cited by examiner

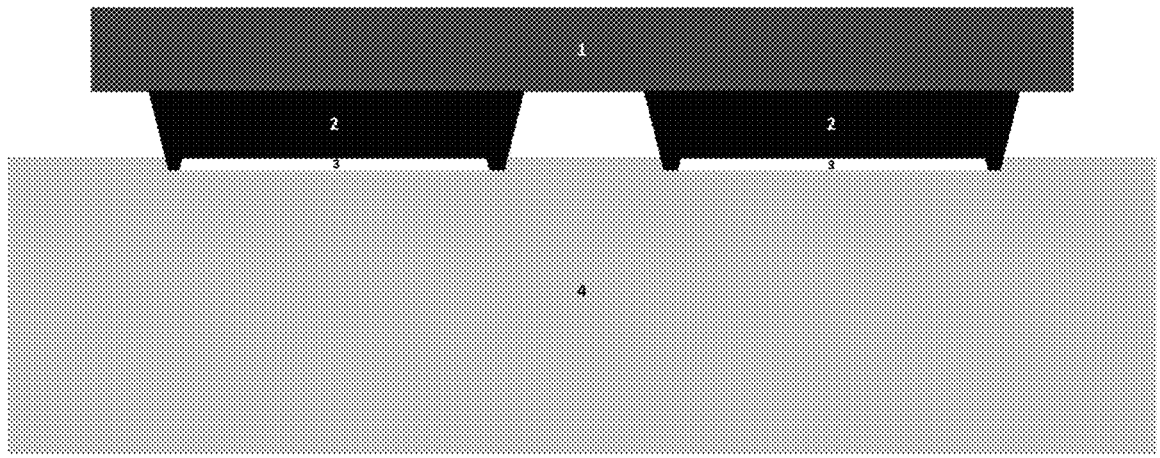
Figure 1 (above)
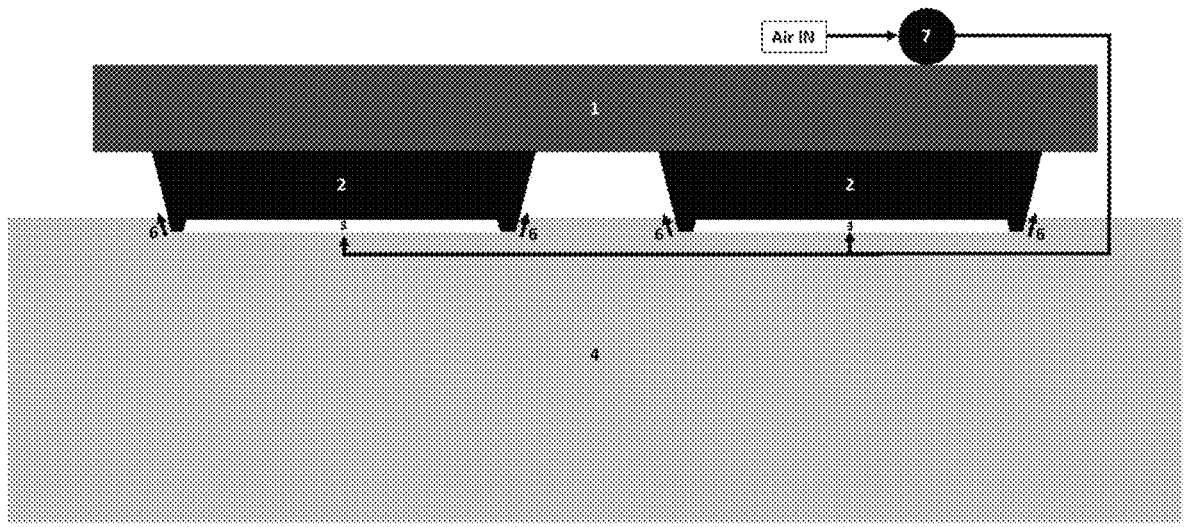
Figure 2 (above)

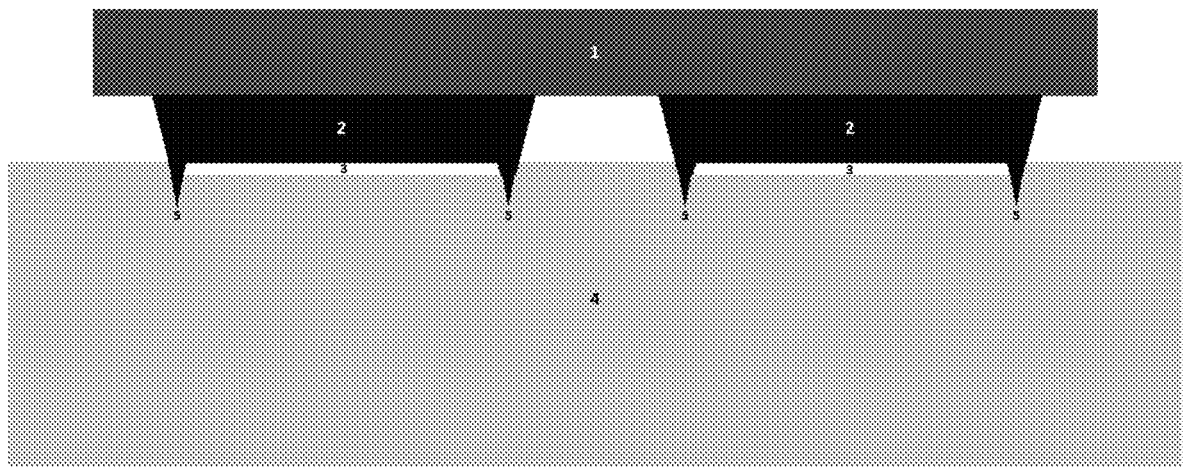
Figure 3 (above)
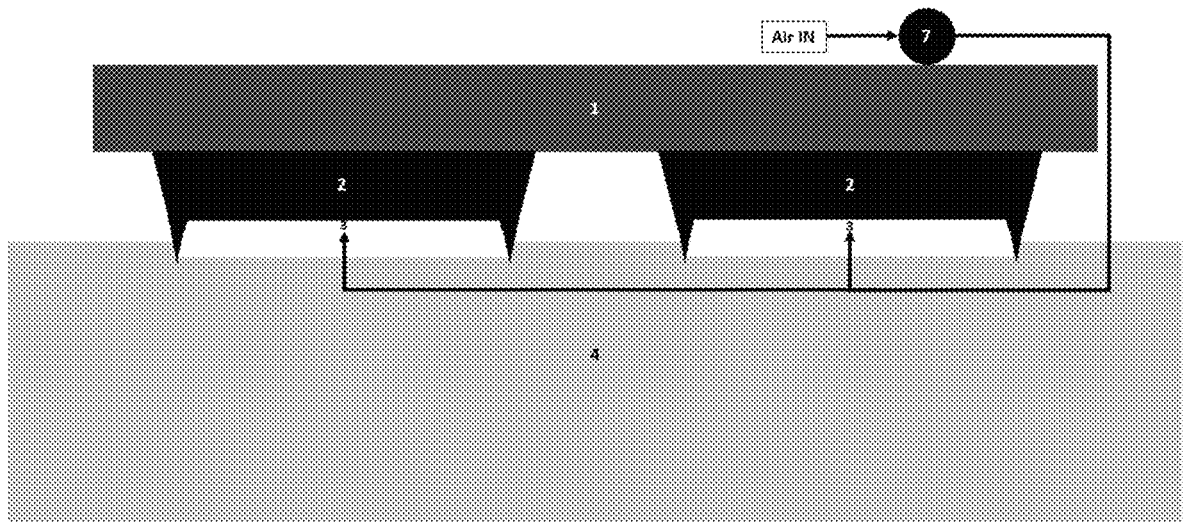
Figure 4 (above)

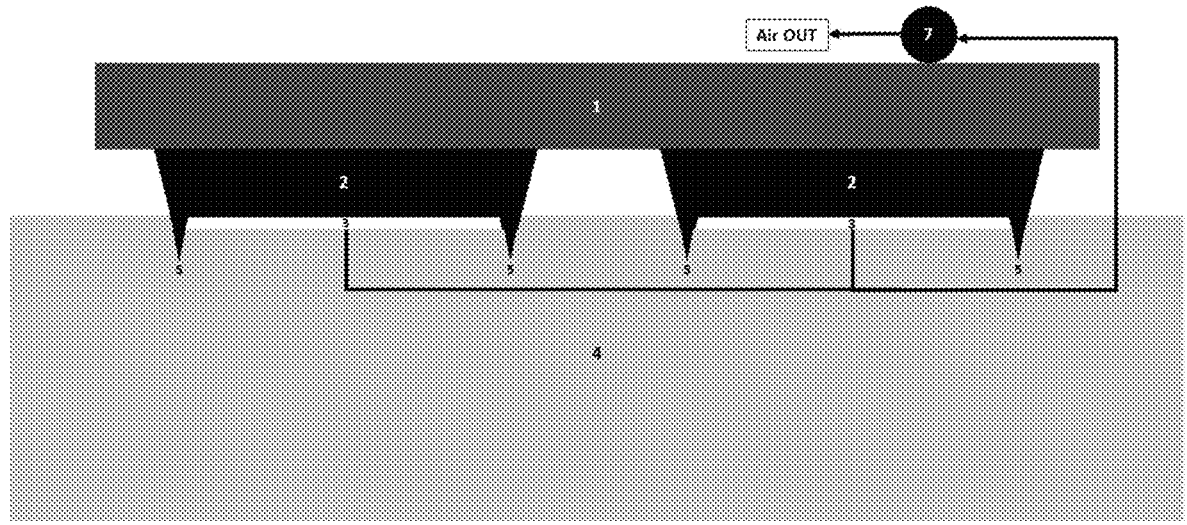
Figure 5 (above)
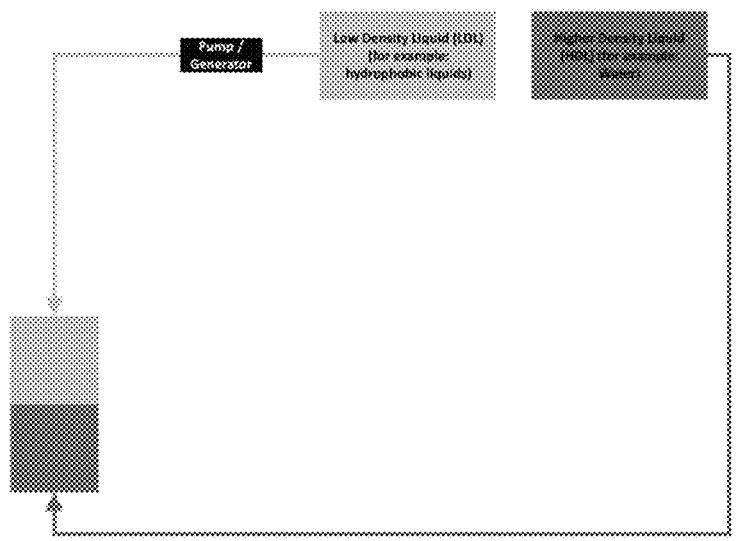
Figure 6 (above)

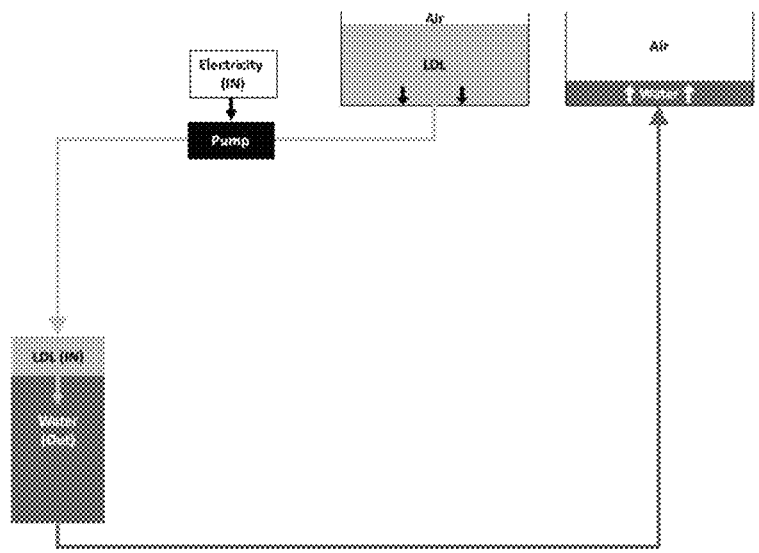
Figure 7 (above)
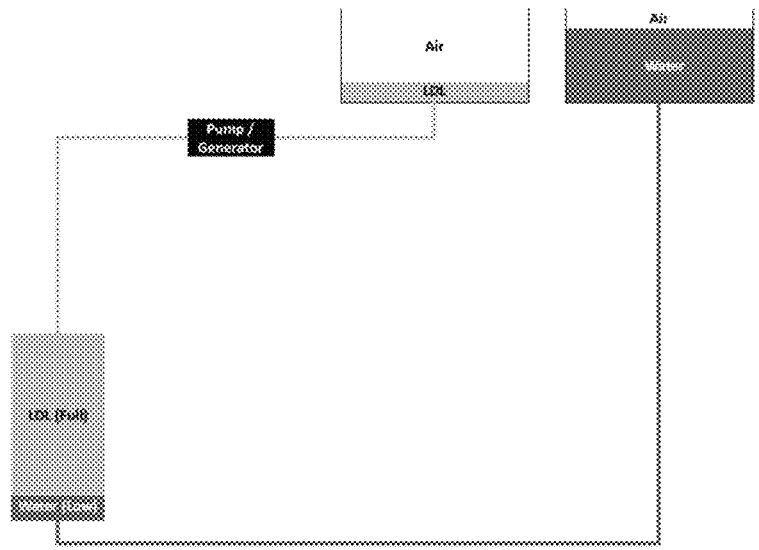
Figure 8 (above)

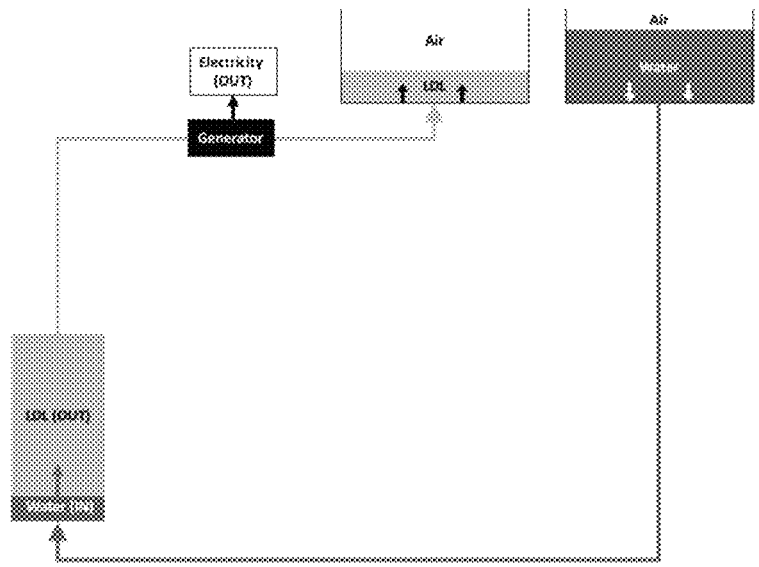
Figure 9 (above)
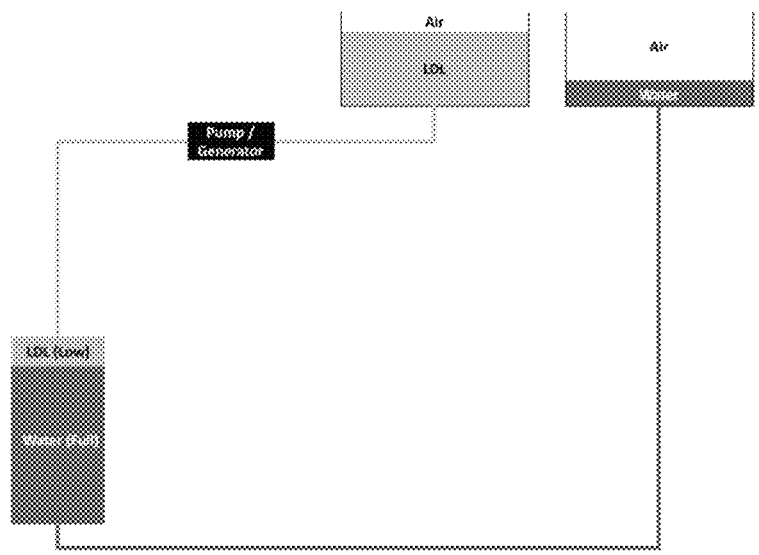
Figure 10 (above)

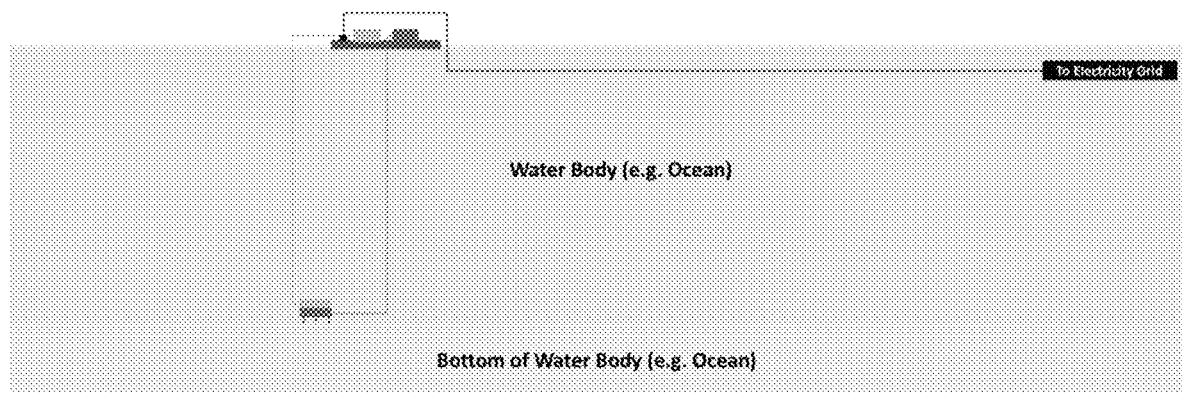
Figure 11 (above)
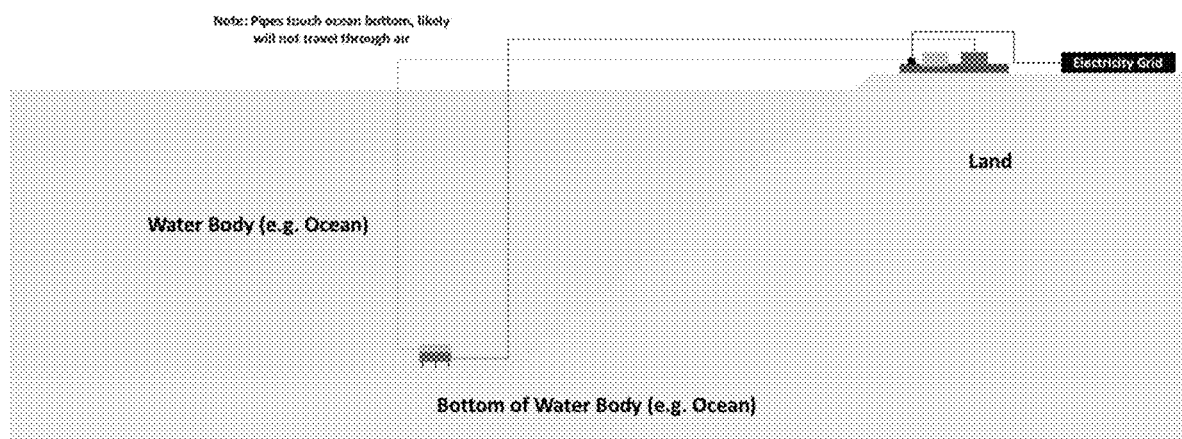
Figure 12 (above)
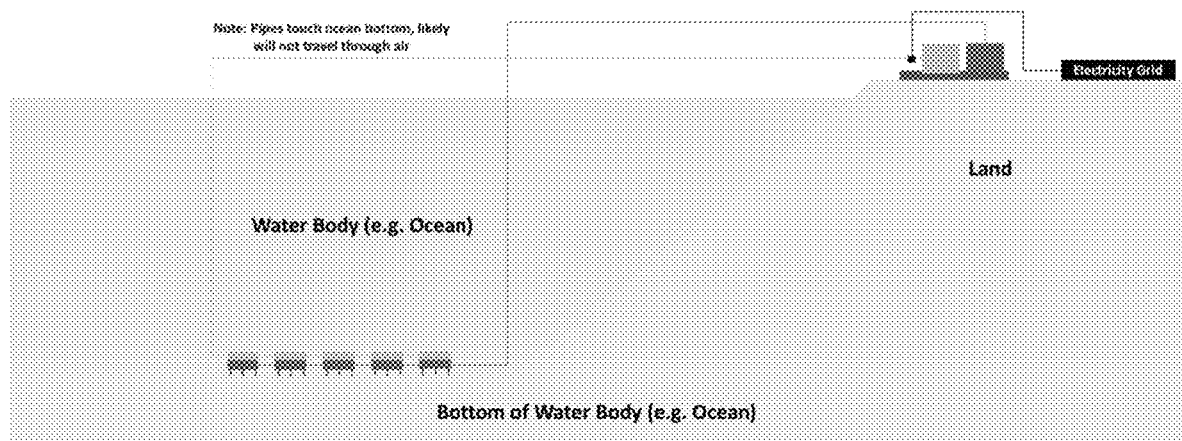
Figure 13 (above)

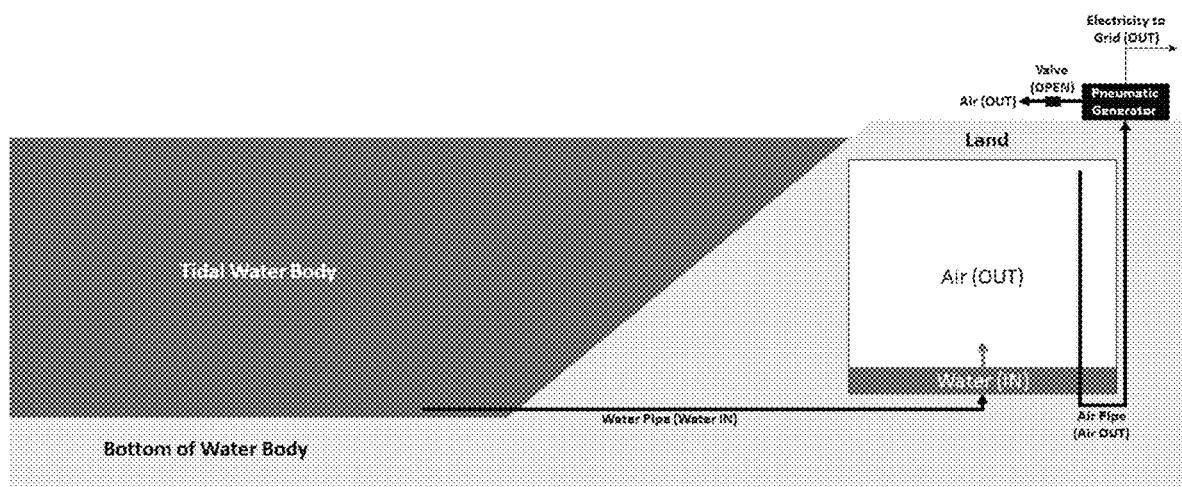
Figure 14 (above)
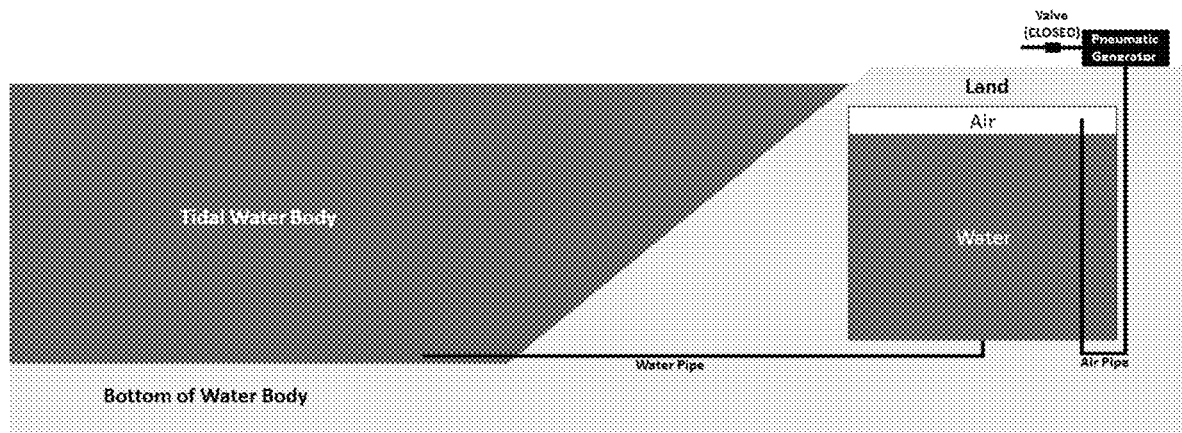
Figure 15 (above)

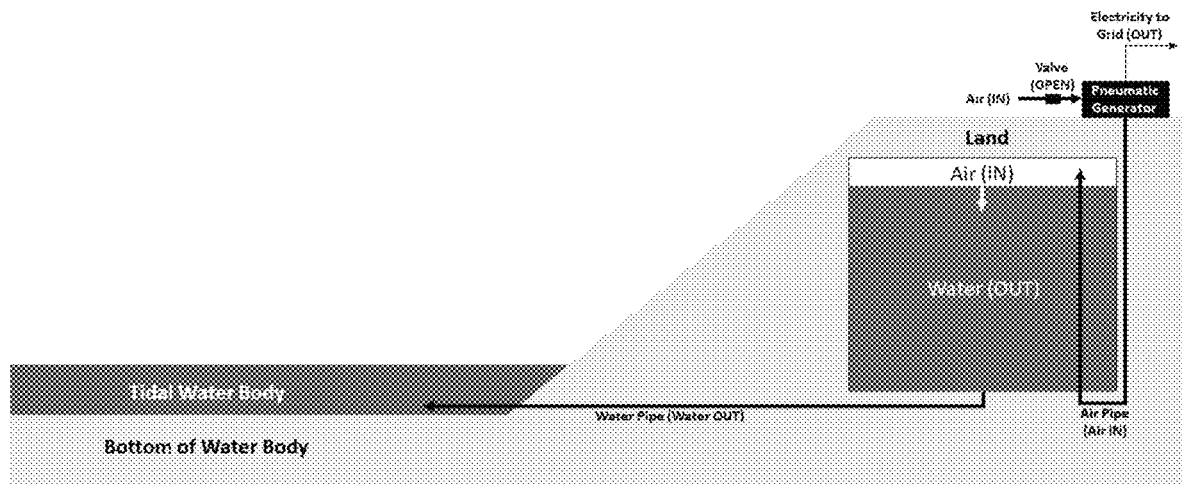
Figure 16 (above)
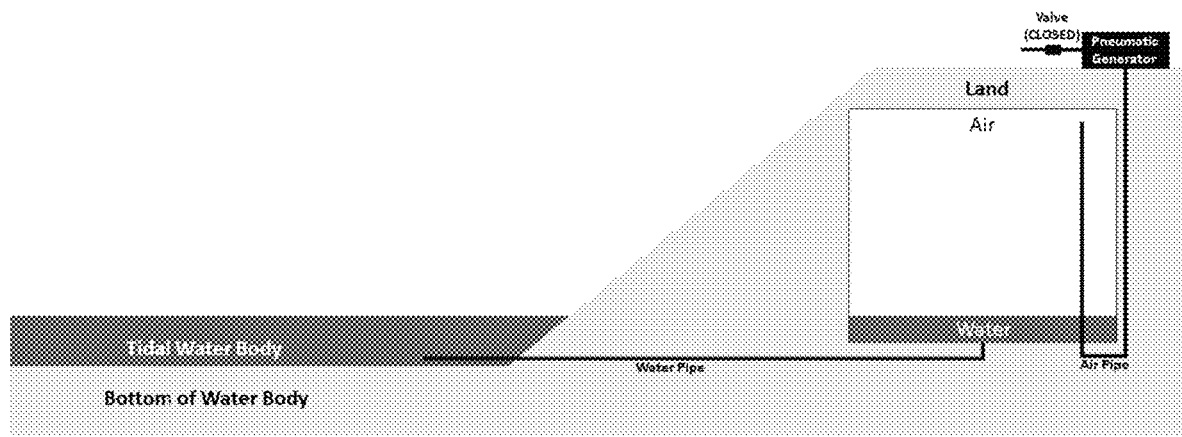
Figure 17 (above)
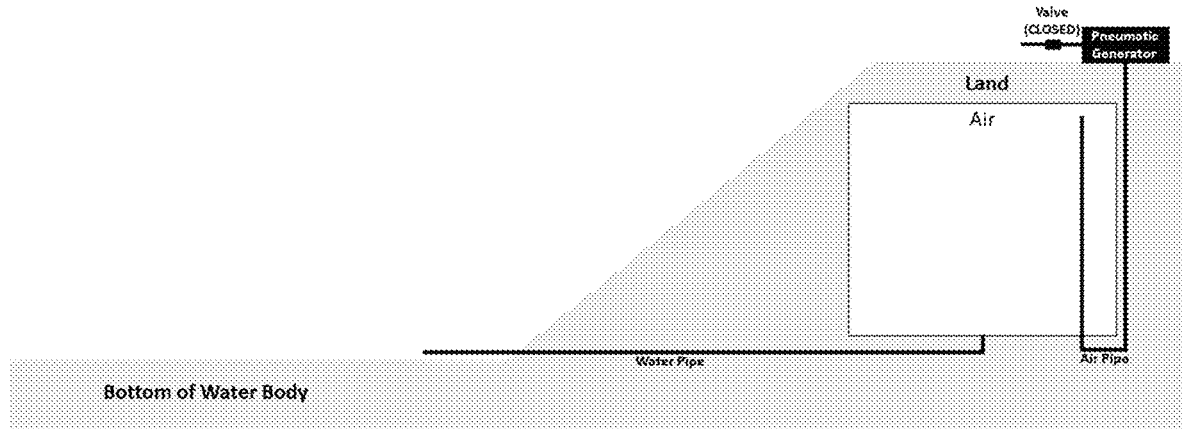
Figure 18 (above)

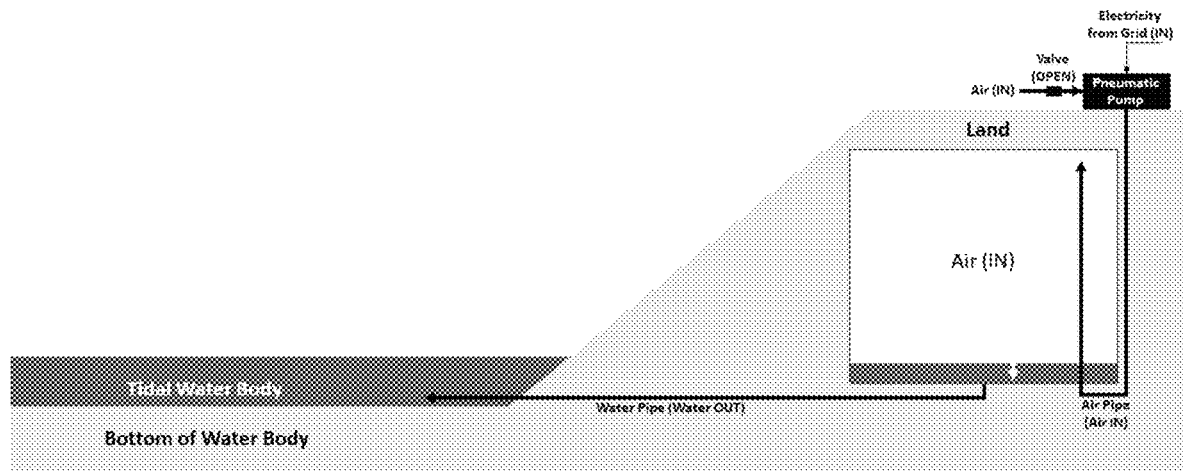
Figure 19 (above)
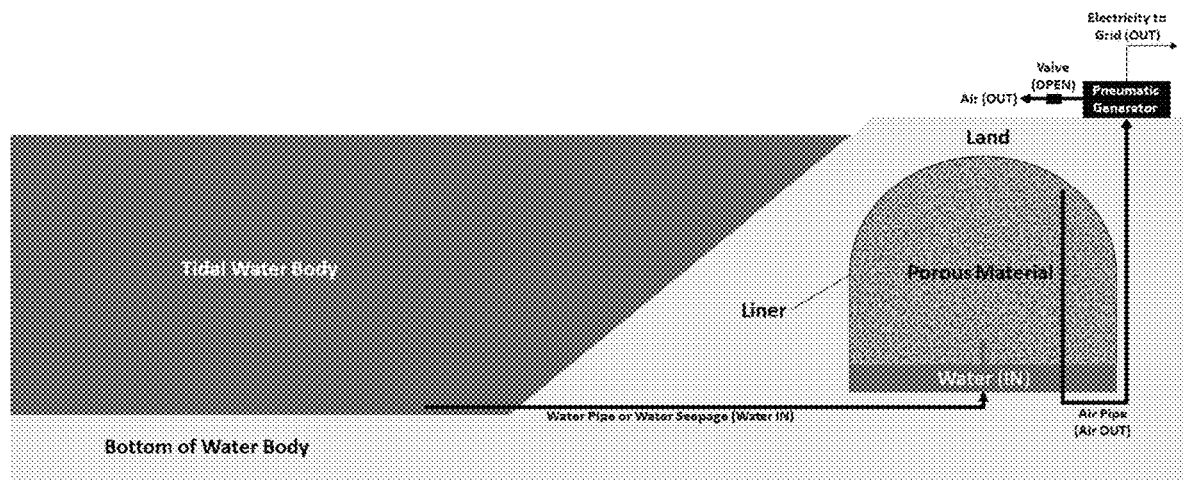
Figure 20 (above)
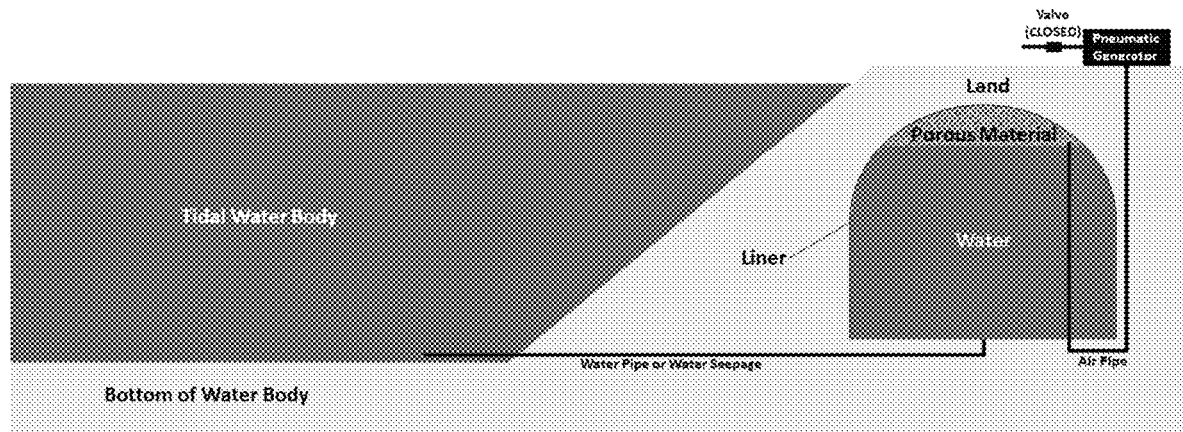
Figure 21 (above)

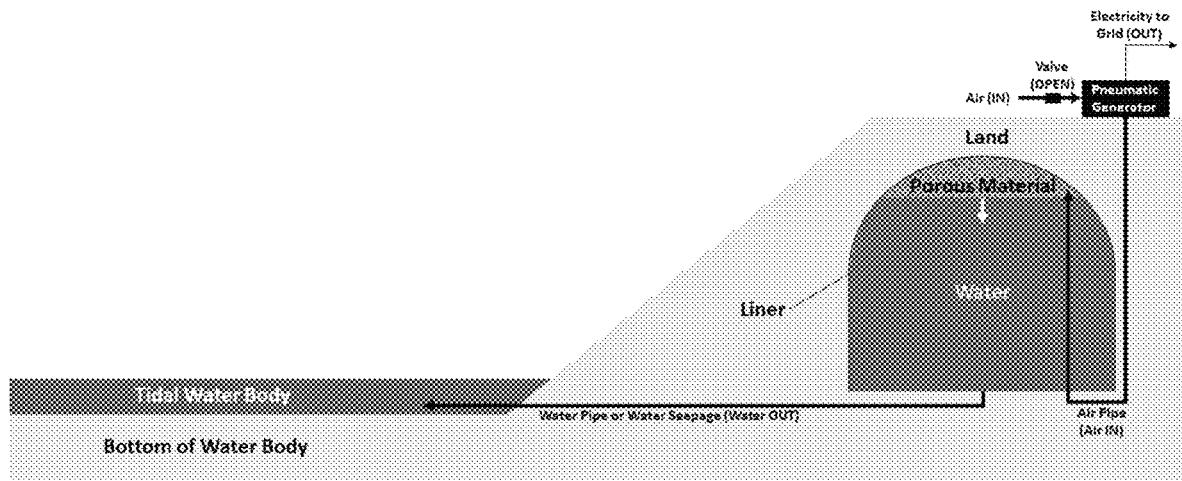
Figure 22 (above)
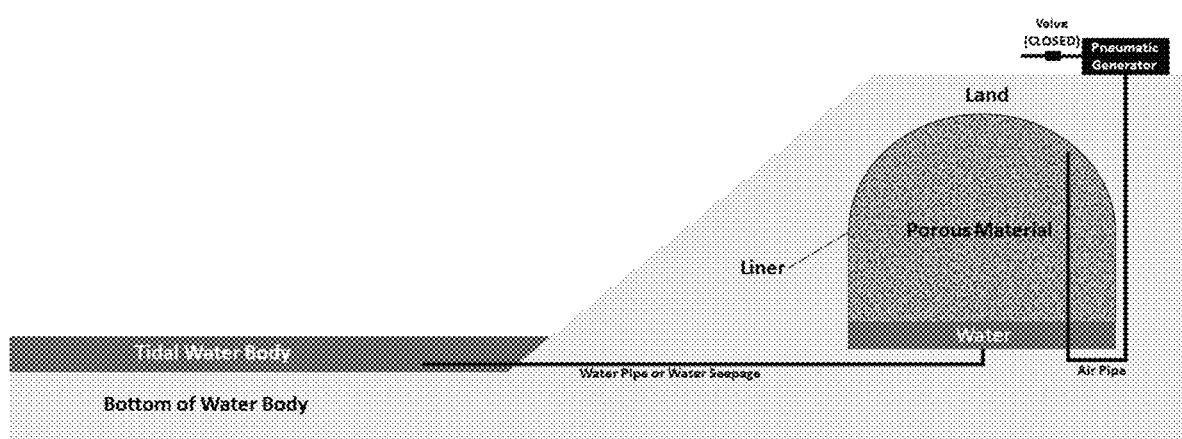
Figure 23 (above)
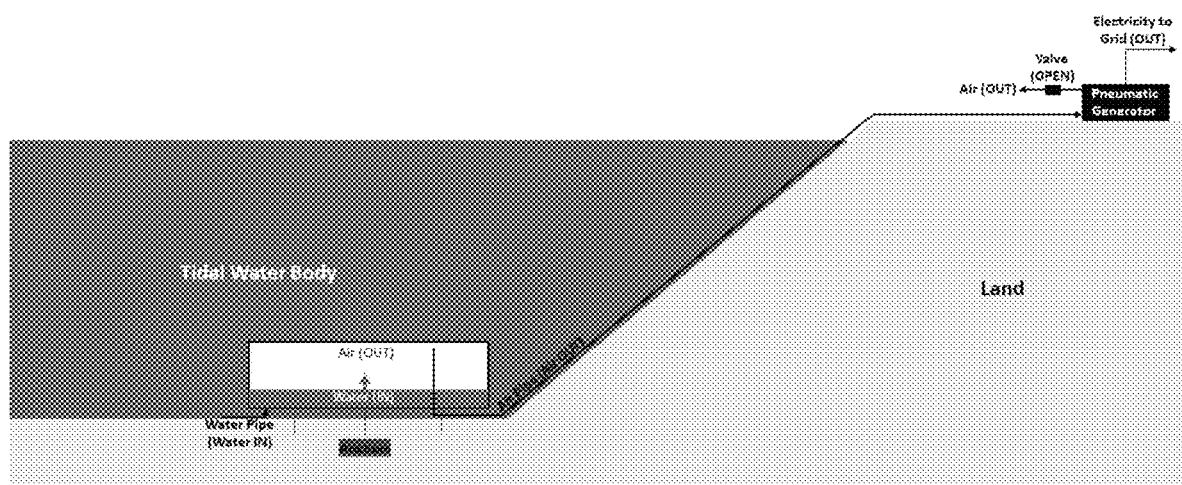
Figure 24 (above)

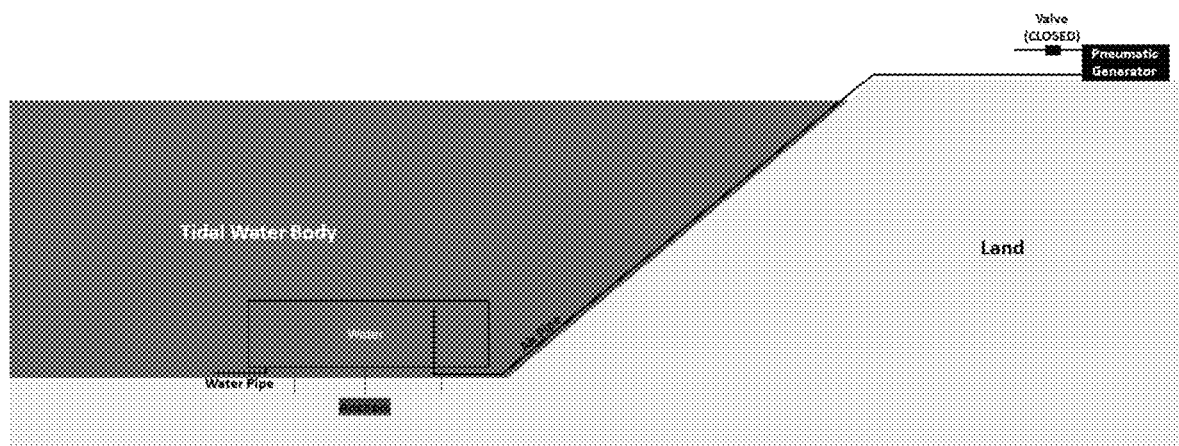
Figure 25 (above)
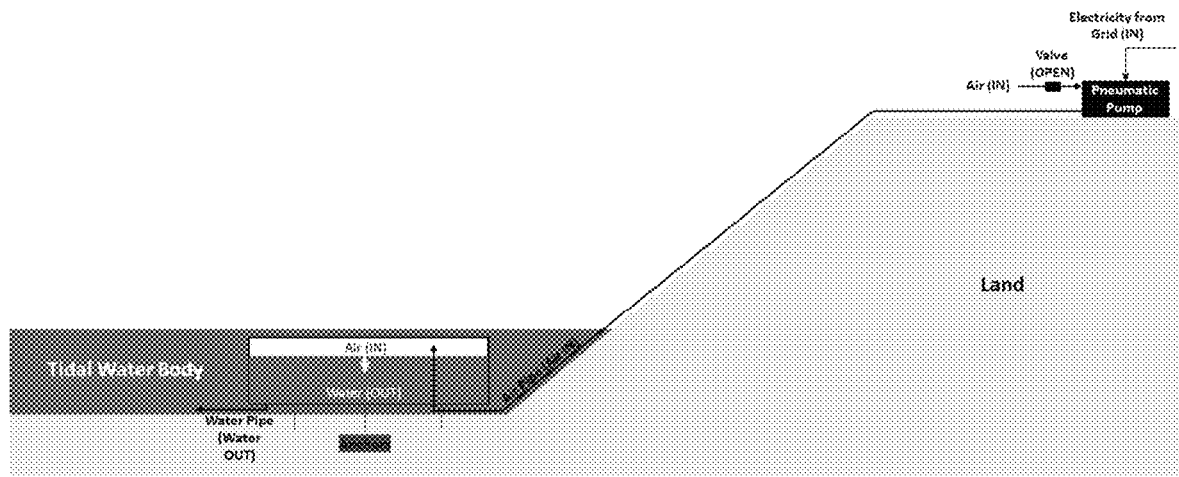
Figure 26 (above)
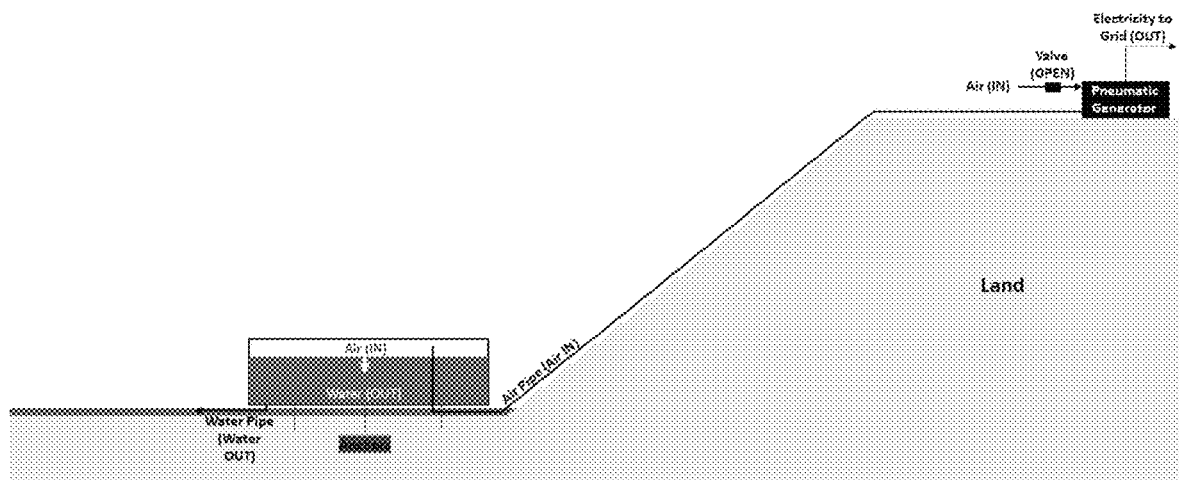
Figure 27 (above)

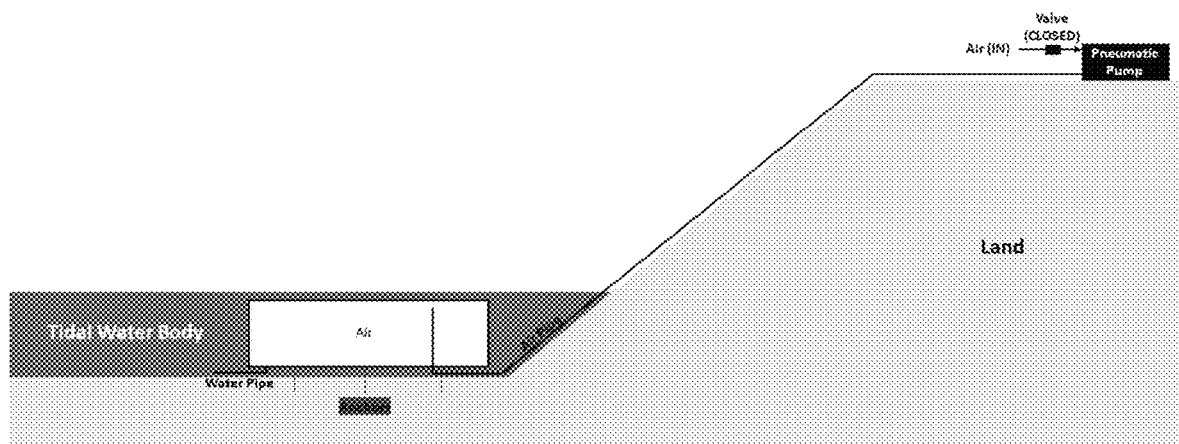
Figure 28 (above)
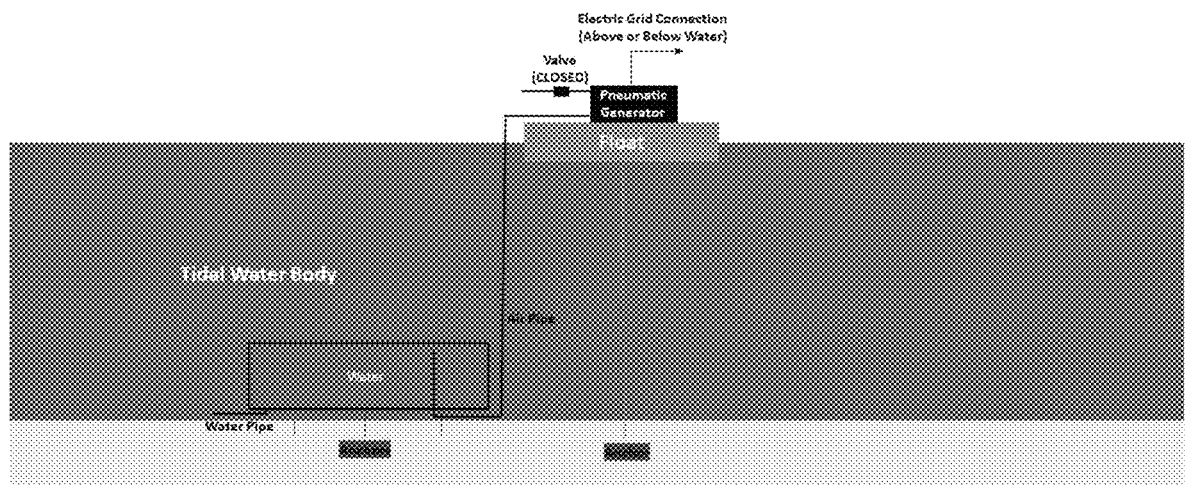
Figure 29 (above)

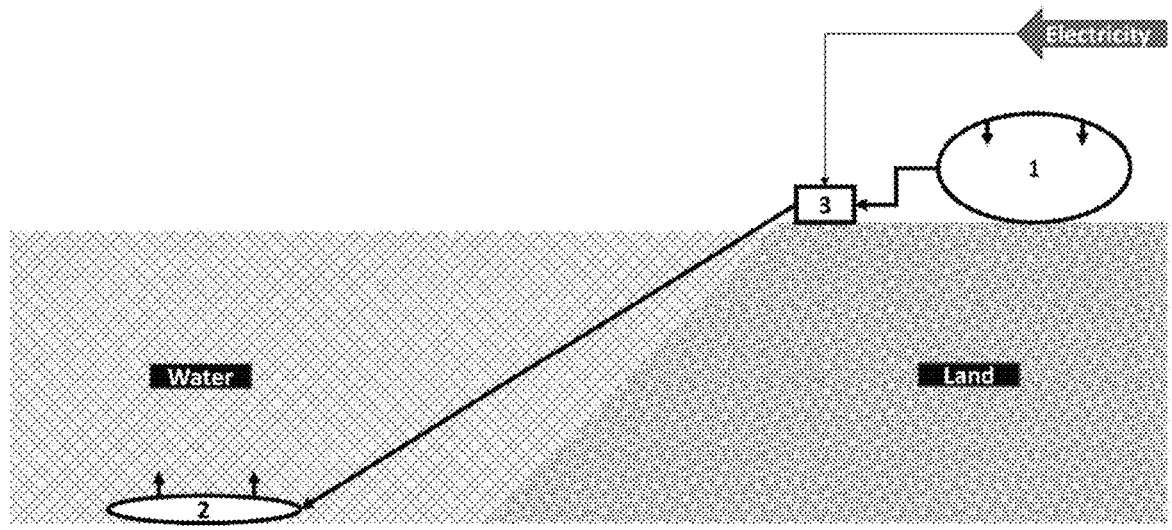
Figure 30 (above)
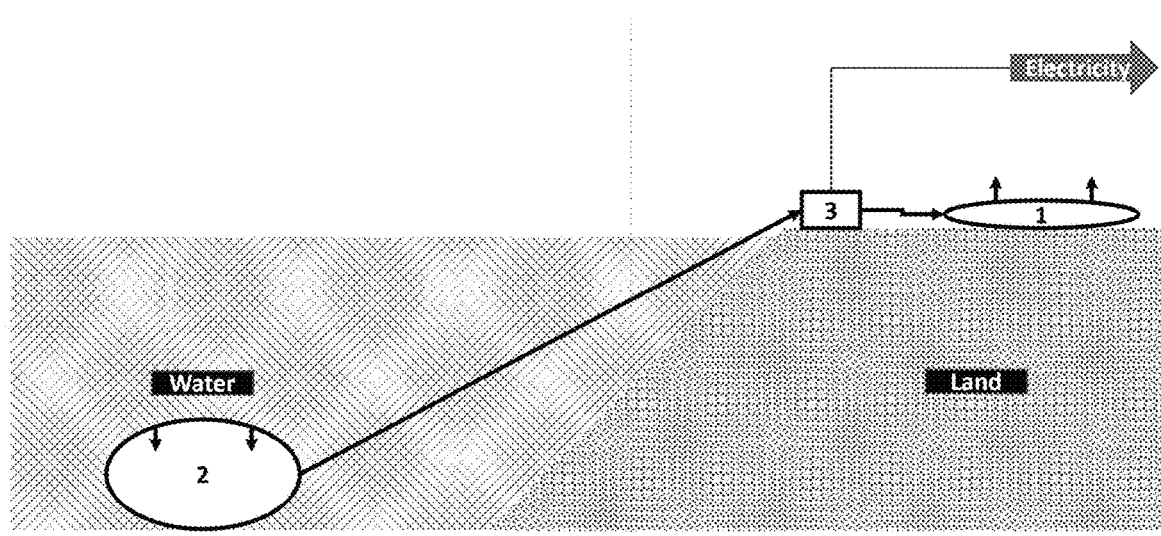
Figure 31 (above)

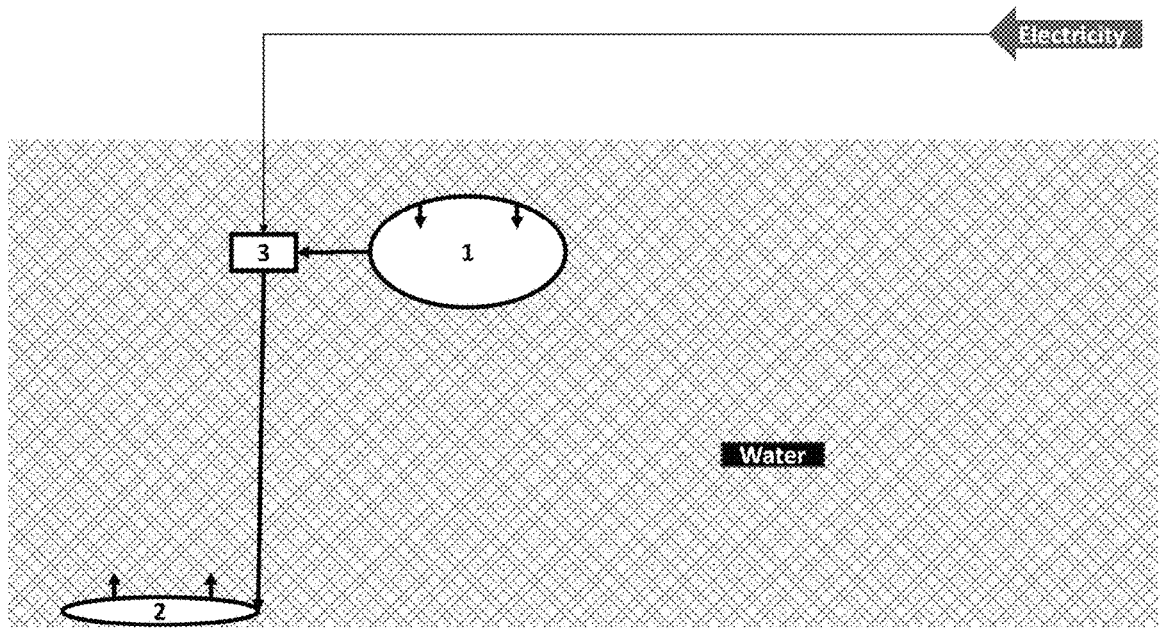
Figure 32 (above)
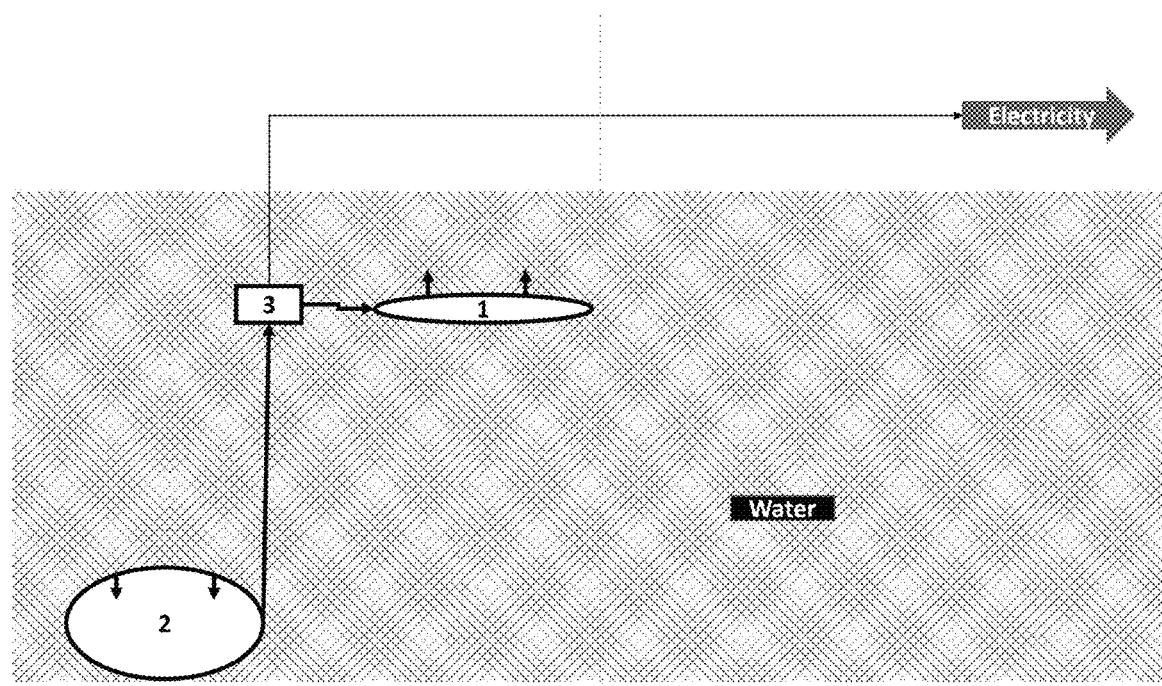
Figure 33 (above)

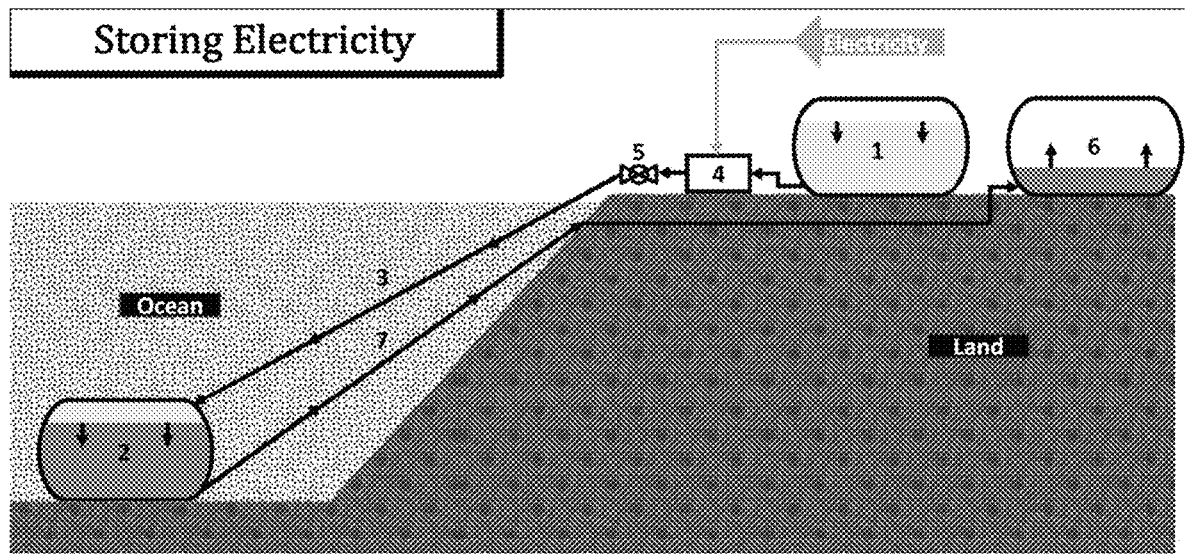
Figure 34 (above)
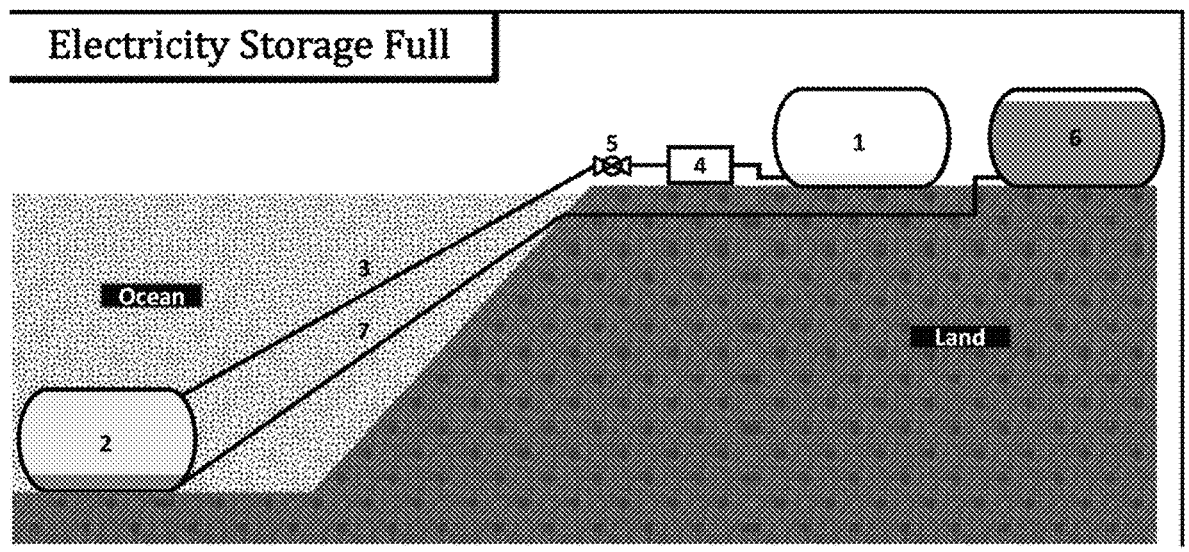
Figure 35 (above)

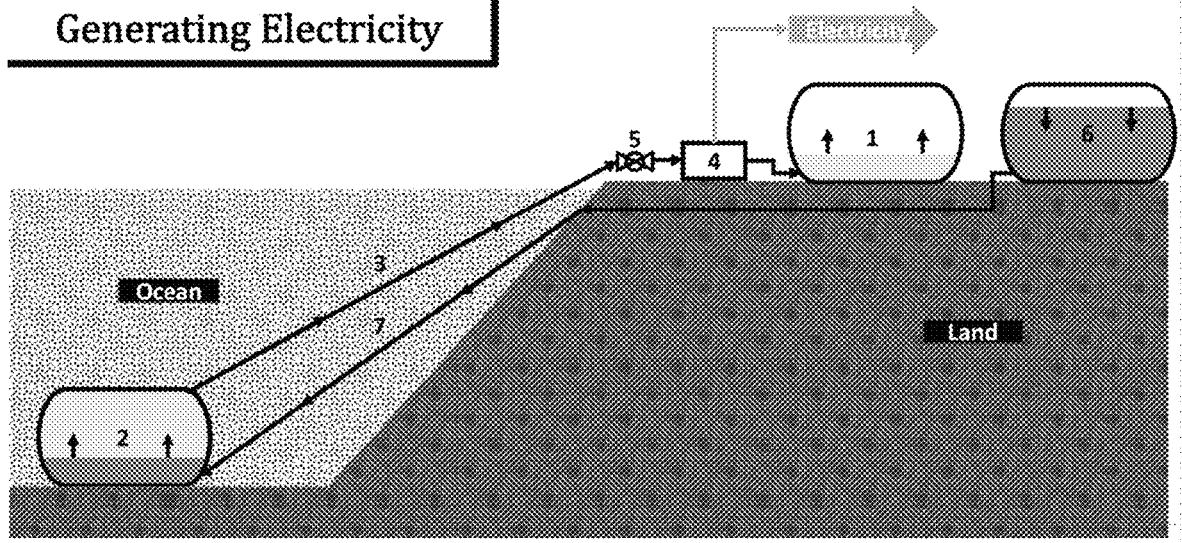
Figure 36 (above)
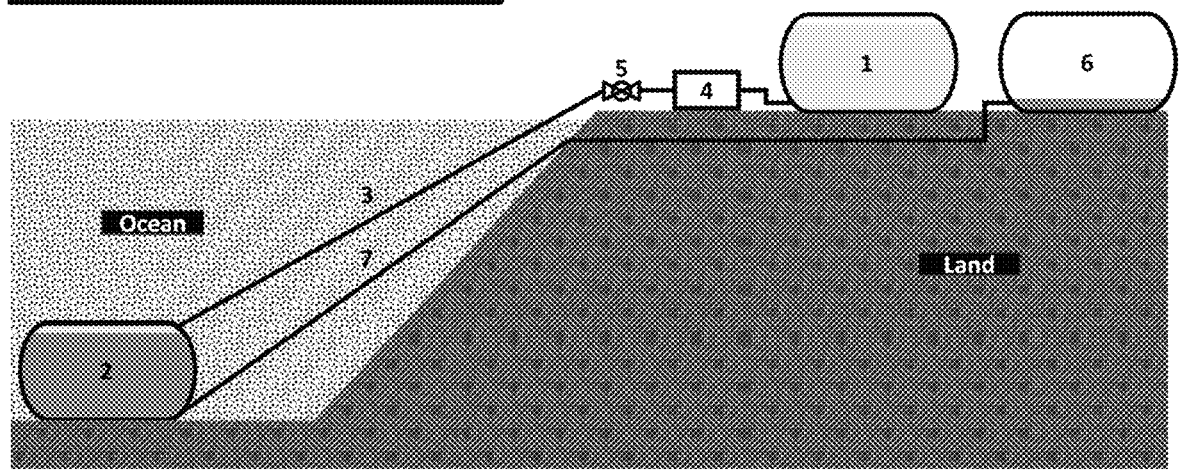
Figure 37 (above)

Key
▢ Low Density Liquid (LDL)
▨ Water (same density as ocean water)
1 Surface LDL Storage Tank  2 Underwater Tank
3 LDL Pipe                  4 Hydraulic Pump / Generator
5 Valve                     6 Surface Water Tank
7 Water Pipe
Figure 38 (above)
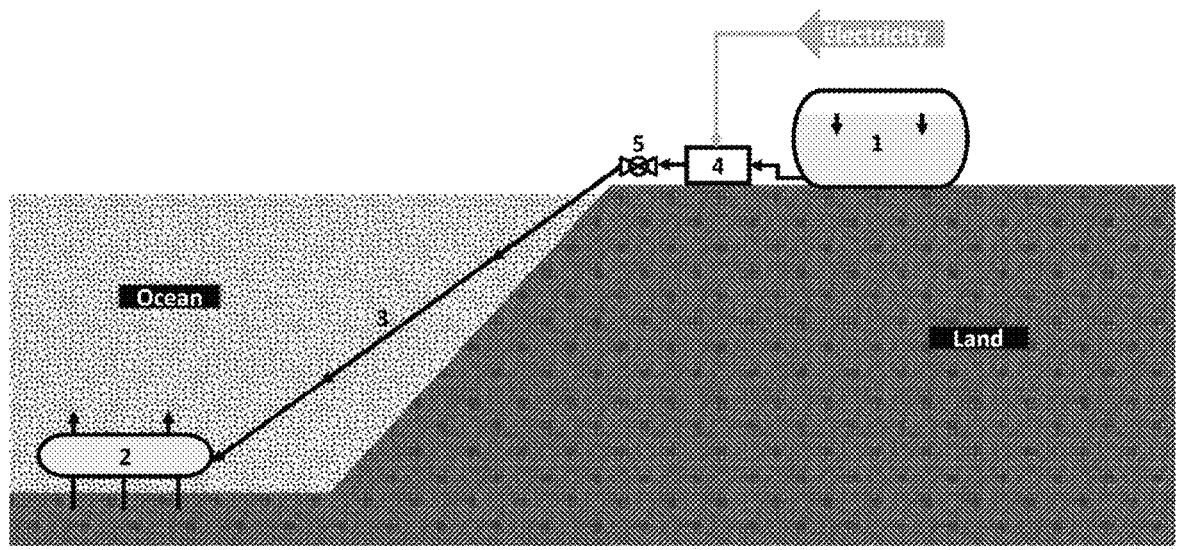
Figure 39 (above)
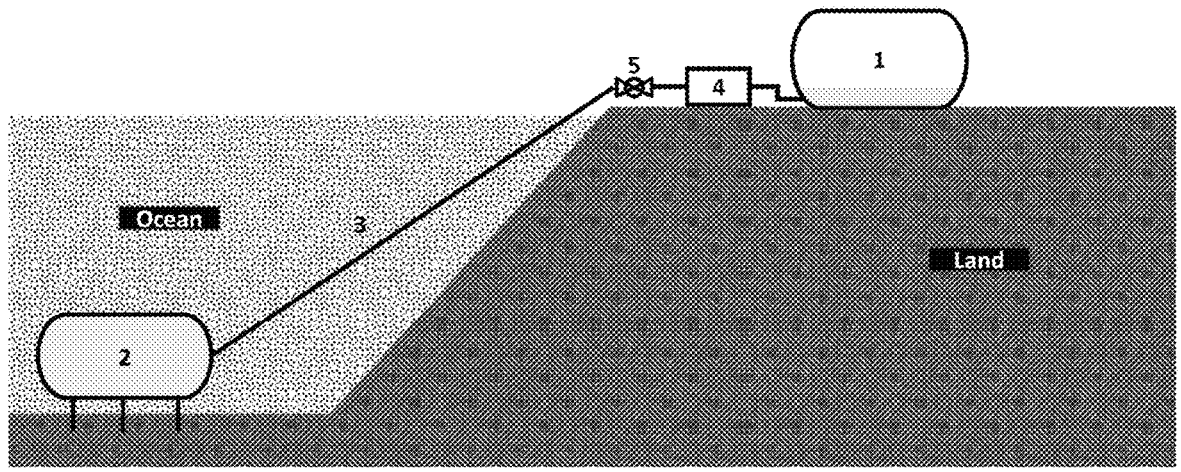
Figure 40 (above)

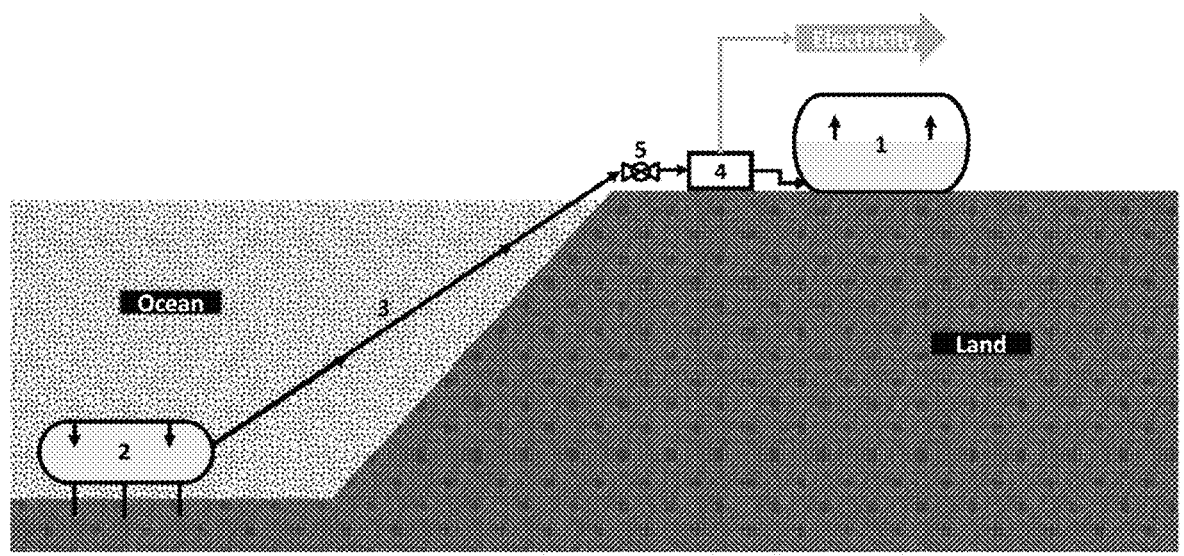
Figure 41 (above)
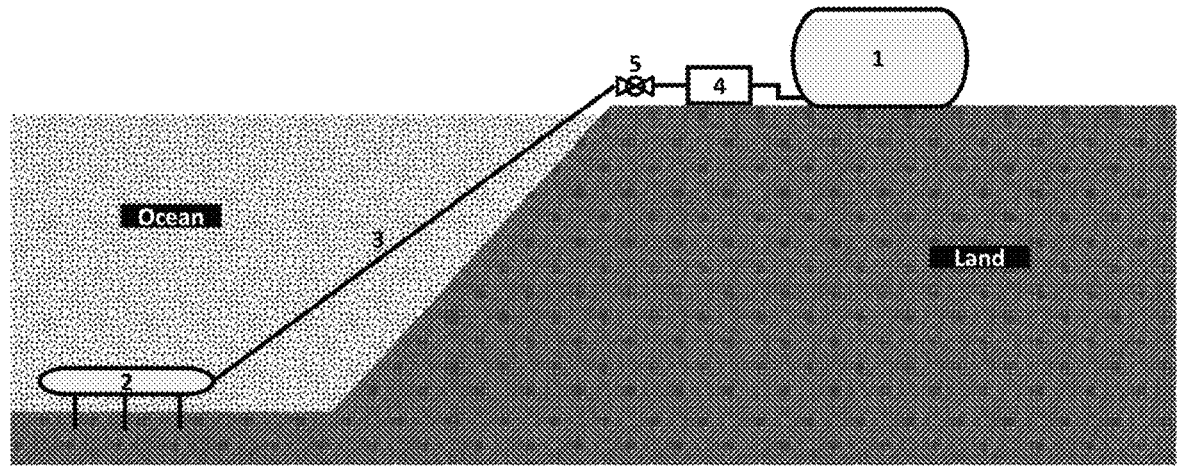
Figure 42 (above)

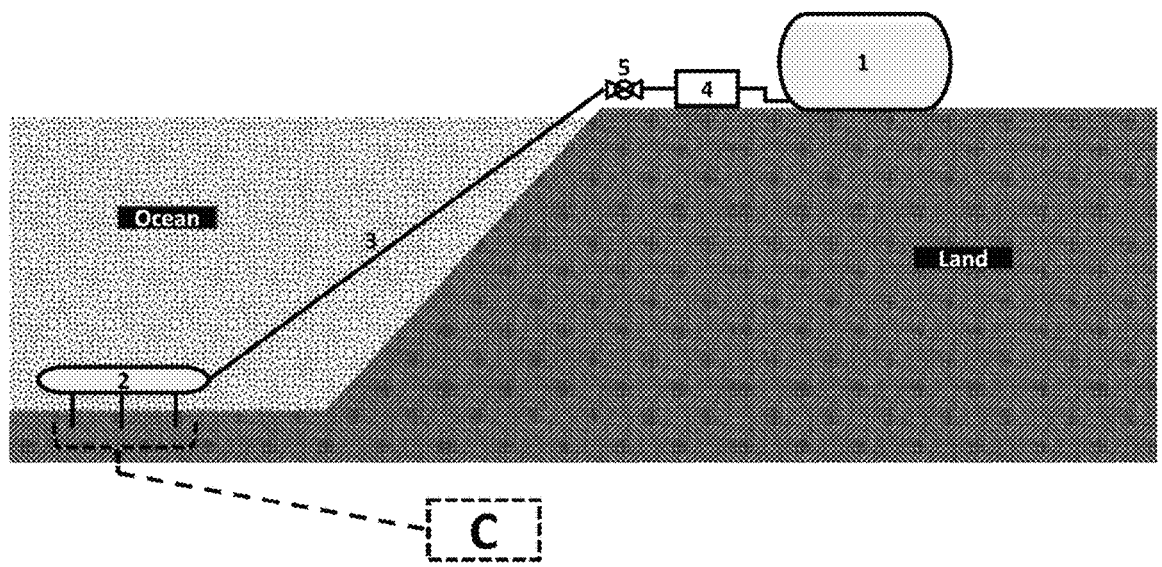
Figure 43 (above)
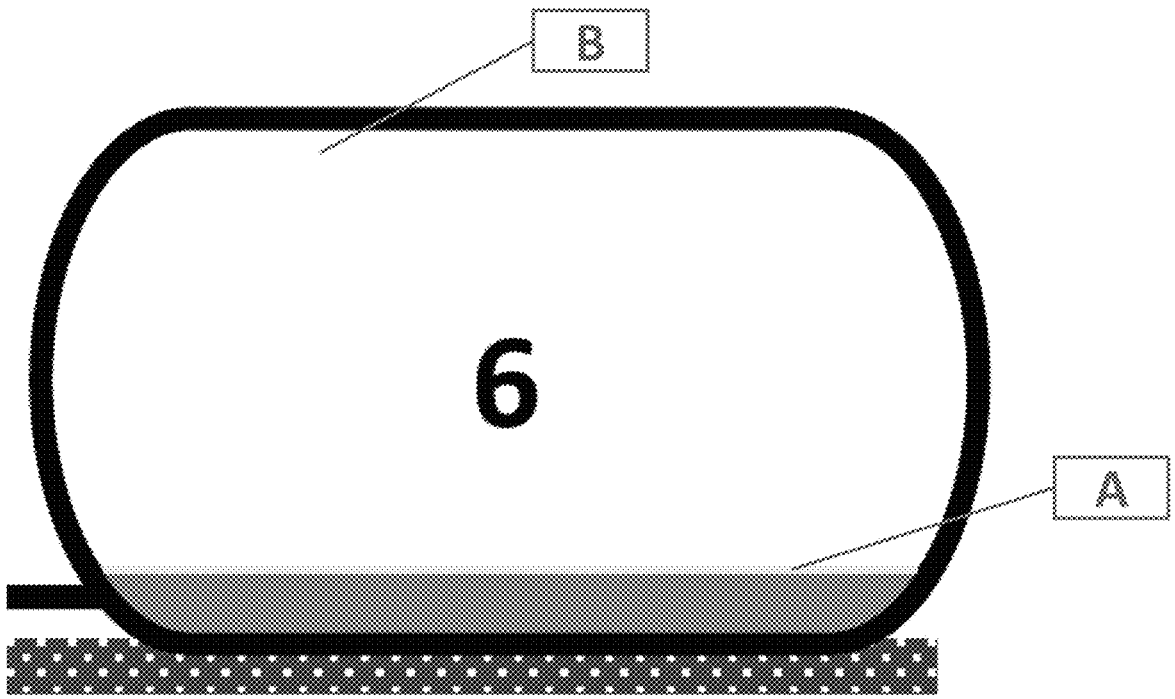
Figure 44 (above)

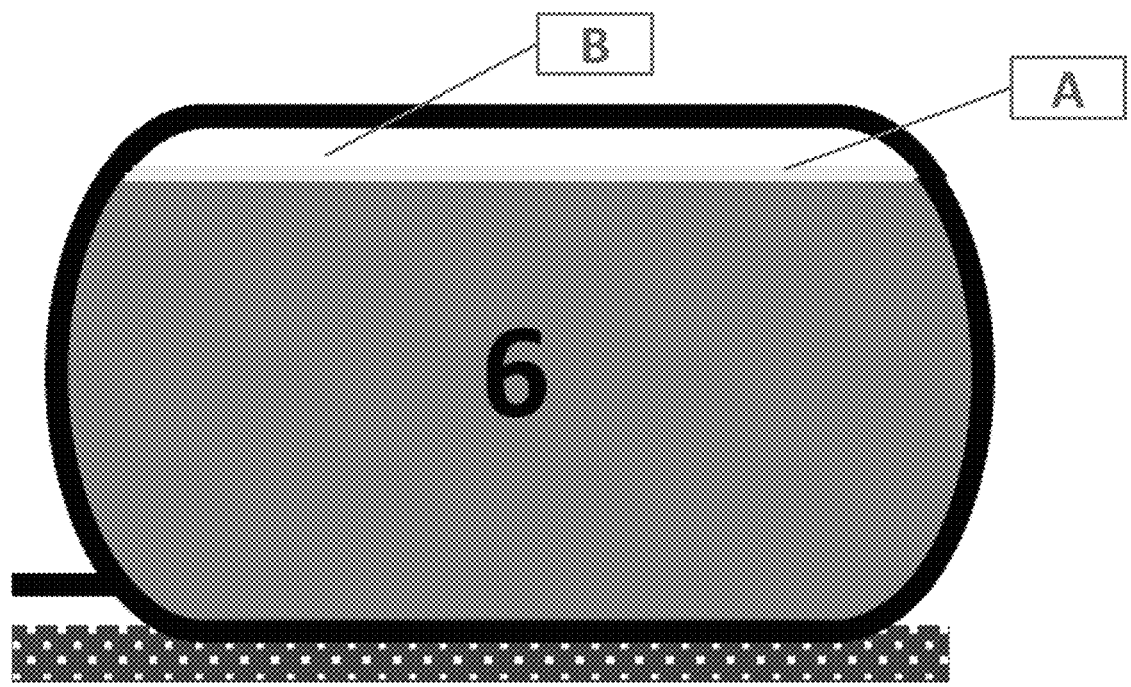
Figure 45 (above)
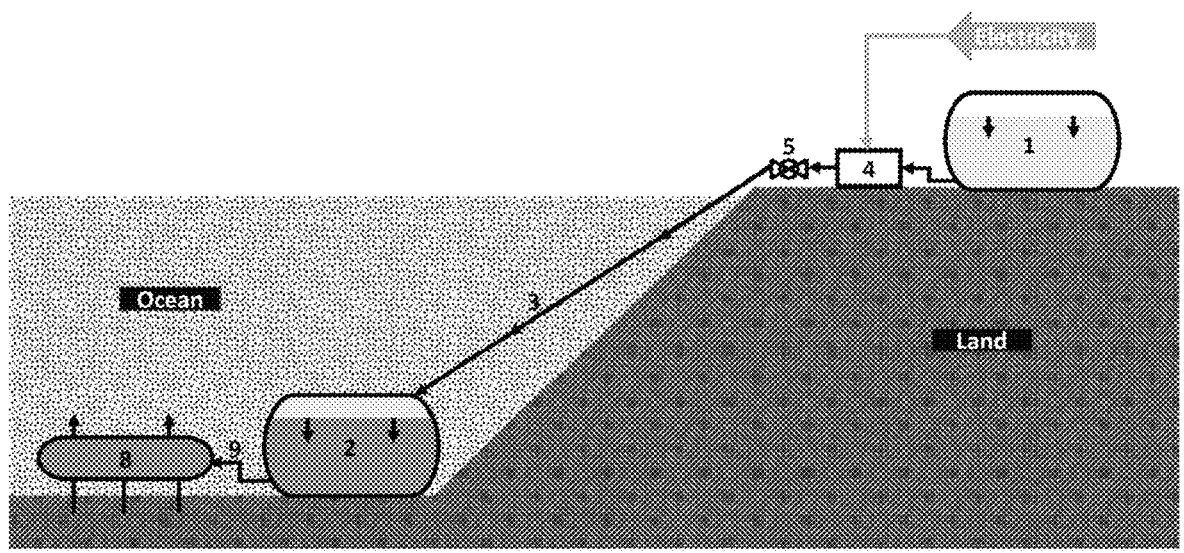
Figure 46 (above)

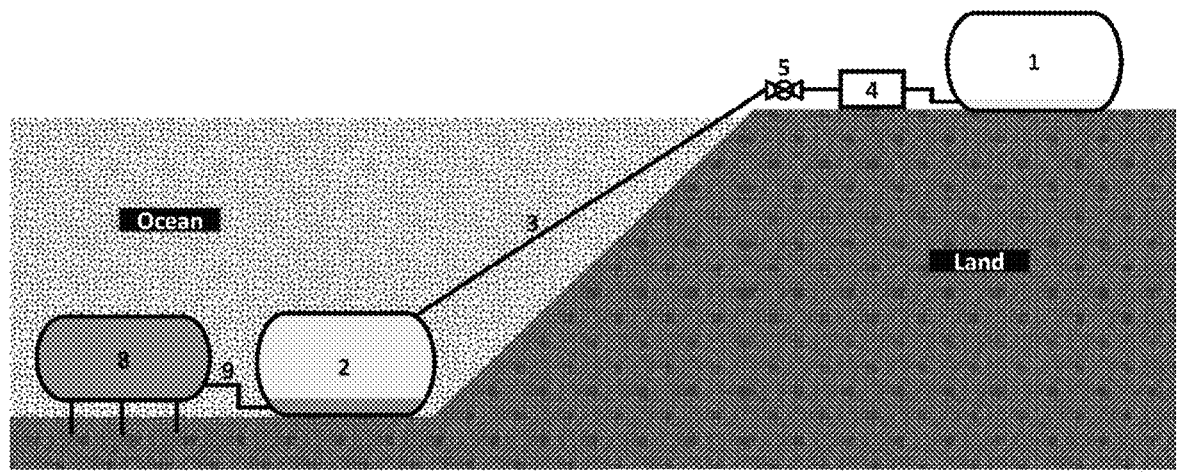
Figure 47 (above)
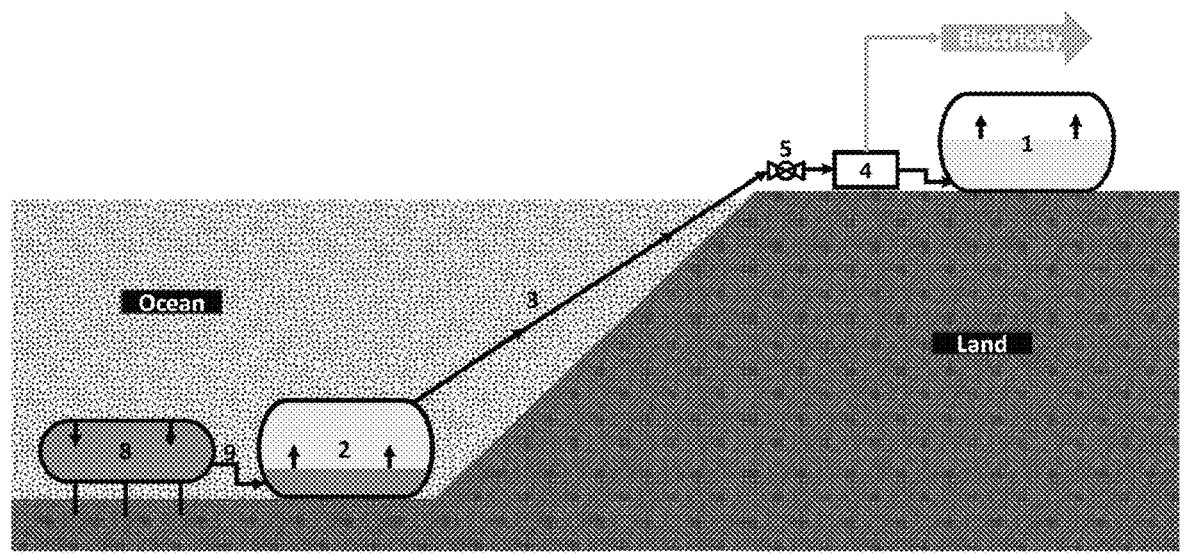
Figure 48 (above)

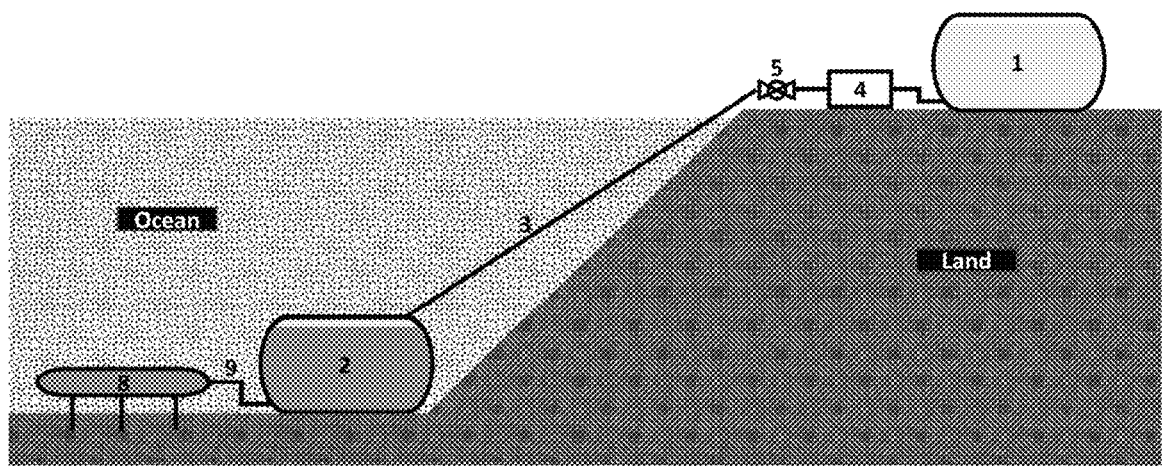
Figure 49 (above)
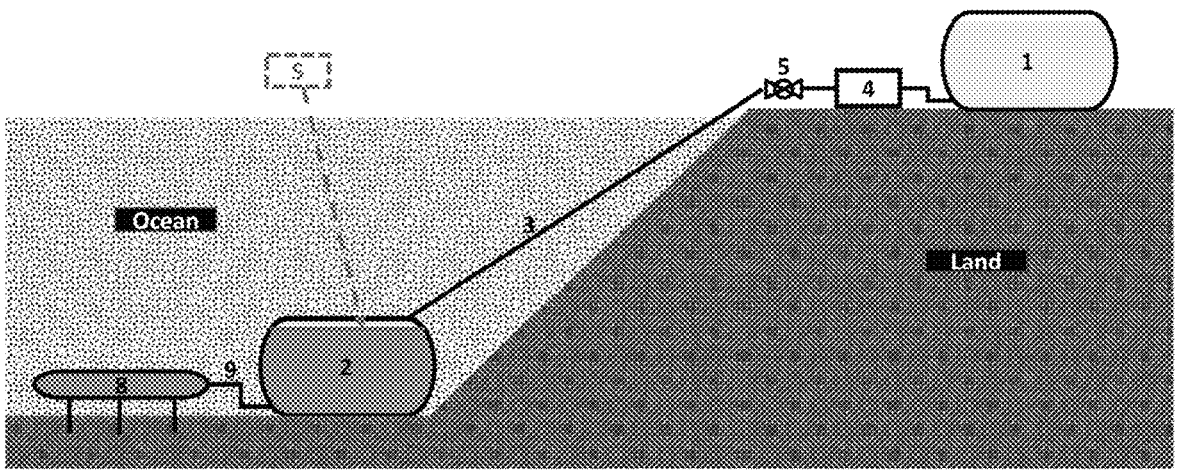
Figure 50 (above)

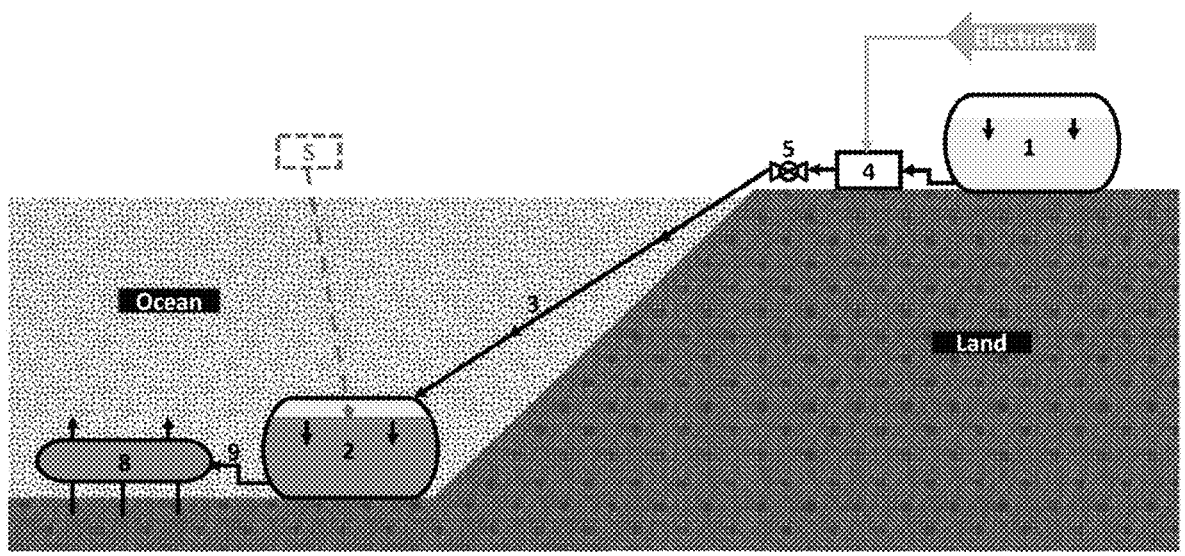
Figure 51 (above)
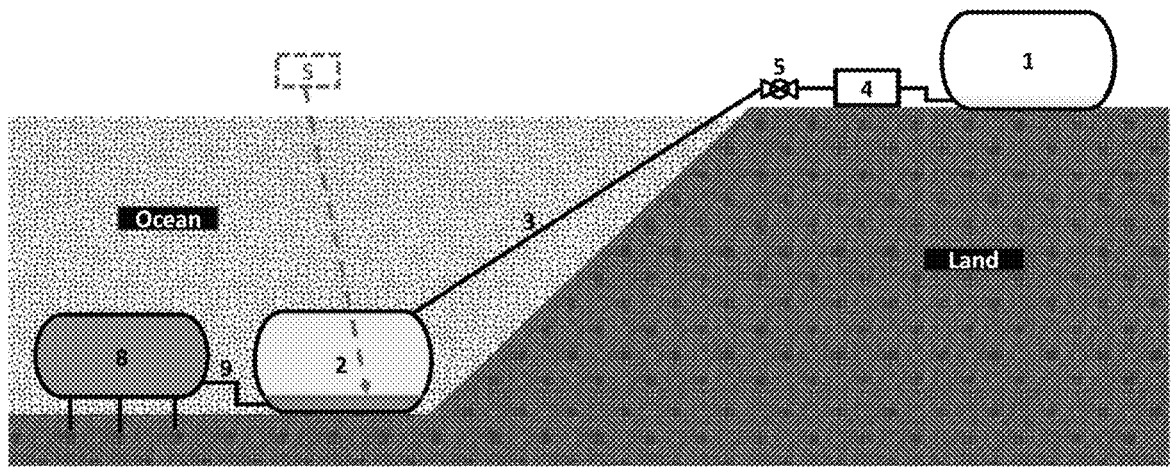
Figure 52 (above)

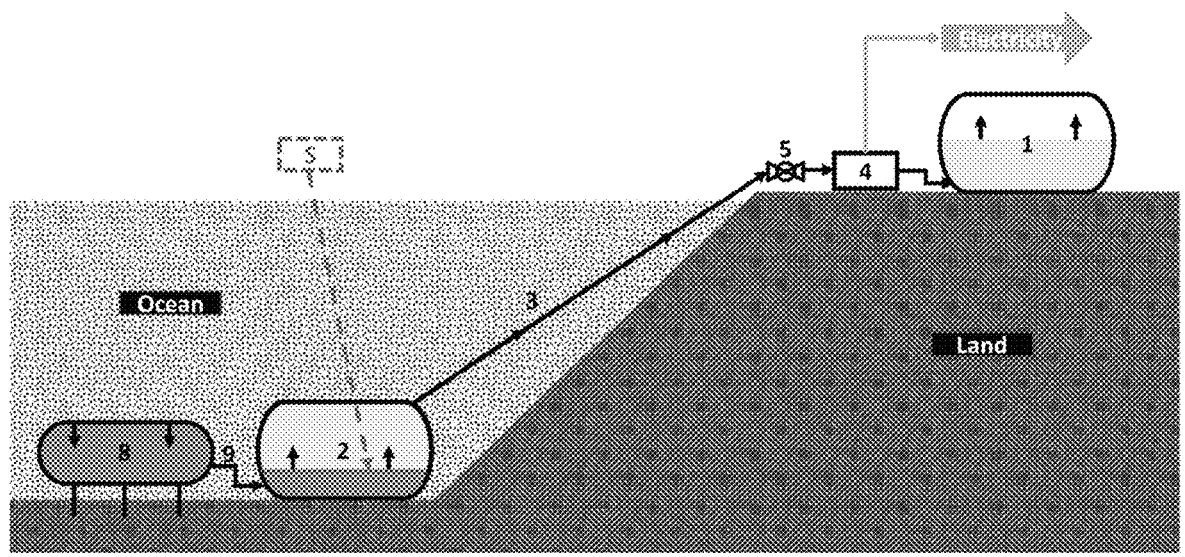
Figure 53 (above)
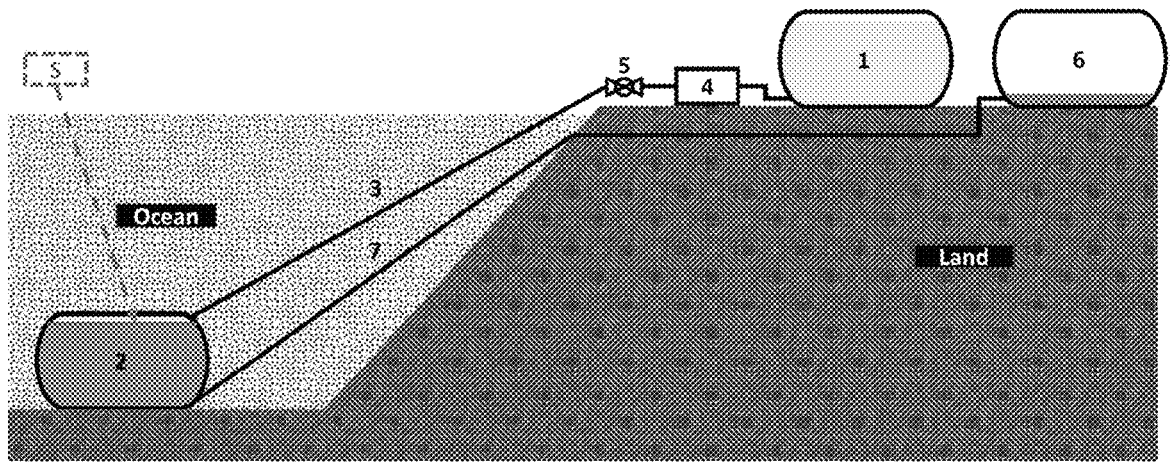
Figure 54 (above)

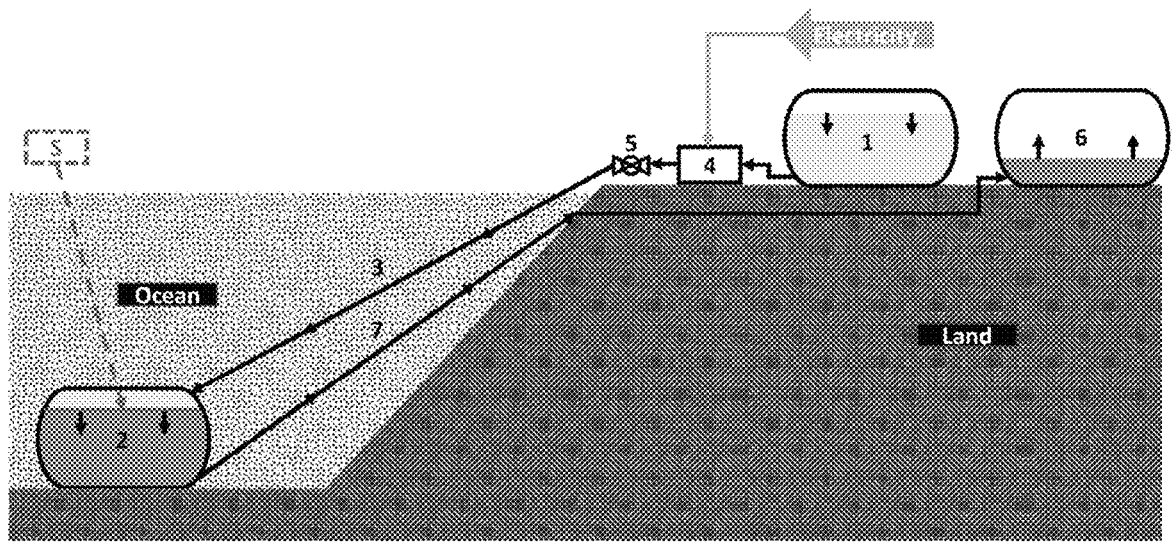
Figure 55 (above)
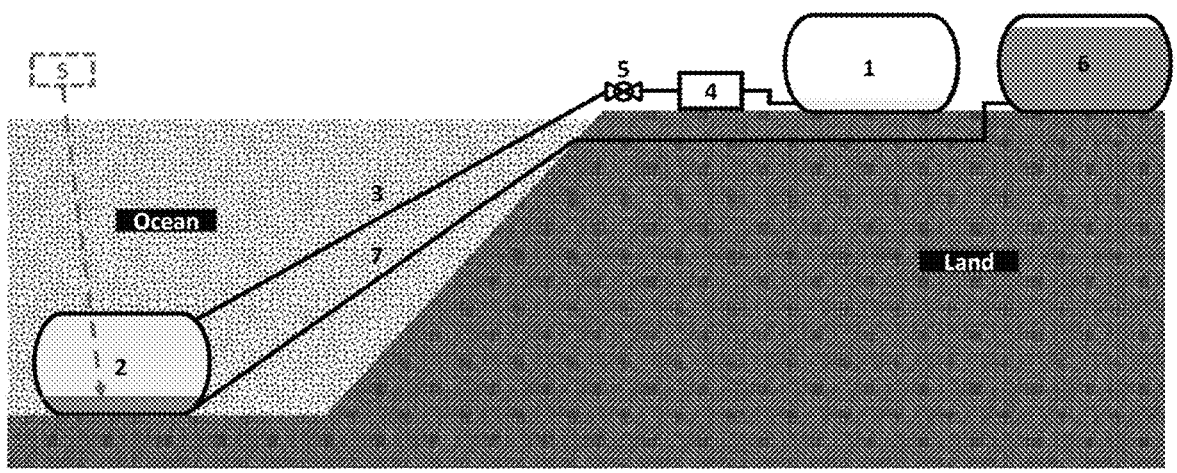
Figure 56 (above)

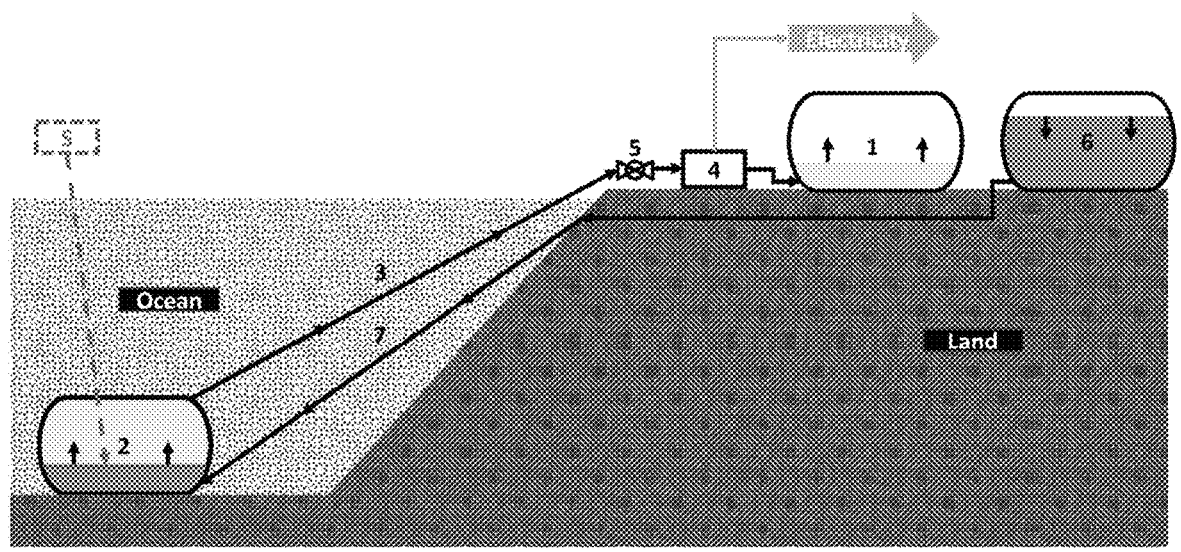
Figure 57 (above)
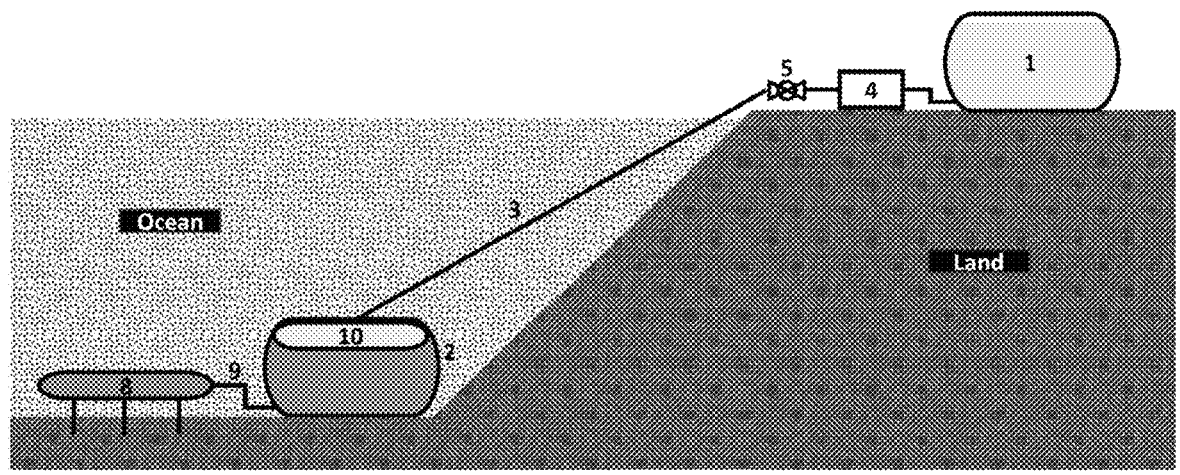
Figure 58 (above)

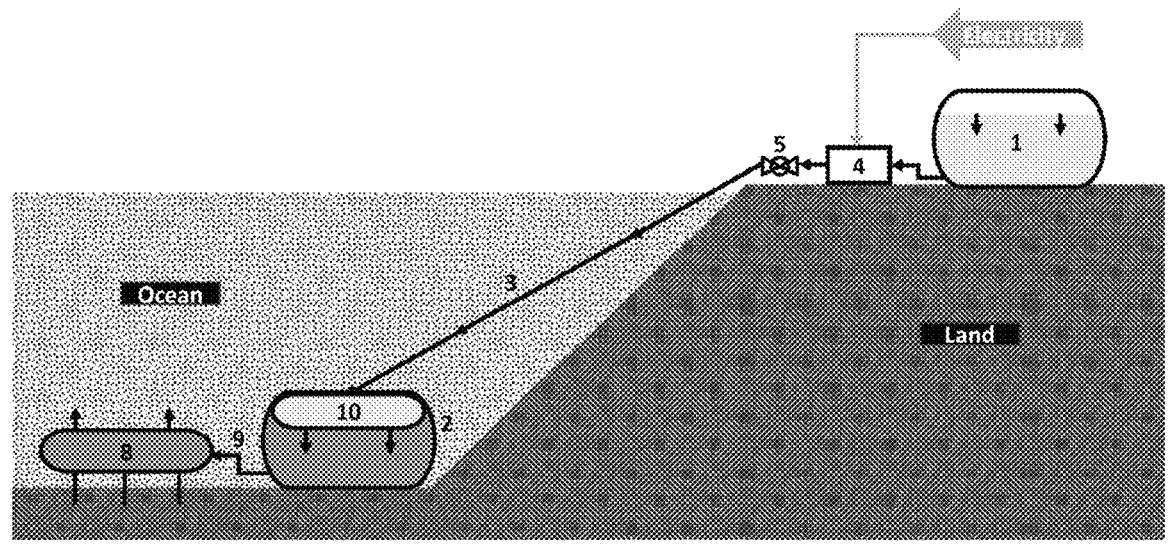
Figure 59 (above)
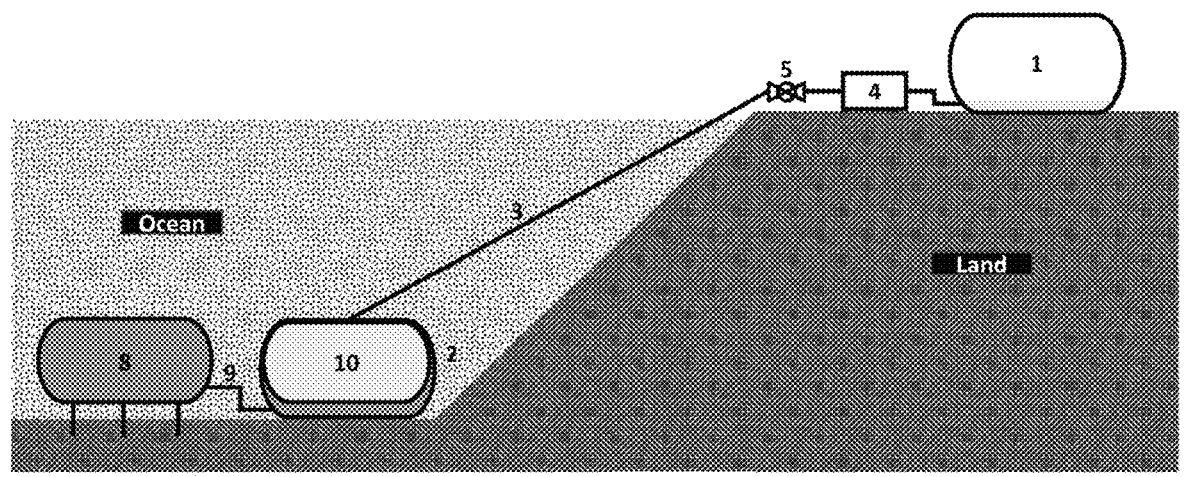
Figure 60 (above)

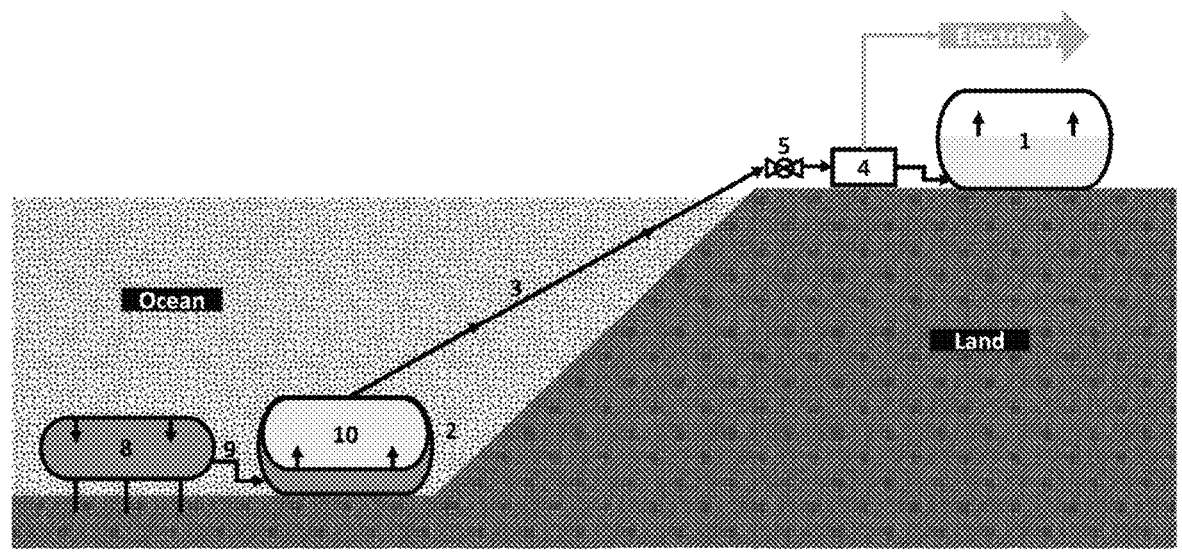
Figure 61 (above)
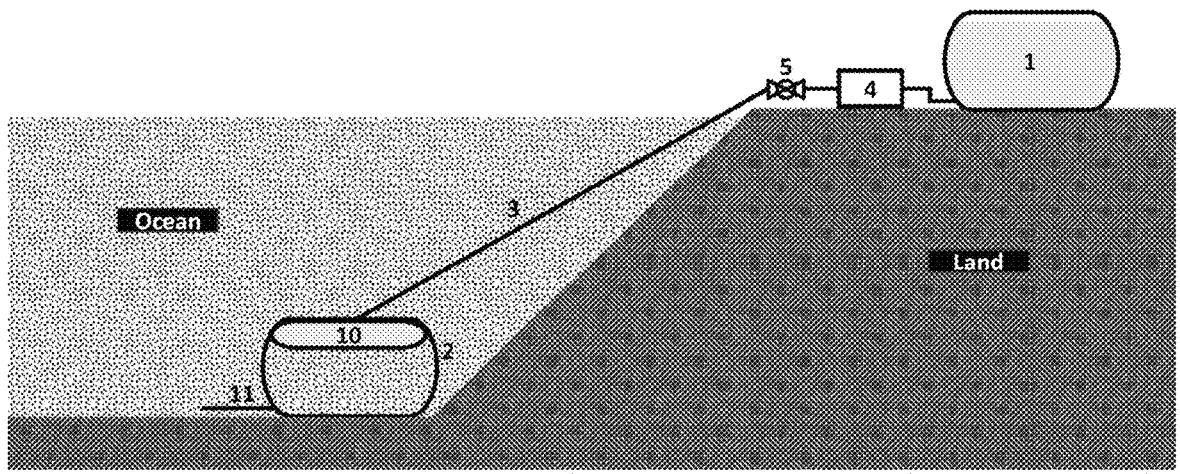
Figure 62 (above)

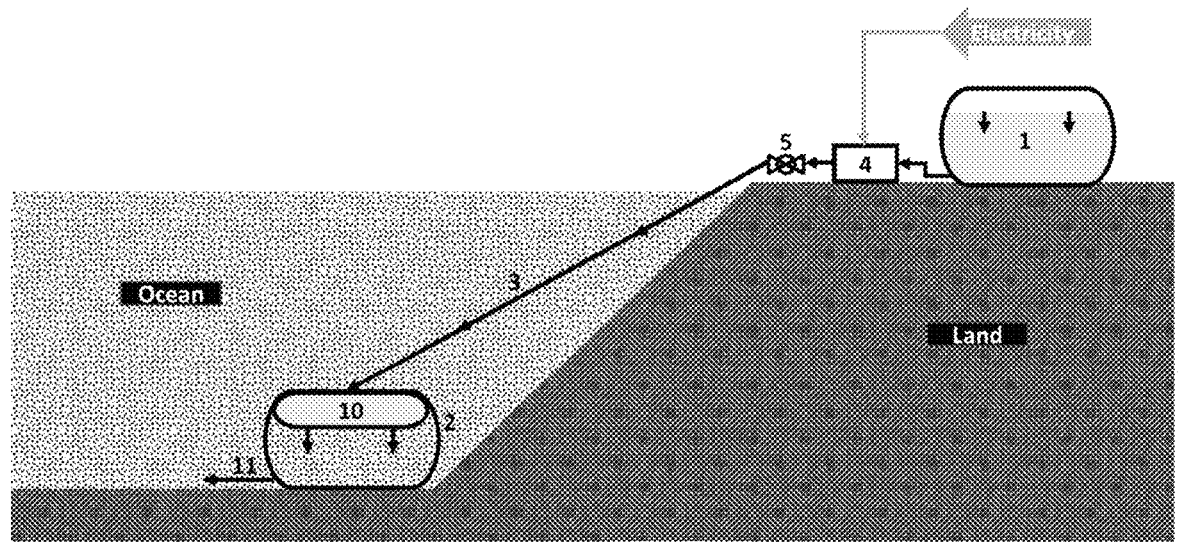
Figure 63 (above)
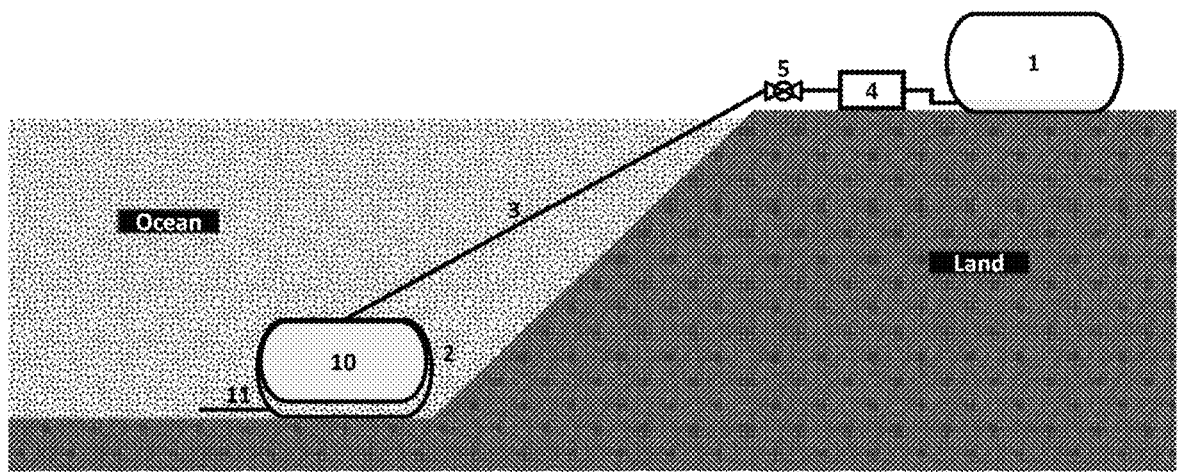
Figure 64 (above)

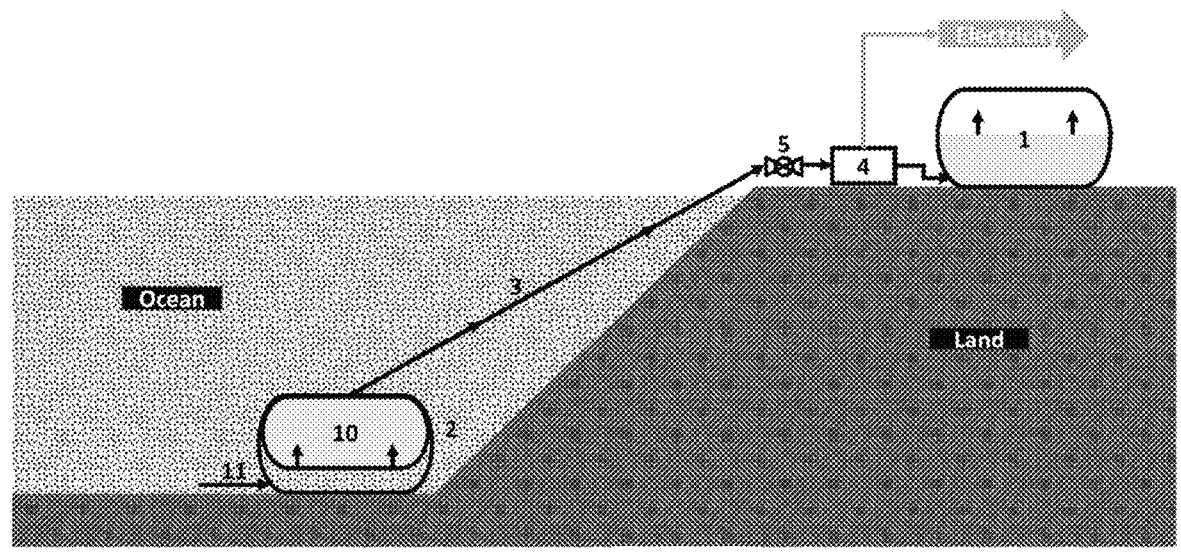
Figure 65 (above)
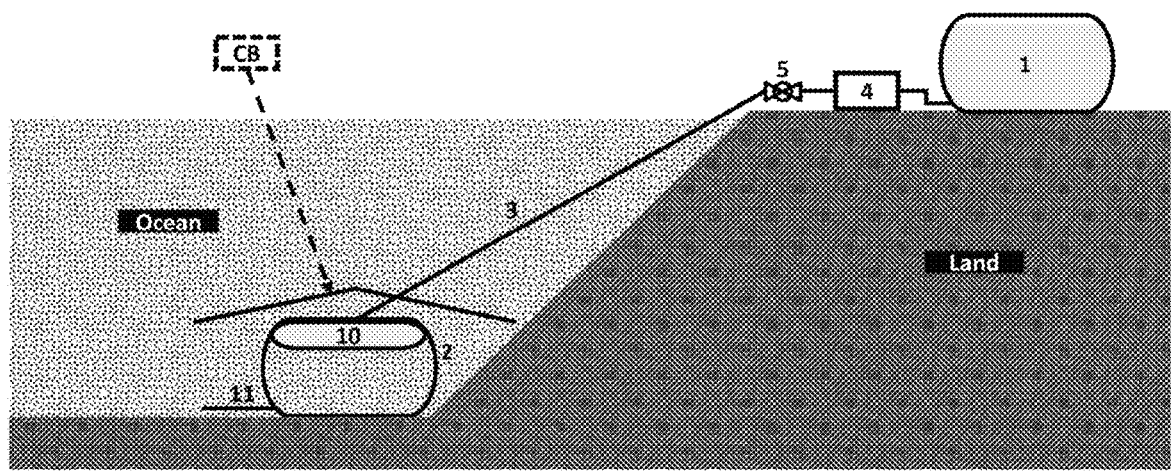
Figure 66 (above)

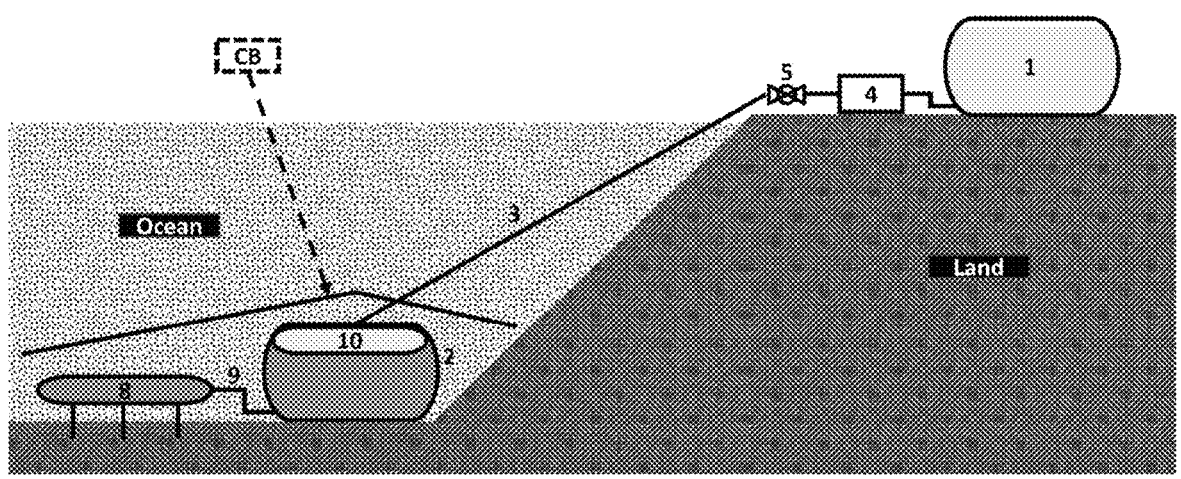
Figure 67 (above)
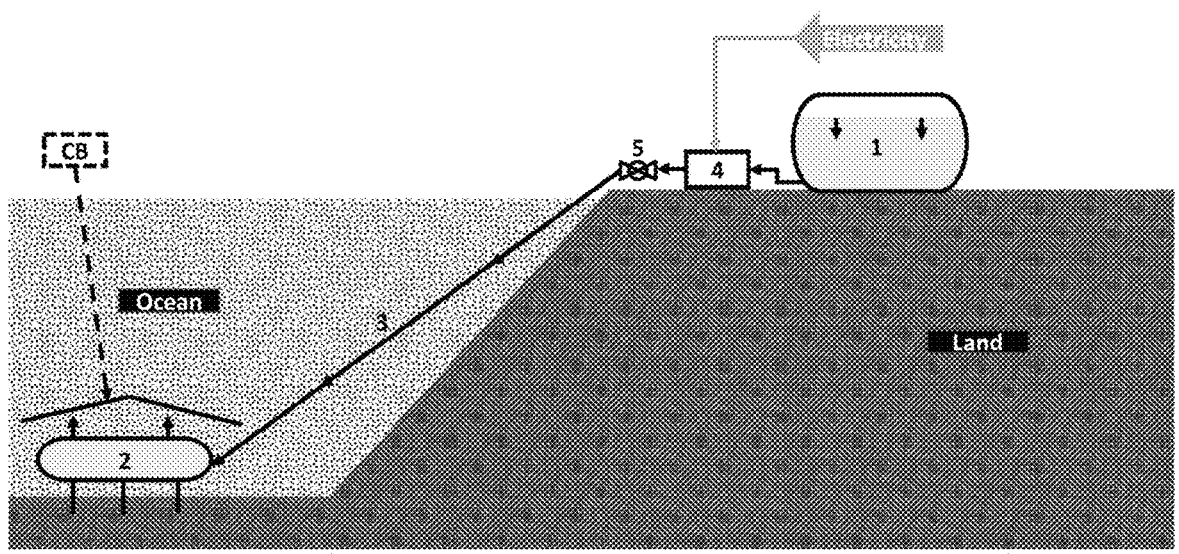
Figure 68 (above)

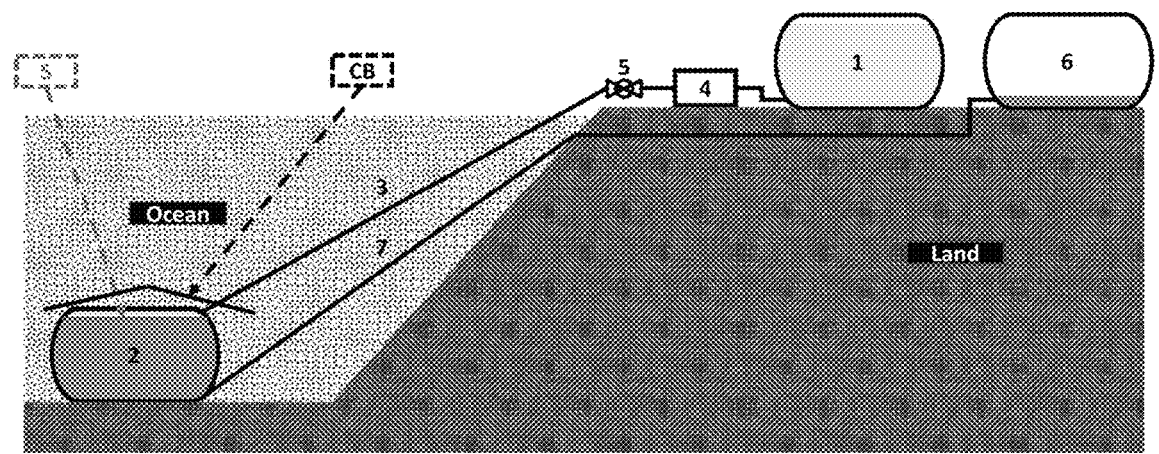
Figure 69 (above)
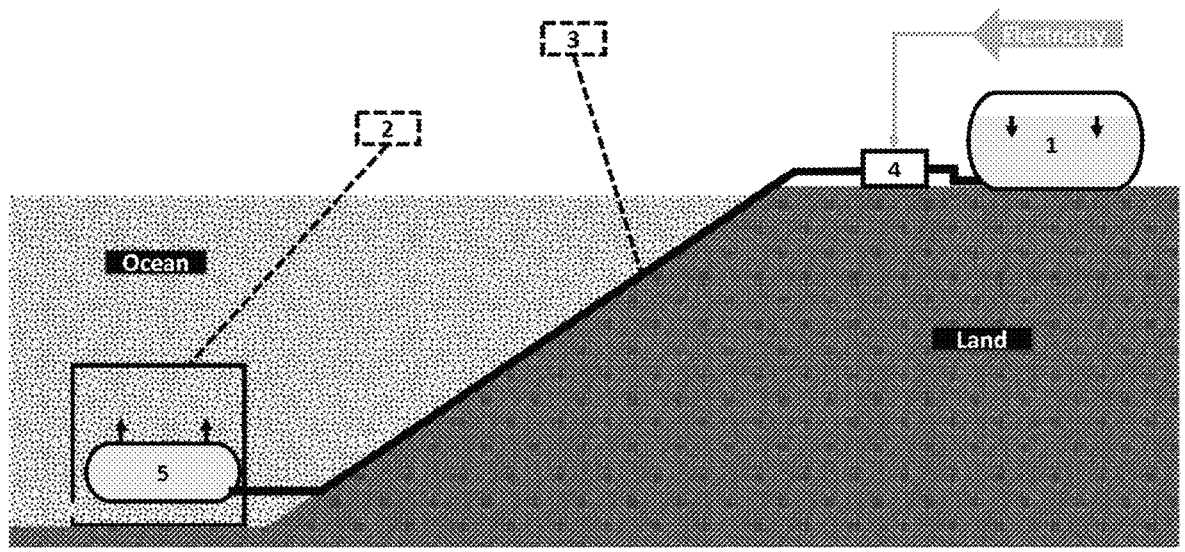
Figure 70 (above)

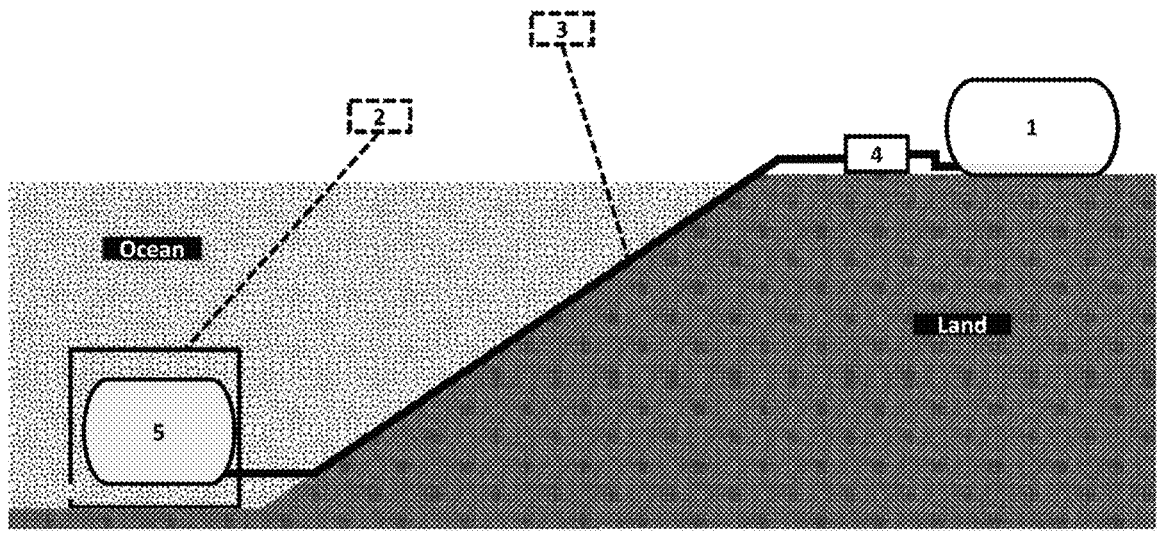
Figure 71 (above)
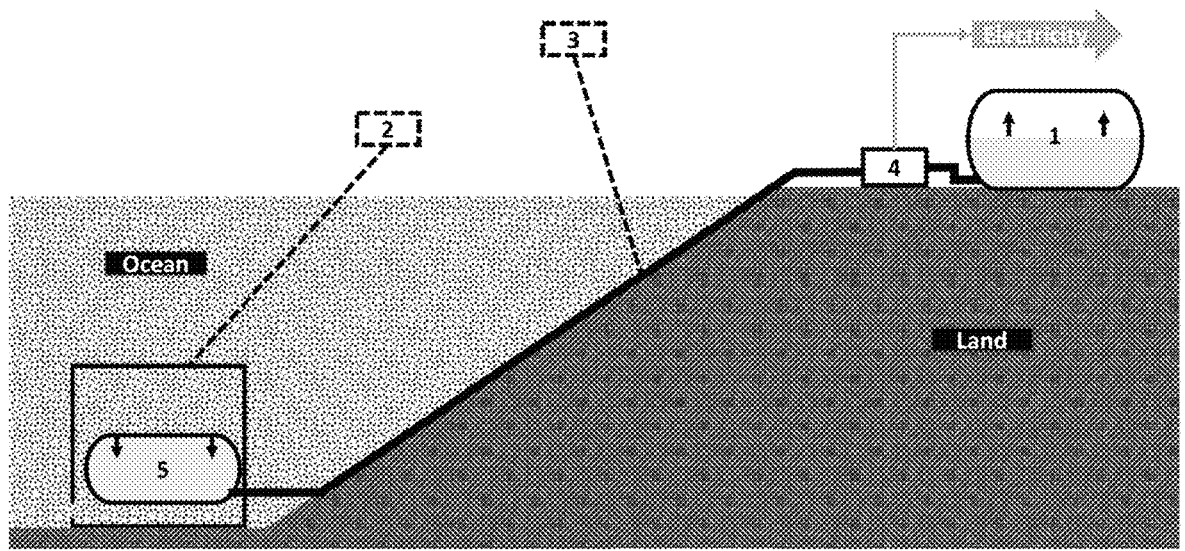
Figure 72 (above)

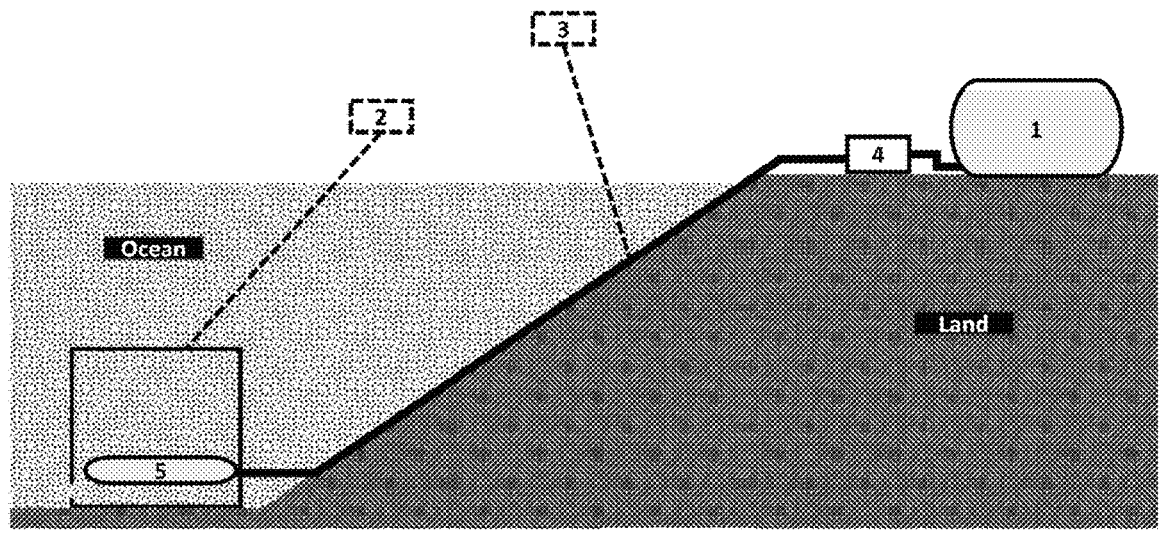
Figure 73 (above)
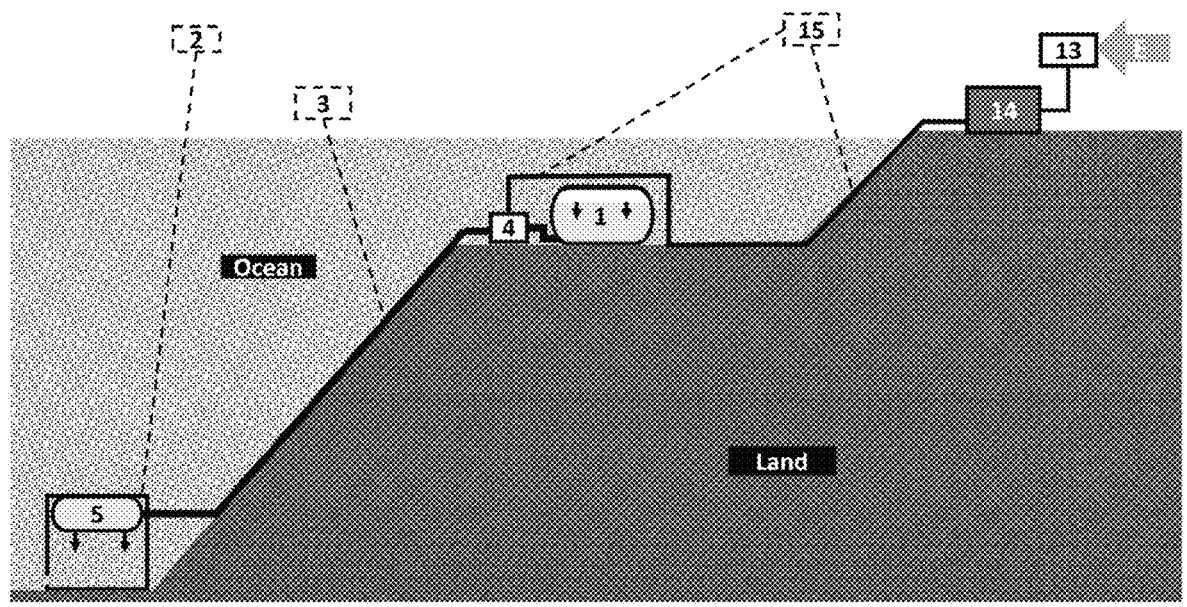
Figure 74 (above)

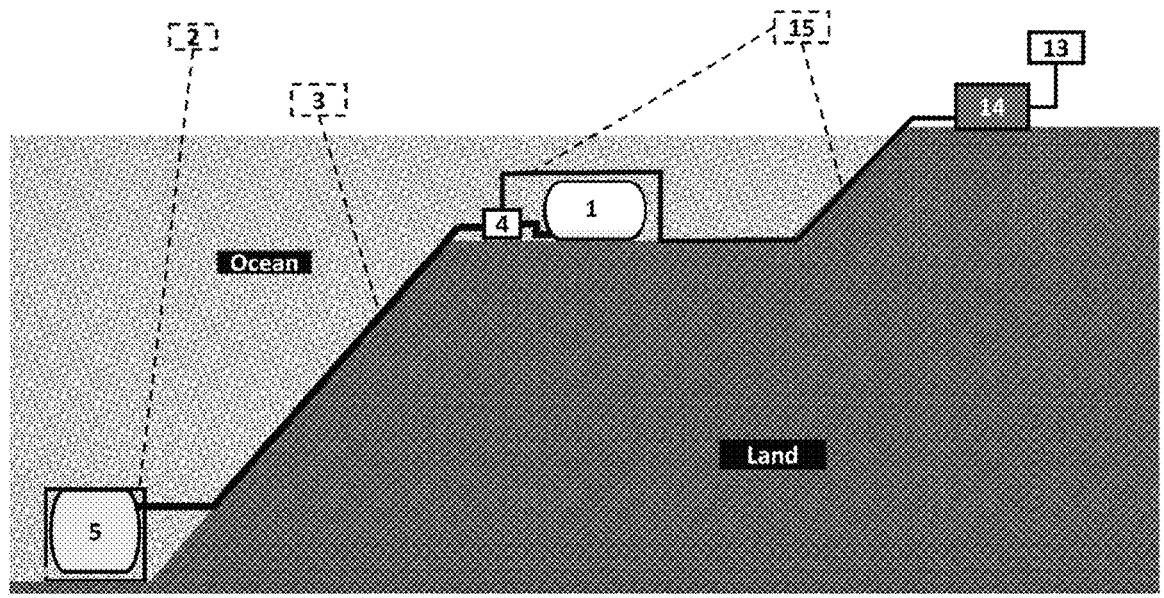
Figure 75 (above)
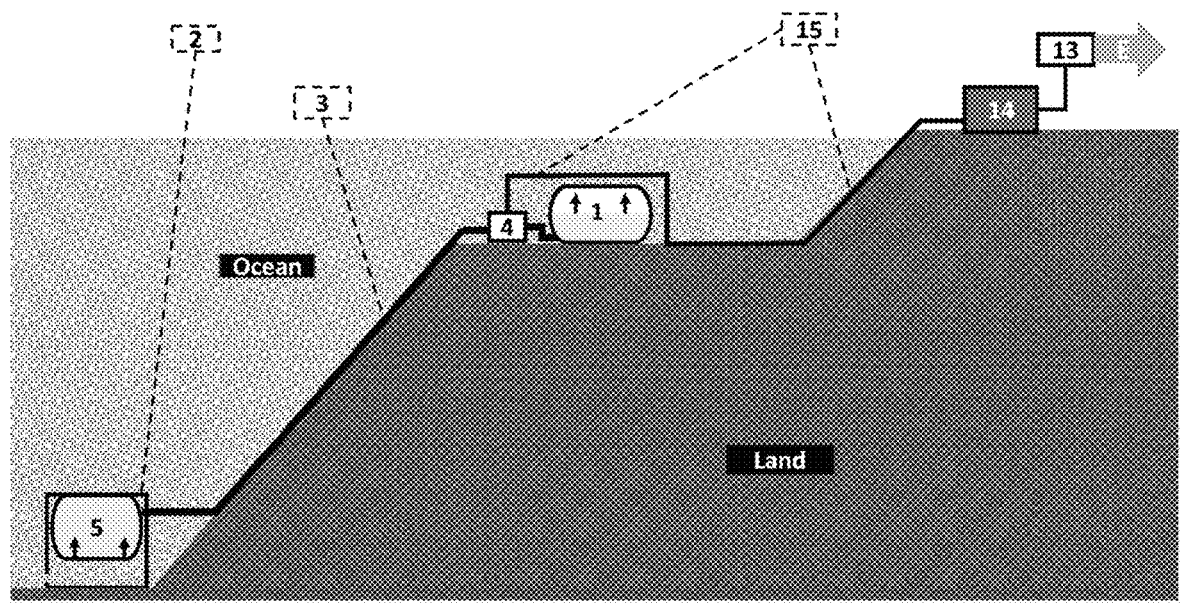
Figure 76 (above)

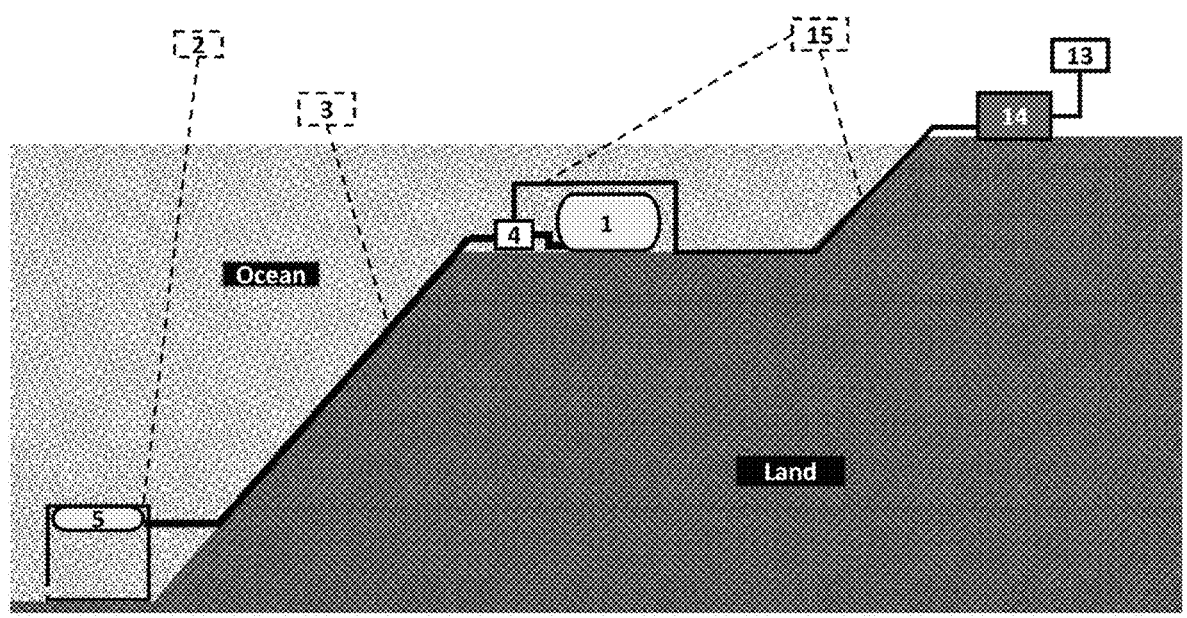
Figure 77 (above)

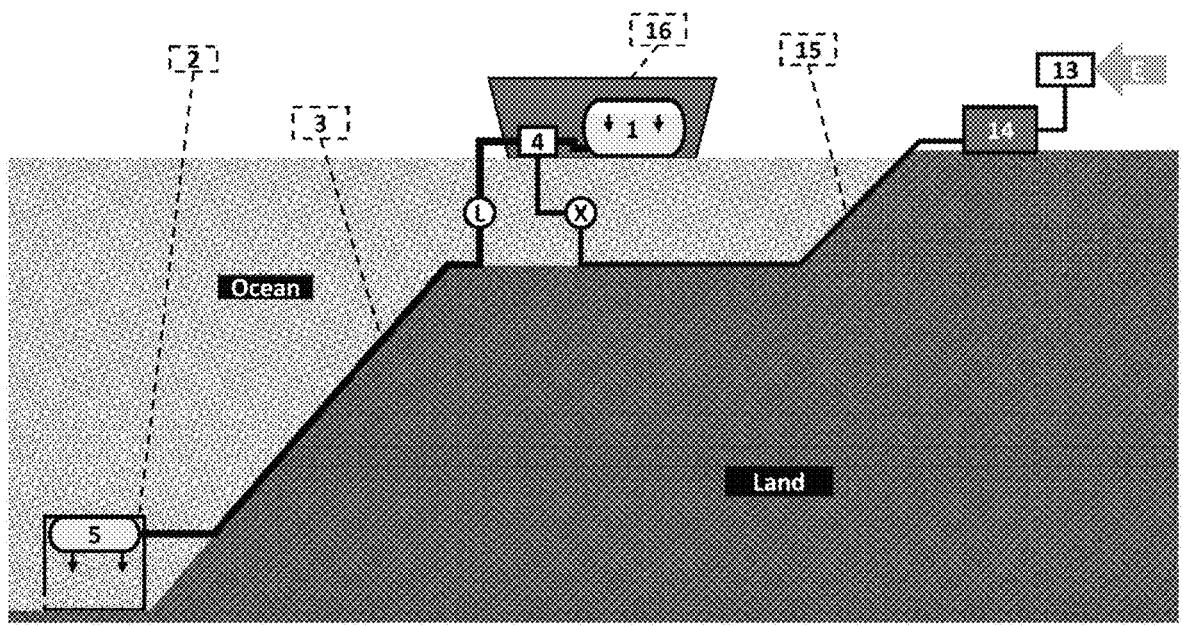
Figure 78 (above)
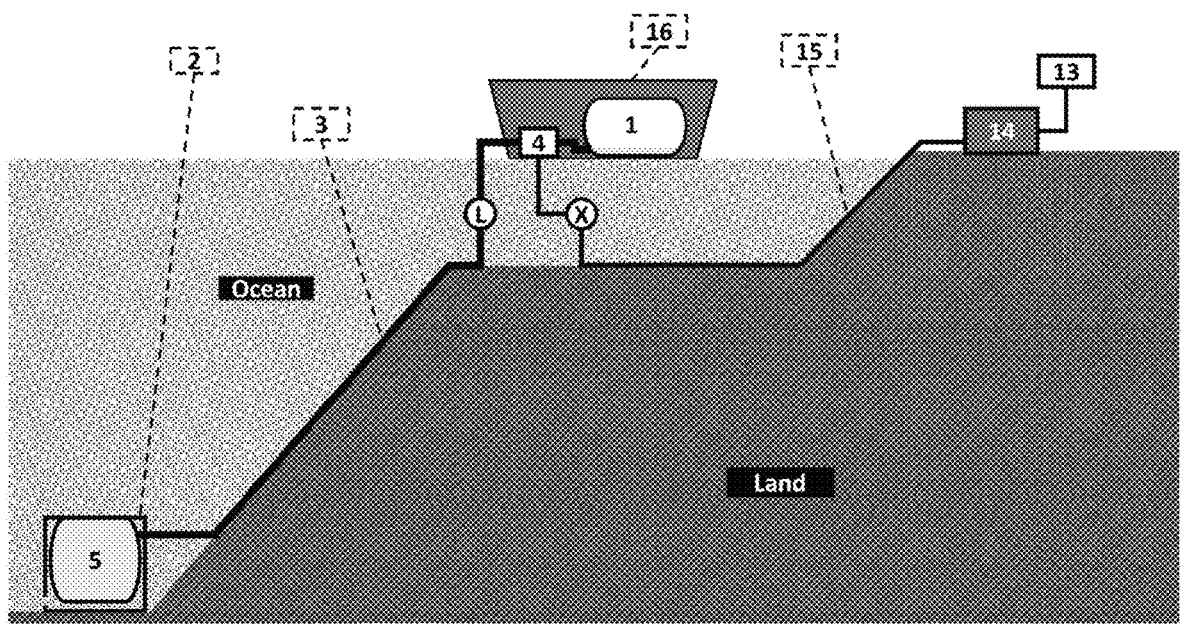
Figure 79 (above)

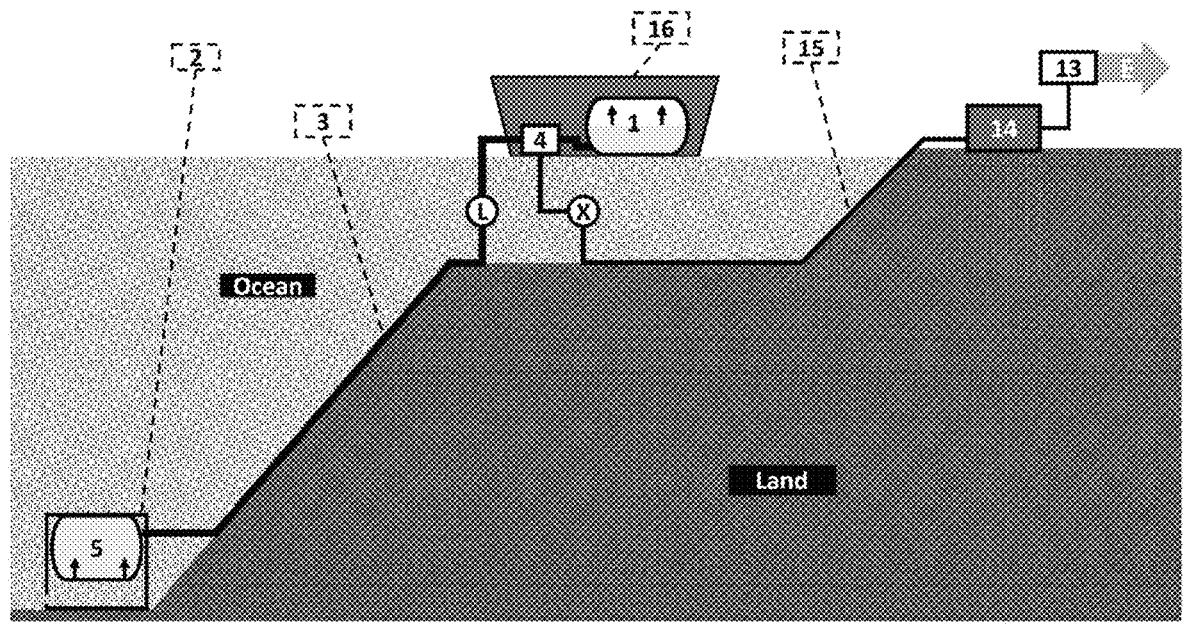
Figure 80 (above)
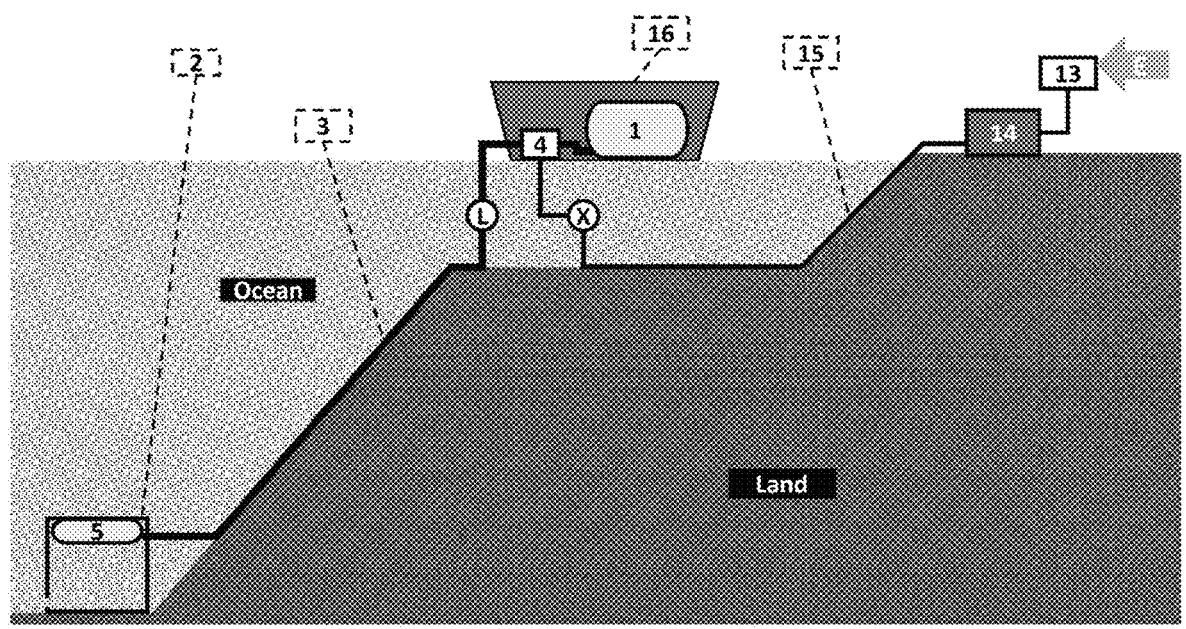
Figure 81 (above)

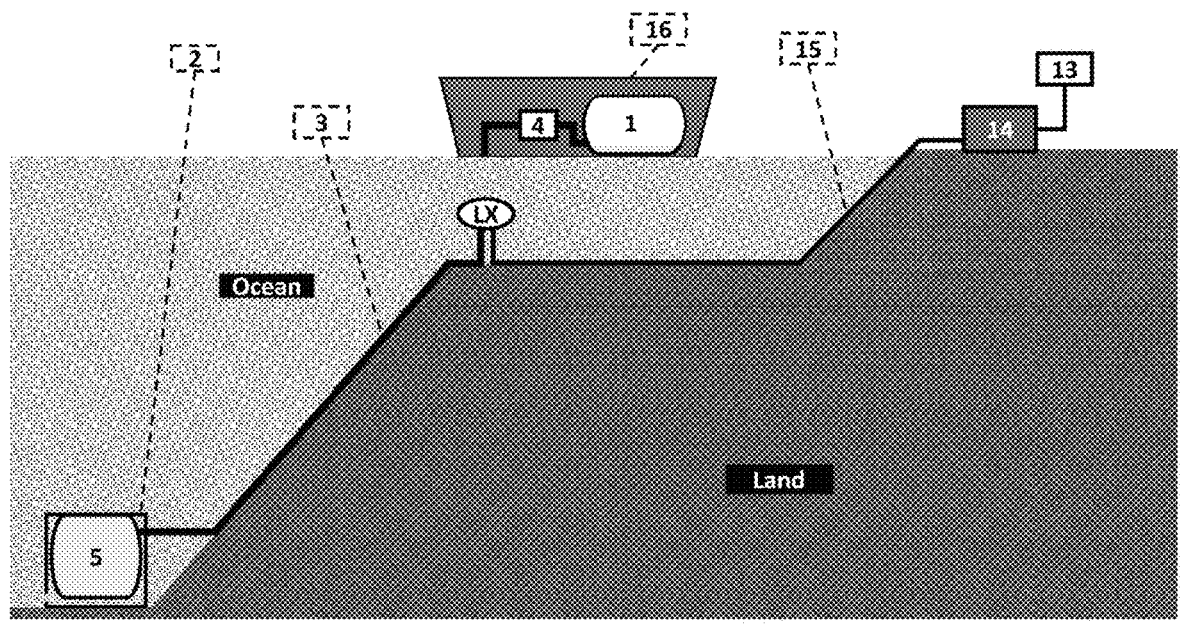
Figure 82 (above)
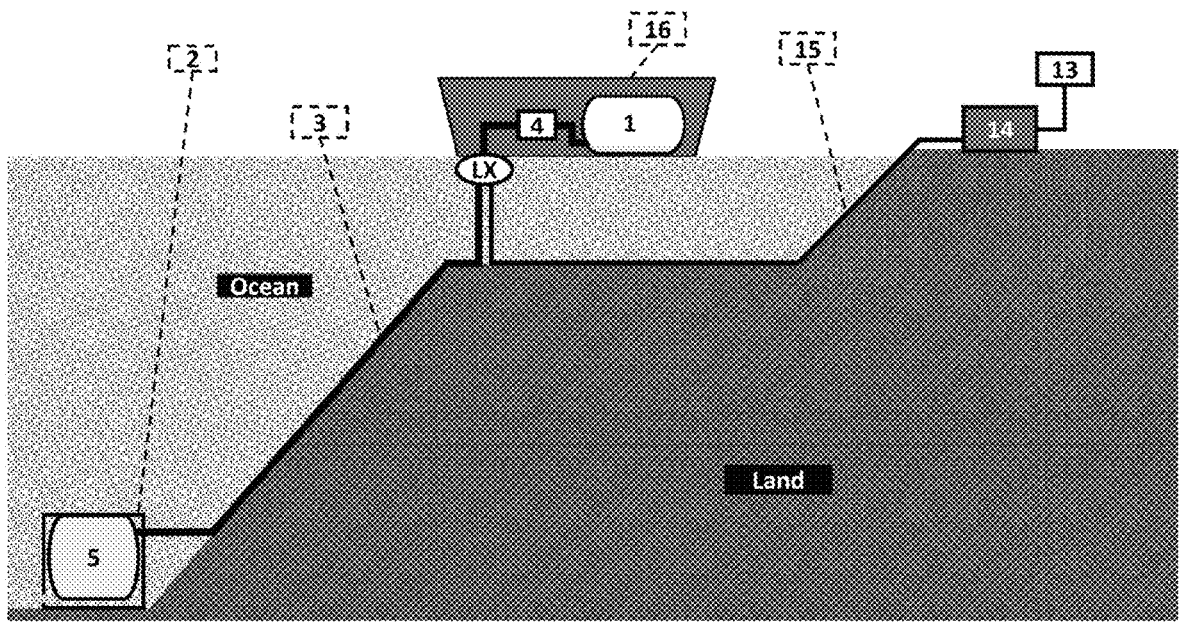
Figure 83 (above)

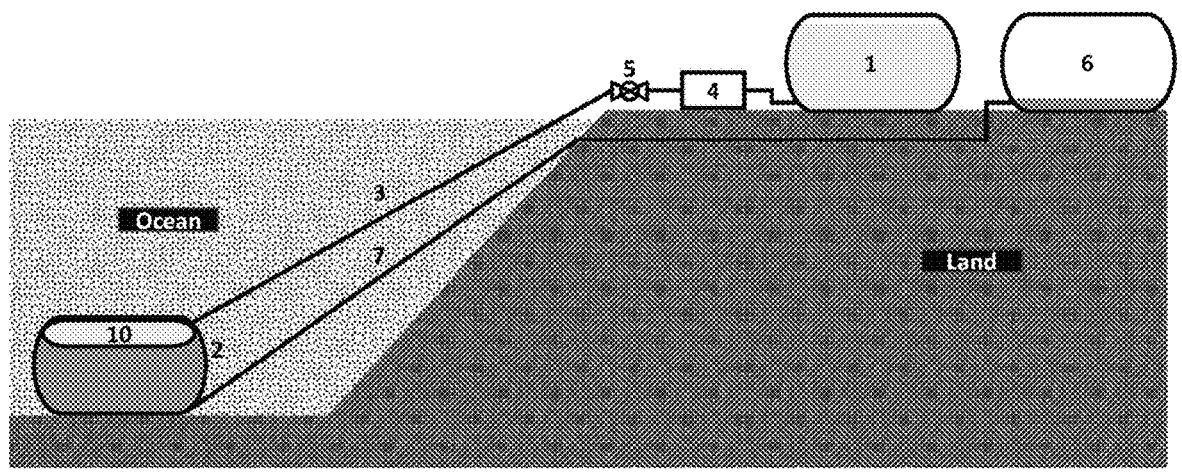
Figure 84 (above)
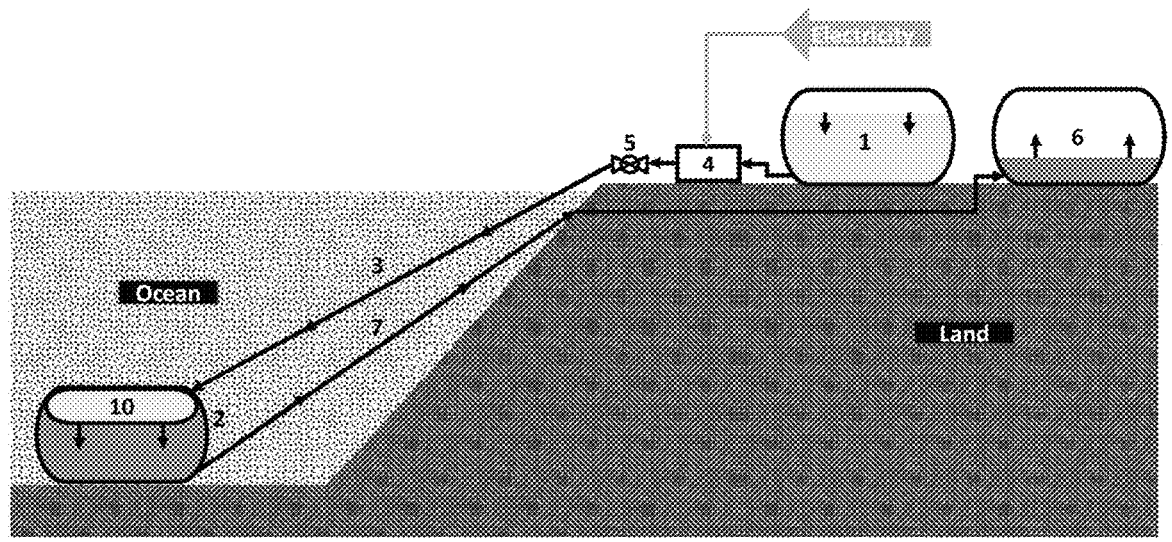
Figure 85 (above)

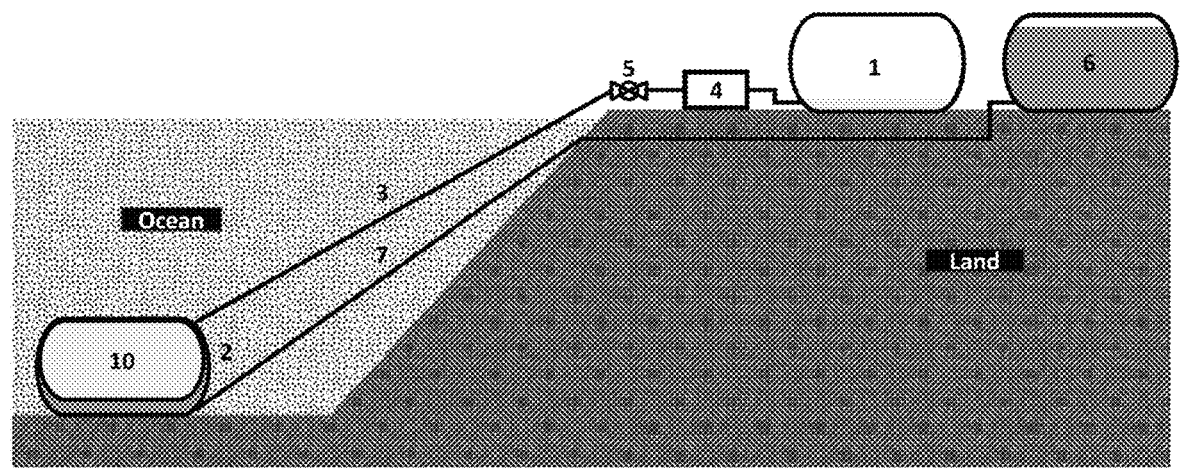
Figure 86 (above)
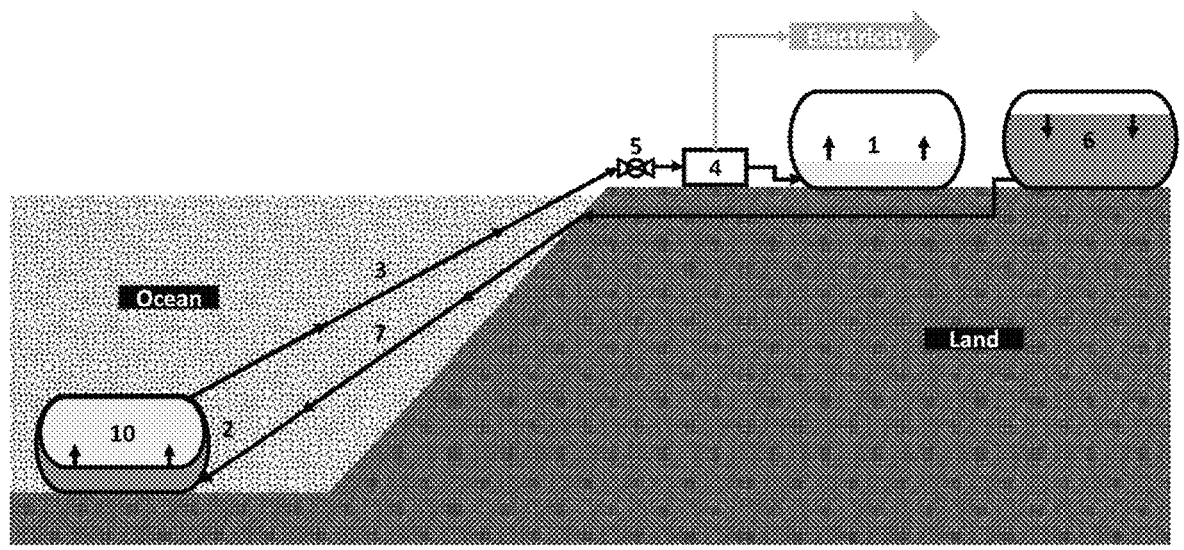
Figure 87 (above)

LOW DENSITY FLUID DISPLACEMENT TO STORE OR GENERATE POWER

CROSS REFERENCE TO RELATED APPLICATIONS

The instant application claims priority to provisional application No. 62/670,133 filed May 11, 2018 which is hereby incorporated by reference in its entirety. The instant application is a continuation-in-part of Ser. No. 16/807,278 filed Mar. 3, 2020 and allowed on Jun. 22, 2020. Application Ser. No. 16/807,278 is a continuation-in-part of Ser. No. 16/776,078 filed Jan. 29, 2020 which is a continuation of U.S. Ser. No. 16/409,790 filed May 11, 2019 which issued as U.S. Pat. No. 10,562,511 on Feb. 18, 2020 all of which are hereby incorporated by reference in their entirety.

BACKGROUND OF INVENTION

Scaling, fouling, other 'growths', and corrosion can be damaging to water infrastructure and other liquid infrastructure. Scaling, fouling, other 'growths', and corrosion can reduce infrastructure lifespan, infrastructure structural integrity, the efficiency of boats and other water vehicles through increased drag and weight, clog pipes, and reduce the buoyancy of docks and buoys.

Prior art technologies for preventing scaling, fouling, and other 'growths' include anti-foulants and antiscalants. Anti-foulants and antiscalants have multiple significant disadvantages. They are generally bad for environment and may be toxic to aquatic ecosystems. They are generally only temporary and require re-application or replacement for continued effectiveness. They are generally expensive, including due to material cost, application cost, and their temporary nature.

In docks and other permanent or semi-permanent aquatic infrastructure, it is common to not employ anti-foulants and antiscalants. Generally, barnacles and/or other growths are periodically removed from the bottom of docks. Barnacles and other growths can add significant weight to docks and can damage or puncture dock pontoons. Removal is expensive, labor intensive, and only a temporary solution.

SUMMARY OF THE INVENTION

The present invention relates to systems and methods for pumping or removing a fluid from a region within or on top of or in contact with a water or liquid body and applications for said systems and methods.

Some embodiments may be applicable to, for example, inhibiting or preventing growth formation or fouling of structures in liquid environments. Said liquid environments may comprise aqueous and/or non-aqueous environments. Some embodiments described herein may inhibit or eliminate or prevent growth formation or fouling without the need for coatings, paint, manual cleaning/scrubbing, or other methods described in the art. Growth formations may include, but are not limited to, one or more or a combination of the following: marine growths, foulants, marine creatures, marine animals, inorganic scaling, organic scaling, barnacles, mussels, clams, oysters, worms, shrimp, crustaceans, biofilms, algae, bacteria, fungi, or ameba. Moving parts for said embodiments related to inhibiting or preventing growth formation or fouling or corrosion of structures in liquid environments, such as pumps and generators, if desired, may be located entirely above the surface of a water or liquid body.

Some embodiments may be applicable to, for example, increasing or decreasing the height of a floating structure, such as a dock. Some embodiments described herein may involve increasing the height of a floating structure above the surface of a liquid by pumping air into a concave region within or beneath said floating structure such that the air or other gas or other low-density fluid at least partially displaces a portion of water in said concave region. Similarly, the height of a floating structure above the surface of a liquid may be decreased by allowing gas to escape from or by pumping gas out of said concave region. Air or other gas may be transferred in or out of said concave region using one or more tubes. The concave region may be open to the water or other liquid. If advantageous, the pumping or release of gas may be conducted using moving parts entirely outside of the water or liquid body. By having moving parts outside of and not in contact with water or the liquid, the moving parts (e.g. air pump) may comprise lower cost equipment, may be less susceptible to fouling, and may have a longer lifespan.

Some embodiments may be applicable to, for example, an energy storage device. Some embodiments may involve a storage region beneath the surface of a water or liquid body and a storage region near the surface or above a water or liquid body. To 'charge' said energy storage device, low density fluid, such as a relatively lower density liquid or a gas, may be pumped into said storage region, displacing a higher density fluid, such as water. To discharge said energy storage device, said higher density fluid may be allowed to displace said lower density fluid, generating electricity due to the flow of the lower density fluid through an electric generator. Moving parts for said energy storage device, such as pumps and generators, if desired, may be located entirely above the surface of a water or liquid body.

Some embodiments may be applicable to, for example, a tidal power energy generation system, which generates energy from change in water level due to, for example, tides. Some embodiments may involve using the displacement of air or other fluid from a storage region due to a rise in water level due to tides to generate energy, such as electricity. Some embodiments may involve using the movement of air or other fluid into a storage region due to a decrease in water level due to tides to generate electricity. Moving parts for said tidal power system, such as pumps and generators, if desired, may be located entirely above the surface of a water or liquid body.

It is important to note that embodiments described herein may be combined and the systems and methods described herein may overlap or have multiple simultaneous applications.

BRIEF DESCRIPTION OF DRAWINGS

FIG. 1: An example dock with a concave region 'gas pocket' ('3') on the bottom of each float or pontoon.

FIG. 2 (above): An example dock with a concave region 'gas pocket' ('3') on the bottom of each float or pontoon with air pump and tube interconnected.

FIG. 3: An example embodiment with extended 'walls', which may be employed to prevent air or gas losses in the event of, for example, waves, turbulent water, or a significant change in the angle of the dock.

FIG. 4: An example embodiment where changing the volume of gas in a gas pocket adjusts the height above the liquid surface and/or angle of a floating structure, such as a dock. FIG. 4 may show height increasing.

FIG. 5: An example embodiment where changing the volume of gas in a gas pocket adjusts the height above the liquid surface and/or angle of a floating structure, such as a dock. FIG. 5 may show height decreasing.

FIG. 6: An example simplified setup of an embodiment employing a lower density liquid and a higher density liquid.

FIG. 7: Step 1: FIG. 7 may show an energy storage embodiment undergoing charging.

FIG. 8: Step 2: FIG. 8 may show an energy storage embodiment at a relatively charged state.

FIG. 9: Step 3: FIG. 9 may show an energy storage embodiment discharging.

FIG. 10: Step 4: FIG. 10 may show an energy storage embodiment at a relatively discharged state.

FIG. 11: FIG. 11 may show an example embodiment where the LDL and/or HDL storage regions at a higher head height or above the surface are located on a platform or a floating platform.

FIG. 12: FIG. 12 may show an example embodiment where the LDL and/or HDL storage regions at a higher head height or above the surface are located on land.

FIG. 13: FIG. 13 may show an example embodiment where multiple subsurface storage regions are employed for energy storage and/or chemical storage.

FIG. 14: Step 1 (Higher Tide, Filling, And Electricity Generation): FIG. 14 may show an embodiment where electricity is being generated.

FIG. 15: Step 2 (High Tide, Cavity Full): FIG. 15 may show an embodiment where the storage region is nearly full with water.

FIG. 16: Step 3 (Lower Tide, Emptying, Generating Electricity): FIG. 16 may show an embodiment generating electricity when the surrounding water body water level is relatively low compared to the water level inside the storage region.

FIG. 17: Step 4 (Lower Tide, Empty): FIG. 17 may show an embodiment where the storage region is nearly empty with water.

FIG. 18: Step 4 Alternative (Lower Tide, Empty, depending on time of year and location): FIG. 18 may show an embodiment where the storage region is fully empty with water.

FIG. 19: Step 5 (Lower Tide, Pump remaining water out): FIG. 19 may show an embodiment where air is pumped into a storage region to remove or displace residual water.

FIG. 20: Step 1 (Higher Tide, Filling, Electricity Generation): FIG. 20 shows an example embodiment where water/air cavity or storage region contains a porous material.

FIG. 21: Step 2 (High Tide, Cavity Full): FIG. 21 shows an example embodiment where water/air cavity or storage region contains a porous material.

FIG. 22: Step 3 (Lower Tide, Emptying, Generating Electricity): FIG. 22 shows an example embodiment where water/air cavity or storage region contains a porous material.

FIG. 23: Step 4 (Lower Tide, Empty): FIG. 23 shows an example embodiment where water air cavity or storage region contains a porous material.

FIG. 24: Step 1 (Higher Tide, Filling, Generating Electricity): FIG. 24 shows an example embodiment where water/air cavity or storage region is located on or within a water body.

FIG. 25: Step 2 (Higher Tide, Full): FIG. 25 shows an example embodiment where water/air cavity or storage region is located on or within a water body.

FIG. 26: Step 3 (Lower Tide, Emptying): FIG. 26 shows an example embodiment where water/air cavity or storage region is located on or within a water body.

FIG. 27: Alternative Step 3 (Lower Tide, Emptying, Depending on Tide and Location): FIG. 27 shows an example embodiment where water/air cavity or storage region is located on or within a water body.

FIG. 28: Step 4 (Lower Tide, Empty): FIG. 28 shows an example embodiment where water/air cavity or storage region is located on or within a water body.

FIG. 29: FIG. 29 shows an example embodiment with a floating pump or generator station.

FIG. 30: FIG. 30 shows an energy storage system where the first storage reservoir is located on land and the pump and/or generator is located on land.

FIG. 31: FIG. 31 shows an energy storage system where the first storage reservoir is located on land and the pump and/or generator is located on land.

FIG. 32: FIG. 32 shows an energy storage system where the first storage reservoir is located near, at, or beneath the surface of a water body and/or the pump and/or generator is located near, at or beneath the surface of a water body.

FIG. 33: FIG. 33 shows an energy storage system where the first storage reservoir is located near, at, or beneath the surface of a water body and/or the pump and/or generator is located near, at, or beneath the surface of a water body.

FIG. 34 is an embodiment of low density fluid displacement.

FIG. 35 is an embodiment of low density fluid displacement.

FIG. 36 is an embodiment of low density fluid displacement.

FIG. 37 is an embodiment of low density fluid displacement.

FIG. 38 is an embodiment of low density fluid displacement.

FIG. 39 is an embodiment of low density fluid displacement.

FIG. 40 is an embodiment of low density fluid displacement.

FIG. 41 is an embodiment of low density fluid displacement.

FIG. 42 is an embodiment of low density fluid displacement.

FIG. 43 is an embodiment of low density fluid displacement.

FIG. 44 is an embodiment of low density fluid displacement.

FIG. 45 is an embodiment of low density fluid displacement.

FIG. 46 is an embodiment of low density fluid displacement.

FIG. 47 is an embodiment of low density fluid displacement.

FIG. 48 is an embodiment of low density fluid displacement.

FIG. 49 is an embodiment of low density fluid displacement.

FIG. 50 is an embodiment of low density fluid displacement.

FIG. 51 is an embodiment of low density fluid displacement.

FIG. 52 is an embodiment of low density fluid displacement.

FIG. 53 is an embodiment of low density fluid displacement.

FIG. 54 is an embodiment of low density fluid displacement.

FIG. 55 is an embodiment of low density fluid displacement.

FIG. 56 is an embodiment of low density fluid displacement.

FIG. 57 is an embodiment of low density fluid displacement.
FIG. 58 is an embodiment of low density fluid displacement.
FIG. 59 is an embodiment of low density fluid displacement.
FIG. 60 is an embodiment of low density fluid displacement.
FIG. 61 is an embodiment of low density fluid displacement.
FIG. 62 is an embodiment of low density fluid displacement.
FIG. 63 is an embodiment of low density fluid displacement.
FIG. 64 is an embodiment of low density fluid displacement.
FIG. 65 is an embodiment of low density fluid displacement.
FIG. 66 is an embodiment of low density fluid displacement.
FIG. 67 is an embodiment of low density fluid displacement.
FIG. 68 is an embodiment of low density fluid displacement.
FIG. 69 is an embodiment of low density fluid displacement.
FIG. 70 is an embodiment of low density fluid displacement.
FIG. 71 is an embodiment of low density fluid displacement.
FIG. 72 is an embodiment of low density fluid displacement.
FIG. 73 is an embodiment of low density fluid displacement.
FIG. 74 is an embodiment of low density fluid displacement.
FIG. 75 is an embodiment of low density fluid displacement.
FIG. 76 is an embodiment of low density fluid displacement.
FIG. 77 is an embodiment of low density fluid displacement.
FIG. 78 is an embodiment of low density fluid displacement.
FIG. 79 is an embodiment of low density fluid displacement.
FIG. 80 is an embodiment of low density fluid displacement.
FIG. 81 is an embodiment of low density fluid displacement.
FIG. 82 is an embodiment of low density fluid displacement.
FIG. 83 is an embodiment of low density fluid displacement.
FIG. 84 is an embodiment of low density fluid displacement.
FIG. 85 is an embodiment of low density fluid displacement.
FIG. 86 is an embodiment of low density fluid displacement.
FIG. 87 is an embodiment of low density fluid displacement.

DETAILED DESCRIPTION OF THE INVENTION

First Description of Embodiments

An example embodiment may involve 'walls' connected to the bottom or sides of a liquid structure. A liquid structure may include, but is not limited to, one or more or a combination of the following: floating structure, a dock, buoy, platform, float, boat, flat bottom boat, skiff, or surface structure. A liquid structure may also include structures which are anchored to land or at least partially supported by land, while also being in or near or in contact with water or immersed in water or in contact with water or in contact with another liquid.

In an example embodiment, the structure may be a dock (please note: a dock is provided as an example floating structure, the elements of the embodiment described herein may be applicable to other floating or non-floating structures described herein). Connected or as a component of the dock or as a feature of the shape of the bottom of the dock are 'walls' which may be connected to the side or bottom of the dock or near the perimeter of the bottom of the dock. Alternatively, the shape of the bottom of the dock may be tailored to have said 'walls', as in, for example, said 'walls' may be part of the shape of the dock rather than a connected separate material. Said 'walls' may protrude beyond the vertical water depth of most or all of the floating dock in contact with the water. The connection of the 'walls' to the structure may be ideally air or water tight. Said 'walls' may simply comprise a concave structure or protruding portions of a concave structure.

Said walls may result in the formation of concave region or cavity located, for example, near the bottom of a floating structure or comprise most of the bottom of a floating structure. In the present embodiment, a gas may occupy at least a portion of said concave region. Said gas may include, but is not limited to, one or more or a combination of the following: air, nitrogen, water vapor, methane, hydrogen, flue gases, carbon dioxide, oxygen, inert gas, argon, helium, practically water insoluble gas, hydrocarbon, ozone, or a combination thereof. The gas may be at least temporarily or semi-permanently or practically permanently 'trapped' in said concave region. Said 'trapped' gas in said concave region may be referred to as a 'gas pocket' or an 'air pocket'. Said gas remains in said concave region due to, for example, 1) greater density of water than the gas; and/or 2) the gas' practical inability to pass through the water/gas interface; and/or 3) the relative gas tightness or gas tight seal of the concave region.

An operating principle of the air pocket may be demonstrated by using a simple empty drink cup and a container filled with water. When an empty drink cup is flipped upside-down and submerged beneath the surface of the water in an upside-down position, air in said drink cup may be trapped inside said drink cup as water may be unable to replace said air because the air cannot escape upward through the drinking cup. Said trapped air may be an example of an air pocket and the region inside the cup where the air is trapped may be an example of a concave region or cavity. An example application where said air pocket effect has been employed in prior art may include 'diving bells'.

Said gas pocket or air pocket may result in the formation of a separation or non-contiguous separation between the water and at least a portion of the surface of the concave region. Water may be separated from contact with at least a portion of the solid surface of the of the concave region due to the physical separation or barrier of the gas pocket between the water and said solid surface. A significant portion of the surface area of the solid surface of the concave region may be in contact with said gas pocket. A significant portion of the surface area of water displaced by the air pocket may be in contact with the air pocket at an air-water interface. Said concave region or surface area in contact with said gas pocket may comprise a significant portion of or nearly all the surface area of the bottom of, for example, the bottom of a surface structure. Said concave region or surface area in contact with said gas pocket may comprise a significant portion of or nearly all the surface area which may be exposed to or vulnerable to or would otherwise be in contact with water or other liquid. Said significant portion may comprise greater than 5%, or greater than 10%, or greater than 20%, or greater than 30%, or greater than 40%, or greater than 50%, or greater than 60%, or greater than 70%, or greater than 80%, or greater than 90%, or greater than 95% of the bottom of the surface of a structure in contact with a liquid or water body.

Fouling or scaling or growth formation may be inhibited by said separation or non-contiguous separation between the liquid and at least a portion of the surface of the concave region resulting from, for example, said gas pocket. Fouling or scaling or growth formation generally occurs in a water environment when water is in direct contact with a solid surface. Said air pocket enables a substantial surface area of water, which may otherwise be in contact with solid surface, to be in contact with a water-gas or water-air interface rather than with a solid surface. Said gas separation or air barrier prevents liquid-borne or water-borne foulants or scalants or growths to adhere the said solid surface. Said concave region may comprise at least a portion of the surface area of the bottom of a floating structure or structure in contact with liquid. Said concave region may comprise a substantial portion or most or almost all the surface area of the bottom of said floating structure or structure in contact with liquid, which may enable a substantial reduction in fouling or scaling or growth formation relative the same structure without a gas pocket or air pocket.

Foulants or scalants or growths generally adhere to surfaces from water through direct contact with a solid surface. Water-borne foulants or scalants or growths generally cannot pass through air or other gas to a solid surface. In an instance where water-borne foulants or scalants or growths are somehow capable of passing through air or other gas to a solid surface, it is important to note that mass transfer through said gas may be orders of magnitude less than if water was in direct contact with a solid surface. As a result, water-borne foulants or scalants or growths may have insufficient mass transfer to conduct substantially any or relatively equivalent fouling, scaling, or growth in a gas or air environment relative to an environment of direct solid surface contact with water.

Gas pockets or concave regions or both may increase or decrease stability. Stability may be increased, for example due to 'suction' effect or attraction created by a structure with gas-solid interface on one side and solid-water interface on the other side. Stability may be increased by, for example, reducing the center of gravity of the dock by, for example, adding weight to the 'walls' of a concave region. By adding weight to the walls of a concave region or near the bottom of the structure, the structure may be less likely to tilt sufficiently to lose gas in a gas pocket, in the event of, for example, a weight imbalance on the structure or a large wave. Gas pockets or concave regions may decrease stability by potentially increasing center of gravity. If a structure is in an environment with significant waves or the potential for rough water, it may be desirable, for example, to incorporate a gyroscopic stabilizer or stabilizing anchors or stabilizing weights or stabilizing earth connected structures to increase stability or minimize tilting.

Gas pockets or concave regions or surface modifications which enable gas pockets may be employed to prevent corrosion or degradation. For example, a corrosion sensitive material or device may be placed in a gas pocket when stored underwater. For example, the propeller of a boat may be surrounded a gas pocket when the propeller or boat is not in use, which may be enabled by encasing or surrounding said propeller with a concave region. For example, underwater hydraulic equipment or underwater trim-tabs may be surrounded a gas pocket when, for example, not in use.

A tube may be placed in the gas pocket or the concave region and gas (for example, including, but not limited to, gases described herein, such as air or nitrogen) may be pumped into the concave regions using said tube and/or a gas pump (which may be connected to said tube). One of the openings of the tube may be placed inside said concave region or below said concave region. The initial pumping of gas into said concave region may enable the formation of a gas pocket in said concave region. After the formation of a gas pocket, additional gas may be pumped into said region to, for example, including, but not limited to, one or more or a combination of the following: expand said gas pocket, to replace gas which may have escaped from said gas pocket, or enable an overflow or spillover of excess gas from said gas pocket and concave region.

Said concave region or gas pocket may be infiltrated with water on, for example, an occasion of a large wave or when a structure is tilted at a significant angle. It may be advantageous for said water contact to be temporary or of as short duration as possible to minimize potential scaling or fouling or corrosion resulting from, for example, water contact. One means of potentially minimizing frequency of water contact may comprise pumping air or other gas into said concave region or cavity using, for example, a tube or pressurized air tank. Said air or other gas may be pumped continuously into said concave region or may be pumped into said concave region only on certain occasions. For example, said certain occasions may comprise when the gas pocket or air pocket is at risk of losing air or at risk of water infiltration into the concave region. For example, said certain occasions may comprise when a structure tilts beyond a specified angle, which may be triggered or measured, for example, using devices for measuring angle change or movement known in the art. For example, said certain occasions may comprise when a portion of the solid surface of said concave region is wetted or at least partially wetted or in contact with water, which may be triggered or measured, for example, using a water or wetting sensor or similar devices known in the art.

It may be desirable for the 'walls' to be durable and capable of handling the weight of the dock or multiple docks and resistant to the abuse from other objects or elements. For example, said wall may comprise an a 'skirt', for example, wherein the material may be structurally bendable, however can store an air pocket. Said 'skirt' may be similar to the 'skirt' employed in hovercrafts, although, unlike hovercrafts, the skirt may remain in part or in whole beneath the surface of the water.

An example durable wall comprises a tube connected to the bottom of the dock and attached, for example, near the outside perimeter of the dock bottom and may be surrounding the outside perimeter of the dock. To prevent damage to the 'walls', the tube may be collapsible when the dock is being moved. The tube may be inflated or may become more rigid using, for example, including, but not limited to, pneumatic or hydraulic pressure means, such as pneumatic or hydraulic pressure or filling with a pneumatic or hydraulic fluid. Said tube may be connected to the dock in a fashion which prevents air or water from passing through the connection between the dock and the tube 'walls'.

The present invention and/or elements of the present invention, which may include, but are not limited to, 'Wall', gas pocket, concave region, tube, gas pump or air pump, and/or other elements of the embodiments described herein, may be retrofitted onto pre-existing structures or may be an element of new structures.

The present invention may also be applicable to preventing or minimizing foulants or scalants or growths in non-aqueous liquid environments.

Portions of a floating structure may be in contact with water or liquid, for example, which may include solid surfaces outside a concave region or gas pocket. Said solid surfaces in contact with water or liquid may be susceptible to growths, fouling or scaling. It is important to note that a large portion of the solid surface area beneath the surface of the water or liquid may be in contact with a gas pocket, and, as a result, may be unsusceptible or less prone to the formation of growths, fouling or scaling. This may have an effect of significantly reducing or eliminating the formation of growths, fouling or scaling on most of the subsurface surface area of a solid structure. Surfaces in contact with water or liquid may have the formation of growths, fouling or scaling, however it may be important to note 1) side-walls are generally easier to clean/scrub than the bottom/underbody/underbelly of a floating structure; 2) the total amount of the formation of growths, fouling or scaling may be significantly less than if the present invention was not employed; 3) an air curtain may be created which minimizes growth formation on regions not protected by an air pocket by pumping excess air into said cocave region and facilitating the formation of small air bubbles, which may rise along the sides of the structure.

Water may refer to a body of liquid. Said body of liquid may include, but is not limited to, a body of liquid containing at least a portion of water including salt water. Said body of liquid may include, but is not limited to, marine environments, aquatic environments, rivers, lakes, brine pools, frac water, waste water, oil storage, chemical storage, or other liquids environments.

A gas pocket may be trapped or stationary in low turbulence or minimal turbulence or non-turbulent conditions. Non-turbulent conditions may include an environment where the water is calm and non-moving to the naked eye and the structure in said water is also non-moving to the naked eye. Low turbulence or minimal turbulence conditions may include an environment where the water is calm and moving to the naked eye and/or the structure in said water is calm and moving to the naked eye. In a low turbulence environment, although there is discernable movement, the movement of the water or structure is insufficient for more than 10%, or more than 20%, or more than 25%, or more than 30%, or more than 40%, or more than 50% of the gas in the gas pocket to escape from beneath the structure in a 30 second period. It is important to note, said gas escape may not include intentional removal of gas from said gas pocket or the escape of gas through a tube interconnected to said gas pocket.

Some embodiments may be employed to encourage growth formation, such as certain forms of growth. For example, embodiments described herein, such as gas pockets, may be formed in a certain region to kill an invasive species of algae or the eggs of an invasive fish, other potentially harmful water borne life form. For example, a gas pocket may enable localized oxygenation. For example, a gas pocket may enable localized de-oxygenation. For example, a gas pocket may enable localized cooling, which may comprise evaporative cooling, which may increase the longevity of or improve the health of, for example, coral. For example, a gas pocket may enable localized pH adjustment, such as pH increase by $CO_2$ removal or $CO_2$ gas stripping.

Example Embodiment Equipment and Description:
   Example cost estimates for a dock module:
   Large Dock Module Dimensions: 8 meters long×5 meters wide $X^{34}$ meter tall.
   Contains concave region on bottom of dock which is about 5 meters long, 3 meters wide, and 0.07 meter deep (1.05 cubic meters total volume of concave region).
   The below cost estimates assume the dock either was built with a concave region or retrofitted with a concave region
   Example Equipment for Embodiment with Grid Electricity Source on Dock (Material CAPEX):
     Air pump—for example: 0.38 PSI, 200 Liters per minute, 35 watts, $12
     ½ inch inside diameter vinyl tubing, 50 ft: $30
     Low power timer breakout: $13
     Triple-Axis Gyro Breakout Board (which may also trigger on/off switch when angle of dock changes): $12.50
     Total CAPEX: $67.50
   Example Embodiment with Grid Electricity Source on Dock (Annual OPEX with On-Off Timer):
     Assumes Pump Operates on a Timer of 2.5 minutes every 30 minutes or 5 minutes per 1 hour
     Pump annual electricity consumption: 25.55 kWh
     Annual electricity cost at $0.10 per kWh: $2.55
   Example Embodiment with Solar Panel with Battery Setups for Electricity Source on Dock (CAPEX):
     Air pump—for example: 0.38 PSI, 200 Liters per minute, 35 watts, $12
     ½ inch inside diameter vinyl tubing, 50 ft: $30
     Low power timer breakout: $13
     Triple-Axis Gyro Breakout Board (which may also trigger on/off switch when angle of dock changes): $12.50
     Total CAPEX: $67.50
     (if solar panel and battery are expensed as CAPEX, $108.13 total)
   Example Embodiment with Solar Panel with Battery Setups for Electricity Source on Dock (Annual OPEX with On-Off Timer):
     Assumes Pump Operates on a Timer of 2.5 minutes every 30 minutes or 5 minutes per 1 hour
     Pump annual electricity consumption: 25.55 kWh
     Solar panel (determined based on 10% capacity factor, one 100 W solar panel for three dock modules): $28.63 per dock module
     264 Wh Battery for 3 dock modules (1.17 days of storage): $25 per dock module
     OPEX of Electricity: $0
     Battery Lifespan: 5-10 years
     Cost of Battery per Year (assuming 5-year lifespan): $5
     Solar Panel Lifespan: 25 years
     Cost of Solar Panel per Year (assuming 25-year lifespan): $1.15
     Total Annual OPEX: $6.15
Example Minimum Viable Prototype Materials:
   1-3 Watt DC Aquarium Air Pump
   Timer breakout on-off switch which, for example, automatically turns on the air pump for 20 seconds every 10 minutes Examples:
   Adafruit TPL5110 Low Power Timer Breakout
   Mini Timer Time Delay Relay 0.1 Sec to 400 days.
Small re-chargeable battery bank, such as 10 Wh battery bank for smartphone charging
Tube to connect air pump and bottom of plastic bin
Plastic bin with subtle perimeter lip which creates rectangular concave region on the plastic container bottom. Alternatively, an upside-down plastic bin may be employed to simulate the concave region.
Plastic bin to store electronic devices outside the water Example Exemplary Embodiments System for fouling and scaling prevention on water structures comprising:
   A structure containing a concave region
   Wherein said concave region contains a gas pocket
   Wherein said gas pocket results in a non-contiguous separation between a water and at least a portion of the surface of said concave region
System for fouling and scaling prevention on water structures comprising:
   A structure containing a cavity
   Wherein said cavity contains a gas pocket
   Wherein said gas pocket results in a non-contiguous separation between liquid and at least a portion of said cavity Example Exemplary Sub-Embodiments Wherein said non-contiguous separation inhibits the formation of scalants, foulants, and growths on the solid surfaces in contact with said region occupied by said gas pocket
Wherein a tube with an opening located beneath or inside said concave region is interconnected to a pressurized gas source
Wherein said pressurized gas source may include an air pump, a gas pump, a pressurized gas line, or a combination thereof
Wherein said tube is connected to a valve which allows control over gas entering or exiting said gas pocket through said tube
Wherein at least a portion of the solid surface area in contact with said gas pocket is separated or not in direct contact with water for greater than 30%, or greater than 40%, or greater than 50%, or greater than 60%, or greater than 70%, or greater than 80%, or greater than 90%, or greater than 95% of the time said structure is in said water
Wherein said water comprises a body of liquid
Wherein said gas pocket displaces liquid
Wherein said gas pocket is trapped or stationary in low turbulence or minimal turbulence or non-turbulent conditions
Wherein gas may be pumped into said gas pocket continuously or semi-continuously or on occasion where gas needs to be replenished
Wherein gas is pumped into said gas pocket in excess of the volumetric capacity of said cavity or concave region, resulting in spillover bubbles
Wherein said spillover bubbles reduce fouling on solid surface area not in direct contact with said gas pocket
Wherein said spillover bubbles are methodically dispersed along said solid surface area not in direct contact with said gas pocket using shape modifications to sections of the structure
Wherein said shape modifications may include perforations, dimples, microscopic modifications, surface morphology, or macroscopic modifications
Wherein the height of said structure over the surface of the water can be adjusted by increasing or decreasing the volume of gas in said concave region or cavity
Wherein said concave region or cavity is retrofitted onto a pre-existing structure
Wherein said concave region or cavity is an aspect of the shape of a pre-existing structure
Wherein said concave region or cavity is an aspect of the shape of a new structure
Wherein the shape or size or strength or rigidity of said concave region or cavity may be adjustable
Wherein said adjustability may include controlled forming or collapsing of said concave region or the 'walls' of said concave region
Wherein said adjustability may include controlled forming or collapsing of said concave region or the 'walls' of said concave region using pneumatic or hydraulic means
Wherein said adjustability may include controlled volume or depth or surface area of said concave region
Wherein the volume, or shape, or surface area, or depth of said gas pocket are adjustable
Wherein said gas pocket adjustability involves one or more or a combination of the following: the ability to add or remove gas from said gas pocket, the ability to change the shape or contour of said gas pocket or concave region, the ability to adjust the shape or size of the 'walls' of the concave region
Wherein said gas pocket contains a non-water liquid in addition to or instead of a gas
Wherein the surface of said gas pocket is hydrophobic or contains a hydrophobic coating
Wherein said gas pocket or concave region or cavity may function as a diving bell or temporary shelter or storage region
Wherein said tube is connected to a check valve which allows gas (such as air) to enter said tube and/or said concave region, although does not allow air to be released from said region Prior-Art—Incorporated Herein by Reference Physically Removal of the Barnacles: https://www.scubadubacorp.com/Dockcleaning.htm
Air bubble curtain—air bubbles are sparged over hull: https://www.tandfonline.com/doi/pdf/10.1080/20464177.2009.11020214
https://www.researchgate.net/profile/Sandra_Shumway/publication/44684741_The_use_of_aeration_a-s_a_simple_and_environmentally_sound_means_to_prevent_biofouling/links/0c96051ffe80269766000000.pdf
https://patents.google.com/patent/US20050087117A1/en Figure Key '1' or '(1)': Top section of a floating platform or dock
'2' or '(2)': Floats or pontoons, bottom section of a floating platform or dock
'3' or '(3)': Gas or air pocket, which may be in the concave region on the underside or bottom of '2'
'4' or '(4)': Liquid body, such as a body of water or oil
'5' or '(5)': Extended walls, which may extend beyond the vertical depth of the air pocket '6' or '(6)': Air or gas bubble curtain up the side walls of '2' in contact with water. '6' may result from gas being pumped into a concave region, and the gas pocket exceeding the volume of the concave region's gas capacity. The bubble curtain may be facilitated by perforations or dimples in the side walls. A bubble curtain may reduce growth formation on surfaces not in contact with the gas pocket.

'7' or '(7)': Air or gas pump connected to tubing (lines with arrows). Tubing may interconnect said gas or air pumped by said pump with the concave region.

FIG. 1: An example dock with a concave region 'gas pocket' ('3') on the bottom of each float or pontoon. The gas pocket may enable a large portion of the surface area on the bottom of the dock, or the surface area of the dock in contact with the air pocket, to have minimal or no levels of foulants, scalants, or growths.

FIG. 2: An example dock with a concave region 'gas pocket' ('3') on the bottom of each float or pontoon. A tube may be placed beneath or connected to bottom of dock. Air or other gas may be pumped into the tube, which directs gas into the gas pocket. If the volume of gas exceeds the volume of the concave region or cavity, bubbles may travel up side of dock, which may, if desired, form a bubble curtain along the side of the dock ('6'). Said bubbled curtain may be facilitated, for example, by placing dimples or perforations in the 'walls' of concave region. Dimples or perforations may be located near the bottom of the vertical depth of said 'walls' of the concave region. Said bubble curtain may be desirable to minimize fouling, scaling, and growths outside of the gas pocket. If a continuous bubble curtain is desirable, a continuous flow of pumped air may be required.

FIG. 3: An example embodiment with extended 'walls', which may be employed to prevent air or gas losses in the event of, for example, waves, turbulent water, or a significant change in the angle of the dock. Extended walls may extend to a depth beyond the depth of the air pocket. Extended walls may be weighted, if desired, to reduce center of gravity. It may be desirable to prevent the air pocket from extending to the full depth of the extended walls (for example: to ensure the dock is stable), in which case it may be desirable to include small perforations in certain parts of the extended walls. Air or other gas may need to be pumped into the air pocket less frequently or on fewer occasions in embodiments with extended walls.

FIG. 4: An example embodiment where changing the volume of gas in a gas pocket adjusts the height above the liquid surface and/or angle of a floating structure, such as a dock. FIG. 4 may show the height of a dock above the surface of water being increased by pumping air into two concave regions, increasing the volume of an air pocket and displacing water from the concave regions. The present embodiment may be advantageous for increasing or decreasing the height or reducing the draft of a dock. Advantageously, relatively little energy may be required to increase the height of the dock due to, for example, the potentially low air pressure in the concave region due to, for example, the relatively small head height. Advantageously, no moving parts are required to be in contact with the liquid.

FIG. 5: An example embodiment where changing the volume of gas in a gas pocket adjusts the height above the liquid surface and/or angle of a floating structure, such as a dock. FIG. 5 may show the height of a dock above the surface of water being decreased by releasing air from concave regions, increasing the volume of an air pocket and displacing water from the concave regions. The present embodiment may be advantageous for increasing or decreasing the height or reducing the draft of a dock.

Second Description of Embodiments

Example Energy Storage Embodiments Overview: Introduced are systems, and methods for energy storage and/or simultaneous oil or chemical storage. In some embodiments, energy is stored via a hydrostatic pressure difference between one or more insoluble or low solubility fluids, which may be driven by a density difference between the one or more fluids. The technology may employ the depth of water bodies to, for example, enable this hydrostatic pressure. An embodiment may comprise, for example, a relatively high density liquid, and a relatively low density liquid or fluid, which may have a lower density than the relatively high density liquid. The end-to-end technology may be a closed system or may be at least closed beneath the surface of the water body. In some embodiments, all or almost all moving parts above the surface of the water body, such as ocean or lake, or, advantageously, not have moving parts, or not have essential moving parts or not have relatively costly moving parts, under water or deep under water, or no moving parts at a depth greater than 250 ft under water, or no moving parts at a depth greater than 1000 ft under water. It may be beneficial for the system to be a closed system, wherein the internal fluids, for example high density and low density liquids, are in direct contact with each other. The internal fluids may be separate from or substantially not in contact with the surrounding water body. The water in the water body may simply be employed to ensure pressure, for example liquid pressure, is in equilibrium between the inside fluids and surrounding or external water body. An equilibrium in pressure between the outside and inside of the vessel may enable, for example, the use of lower cost materials, as, for example, at least a portion of the materials may not require resistance to pressure differences or substantial differences. Energy may be stored in the hydrostatic pressure difference between the media (for example: liquids) inside the vessel, for example, wherein one or more media have a higher hydrostatic pressure than another one or more media. Difference in hydrostatic pressure may be driven by the difference in hydrostatic pressure of liquids of difference densities at the same hydraulic head height. An embodiment may comprise media comprising two or more immiscible or low solubility liquids with different densities. The difference in density between two or more liquids at the same or similar height may drive the hydrostatic pressure difference. Advantageously, the process may operate with greater than 70% or 80% round-trip efficiency due to the incompressibility of liquids and high efficiency of hydroelectric generators.

Embodiments may employ liquids, solids, gases, supercritical fluids or other media phases. One or more phases may be advantageously employed, for example, because said integrated system may be a closed system. For example, in a closed system, contamination with the surrounding water body may not be a challenge, unless, for example, there is a leak.

In one embodiment, liquid storage of a higher density liquid (such as water) and liquid storage of a lower density liquid (such butane) are placed at a relatively higher head height than a separate liquid-liquid interface vessel or vessels. Said relatively higher head height may be including, but not limited to, one or more of a combination thereof: located lesser depth in the surface of a water body, at the surface of a water body, above the surface of a water body, floating on the surface of a water body, located on land adjacent to a water body, or located on another water body, or located on land. It may be desirable for the higher density liquid to have the same or similar density as the surrounding water body at the same depth. For example, if the pipe or container containing the high density and low density liquids are in ocean, the higher density liquid may comprise a liquid of the same or similar or relatively close density as the surrounding water body or other surrounding media. Alternatively, the higher density liquid may significantly differ in density from the surrounding water body or other surrounding media, as in such an embodiment, pressure difference resistant materials may be required. Separate liquid-liquid interface storage vessel or vessels may be located at a lower head height than the liquid storage. Said liquid-liquid interface storage vessel or vessels may be connected to the higher head height liquid storage vessel or vessels using one or more tubes. Tubes may be employed to transport the lower density liquid or the higher density liquid or a combination thereof. One or more tubes may be connected to one or more valves or pumps or sealed connecting joints. For example, the lower density liquid may be connected to liquid tube or tubes, which may be connected to one or more pumps or generators or connected to low density liquid storage or a combination thereof. For example, the higher density liquid may be connected to liquid tube or tubes, which may be connected to one or more pumps or generators or connected to higher density liquid storage or a combination thereof.

Storing energy may involve, for example, pumping the lower density liquid into a tube or tubes, displacing at least a portion of the higher density liquid out of the tube or tubes and underwater vessel or vessels into the higher density liquid storage or, alternatively, displacing the higher density liquid into the surrounding water body. Energy may be stored energy due to the difference in hydrostatic pressure between the low-density liquid and high density liquid at the same hydraulic head height—for example, as the low density is pumped into the tubing or storage vessel, it is overcoming the hydrostatic pressure of the higher density liquid, developing a hydraulic head. When the storage device stops charging, a valve may be employed to prevent the one or more liquids from undesirably reversing flow direction.

A check valve may be employed during pumping operation to prevent the low-density liquid from reversing pumping direction. Energy storage time-period may indefinite if there are no leaks. During discharge, one or more valves may open, enabling the pressurized low-density liquid to be at least partially displaced and enable said low density liquid to power a generator. Valves, pumps, generators, and other moving parts may be located at the surface or just below the surface, or on land, or a combination thereof as this may reduce capital, operational, and/or maintenance costs.

In another embodiment, the process may be an open system, wherein the higher density fluid is comprises the fluid in one or more liquid or water bodies, such as, for example, water or salt water or oil or relatively inexpensive liquid. For charging, the low density liquid may be pumped into one or more vessels, displacing the higher density water or liquid in the vessel. The process may contaminate the water in the bay, although this may be minimized by, including, but not limited to, minimizing mixing, preventing the contaminant liquid level, for example the low density liquid level, from approaching or surpassing the edge of the vessel, using a low solubility or insoluble combination of liquids or media, using a non-hazardous or inexpensive low density liquid, or a combination thereof. In the present embodiment, a high density liquid storage vessel may be unnecessary, potentially reducing capital cost and complexity. A version of the present embodiment may comprise an upside down barrel with a tube opening on the inside of the closed, upward facing side of the barrel and a port open to the surrounding liquid body (for example, water body or ocean or lake) on the bottom facing side of the barrel. A version of the present embodiment may comprise an upside down barrel with a tube connected to a liquid tight port connected to upward facing side of the barrel and a port open to the surrounding liquid body (for example, water body or ocean or lake) on the bottom facing side of the barrel. A version of the present embodiment may not contain any liquid tight ports—a tube may be fed into the open side of the up-side-down vessel or barrel and attached to the bottom (inside of top of barrel because up-side-down) of the inside of the vessel or barrel. Advantages of said alternative embodiment include, but are not limited to, a simplified construction, higher pressure resistance, lower opportunity for leak or contamination, and low cost. One or more vessels or barrels may be further connected to a weight or anchor and the upper region of the barrel may be connected to floatation to maintain the one or more vessels or barrels in the desired position (for example, the upside-down position). One or more tubes may be further connected to a pump or generator, which may be further, connected to one or more low density fluid storage vessels. Said one or more lower density liquids (or other fluid, such as a gas) storage vessels may be located at a higher head height, for example, near the surface, at the surface, or above the surface of the water body. During charging, the lower density liquid (or other fluid, such as a gas) may be pumped into the vessel, displacing the higher density liquid. During discharging, low density liquid may be pumped into the vessel, displacing the higher density liquid.

Pressure of Low Density Liquid:

The pressure of the low density liquid when the liquid is forced to displace higher density liquid, as is the case when energy is stored, may be at a higher pressure than the surrounding water body, wherein the pressure difference between the low density liquid and the surrounding water body increases with decreasing depth. At the interface between the lower and higher density liquids, the pressure of the two liquids may be equal or close to equal. As the depth of the lower density liquid decreases (or the higher the low density liquid is above the liquid-liquid interface), the greater the lower density liquid deviates in pressure from the higher density liquid or the greater the net pressure of the low density liquid. As a result, the tube or other vessel transporting the lower density liquid across depths or head heights may require pressure resistance, the pressure resistance requirement may increase with decreasing depth (or greater hydraulic height from the liquid-liquid interface or deepest point). The point of the pump or generation may comprise the highest pressure in the embodiment. One way of describing this phenomenon is:

If an open tube is placed vertically in a water body, the water inside the tube, although separated, is predominately at the same pressure as the surrounding water body at any given depth because the water pressure applied by the water inside the tube above a given point in the tube is the same as the water surrounding the tube. Similarly, when a liquid of different density, such as a lower or higher density, is placed in a closed bottom vessel in open air, the pressure of the liquid at any given point may be equivalent to the liquid pressure applied by the liquid above a point in the liquid. At the same height or depth, a liquid of lower density may have a significantly lower gravitationally derived pressure than a liquid of higher density. When a lower density liquid is displacing a higher density liquid (for example, due to the application of an outside force) in a location experiencing gravity, the net pressure or pressure difference experienced by the lower density liquid at any given height above the liquid-liquid interface or deepest point of the low density liquid is:

$$P_{Net}=P_{HD}-P_{LD}$$

Wherein:
'$P_{Net}$' may be the Net Pressure of Lower Density Liquid at a Given Height above the Lowest Depth of the Lower Density Liquid or Liquid—Liquid Interface
'$P_{HD}$' may be the Gravitational Pressure Head of Higher Density Liquid at the Height Above Lowest Depth of Low Density Liquid or Liquid—Liquid Interface
'$P_{LD}$' may be the Gravitational Pressure Head of Lower Density Liquid at Height Above Lowest Depth of Low Density Liquid or Liquid—Liquid Interface FIG. 6: FIG. 6 shows a simplified setup of an embodiment employing a lower density liquid and a higher density liquid. The two boxes with black text are the higher head height liquid storage vessels. The higher head height liquid storage region is connected via tubes or pipes to one or more separate storage vessels. In FIG. 6, the tubes are connected to a single storage vessel at a head height below the surface of the liquid body (such as a water body) and located at a head height below the higher head height liquid storage vessels, which may be referred to as the lower head height storage vessel. The higher density liquid tube or pipe is connected to one or more ports at the bottom of the lower head height storage vessel. The lower density liquid tube or pipe is connected to one or more ports at the top of the lower head height storage vessel. It is important to note the location of placement of ports on the lower head height storage vessel may not be of importance, and ports may be placed, in, including, but not limited to: next to each other, across from each other vertically, across from each other horizontally, placed randomly, or in another configuration or in a combination thereof. It may be important for the ports to be liquid tight. An exception may be, for example, if the heavy liquid port is open to the surrounding water bay, potentially eliminating the need for a liquid tight port for the higher density liquid and potentially eliminating the need for a high density liquid pipe or storage vessel. The region inside the lower head height vessel where the higher density liquid and lower density liquid meet may be referred to as the fluid-fluid or liquid-liquid interface. The liquids may be contacted directly, in which case it may be desirable for the liquids to be immiscible. The liquids may also be spaced or separated or constitute non-contiguous liquids by a separator or drum, including, but not limited to, a drum or floating drum. If a floating drum is employed to separate the higher density liquid from the lower density liquid, it may be desirable for the floating drum to be of lower density than the higher density liquid and higher density than the lower density liquid. A liquid-liquid separator or drum may be employed, for example, to reduce liquid-liquid mixing (especially important for soluble liquids) or, in the case where open water is the high density liquid higher density liquid, reduce environmental contamination. Energy is storage by pumping the lower density liquid into the lower density liquid tube or pipe, which may displace the higher density liquid from the lower head height storage vessel. Stored energy may be released by enabling the displaced water to enter the lower head height vessel, which may displace the lower head height liquid and generate electricity. In the configuration shown in FIG. 1, the pump/generator is shown connected to the lower density liquid pipe or tube, which may enable higher pumping efficiency. Pump may be above the water surface, enabling no moving parts to be under water. The lower density liquid may be under pressure during charging and discharging.

A pump/generator may be connected to the higher density liquid. One potential challenge of pumping the higher density liquid directly is charging may require the formation of a partial vacuum, which may be less efficient and, even in the case of a pure vacuum, may not be enough driving force to remove sufficient higher density liquid from the lower head height vessel. It may be desirable for the pump or generator to be beneath the water line, for example, if the pump or generator is directly in contact or pumping the higher density liquid.

Liquid storage regions may comprise tanks or reservoirs storing the lower density liquid or higher density liquid. Substantially immiscible or insoluble may mean a liquid which is less than 50 weight percent (wt %), or less than 40 wt %, or less than 30 wt %, or less than 20 w % soluble in the other liquid.

It may be advantageous for the higher density liquid storage region to be beneath the water line or at the same or similar or lower depth than the liquid-liquid interface or lowest point of the lower density liquid. This may be advantageous, for example, if the higher density liquid has the same density as the liquid body, such as water body, surrounding the energy storage device. The higher density liquid storage region may comprise, for example, a bladder-like storage device in pressure equilibrium with the surrounding liquid body, such as water body. The higher density liquid storage region may comprise, for example, a storage device with a floating or movable roof in pressure equilibrium with the surrounding liquid body, such as water body.

The lower head height vessel may be pressure difference resistant. The pressure resistance required by the lower head height vessel may increase with vertical distance from the liquid-liquid interface or lowest point of the lower density liquid. It may be advantageous to minimize the vertical height of the vessel, minimizing the pressure difference experienced by the lower head height vessel compared. This may transition more or most of the lower density liquid pressure difference to the pipe/tube. It may be advantageous to progressively increase the reinforcement of the lower head height vessel with increasing vertical distance from the liquid-liquid interface or the lowest point of the lower density liquid. For example, the structure of progressively increasing the reinforcement of the lower head height vessel may be similar to water towers, wherein the vessel is progressively more pressurize resistant and reinforced with higher hydrostatic pressure.

The higher density liquid storage and lower density liquid storage may be, for example, located beneath the surface, floating on the surface, or on land. In some embodiments, the higher density liquid storage may comprise the surrounding water body. In some embodiments, the higher density liquid storage may be in a different location than the lower density liquid storage. For example, the higher density liquid storage may be a bladder like expandable and contractible volume storage region beneath the water body surface, while the lower density liquid storage region may be located on land.

The energy storage device may undergo charging or discharging at any point in storage capacity. For example, if the device is at least a portion charged, it may be discharged.

For example, if the device is at least a portion discharged, it may be charged. For example, if the device is fully charged, it may not have the capacity to further charge. For example, if the device is fully discharged, it may not have the capacity to further discharge.

Example Step by Step Description:

FIG. 7: Step 1: FIG. 7 may show an energy storage device undergoing charging. A liquid pump may pressurize and pump the Lower Density Liquid (LDL) into a pipe connected to the lower head height storage region, which may allow the LDL to displace the higher density liquid (HDL) in the lower head height storage. As HDL is displaced by the LDL, gravitation potential energy may be stored. In FIG. 7, HDL may be shown being transferred it to an HDL storage region above the lower head height storage region. The HDL storage region, for example, if it comprises a fluid in equilibrium with the hydrostatic pressure of the surrounding liquid or of the same density as the surround liquid, may be located elsewhere, for example, beneath the surface of the liquid body, or at the same height or depth as the lower head region, or below the depth of the liquid-liquid interface. The pump or pumps may be powered by work, for example, electricity, hydraulic pressure, or mechanical work.

The LDL may a volatile liquid (such as propane or butane) and the LDL storage region may be closed. Regardless of whether the LDL is volatile, the LDL storage region may be closed to outside air. If the LDL is sufficiently volatile, the headspace gases in the LDL may comprise the LDL in the gas phase. If the LDL has a sufficiently high partial pressure (for example: propane or butane), the LDL storage region may be pressure resistant and comply with the appropriate safety precautions.

The HDL may be a volatile liquid. The HDL may comprise water. It may be desirable for the HDL storage region to not be open outside air, as biofouling agents and other contaminants may enter. Alternatively, the headspace of the HDL storage region may comprise, for example, filtered or treated air.

FIG. 8: Step 2: FIG. 8 may show an energy storage device at a relatively charged state. At a charged, or discharge, or when charged, or when at a steady state, a check valve may be employed to prevent liquid from flowing into the LDL tank.

It may not be advantageous to have LDL enter the higher density liquid region, which may occur, for example, during overcharging if the HDL storage region is located at a higher height relative to the LDL. If this were to occur, for example, the LDL may float to the surface of the HDL storage region if the HDL storage region is at a higher height relative to the LDL liquid-liquid interface. This may be remediated, for example, by removing the LDL from the HDL using, for example, one or more or a combination of the following: decanting, cyclone, coalescer, filter, or other means of phase or liquid-liquid separations. If the LDL forms a gas phase at the conditions in the HDL storage region, the LDL may be separated by, for example, including, but not limited to, one or more or a combination of the following: removing LDL gas from the headspace, compression of headspace gases, cooling headspace gases, gas separation methods, pressure swing adsorption, pressure swing absorption, membrane, distillation, combustion, absorption, or adsorption.

FIG. 9: Step 3: FIG. 9 may show an energy storage device discharging. HDL may displace LDL in the subsurface storage region, which may result in high pressure LDL passing through a generator, generating electricity, and entering, for example, an LDL storage tank.

FIG. 10: Step 4: FIG. 10 may show an energy storage device at a relatively discharged state. At a discharged or charged or when charged or when at a steady state, a check valve may be employed to prevent liquid from flowing into the LDL tank.

FIG. 11: FIG. 11 may show an example embodiment where the LDL and/or HDL storage regions at a higher head height or above the surface are located on a platform or a floating platform. If desired, the only direct interconnected between the energy storage device and land may be a medium for transporting electricity, such as an electric cable.

FIG. 12: FIG. 12 may show an example embodiment where the LDL and/or HDL storage regions at a higher head height or above the surface are located on land, such as on the shore or on an island.

FIG. 13: FIG. 13 may show an example embodiment where multiple subsurface storage regions are employed for energy storage. If there is more than one subsurface storage region, the subsurface storage regions may be interconnected, which may minimize the number of pipes between the higher head height storage region or regions and the lower head height or subsurface storage region or regions.

Example Installation of an Example Embodiment:

1. Connect tubes (lower density liquid tube and higher density liquid tube) to the two ports of a liquid-tight vessel. Tubes may be wrapped in a roll or in another storage configuration.
    a. The location of the ports may be of importance, and may be located, for example, to minimize mixing. For example, ports may be located near the top of the vessel for the low-density liquid tube connection and near the bottom of the vessel for the higher density liquid tube.
    b. Tubes may be connected to one or more rolls of tubing
    c. Tubes or vessels may require withstanding pressure, although in some embodiments only the tube transporting the lower density liquid must withstand substantial pressure differences.
2. Fill the vessel or tubes or both with a liquid at the same or similar density as surrounding water body (for example: if ocean, same density as ocean water, may be salt water or an aqueous solution containing a dense organic additive, such as glycerol or ethylene glycol or propylene glycol. It may be desirable for the liquid to not comprise bio-foulants, scaling agents, or corrosion or degradation causing agents). Alternatively, the liquid may comprise bio-foulants, scaling agents, or corrosion or degradation causing agents, for example raw ocean water or lake water or raw oil storage liquid or raw waste water or other liquid. The liquid filling the vessel or tubes or both in the present step may be considered the higher density liquid.
3. Attach tubes to their desired storage tank and generator/pump
4. To ensure the vessel remains in the desired position (for example, such as upright) and prevent tangling of tubes, the implementation may involve attaching one or more weights or anchors to near the bottom of the vessel and one or more buoyant floats to near the top of the vessel. The float or near top of the vessel or combination thereof may be further attached to a line, which may be connected by a connector comprising a detachable mechanism, such as clip, or remotely detachable clip.

5. Allow vessel to sink to a desirable depth, for example, near or at the bottom of a water body. Unravel the tubes and lines (for example: the float line and guide line) as the vessel sinks.
6. When the vessel reaches its desired depth (for example: the depth at which the weight or anchor reaches the bottom) the guide line may be detached or may be attached to a float specifying the location.
7. To charge, pump low density liquid into the liquid tubes or vessels, displacing the higher density liquid, which travels through an adjacent tube into a storage vessel. During charging, the low-density liquid may displace the higher density liquid in the tube or in the vessel or in a combination thereof.
8. To discharge, open valve, allowing pressurized low-density liquid (for example: from step 8) to the generator (which may be, for example, a separate generator or may be a pump that can reversibly be used as a generator).

Potential Benefits of Energy Storage Technology Described Herein:

>80% round trip efficiency
  Liquid pump and generator achieves high efficiency and low thermodynamic losses
Unlimited available land area (sits at bottom of water body or ocean)
Unlimited storage time
Unlimited charge/discharge cycles
  No moving parts in ocean
  No degradation or corrosion
  Reagents do not contact with ocean (water body, such as ocean, is simply used to create depth/head height with same surrounding hydrostatic pressure)
  Unaffected by marine or water body growths (e.g. barnacles, slimes)
  Entirely closed system
Cost per kWh—Butane costs ~$300 per $m^3$ liquid
Energy density (at 1000 m-1 $m^3$ of butane-water is about 1 kWh of electricity)
No environmental impact
  Closed system
  Non-toxic reagents (if a leak were to occur)
Abundant, Non-toxic, Non-volatile reagents and building materials
Simple, low cost construction
  Hydrostatic pressure inside technology may be the same as its surroundings. Enables use of low cost, less pressure resistant materials in construction. (Note: Tube connected to low density liquid may require higher pressure resistance)
  No moving parts in water
  Embodiment may comprise three tanks (two on surface, one on ocean floor), two pipes and one pump/generator It may be desirable for the high density liquid (HDL) to have the same density as the surrounding water body liquid. This may enable similar hydrostatic pressure inside the vessel(s) and/or pipes as surrounding the vessel(s) and/or pipes, enabling the potential use of lower cost, less pressure resistant materials.

To maximize the energy density of the introduced storage device, potentially desirable characteristics, include, but are not limited to, large net density difference (i.e. [density of high density liquid]−[density of 'low density liquid']) and low pressure or temperature driven liquid compression (e.g. water minimally compresses under high pressure). An example of this includes, but is not limited to, propane (LDL) and water (HDL)

To enable effective functionality of the introduced storage device, potentially desirable characteristics, include, but are not limited to, two or more reagents that are substantially insoluble or immiscible. It may be desirable for the high density liquid and low density liquid to be substantially insoluble or immiscible in each other.

To minimize capital cost, potentially desirable characteristics, include, but are not limited to, low cost reagents, low density for low density liquid, and/or low corrosion or non-corrosive reagents. For example, butane and propane are low cost and liquid at higher pressure operation.

To minimize capital cost, potentially desirable characteristics, include, but are not limited to, employing materials that are compatible with the reagents inside the integrated process. For example, polypropylene or HDPE is inexpensive, abundant, corrosion resistant, and compatible with water, seawater, butane and propane.

The energy storage device may also be a means of storing hydrocarbon liquids or chemicals or volatile hydrocarbons. For example, the LDL storage region and lower head height storage region may comprise storage for hydrocarbons, such as, for example, including, but not limited to, crude oil, gasoline, diesel, kerosene, ethane, propane, butane, hexane, octane, cyclopropane, or decane, or a combination thereof. Hydrocarbon liquids are stored in small, medium, or large quantities before they are used or transported in various applications, such as polymer production, fuel, or other uses. By employing the energy storage device as a simultaneous relatively low density liquid storage device, the capital expense of the hydrocarbon liquids may be avoided. For example, oil & gas companies, hydrocarbon transport companies, oil traders, commodity traders, chemical companies, and other users of hydrocarbons or other relatively low density liquids may employ the present energy storage device as a hydrocarbon liquid storage device. For example, the owners or operators of the energy storage device may be compensated for the storage or service or storing the relatively low density liquids. Although the relatively low density liquids may be purchased, in the present embodiment, the relatively low density liquids may advantageously not be purchased by the owner or operator of the energy storage device. Alternatively, the owner or operator of the energy storage device may be compensated for properly storing the relatively low density liquids. This may eliminate the need to pay the capital expense of purchasing the hydrocarbon liquids, while also developing a new revenue source for storing the hydrocarbon liquids.

High density liquid may comprise a higher density liquid with limited solubility in water, such as propylene carbonate (density of ~1.2 g/cm3) or ethylene glycol diacetate (density of ~1.128 g/cm3). With said higher density liquid with limited solubility in water, water may be employed as a low density liquid. Said higher density liquids may be low cost, non-volatile, and relatively non-toxic, enabling their use in large volumes in aquatic or marine environments. Aquatic and marine are used interchangeably herein.

Ridged storage regions or containers may be employed for the storage region or regions located beneath the surface of the water. Said storage regions may include, but are not limited to, storage containers presently employed to store crude oil or chemicals beneath the surface of the ocean or other water body. Storage regions, including non-ridged or ridged storage regions or containers, may be located outside the water or liquid body. Alternatively or additionally, the storage regions may be located in strategic oil reserves, oil storage, natural gas storage, liquids storage, saline aquifers, geological formations, or oil & gas wells. It may be desirable for one or more storage regions experiencing greater than atmospheric pressure hydrostatic pressure to be in an environment where the surroundings exert a similar or supplemental pressure to minimize the strength requirements and potential cost of a storage region or container. In the case of a solid surroundings, such as a geological formation, such as a salt cavern, the geological formation or artificially constructed geological formation may function to contain or store said liquids directly and may function as a storage region on its own.

Example Exemplary Embodiments

An energy storage device comprising:
  Two or more storage regions
    Wherein at least one storage region is at a greater pressure than another storage region
    Wherein energy is stored using the difference in pressure between a lower density liquid and a higher density liquid at the same head height or depth
An energy storage device comprising:
  Two or more storage regions
    Wherein at least one storage region is at a greater pressure than another storage region
    Wherein said energy storage device is charged by pumping a relatively low density liquid into a storage region to displace a relatively higher density liquid
    Wherein said energy storage device is discharged by allowing a relatively higher density liquid to displace a relatively lower density liquid and allowing the flow of said lower density liquid to power a generator or hydraulic turbine
A subsea oil or chemicals storage facility which simultaneously functions as a large-scale energy storage device comprising:
  Two or more storage regions
    Wherein at least one storage region is at a greater pressure than another storage region
    Wherein energy is stored using the difference in pressure between a lower density liquid and a higher density liquid at the same head height or depth
A subsea oil or chemicals storage facility which simultaneously functions as a large-scale energy storage device comprising:
  Two or more storage regions
    Wherein at least one storage region is at a greater pressure than another storage region
    Wherein said energy storage device is charged by pumping a relatively low density liquid into a storage region to displace a relatively higher density liquid
    Wherein said energy storage device is discharged by allowing a relatively higher density liquid to displace a relatively lower density liquid and allowing the flow of said lower density liquid to power a generator or hydraulic turbine
A process for storing energy/electricity while simultaneously storing natural gas comprising
  Storing natural gas in gas bags or a storage region beneath the surface of a water body
  Storing electricity compressing or pumping natural gas into said gas bag or storage region, which may expand the volume of said storage region
  Discharging or generating electricity by allowing said natural gas leave said gas bag or storage region and pass through a generator or turbine
  Wherein said storage region is connected to a natural gas pipeline or LNG facility or natural gas facility on the surface through one or more tubes or pipes Example Exemplary Sub-Embodiments Wherein energy is stored in the displacement of a higher density liquid using a lower density liquid under conditions where the pressure head due to gravity of the higher density liquid exceeds the gravitational pressure head of the lower density liquid
Wherein the pump may function as a generator reversibly
Wherein one storage region is located beneath the surface of a water body and another storage region is located near or above the surface of a water body
Wherein said storage regions function as oil or chemicals storage
Wherein said low density liquid or high density liquid or both are the oil or chemicals requiring storage
Wherein the storage region beneath the surface of the water body constitutes a higher pressure, lower head height storage region, while the storage region above the surface of a water body constitutes a lower pressure, higher head height region
Wherein the pump or generator is located near or above the surface of a water body
Wherein said storage region beneath the surface of a water body contains a concave region with an opening near the bottom of said concave region open to the surrounding water body
Wherein a drum or separator separates or is located between the lower density liquid and the water from the surrounding water body
Wherein said storage region beneath the surface of a water body comprises an expandable or contractible or flexible structure, such as a bladder or bag or balloon, which may expand and fill with low density liquid during charging and collapse or contracted or empty during discharging
Wherein said storage region comprising an expandable or contractible or flexible structure may displace water around said storage region
Wherein the high density liquid constitutes water or water body surrounding a storage region
Wherein said storage region beneath the surface of the water body may be anchored or tethered to the ground near the bottom of said water body
Wherein the pump or generator is in contact with the low-density liquid
Wherein the pump or generator is in contact with the high-density liquid
Wherein the pump or generator is in located beneath the surface of the water
Wherein the pump or generator is in contact with the high-density liquid and located near the lower head height, higher pressure storage region
Wherein, during charging, the high-density liquid is pumped out of a storage region and the lower density liquid replaces the higher density liquid
Wherein one or more storage regions is employed for the storage of one or more chemicals
Wherein the low-density liquid or the high density liquid or a both comprise the chemicals being stored Wherein low-density liquid or high density liquid or both may be added or removed from said system Wherein said storage facility/energy storage device is located near an oil platform or chemicals facility Wherein a processing unit is employed to separate out residual high density liquid from low density liquid or vise versa before said liquid or liquids are used or transported after removal from said storage region Wherein the storage units may be employed for storage of oil or chemicals when excess storage is required Wherein the storage units may contain more of, or filled with, or almost fully filled with, or filled with more of low-density liquid to temporarily or semi-permanently or permanently employed for oil or chemical storage, for example, in the event said storage is needed Wherein the storage units may contain more of, or filled with, or almost fully filled with, or filled with more of high-density liquid to temporarily or semi-permanently or permanently employed for oil or chemical storage, for example, in the event said storage is needed Wherein the system may be optimized to prioritize or balance energy storage or oil storage or chemical storage or a combination thereof depending on, for example, including, but not limited to, one or more or a combination of the following:
  The amount of chemicals or oil requiring storage
  The market rate/price for chemical or oil storage
  The market rate/price of energy storage in the electricity grid
  The arbitrage value available for energy storage
  The arbitrage value available for chemical storage Wherein the low density liquid is a low density fluid Wherein said low density fluid comprises a gas Wherein said low density fluid or gas may comprise natural gas Wherein said natural gas may be employed in said system for energy generation and oil natural gas storage Wherein natural gas may be stored in the form of compressed natural gas (CNG) or liquid natural gas (LNG)

Wherein said storage region is connected to a natural gas pipeline or LNG facility or natural gas facility on the surface through one or more tubes or pipes A process for storing energy/electricity while simultaneously storing natural gas comprising
  Storing natural gas in gas bags or a storage region beneath the surface of a water body
  Storing electricity compressing or pumping natural gas into said gas bag or storage region, which may expand the volume of said storage region
  Discharging or generating electricity by allowing said natural gas leave said gas bag or storage region and pass through a generator or turbine
  Wherein said storage region is connected to a natural gas pipeline or LNG facility or natural gas facility on the surface through one or more tubes or pipes Lower head height, higher pressure storage region may be equivalent to the storage region beneath the surface of a water body Energy Density (Butane-Water):

| Head Height (m) | Potential Energy (Wh per m$^3$) (One Cycle) |
| --- | --- |
| 1 | 1.09 |
| 2 | 2.18 |
| 3 | 3.27 |
| 4 | 4.36 |
| 5 | 5.45 |
| 6 | 6.54 |
| 7 | 7.63 |
| 8 | 8.72 |
| 9 | 9.81 |
| 10 | 10.9 |
| 100 | 109 |
| 1000 | 1090 |

Liquid Densities

The table below shows the densities of various example liquids, which may be employed in the technology introduced herein.

| Liquid | Temperature - t - (° C.) | Density - ρ - (kg/m$^3$) |
| --- | --- | --- |
| Acetic Acid | 25 | 1049 |
| Acetone | 25 | 784.6 |
| Acetonitrile | 20 | 782 |
| Alcohol, ethyl (ethanol) | 25 | 785.1 |
| Alcohol, methyl (methanol) | 25 | 786.5 |
| Alcohol, propyl | 25 | 800.0 |
| Ammonia (aqua) | 25 | 823.5 |
| Aniline | 25 | 1019 |
| Automobile oils | 15 | 880-940 |
| Beer (varies) | 10 | 1010 |
| Benzene | 25 | 873.8 |
| Benzil | 15 | 1230 |
| Brine | 15 | 1230 |
| Bromine | 25 | 3120 |
| Butyric Acid | 20 | 959 |
| Butane | 25 | 599 |
| n-Butyl Acetate | 20 | 880 |
| n-Butyl Alcohol | 20 | 810 |
| n-Butylhloride | 20 | 886 |
| Caproic acid | 25 | 921 |
| Carbolic acid (phenol) | 15 | 956 |
| Carbon disulfide | 25 | 1261 |
| Carbon tetrachloride | 25 | 1584 |
| Carene | 25 | 857 |
| Castor oil | 25 | 956.1 |
| Chloride | 25 | 1560 |
| Chlorobenzene | 20 | 1106 |
| Chloroform | 20 | 1489 |
| Chloroform | 25 | 1465 |
| Citric acid, 50% aqueous solution | 15 | 1220 |
| Coconut oil | 15 | 924 |
| Cotton seed oil | 15 | 926 |
| Cresol | 25 | 1024 |
| Creosote | 15 | 1067 |
| Crude oil, 48° API | 60° F. | 790 |
| Crude oil, 40° API | 60° F. | 825 |
| Crude oil, 35.6° API | 60° F. | 847 |
| Crude oil, 32.6° API | 60° F. | 862 |
| Crude oil, California | 60° F. | 915 |
| Crude oil, Mexican | 60° F. | 973 |
| Crude oil, Texas | 60° F. | 873 |
| Cumene | 25 | 860 |
| Cyclohexane | 20 | 779 |
| Cyclopentane | 20 | 745 |
| Decane | 25 | 726.3 |
| Diesel fuel oil 20 to 60 | 15 | 820-950 |
| Diethyl ether | 20 | 714 |
| o-Dichlorobenzene | 20 | 1306 |
| Dichloromethane | 20 | 1326 |
| Diethylene glycol | 15 | 1120 |
| Dichloromethane | 20 | 1326 |
| Dimethyl Acetamide | 20 | 942 |

| Liquid | Temperature - t - (° C.) | Density - ρ - (kg/m³) |
|---|---|---|
| N,N-Dimethylformamide | 20 | 949 |
| Dimethyl Sulfoxide | 20 | 1100 |
| Dodecane | 25 | 754.6 |
| Ethane | −89 | 570 |
| Ether | 25 | 713.5 |
| Ethylamine | 16 | 681 |
| Ethyl Acetate | 20 | 901 |
| Ethyl Alcohol (Ethanol, pure alcohol, grain alcohol or drinking alcohol) | 20 | 789 |
| Ethyl Ether | 20 | 713 |
| Ethylene Dichloride | 20 | 1253 |
| Ethylene glycol | 25 | 1097 |
| Trichlorofluoromethane refrigerant R-11 | 25 | 1476 |
| Dichlorodifluoromethane refrigerant R-12 | 25 | 1311 |
| Chlorodifluoromethane refrigerant R-22 | 25 | 1194 |
| Formaldehyde | 45 | 812 |
| Formic acid 10% concentration | 20 | 1025 |
| Formic acid 80% concentration | 20 | 1221 |
| Fuel oil | 60° F. | 890 |
| Furan | 25 | 1416 |
| Furforol | 25 | 1155 |
| Gasoline, natural | 60° F. | 711 |
| Gasoline, Vehicle | 60° F. | 737 |
| Gas oils | 60° F. | 890 |
| Glucose | 60° F. | 1350-1440 |
| Glycerine | 25 | 1259 |
| Glycerol | 25 | 1126 |
| Heating oil | 20 | 920 |
| Heptane | 25 | 679.5 |
| Hexane | 25 | 654.8 |
| Hexanol | 25 | 811 |
| Hexene | 25 | 671 |
| Hydrazine | 25 | 795 |
| Ionene | 25 | 932 |
| Isobutyl Alcohol | 20 | 802 |
| Iso-Octane | 20 | 692 |
| Isopropyl Alcohol | 20 | 785 |
| Isopropyl Myristate | 20 | 853 |
| Kerosene | 60° F. | 820.1 |
| Linolenic Acid | 25 | 897 |
| Linseed oil | 25 | 929.1 |
| Machine oil | 20 | 910 |
| Mercury | | 13590 |
| Methane | −164 | 465 |
| Methanol | 20 | 791 |
| Methyl Isoamyl Ketone | 20 | 888 |
| Methyl Isobutyl Ketone | 20 | 801 |
| Methyl n-Propyl Ketone | 20 | 808 |
| Methyl t-Butyl Ether | 20 | 741 |
| N-Methylpyrrolidone | 20 | 1030 |
| Methyl Ethyl Ketone | 20 | 805 |
| Milk | 15 | 1020-1050 |
| Naphtha | 15 | 665 |
| Naphtha, wood | 25 | 960 |
| Napthalene | 25 | 820 |
| Nitric acid | 0 | 1560 |
| Ocimene | 25 | 798 |
| Octane | 15 | 698.6 |
| Oil of resin | 20 | 940 |
| Oil of turpentine | 20 | 870 |
| Oil, lubricating | 20 | 900 |
| Olive oil | 20 | 800-920 |
| Oxygen (liquid) | −183 | 1140 |
| Paraffin | | 800 |
| Palmitic Acid | 25 | 851 |
| Pentane | 20 | 626 |
| Pentane | 25 | 625 |
| Perchlor ethylene | 20 | 1620 |
| Petroleum Ether | 20 | 640 |
| Petrol, natural | 60° F. | 711 |
| Petrol, Vehicle | 60° F. | 737 |
| Phenol (carbolic acid) | 25 | 1072 |
| Phosgene | 0 | 1378 |
| Phytadiene | 25 | 823 |
| Pinene | 25 | 857 |
| Propane | −40 | 493.5 |
| Propane, R-290 | 25 | 494 |
| Propanol | 25 | 804 |
| Propylenearbonate | 20 | 1201 |
| Propylene | 25 | 514.4 |
| Propylene glycol | 25 | 965.3 |
| Pyridine | 25 | 979 |
| Pyrrole | 25 | 966 |
| Rape seed oil | 20 | 920 |
| Resorcinol | 25 | 1269 |
| Rosin oil | 15 | 980 |
| Sea water | 25 | 1025 |
| Silane | 25 | 718 |
| Silicone oil | 25 | 965-980 |
| Sodium Hydroxide (caustic soda) | 15 | 1250 |
| Sorbaldehyde | 25 | 895 |
| Soya bean oil | 15 | 924-928 |
| Stearic Acid | 25 | 891 |
| Sulfuric Acid 95% concentration | 20 | 1839 |
| Sulfurus acid | −20 | 1490 |
| Sugar solution 68 brix | 15 | 1338 |
| Sunflower oil | 20 | 920 |
| Styrene | 25 | 903 |
| Terpinene | 25 | 847 |
| Tetrahydrofuran | 20 | 888 |
| Toluene | 20 | 867 |
| Trichlor ethylene | 20 | 1470 |
| Triethylamine | 20 | 728 |
| Trifluoroacetic Acid | 20 | 1489 |
| Turpentine | 25 | 868.2 |
| Water, heavy | 11.6 | 1105 |
| Water - pure | 4 | 1000 |
| Water - sea | 77° F. | 1022 |
| Whale oil | 15 | 925 |
| o-Xylene | 20 | 880 |

Low density liquid or high density liquid may be sourced from, for example, waste products. For example, the low density liquid or the high density liquid may be sourced from, for example, including, but not limited to, one or more or a combination of the following: waste cooking oil, waste plastic, waste plastic converted into liquids, waste plastic converted into fuel oil, waste glycerol, waste alcohol, waste coolant, waste antifreeze, waste lubricant, waste fuel, contaminated oil, contaminated chemicals, or expired goods.

Prior Art, Incorporated Herein by Reference (*Ocean Renewable Energy Storage (ORES) System: Analysis of an Undersea Energy Storage Concept,* 2013, 10.1109/JPROC.2013.2242411, https://ieeexplore.ieee.org/document/6471167/)(https://www.renewableenergyworld.com/articles/2016/09/storing-energy-in-the-sea-a-new-design-for-marine-energy-storage.html).
Application Ser. No. 14/003,567, 20140060028, Pumped-Storage Power Plant https://patents.justia.com/patent/20140060028

Third Description of Embodiments

Tidal Power System
  Description:
    The present embodiments may relate to systems and methods for generating energy from the change in water level due to tides. Some embodiments may be applicable to, for example, a tidal power energy generation system, which generates energy from change in water level due to, for example, tides. Some embodiments may involve using the displacement of air or other fluid from a storage region due to a rise in water level due to tides to generate energy, such as electricity. Some embodiments may involve using the movement of air or other fluid into a storage region due to a decrease in water level due to tides to generate electricity. The movement of air or displacement of air may be transferred through one or more tubes to, for example, the surface and/or may be converted to electricity using, for example, a pneumatic generator. The generation of electricity, pneumatic pump, pneumatic generator, and/or other components may be located on the surface outside the water or storage region if desired. Another gas or fluid other than air or in addition to air or in combination with air may be employed if desired. Said storage region may comprise a water or air or fluid impermeable material or structure with a concave region containing space which can be occupied by a fluid. Said concave region may be occupied by a porous material, for example, sand or rocks or cinder blocks or plastic bottles or packing material, which may contain space which can be occupied by a fluid, such as water or air. Said storage region may comprise a water or air tight liner or tarp which forms a concave region over a portion of sand or rock or cinder blocks or plastic bottles or packing material or solid material with space which can be occupied by a fluid, such as water or air. Said storage region may comprise a rigid structure such as an old ship, or a plastic container. Said storage region may comprise a bag, or bladder, or flexible structure, which may be expanded when filled with a gas or a low density liquid at, for example, lower tides, and collapsible when said gas or low density liquid is released through, for example, a generator, at higher tides. Said concave region may comprise open space which may be occupied by a fluid, such as water or air. Said concave region may be positioned such that the concave region faces the direction of the earth's surface (e.g. the direction of the force of gravity) such that a lower density fluid may be trapped in said concave region if desired. Said concave region may contain a tube with an opening inside said concave region. Said tube may be interconnected to the surface, where it may be connected to a pneumatic pump or generator or a hydraulic pump or generator. Said tube may be placed under and around said concave region, as opposed to, for example, through the material of said storage region, as this may reduce the likelihood of leaks through said storage region.

The concave region or storage region may comprise infrastructure employed for another purpose, which may include, but is not limited to, one or more or a combination of the following: a sewer system, a drainage system, a runoff water system, a wastewater system, a drainage pipe, an intake pipe, an outflow pipe, or a water storage region.

A concave region or storage region may be filled with a porous material fill. Said porous material fill may comprise, including, but not limited to, one or more or a combination of the following: sand, gravel, rock, packing material, or cinderblock, or plastic bottles, or plastic containers, or plastic buckets, or interconnected cinderblock, or interconnected plastic containers, or interconnected packing material.

The concave region or storage region may be built into or may be a component of a pre-existing or new marine structure. For example, a concave region or storage region (which may be integrated with an air tube and pneumatic generator/pump) may be fabricated as a component causeway, breakwall, building foundation, landfill or land expansion, or artificial island. Advantageously, the subsurface of waterfront land, which is rarely seen or utilized after construction, may be transformed into a means for generating renewable electricity from the tides or changes in water level of a water body.

For example, a concave region or storage region may be constructed as part of a causeway or landfill or artificial island in three general steps: 1) Air tubes may be placed in the region where the marine structure will be constructed. The air tubes may have an end which is located at a vertical height near the vertical height of the eventually constructed concave region or storage region. If advantageous, a water pipe may be placed in the region where the marine structure will be constructed to facilitate water flow in the eventually constructed concave region or storage region. Alternatively, water seepage or permeate may be the sole source of water flow if, for example, a water pipe is not employed. 2) Porous material fill, such as rock, or sand, or cinder block, or other fill materials, or other porous fill materials described herein, or a combination thereof, may be added. Said fill materials may comprise the interior of the concave region or storage region. Said fill materials may surround the air tubes. It may be desirable for said fill materials to surround, although not substantially or completely block or kink or clog an air tube. Fill materials may be carefully placed to match a design or the contour of the storage region or concave region liner. 3) A liner may be placed over said fill materials and pipe. It may be desirable for the liner to match the contour of the fill materials and it may be desirable for the liner to surround the fill materials for the full vertical depth of the fill materials or storage region. A liner may include, but is not limited to, one or more or a combination of the following: a HDPE liner, or LDPE liner, or aluminum liner, or steel liner, or metal coated liner, or metal liner, or cement liner, a cement layer, or clay liner, or landfill liner, or pond liner, or lake liner, storage basin liner, or a nylon liner, or geosynthetic liner, or PVC liner, or bag, or fabric, or textile, or mesh, or high strength polymer liner, or woven liner, or braided liner, or liner comprising multiple layers of materials for strength and fluid tightness, or tarp.

After the liner has been placed, materials comprising the rest of the marine structure may be added to, for example, construct the marine structure. If advantageous, buffer materials may be added to the top or bottom of the liner to minimize potential wear and tear or prevent the formation of perforations in the liner. Said buffer materials may include, but are not limited to, one or more or a combination of the following: sand, or burlap, or twine, or woven nyon, or Kevlar, or gravel, or clay, or mud, or foam, or cement, or concrete, or mesh, or fabric, or textile, or rubber. Advantageously, it is possible to construct the present tidal power system with no moving parts beneath the surface of the water, or underground, or inside the storage region or cavity.

For example, a concave region or storage region may be constructed as an aspect of an artificial reef or from vessels or structures which may otherwise be sunk. For example, a concave region or storage region may be constructed from using upside-down vessel or ship or boat or tank or barge. Advantageously, the hull of a ship may already be fluid tight, although additional patching or re-enforcement may be employed if desired. An example implementation may involve one or more of the following steps: 1) placing tubing and/or water pipes inside said vessel. An opening of the air tubing may be placed or attached near the bottom of the vessel (which may be near the eventual top of the storage region or concave region when said vessel becomes a storage region or concave region). Water tubing may be employed to facilitate water flow in and out of the storage region or concave region. 2) Placing porous filling material into at least a portion of said vessel. Said porous filling material may be employed to prevent the vessel from floating when the vessel open space is occupied by air. Alternatively or additionally, said vessel may be prevented from floating by using anchors and lines, which may be evenly distributed across the vessel. If necessary, a portion of the remaining air space inside the vessel may be filled with water to promote sinking. 3) Flipping said vessel upside down and placing said vessel at or near the bottom of the water body. It may be desirable for the fill material to be at least partially contained in the vessel to prevent significant uncontrolled spilling of fill material. Fill material may be contained due to at least partially covered compartments inside said vessel. Alternatively or additionally, said fill materials may be contained using a fabric or mesh or twine or net. It may be advantageous to conduct this step when the vessel is near the bottom of said water body to, for example, minimize uncontrolled spilling of fill material. Air pipes may be connected to an air pump or pneumatic generator located near, at, or above the surface. Water pipes may be open to the surrounding water body. Advantageously, if a storage region or concave region is located near the bottom of a water body, it may experience near or close to the full hydraulic head of the water body throughout the energy generation step, although this may be dependent on the vertical height of said concave region relative to the depth of the water body and water level difference between low and high tide.

Some embodiments may generate electricity from the difference in hydraulic pressure in a storage region in a water body due to the change with water level, which may be due to tides. An embodiment may involve a storage region beneath the surface of a water body. During relatively lower water levels or tides, air may be pumped into the storage region using, for example, one or more tubes, displacing water in said storage region. During relatively higher water levels or tides, water may be allowed to displace air from said storage region, and said air may pass through, for example, one or more tubes into pneumatic generator, generating useful work or electricity. It is important to note that at higher water levels or tides, the hydraulic pressure in the storage region may be significantly greater than the hydraulic pressure in the storage region during lower water levels or tides. Net energy or electricity may be generated due to, for example, the significantly greater amount of energy or electricity generated from air being displaced into a generator at higher tides or water levels than the energy or electricity required to pump air into said storage region during lower water levels or tides. Net energy or electricity generated may comprise the difference in between the energy generated during higher water levels or tides compared to the energy consumed during lower water levels or tides.

Embodiments may generate electricity during one or more of the tide cycles. For example, some embodiments may generate electricity during four tide cycles in a ~1 day period (for example: 2 high tides, two low tides)—an example of this may be an embodiment employing an underground cavity with depth in the range of the ocean water level at higher or lower or both tides. For example, some embodiments may generate electricity during two tide cycles in a ~1 day period (for example: 2 high tides)—an example of this may be an embodiment employing an under water storage region at below or near or about same water depth of the low tide depth in a region. For example, some embodiments may generate electricity during less cycles than their available capacity—an example of this may be an embodiment employing an underground cavity with depth in the range of the ocean water level at higher or lower or both tides wherein the process generates electricity during only higher tides. An embodiment which only generates electricity during higher tides may be advantageous as some cavities may not be structurally suitable for partial vacuums, which may be required to generate electricity during all four tide movements during a day.

The process may employ a hydroelectric or hydro generator if advantageous. It is important to note to minimize costs and maximize longevity, it may be advantageous to employ a pneumatic generator powered by air displacement.

Cavity, storage region, or concave region may be analogous or synonym terms.

Example Advantages:
  Cost:
    Material cost is low. Material cost may simply comprise a liner, pipes, filling material (if not already available in the surrounding environment), and pneumatic generator or pump
    Labor cost may vary depending on whether the installation is part of another project, such as the construction of a marine structure, and whether the installation required digging beneath the surface of the ground or dredging.
  Resilience and durability:
    Some embodiments may be located underground or beneath the surface of a water body, reducing potential hazards from waves and debris
    Some embodiments may have no moving parts beneath the surface of the water body, reducing or eliminating potential complications from corrosion, fouling, or debris
    Moving parts may, if desired, not be in contact or direct contact with water or the water body, reducing their cost and increasing their expected lifespan
  Efficiency
    Pneumatic generators powered using relatively low pressure pressurized air can produce electricity at an efficiency greater than 50%, or greater than 60%, or greater than 70%, or greater than 80%, or greater than 90%.

Example Step by Step Descriptions
Underground Air & Water Cavity:
  Overview:
    FIGS. 14-19 may show embodiments employing an underground storage region or cavity. Each figure may show an example step in the process of generating electricity from changes in water level due to, for example, including, but not limited to, tides. In FIGS. 14-19, the storage region or cavity may comprise mostly open space for fluid, such as air or water, to occupy.
    FIG. 14: Step 1 (Higher Tide, Filling, Electricity Generation): FIG. 14 may show an embodiment where electricity is being generated. Air is allowed to be released through the opening of a valve in the air tube or pneumatic pump, which allows air to exit storage region through a pipe into a pneumatic generator, which may generate electricity. Due to the relatively high water level in the surrounding or nearby water body relative to the water level in the storage region, the air pressure in the storage region may be greater than the atmosphere air pressure. Water from the surrounding or nearby water body may pass through a pump or travel via seepage into the storage region, displacing the air in said storage region. The flow rate of air exiting the storage region and the rate of water entering the storage region may be controlled by controlling the flow rate of air entering the pneumatic generator.

FIG. 15: Step 2 (High Tide, Cavity Full): FIG. 15 may show an embodiment where the storage region is nearly full with water. The storage region may be considered nearly full with water when it achieves either of the following: 1) the water level in the storage region is near or at the maximum water level in the nearby water body's recent tide range; or 2) the water volume reaches the maximum practical volumetric capacity of the storage region.

FIG. 16: Step 3 (Lower Tide, Emptying, Generating Electricity): FIG. 16 may show an embodiment generating electricity when the surrounding water body water level is relatively low compared to the water level inside the storage region. Energy may be generated due to the flow of air into the storage region as water exits said storage region, and where said flow of air powers, for example, a pneumatic generator. The flow of water out of said storage region may be through a water pipe or water seepage. It is important to note depth of the storage region or, if a water pipe is connected to the storage region, the depth of the water pipe, may desirably be lower than the depth of the water in water body to prevent uncontrolled water exiting or air entering the storage region. Air flow and water exiting may be controlled through the opening of a valve in connected to the air tube or pneumatic generator.

FIG. 17: Step 4 (Lower Tide, Empty): FIG. 17 may show an embodiment where the storage region is nearly empty with water. The storage region may be considered nearly empty with water when it achieves one of the following: 1) the water level in the storage region is near or at the minimum water level in the nearby water body's recent tide range; or 2) there is no water in the storage region.

FIG. 18: Step 4 Alternative (Lower Tide, Empty, depending on time of year and location): FIG. 18 may show an embodiment where the storage region is fully empty with water. It is important to note that energy generation from water exiting a storage region may require the water pipe or the storage region to be at least partially beneath the surface of the water to prevent unintentional air or water flow. It is important to note that a storage region occupied almost entirely by air may maximize the potential energy generation capacity.

FIG. 19: Step 5 (Lower Tide, Pump remaining water out): FIG. 19 may show an embodiment where air is pumped into a storage region to remove residual water. Pumping air into the storage region may be conducted, for example, while the water level in the surrounding water body is relatively low. The energy required to pump air into the storage region (and displacing residual water) at a lower tide may be significantly less the than the energy generated from the increase in displaceable volume occupied by air in the storage region. Additionally, air may be pumped into the storage region to remove water which may have been trapped in the air pipe.

Example Embodiment where Water/Air Cavity or Storage Region Contains a Porous Material Overview: FIGS. 20-23 may show embodiments employing an underground storage region or cavity. Each figure may show an example step in the process of generating electricity from changes in water level due to, for example, including, but not limited to, tides. In FIGS. 14-19, the storage region or cavity may comprise mostly porous filling material, which may contain space for fluid, such as air or water, to occupy. The steps for generating electricity may be similar to the steps shown in FIGS. 14-19.

FIG. 20: Step 1 (Higher Tide, Filling, Electricity Generation): FIG. 20 shows an example embodiment where water/air cavity or storage region contains a porous material.

FIG. 21: Step 2 (High Tide, Cavity Full): FIG. 21 shows an example embodiment where water/air cavity or storage region contains a porous material.

FIG. 22: Step 3 (Lower Tide, Emptying, Generating Electricity): FIG. 22 shows an example embodiment where water/air cavity or storage region contains a porous material.

FIG. 23: Step 4 (Lower Tide, Empty): FIG. 23 shows an example embodiment where water air cavity or storage region contains a porous material.

Under Water Vessel (May be Near Full Head Height Throughout Power Generation):

FIG. 24: Step 1 (Higher Tide, Filling, Generating Electricity): FIG. 24 shows an example embodiment where water/air cavity or storage region is located on or within a water body.

FIG. 25: Step 2 (Higher Tide, Full): FIG. 25 shows an example embodiment where water/air cavity or storage region is located on or within a water body.

FIG. 26: Step 3 (Lower Tide, Emptying): FIG. 26 shows an example embodiment where water/air cavity or storage region is located on or within a water body.

FIG. 27: Alternative Step 3 (Lower Tide, Emptying, Depending on Tide and Location): FIG. 27 shows an example embodiment where water/air cavity or storage region is located on or within a water body.

FIG. 28: Step 4 (Lower Tide, Empty): FIG. 28 shows an example embodiment where water/air cavity or storage region is located on or within a water body.

FIG. 29: FIG. 29 shows an example embodiment with a floating pump or generator station.

It will be appreciated that while many of the above figures show the vessel or other storage structure at or near the bottom of the water body, it may be located at any convenient location below the surface. In some embodiments it may be moored to the bottom and/or the top of the water body.

Air may be substituted with other fluids described herein. In the case where the fluid comprises a liquid, a hydraulic or hydroelectric generator may be employed instead of a pneumatic generator.

Relatively higher tides are when the water level in a water body is higher than the water level during relatively lower tides. Water level changes may be due to primarily changes in the water level due to gravitational tides.

Example Exemplary Embodiments

A tidal power system comprising:
A region comprising a cavity, or concave region, or a storage region surrounded by at least a portion water impermeable material
Wherein water displaces air from said region at relatively high tides,
Wherein air displaces water at relatively lower tides
Wherein electricity is generated from movement of air to or from said region Example Exemplary Sub-Embodiments Wherein energy or electricity is generated using a pneumatic turbine or generator
Wherein said region is located beneath the surface of the ground, or inside a causeway, or a landfill, or an artificial island, or a breakwall, or a building foundation, or a structure foundation, or a combination thereof
Wherein said storage region contains a porous fill material
Wherein said porous fill material comprises one or more or a combination of the following: sand, gravel, rock, packing material, or cinderblock, or plastic bottles, or plastic containers, or plastic buckets, or interconnected cinderblock, or interconnected plastic containers, or interconnected packing material
Wherein said water impermeable material may comprise a liner
Wherein air exits and enters said region using a pipe
Wherein said pipe has an opening inside said storage region or an opening above the surface of the water or both
Wherein water enters or exits said region via water seepage
Wherein water enters or exits said region via a pipe
Wherein water enters or exits said region through an opening in said region or water impermeable material
Wherein said is structurally rigid
Wherein said region is structurally flexible or expandable or collapsible and may comprise a bladder, bag, or similar device
Wherein said air is located inside said structurally flexible region and said structurally flexible region is inflated during lower tides and collapsed during higher tides
Wherein said collapsing generates electricity through the displacement of air from said structurally flexible region into a pneumatic generator
Wherein said region comprises infrastructure employed for another purpose, such as one or more or a combination of the following: a sewer system, a drainage system, a runoff water system, a wastewater system, a drainage pipe, an intake pipe, an intake system, an outflow pipe, an outflow system, or a storage region.
Wherein a liner comprises one or more or a combination of the following: a HDPE liner, or LDPE liner, or aluminum liner, or steel liner, or metal coated liner, or metal liner, or cement liner, a cement layer, or clay liner, or landfill liner, or pond liner, or lake liner, storage basin liner, or a nylon liner, or geosynthetic liner, or PVC liner, or bag, or fabric, or textile, or mesh, or high strength polymer liner, or woven liner, or braided liner, or liner comprising multiple layers of materials for strength and fluid tightness, or tarp.
Wherein said region is constructed as an aspect of an artificial reef or from vessels or structures which may otherwise be sunk or a combination thereof
Wherein air is pumped into said region during lower tides and air is released from said region into a generator during higher tides
Wherein the energy generated during higher tides exceeds the energy consumed during lower tides
Wherein air is pumped into said region to store electricity
Wherein air is released from said region to generate electricity
Wherein the present invention can function as a tidal power energy generation device, an energy storage device, or both Specific Embodiments Embodiments for "Systems and Methods for Preventing Fouling of Marine Structures"

1. A system for reducing fouling on an aquatic structure comprising: an aquatic structure comprising at least one surface exposed to water; a concave region on at least one portion of the surface exposed to water wherein said concave region is configured to maintain a substantially non-contiguous physical separation between water and said region and wherein at least a portion of said concave region is occupied with a gas.

2. The system of Embodiment 1 wherein the substantially non-contiguous physical separation is maintained by controlling the amount of gas in said concave region.

3. The system of Embodiment 1 further comprising a controller and a gas source operably connected to said concave region wherein the controller and gas source control the amount of gas.

4. The system of Embodiment 3 wherein said controller and gas source are employed to displace water with gas in at least a portion of said concave region.

5. The system of Embodiment 1 wherein the said gas pocket is controllably immobilized for a controlled period of time.

6. The system of Embodiment 5 wherein said time is at least about 5 seconds.

7. The system of Embodiment 1 wherein said substantially non-contiguous physical separation is present greater than 30% of the time said structure is in use.

8. A system for reducing fouling on an aquatic structure comprising: an aquatic structure comprising at least one surface exposed to water when the structure is in use; a concave region on at least one portion of the surface exposed to water wherein said concave region is configured to maintain a substantially non-contiguous physical separation between water and said region.

9. The system of Embodiment 8 wherein the volume beneath said concave region is adjustable.

10. The system of Embodiment 8 wherein the surface area of the concave region is adjustable.

11. The system of Embodiment 8 wherein the height of the concave region relative to water is adjustable.

12. The system of Embodiment 8 wherein at least one of the volume beneath said concave region, the surface area of the concave region, or the height of the concave region above water, is adjusted by changing the surface morphology of or on the concave region.

13. The system of Embodiment 8 wherein at least a portion of the surface exposed to water is substantially hydrophobic.

14. An improved aquatic structure comprising:
a structure comprising at least one surface exposed to water when the structure is in use wherein the improvement comprises:
configuring at least a portion of said surface exposed to water such that said portion has a non-contiguous separation with water when the structure is in use and wherein the portion having a non-contiguous separation with water provides a gas pocket between said portion and water when the structure is in use.

15. The improved aquatic structure of Embodiment 14 wherein the amount of substantially non-contiguous physical separation with water of the surface exposed to water is controlled by adjusting the amount of gas in the pocket.

16. The improved aquatic structure of Embodiment 14 wherein said non-contiguous separation is present greater than 30% of the time said structure is in use.

17. The improved aquatic structure of Embodiment 14 wherein said portion configured to be non-contiguous reduces visible fouling by at least 50% as compared to a similar structure lacking said non-contiguous portion.
18. The improved aquatic structure of Embodiment 14 wherein the amount of gas in the pocket is adjustable.
19. The improved aquatic structure of Embodiment 14 wherein the volume of the gas pocket is adjustable.
20. The improved aquatic structure of Embodiment 14 wherein the surface area or volume of the non-contiguous separated portion is adjustable.
21. The system of Embodiment 14 wherein the height of the non-contiguous separated portion with respect to water is adjustable.

Embodiments for "Low Density Fluid Displacement to Generate Power"

1. A system for generating electricity comprising:
a first storage reservoir near the surface of a body of water and configured to store a low density fluid which is substantially immiscible with water;
a second storage reservoir located below the surface of a body of water and configured to store water; a pump; and a generator;
wherein the pump, generator, and the first and second reservoir are operatively connected such that electricity is stored by displacing water in the second storage reservoir by pumping low density fluid in the first storage reservoir to the second storage reservoir and electricity is generated (or discharge) by allowing the low density fluid in the second storage reservoir to return to the first reservoir.
2. The system of Embodiment 1 wherein the pump and the generator may be the same unit.
3. The system of Embodiment 1 wherein said second storage reservoir comprises an expandable or contractible structure.
4. The system of Embodiment 1 wherein said second storage reservoir comprises a bladder, a bag, or a balloon.
5. The system of Embodiment 1 wherein said second storage reservoir contains a concave region with an opening near the bottom of said concave region open to the body of water.
6. The system of Embodiment 1 wherein said second storage reservoir is tethered to the bottom of said water body.
7. The system of Embodiment 1 wherein the low density fluid comprises a hydrocarbon liquid or natural gas.
8. The system of Embodiment 1 wherein the low density fluid comprises compressed natural gas or liquid natural gas.
9. The system of Embodiment 1 which is operatively connected to a unit requiring electricity.
10. A process to generate energy comprising:
storing energy by displacing at least a portion of a first fluid having a first density with a second fluid having a second density which is lower than said first fluid wherein said first and second fluid are substantially immiscible in each other;
allowing a power discharge by displacing at least a portion of the lower density second fluid with the first higher density fluid;
wherein said generating step, allowing step, or both are facilitated by pressure and gravity.
11. The process of Embodiment 10 wherein said generating step, allowing step, or both occur beneath a surface of water wherein said water is employed to facilitate pressure.
12. The process of Embodiment 10 wherein said first fluid is water.
13. The process of Embodiment 10 wherein said second fluid comprises compressed natural gas, liquid natural gas, liquid hydrocarbon, petroleum ether, or crude oil.
14. The process of Embodiment 10 wherein the second fluid having a second density is stored near the surface of a body of water.
15. The process of Embodiment 10 which further comprises converting the power discharge to electricity.
16. The process of Embodiment 10 which further comprises storing said power discharge.
17. The process of Embodiment 10 which further comprises converting the power discharge to electricity.
18. The process of Embodiment 10 wherein the first or second fluid comprise a waste fluid.
19. The process of Embodiment 10 wherein the first or second fluid comprise a fluid generated from a solid waste.
20. The process of Embodiment 10 wherein the first or second fluid comprise a cooking oil.

Embodiments for "Underwater Energy Storage and Electricity"

1. A process for generating electricity from tides comprising:
providing a cavity which is operatively linked to tidal waters and configured such that air is displaced with water at higher tides and such that water is displaced with air at lower tides;
displacing at least a portion of air within the cavity with water at higher tides;
displacing at least a portion of water within the cavity with air at lower tides; wherein the displacing of water, air or both generates power.
2. The process of Embodiment 1 wherein the cavity is open on bottom.
3. The process of Embodiment 1 further comprising transferring at least a portion of displaced air to a pneumatic generator.
4. The process of Embodiment 1 which further comprises controlling the flow rate of air during displacing of air.
5. The process of Embodiment 1 which further comprises controlling the flow rate of water during displacing of air.
6. The process of Embodiment 1 wherein the cavity is above ground.
7. The process of Embodiment 1 wherein the cavity is below ground.
8. The process of Embodiment 1 wherein the cavity is at least partially submerged in a tidal water body.
9. The process of Embodiment 1 further comprising transferring at least a portion of displaced air to a pneumatic generator through one or more pipes.
10. The process of Embodiment 1 wherein the cavity comprises a flexible liner.
11. The process of Embodiment 1 wherein the cavity is rigid.
12. The process of Embodiment 1 wherein the cavity is expandable or collapsible.
13. The process of Embodiment 1 which is configured such that power generated at higher tides exceeds any power consumed during lower tides.
14. A process for generating electricity from tides comprising:
providing a cavity which is at least partially filled with a porous material and air which cavity is operatively linked to tidal waters and configured such that air is displaced with water at higher tides and such that water is displaced with air at lower tides;
displacing at least a portion of air within the cavity with water at higher tides;
displacing at least a portion of water within the cavity with air at lower tides; wherein the displacing of water, air or both generates power.
15. The process of Embodiment 14 wherein the porous material comprises sand, gravel, rock, packing material, or cinderblock, or plastic bottles, or plastic containers, or plastic buckets, or interconnected cinderblock, or interconnected plastic containers, interconnected packing material, or mixtures thereof.

16. The process of Embodiment 14 wherein the cavity comprises a flexible liner.

17. The process of Embodiment 14 wherein the cavity is rigid.

18. The process of Embodiment 14 wherein the cavity is expandable or collapsible.

19. The process of Embodiment 14 further comprising transferring at least a portion of displaced air to a pneumatic generator.

20. The process of Embodiment 14 which further comprises controlling the flow rate of water during displacing of air.

Further Discussion of Second Description of Embodiments

Additional Energy Storage Embodiments Summary

The present invention pertains to a system for storing energy. The present invention stores energy in the hydrostatic pressure difference between a lesser density liquid and a greater density liquid over the same hydraulic head or depth.

The present invention may involve storing energy by displacing water or other greater density liquid with a lesser density liquid. Said displacing of water with a lesser density liquid may involve pumping lesser density liquid to a greater depth beneath the surface of water or other body of liquid. Said pumping may consume power, such as electricity, and convert said power into gravitational potential energy and/or energy stored in a hydrostatic pressure difference. Said stored energy may be converted back into power by allowing said lesser density liquid to be released from said greater depth beneath the surface of water or other body of liquid to a lesser depth beneath the surface of water or other body of liquid, passing through a generator in the process.

Description of Figures

FIG. 30: FIG. 30 may show an energy storage system where the first storage reservoir is located on land and the pump and/or generator is located on land. The second storage reservoir is located beneath the surface of a water body at a greater hydrostatic pressure and/or greater depth beneath the surface of a water body than the first storage reservoir. The first storage reservoir, the pump and/or generator, and the second storage reservoir may be connected using pipes. FIG. 30 may show the energy storage system undergoing charging. Charging may involve storing power by pumping low density liquid from the first storage reservoir to the second storage reservoir. Storage reservoirs may comprise expandable and/or contractable or collapsible tanks. For example, during charging, the first storage reservoir may contract or collapse into a smaller volume as liquid is pumped from the first storage reservoir to the second storage reservoir. For example, during charging, the second storage reservoir may expand into a larger volume as liquid is pumped from the first storage reservoir to the second storage reservoir.

FIG. 31: FIG. 31 may show an energy storage system where the first storage reservoir is located on land and the pump and/or generator is located on land. The second storage reservoir is located beneath the surface of a water body at a greater hydrostatic pressure and/or greater depth beneath the surface of a water body than the first storage reservoir. The first storage reservoir, the pump and/or generator, and the second storage reservoir may be connected using pipes. FIG. 31 may show the energy storage system undergoing discharging. Discharging may involve releasing stored energy by allowing the release of lower density liquid from the first storage reservoir to the second storage reservoir, generating power in the process by allowing said low density liquid to pass through a generator. Storage reservoirs may comprise expandable and/or contractable or collapsible tanks. For example, during discharging, the first storage reservoir may expand into a larger volume as liquid is released from the second storage reservoir to the first storage reservoir. For example, during discharging, the second storage reservoir may contract or collapse into a smaller volume as liquid is released from the second storage reservoir to the first storage reservoir.

FIG. 32: FIG. 32 may show an energy storage system where the first storage reservoir is located near, at, or beneath the surface of a water body and/or the pump and/or generator is located near, at or beneath the surface of a water body. The second storage reservoir is located beneath the surface of a water body at a greater hydrostatic pressure and/or greater depth beneath the surface of a water body than the first storage reservoir. The first storage reservoir, the pump and/or generator, and the second storage reservoir may be connected using pipes. FIG. 32 may show the energy storage system undergoing charging.

FIG. 33: FIG. 33 may show an energy storage system where the first storage reservoir is located near, at, or beneath the surface of a water body and/or the pump and/or generator is located near, at or beneath the surface of a water body. The second storage reservoir is located beneath the surface of a water body at a greater hydrostatic pressure and/or greater depth beneath the surface of a water body than the first storage reservoir. The first storage reservoir, the pump and/or generator, and the second storage reservoir may be connected using pipes. FIG. 33 may show the energy storage system undergoing discharging.

Example Figure Keys

| Diagram Element | Description |
|---|---|
| FIG. 30 | |
| 1 | '1' or the first storage reservoir, may comprise a tank or reservoir storing a relatively low density liquid at a lesser hydrostatic pressure than the second storage region, '2'. '1' may exist at a pressure at or near the ambient pressure surrounding '1'. Alternatively, or additionally, '1' may exist at a pressure greater than ambient pressure surrounding '1', however less than the hydrostatic pressure of the second storage reservoir ('2'). Alternatively, or additionally, '1' may exist at a pressure less than ambient pressure surrounding '1', which may be less than the |

| Diagram Element | Description |
|---|---|
| | hydrostatic pressure of the second storage reservoir ('2'). In FIG. 30, the process may be undergoing 'charging'. During charging, low density liquid may be pumped from '1' using a pump ('3') to '2'. '2' may be located beneath the surface of a body of liquid with greater density than the low density liquid and/or may exist at a greater hydrostatic pressure than '1'. If '1' comprises a contractable or collapsible tank, the total volume occupied by the tank or total volume of liquid in the tank may decrease during 'charging'. |
| 2 | '2' or the second storage reservoir may comprise a tank or reservoir storing a relatively low density liquid at a greater hydrostatic pressure than the first storage region, '1'. '2' may exist at a pressure at or near the ambient pressure surrounding '2'. Alternatively, or additionally, '2' may exist at a pressure greater than ambient pressure surrounding '2' and/or greater than the hydrostatic pressure of the '1'. Alternatively, or additionally, '2' may exist at a pressure less than ambient pressure surrounding '2', which may be greater than the hydrostatic pressure of '1'. In FIG. 30, the process may be undergoing 'charging'. During charging, low density liquid may be pumped from '1' using a pump ('3') to '2'. '2' may be located beneath the surface of a body of liquid with greater density than the low density liquid and/or may exist at a greater hydrostatic pressure than '1'. If '2' comprises a contractable or collapsible tank, the total volume occupied by the tank or total volume of liquid in the tank may increase during 'charging'. |
| 3 | '3' may comprise a pump and/or generator. '3' may be employed to pump low density liquid from '1' to '2'. '3' may comprise a pump, which may be reversibly employed as a generator. '3' may comprise a pump separate from a generator. '3 may comprise multiple pumps and generators or reversible pump/generators. '3' may act as a valve which separates relatively high pressure low density liquid in the pipe 'Line/Arrow Between '2' and '3'" from the relatively low pressure low density liquid in the pipe 'Line/Arrow Between '1' and '3'". In FIG. 30, '3' may be pumping low density liquid from '1' to '2', which may comprise charging the energy storage device. |
| Electricity | 'Electricity' may comprise a source of electricity or an application requiring electricity or both. 'Electricity' may encompass transmission equipment and/or electricity grid infrastructure and/or applications generating or using electricity. In FIG. 30, 'Electricity' may involve supplying electricity to '3' to power the pumping of low density liquid from reservoir '1' to reservoir '2'. |
| Line/Arrow Between '1' and '3' | The present diagram element may comprise a means for transferring low density liquid from '1' to '3'. For example, the present diagram element may comprise a pipe or set of pipes. Said pipe may be compatible with the low density liquid. |
| Line/Arrow Between '3' and '2' | The present diagram element may comprise a means for transferring low density liquid from '3' to '2'. For example, the present diagram element may comprise a pipe or pipes. The present diagram element may involve a pipe which experiences a pressure difference between internal liquid contents and liquid surrounding the pipe. Said pressure difference may vary depending on the depth of the section of pipe beneath the surface of the water body, the depth of reservoir '2' compared to reservoir '1' or to '3', the hydrostatic pressure difference between reservoir '1' and reservoir '2', and/or the density of the low density liquid and/or the density of the liquid surrounding the section of pipe. In FIG. 30, the present diagram element may involve transferring low density liquid from '3' to reservoir '2'. |
| Land | 'Land' may comprise a solid structure or surface or earth which '1' and/or '3' are situated in FIG. 30. The weight of '1' and/or '3' may be supported by said land in FIG. 30. |
| Water | 'Water' may comprise the body of liquid in which reservoir '2' is submerged. |
| FIG. 31 | |
| 1 | '1' or the first storage reservoir, may comprise a tank or reservoir storing a relatively low density liquid at a lesser hydrostatic pressure than the second storage region, '2'. '1' may exist at a pressure at or near the ambient pressure surrounding '1'. Alternatively, or additionally, '1' may exist at a pressure greater than ambient pressure surrounding '1', however less than the hydrostatic pressure of the second storage reservoir ('2'). Alternatively, or additionally, '1' may exist at a pressure less than ambient pressure surrounding '1', which may be less than the hydrostatic pressure of the second storage reservoir ('2'). In |

| Diagram Element | Description |
|---|---|
| | FIG. 31, the process may be undergoing 'discharging'. During discharging, low density liquid may be released from '2' to '1', generating electricity by powering generator '3'. '2' may be located beneath the surface of a body of liquid with greater density than the low density liquid and/or may exist at a greater hydrostatic pressure than '1'. If '1' comprises a contractable or collapsible tank, the total volume occupied by the tank or total volume of liquid in the tank may increase during 'discharging'. |
| 2 | '2' or the second storage reservoir may comprise a tank or reservoir storing a relatively low density liquid at a greater hydrostatic pressure than the first storage region, '1'. '2' may exist at a pressure at or near the ambient pressure surrounding '2'. Alternatively, or additionally, '2' may exist at a pressure greater than ambient pressure surrounding '2' and/or greater than the hydrostatic pressure of the '1'. Alternatively, or additionally, '2' may exist at a pressure less than ambient pressure surrounding '2', which may be greater than the hydrostatic pressure of '1'. In FIG. 31, the process may be undergoing 'discharging'. During discharging, low density liquid may be released from '2' to '1', generating electricity by powering generator '3'. '2' may be located beneath the surface of a body of liquid with greater density than the low density liquid and/or may exist at a greater hydrostatic pressure than '1'. If '2' comprises a contractable or collapsible tank, the total volume occupied by the tank or total volume of liquid in the tank may decrease during 'discharging'. |
| 3 | '3' may comprise a pump and/or generator and/or valve. '3' may be employed to generate power from low density liquid transferred from '2' to '1' during discharging. '3' may be employed to pump low density liquid from '1' to '2' during charging. '3' may comprise a pump, which may be reversibly employed as a generator. '3' may comprise a pump separate from a generator. '3' may comprise multiple pumps and generators or reversible pump/generators. '3' may act as a valve which separates relatively high pressure low density liquid in the pipe 'Line/Arrow Between '2' and '3'' from the relatively low pressure low density liquid in the pipe 'Line/Arrow Between '1' and '3''. In FIG. 31, '3' may be generating power from the release of low density liquid from '2' to '1', which may comprise discharging the energy storage device. |
| Electricity | 'Electricity' may comprise a source of electricity or an application requiring electricity or both. 'Electricity' may encompass transmission equipment and/or electricity grid infrastructure and/or applications generating or using electricity. In FIG. 31, 'Electricity' may comprise electricity generated by '3' during discharging and/or the transmission and/or utilization of said electricity. |
| Line/Arrow Between '1' and '3' | The present diagram element may comprise a means for transferring low density liquid from '3' to '1'. For example, the present diagram element may comprise a pipe or set of pipes. Said pipe may be compatible with the low density liquid. |
| Line/Arrow Between '3' and '2' | The present diagram element may comprise a means for transferring low density liquid from '2' to '3'. For example, the present diagram element may comprise a pipe or pipes. The present diagram element may involve a pipe which experiences a pressure difference between internal liquid contents and liquid surrounding the pipe. Said pressure difference may vary depending on the depth of the section of pipe beneath the surface of the water body, the depth of reservoir '2' compared to reservoir '1' or to '3', the hydrostatic pressure difference between reservoir '1' and reservoir '2', and/or the density of the low density liquid and/or the density of the liquid surrounding the section of pipe. In FIG. 31, the present diagram element may involve transferring low density liquid from '2' to '3'. |
| Land | 'Land' may comprise a solid structure or surface or earth which '1' and/or '3' are situated in FIG. 31. The weight of '1' and/or '3' may be supported by said land in FIG. 31. |
| Water | 'Water' may comprise the body of liquid in which reservoir '2' is submerged. |
| FIG. 32 | |
| 1 | '1' or the first storage reservoir, may comprise a tank or reservoir storing a relatively low density liquid at a lesser hydrostatic pressure than the second storage region, '2'. '1' may exist at a pressure at or near the ambient pressure surrounding '1'. Alternatively, or additionally, '1' may exist at a pressure greater than ambient pressure surrounding '1', however less than the hydrostatic pressure of the second storage reservoir ('2'). Alternatively, or additionally, '1' may exist at a pressure less than |

-continued

| Diagram Element | Description |
|---|---|
| | ambient pressure surrounding '1', which may be less than the hydrostatic pressure of the second storage reservoir ('2'). In FIG. 32, the process may be undergoing 'charging'. During charging, low density liquid may be pumped from '1' to '2', using pump '3'. '2' may be located beneath the surface of a body of liquid with greater density than the low density liquid and/or may exist at a greater hydrostatic pressure than '1'. If '1' comprises a contractable or collapsible tank, the total volume occupied by the tank or total volume of liquid in the tank may decrease during 'charging'. |
| 2 | '2' or the second storage reservoir may comprise a tank or reservoir storing a relatively low density liquid at a greater hydrostatic pressure than the first storage region, '1'. '2' may exist at a pressure at or near the ambient pressure surrounding '2'. Alternatively, or additionally, '2' may exist at a pressure greater than ambient pressure surrounding '2' and/or greater than the hydrostatic pressure of the '1'. Alternatively, or additionally, '2' may exist at a pressure less than ambient pressure surrounding '2', which may be greater than the hydrostatic pressure of '1'. In FIG. 32, the process may be undergoing 'charging'. During charging, low density liquid may be pumped from '1' to '2', using pump '3'. '2' may be located beneath the surface of a body of liquid with greater density than the low density liquid and/or may exist at a greater hydrostatic pressure than '1'. If '2' comprises a contractable or collapsible tank, the total volume occupied by the tank or total volume of liquid in the tank may increase during 'charging'. |
| 3 | '3' may comprise a pump and/or generator and/or valve. '3' may be employed to generate power from low density liquid transferred from '2' to '1' during discharging. '3' may be employed to pump low density liquid from '1' to '2' during charging. '3' may comprise a pump, which may be reversibly employed as a generator. '3' may comprise a pump separate from a generator. '3' may comprise multiple pumps and generators or reversible pump/generators. '3' may act as a valve which separates relatively high pressure low density liquid in the pipe 'Line/Arrow Between '2' and '3'' from the relatively low pressure low density liquid in the pipe 'Line/Arrow Between '1' and '3''. In FIG. 32, '3' may be pumping low density liquid from '1' to '2', which may comprise charging the energy storage device. |
| Electricity | 'Electricity' may comprise a source of electricity or an application requiring electricity or both. 'Electricity' may encompass transmission equipment and/or electricity grid infrastructure and/or applications generating or using electricity. In FIG. 32, 'Electricity' may comprise electricity consumed by '3' (and stored by the energy storage device) during charging. In FIG. 32, electricity may be transferred using undersea cables or using underground cables or using subsea cables or using light, or using microwaves, or by oxidation of a fuel, or by reversible consumption of a fuel, or by discharging a transportable battery. |
| Line/Arrow Between '1' and '3' | The present diagram element may comprise a means for transferring low density liquid from '1' to '3'. For example, the present diagram element may comprise a pipe or set of pipes. Said pipe may be compatible with the low density liquid. |
| Line/Arrow Between '3' and '2' | The present diagram element may comprise a means for transferring low density liquid from '3' to '2'. For example, the present diagram element may comprise a pipe or pipes. The present diagram element may involve a pipe which experiences a pressure difference between internal liquid contents and liquid surrounding the pipe. Said pressure difference may vary depending on the depth of the section of pipe beneath the surface of the water body, the depth of reservoir '2' compared to reservoir '1' or to '3', the hydrostatic pressure difference between reservoir '1' and reservoir '2', and/or the density of the low density liquid and/or the density of the liquid surrounding the section of pipe. In FIG. 32, the present diagram element may involve transferring low density liquid from '3' to '2'. |
| Water | 'Water' may comprise the body of liquid which '1', '2', and/or '3' are situated and/or submerged in FIG. 32. |
| FIG. 33 | |
| 1 | '1' or the first storage reservoir, may comprise a tank or reservoir storing a relatively low density liquid at a lesser hydrostatic pressure than the second storage region, '2'. '1' may exist at a pressure at or near the ambient pressure surrounding '1'. Alternatively, or additionally, '1' may exist at a pressure greater than ambient pressure surrounding '1', however less than the |

-continued

| Diagram Element | Description |
|---|---|
| | hydrostatic pressure of the second storage reservoir ('2'). Alternatively, or additionally, '1' may exist at a pressure less than ambient pressure surrounding '1', which may be less than the hydrostatic pressure of the second storage reservoir ('2'). In FIG. 33, the process may be undergoing 'discharging'. During discharging, low density liquid may be released from '2' to '1', generating electricity by powering generator '3'. '2' may be located beneath the surface of a body of liquid with greater density than the low density liquid and/or may exist at a greater hydrostatic pressure than '1'. If '1' comprises a contractable or collapsible tank, the total volume occupied by the tank or total volume of liquid in the tank may increase during 'discharging'. |
| 2 | '2' or the second storage reservoir may comprise a tank or reservoir storing a relatively low density liquid at a greater hydrostatic pressure than the first storage region, '1'. '2' may exist at a pressure at or near the ambient pressure surrounding '2'. Alternatively, or additionally, '2' may exist at a pressure greater than ambient pressure surrounding '2' and/or greater than the hydrostatic pressure of the '1'. Alternatively, or additionally, '2' may exist at a pressure less than ambient pressure surrounding '2', which may be greater than the hydrostatic pressure of '1'. In FIG. 33, the process may be undergoing 'discharging'. During discharging, low density liquid may be released from '2' to '1', generating electricity by powering generator '3'. '2' may be located beneath the surface of a body of liquid with greater density than the low density liquid and/or may exist at a greater hydrostatic pressure than '1'. If '2' comprises a contractable or collapsible tank, the total volume occupied by the tank or total volume of liquid in the tank may decrease during 'discharging'. |
| 3 | '3' may comprise a pump and/or generator and/or valve. '3' may be employed to generate power from low density liquid transferred from '2' to '1' during discharging. '3' may be employed to pump low density liquid from '1' to '2' during charging. '3' may comprise a pump, which may be reversibly employed as a generator. '3' may comprise a pump separate from a generator. '3' may comprise multiple pumps and generators or reversible pump/generators. '3' may act as a valve which separates relatively high pressure low density liquid in the pipe 'Line/Arrow Between '2' and '3'' from the relatively low pressure low density liquid in the pipe 'Line/Arrow Between '1' and '3''. In FIG. 33, '3' may be generating power from the release of low density liquid from '2' to '1', which may comprise discharging the energy storage device. |
| Electricity | 'Electricity' may comprise a source of electricity or an application requiring electricity or both. 'Electricity' may encompass transmission equipment and/or electricity grid infrastructure and/or applications generating or using electricity. In FIG. 33, 'Electricity' may comprise electricity generated by '3' during discharging and/or the transmission and/or utilization of said electricity. In FIG. 33, electricity may be transferred using undersea cables or using underground cables or using subsea cables or using light, or using microwaves, or by conversion into a fuel, or by reversible production of a fuels, or by charging a transportable battery, or may be used by a nearby application, or may be used by an application on land, or may be used by an application on the body of water, or a combination thereof. |
| Line/Arrow Between '1' and '3' | The present diagram element may comprise a means for transferring low density liquid from '3' to '1'. For example, the present diagram element may comprise a pipe or set of pipes. Said pipe may be compatible with the low density liquid. |
| Line/Arrow Between '3' and '2' | The present diagram element may comprise a means for transferring low density liquid from '2' to '3'. For example, the present diagram element may comprise a pipe or pipes. The present diagram element may involve a pipe which experiences a pressure difference between internal liquid contents and liquid surrounding the pipe. Said pressure difference may vary depending on the depth of the section of pipe beneath the surface of the water body, the depth of reservoir '2' compared to reservoir '1' or to '3', the hydrostatic pressure difference between reservoir '1' and reservoir '2', and/or the density of the low density liquid and/or the density of the liquid surrounding the section of pipe. In FIG. 33, the present diagram element may involve transferring low density liquid from '2' to '3'. |
| Water | 'Water' may comprise the body of liquid which '1', '2', and/or '3' are situated and/or submerged in FIG. 33. |

Example Step-by-Step Description

Charging:

Low density liquid is pumped from reservoir '1' to reservoir '2' using pump '3'. Power is stored in the gravitational potential energy and/or hydrostatic pressure difference of the low density liquid stored at reservoir '2' relative to reservoir '1'.

Discharging:

Low density liquid is released from reservoir '2' and transferred to reservoir '1', generating electricity using generator '3'. Power is generated by releasing energy stored in the gravitational potential energy and/or hydrostatic pressure difference of the low density liquid stored at reservoir '2' relative to reservoir '1'.

Example Calculations

The below table shows key metrics on the energy density and cost of the butane in the present gravitational potential energy storage device. Cost figures employ an example butane commodity price of $0.60 USD per gallon.

| Difference in Ocean Water Depth between Reservoir 1 and 2 (m) | Wh per liter of Butane | kWh per m³ of Butane | Tons of Butane per kWh | Tons of Butane per MWh | Tons of Butane per GWh | Cost of Butane per kWh (USD) |
| --- | --- | --- | --- | --- | --- | --- |
| 100  | 125.7667 | 0.125766667 | 4.556056 | 4556.056 | 4556056  | 722.15 |
| 200  | 251.5333 | 0.251533333 | 2.278028 | 2278.028 | 2278028  | 361.075 |
| 300  | 377.3    | 0.3773      | 1.518685 | 1518.685 | 1518685  | 240.7167 |
| 400  | 503.0667 | 0.503066667 | 1.139014 | 1139.014 | 1139014  | 180.5375 |
| 500  | 628.8333 | 0.628833333 | 0.911211 | 911.2112 | 911211.2 | 144.43 |
| 600  | 754.6    | 0.7546      | 0.759343 | 759.3427 | 759342.7 | 120.3583 |
| 700  | 880.3667 | 0.880366667 | 0.650865 | 650.8652 | 650865.2 | 103.1643 |
| 800  | 1006.133 | 1.006133333 | 0.569507 | 569.507  | 569507   | 90.26875 |
| 900  | 1131.9   | 1.1319      | 0.506228 | 506.2285 | 506228.5 | 80.23889 |
| 1000 | 1257.667 | 1.257666667 | 0.455606 | 455.6056 | 455605.6 | 72.215 |
| 1500 | 1886.5   | 1.8865      | 0.303737 | 303.7371 | 303737.1 | 48.14333 |
| 2000 | 2515.333 | 2.515333333 | 0.227803 | 227.8028 | 227802.8 | 36.1075 |
| 2500 | 3144.167 | 3.144166667 | 0.182242 | 182.2422 | 182242.2 | 28.886 |
| 3000 | 3773     | 3.773       | 0.151869 | 151.8685 | 151868.5 | 24.07167 |
| 3500 | 4401.833 | 4.401833333 | 0.130173 | 130.173  | 130173   | 20.63286 |
| 4000 | 5030.667 | 5.030666667 | 0.113901 | 113.9014 | 113901.4 | 18.05375 |
| 4500 | 5659.5   | 5.6595      | 0.101246 | 101.2457 | 101245.7 | 16.04778 |
| 5000 | 6288.333 | 6.288333333 | 0.091121 | 91.12112 | 91121.12 | 14.443 |

Notes

Note:

Electricity may be transferred from or to an electricity grid or application requiring or supply electricity.

Note:

Electricity may be transferred using, for example, undersea or underground or above ground or a combination thereof power lines.

Note:

The lines/arrows between '1' and '3' and '3' and '2' may represent the transfer of low density liquid between these process elements. Liquid may be transferred using, for example, pipes or transport vehicles. If liquid is transferred using pipes, it may be desirable for said pipe to be, including, but not limited to, one or more or a combination of the following: located on the surface of the ground, or suspended above the surface of the ground, or located beneath the ground, or comprise a subsurface pipeline, or comprise an underground pipeline, or comprise a pipeline beneath water and above ground, or comprise a pipeline beneath ground and beneath water, or comprise a pipeline above water and above ground.

Note:

Expandable or collapsible reservoir may comprise a liquid storage vessel which can expand or contract in volume to allow for the storage of more or less liquid, respectively. The pressure inside said reservoir may be close to or equal to the pressure surround said reservoir. Said reservoirs may include, but is not limited to, expandable or collapsible liquid storage devices, which may include, but are not limited to, one or more or a combination of the following: pillow tanks, or onion tanks, or balloon tanks, or bag tanks, fabric tanks, or bladder tanks, or folding tanks, or flexible tanks, or bellows tanks, or accordion tanks, or liner tanks.

Note:

The present invention may comprise a LPG storage facility, or an oil storage facility, or a strategic LPG reserve, or a strategic oil reserve.

Note:

The present invention may be employed to store a fuel or commodity chemical, while simultaneously employing said fuel or other commodity chemical as an gravitational electricity storage medium. This may enable the owner or operator of the facility to have an additional source of revenue (the storage or release of electricity), in addition to revenue from the storage of the fuel or other commodity chemical. By employing the present invention as a storage facility, instead of purchasing or leasing the low density liquid, the facility owner may be paid storage fees to store the low density liquid, which may further improve economics of the facility. A proportion of the low density liquid storage in the facility may be available for 'commodity storage' while a proportion of the low density liquid storage in the facility may be intended for permanent or semi-permanent storage. The proportion of low density liquid storage available for 'commodity storage' relative to the proportion of low density liquid storage intended to be permanently or semi-permanently in the facility may vary by facility and may be dependent on multiple economic factors and the priorities of the facility.

Note:

'Commodity storage' may comprise flexible or semi-flexible storage may comprise a portion of the storage facility's low density liquid in storage which may be removed or added on a regular basis for market needs, such as commodity traders or other entities involved with the commodity market. If desired, the proportional low density liquid storage capacity devoted to 'commodity storage' may comprise the proportion of low density liquid which can be added or removed without substantially impacting the performance or capacity or capabilities of the electricity storage. The threshold of said 'substantially impacting' may vary by facility based on economic factors and facility priorities. 'Semi-permanent storage' may comprise long term storage or storage which may be utilized in periodic or very rare instances. For example, applications for semi-permanent storage may include, but are not limited to, storage for a commodity asset backed fund, storage for a commodity asset backed ETF or ETN, or storage for a strategic reserve. Permanent storage may involve low density liquid which is intended to remain in the facility and/or may be necessary for the proper operation of the facility.

Note:

Stored low density liquid may be employed as a stored asset or physical asset backing a commodity tracking ETF or other fund. The low density liquid storage facility owner or operator may generate revenue from the electricity markets as an energy storage service, as well as generate revenue from the management fees generated by the ETF for storing the low density liquid backing the ETF. The ability to have these two revenue streams may enable the facility owner or operator to generate more revenue from the facility, or may enable lower CAPEX of the facility, or may enable lower management fees for the ETF, or a combination thereof. To ensure the assets backing the ETF or ETN are sufficiently readily available or transferable, a portion of the low density liquid may be always stored in storage reservoir '1' to satisfy short term needs of low density liquid.

Note:

The temperature of water in the ocean beneath a certain depth may be relatively stable. Liquid in storage reservoir '2' be cooled or heated by the surrounding ocean water temperatures, depending on the ambient temperature conditions surrounding reservoir '1' and the ambient conditions surrounding reservoir '2'. For example, the ambient conditions surround reservoir '2' may be colder than the ambient conditions surrounding reservoir '1'. In said example, the relatively cool temperatures of liquid transferred from reservoir '2' to reservoir '1' may be harnessed to supply cooling to one or more applications requiring cooling. An example application requiring cooling may be the pump or generator '3'. For example, the ambient conditions surround reservoir '2' may be warmer than the ambient conditions surrounding reservoir '1'. In said example, the relatively warm temperatures of liquid transferred from reservoir '2' to reservoir '1' may be harnessed to supply heating or enthalpy to one or more applications requiring heating or enthalpy. Said certain depth may comprise less than, greater than or equal to, one or more or a combination of the following: 300 meters, or 400 meters, or 500 meters, or 600 meters, or 700 meters, or 800 meters, or 900 meters, or 1,000 meters, or 1,100 meters, or 1,200 meters, or 1,300 meters, or 1,400 meters, or 1,500 meters, or 1,750 meters, or 2,000 meters.

Note:

Due to the low density liquid being a liquid and liquids being essentially incompressible compared to gases, the round trip efficiency of the present pressure and/or gravitational energy storage device may possess a significantly greater round trip efficiency relative to energy storage devices which employ pressurized gases. For example, the round trip efficiency of the present invention may be greater than or equal to 40%, or 50%, or 60%, or 70%, or 75%, or 80%, or 85%, or 90% or 95%.

Note:

The low density liquid may possess a low viscosity, for example, a viscosity near, equal to, or less than water. For example, butane possesses a dynamic viscosity of ~0.2 cP at 1° C., compared to a dynamic viscosity of 1.73 cP at 1° C. for water. Other low density liquids other than or in addition to butane may possess a lesser viscosity than water. Low viscosity may be advantageous, for example, because lower viscosity liquids may enable smaller pipe diameter, lower CAPEX, lower pumping energy losses, greater round-trip efficiency, and greater distances between reservoir '1' and reservoir '2'.

Note:

Compatibility with low density liquid, compatibility with water or ocean water, biofouling, compatibility with pressure. For pipes transferring low density liquid, the pressure difference between the low density liquid inside the pipe and the water surrounding the pipe increases with decreasing depth beneath the surface of the water. To, for example, minimize CAPEX, the pressure rating of the pipe may increase with greater pressure difference. For example, pipe near reservoir '2' may possess lower pressure rating (and/or may be lower cost) and pipe near reservoir '1' may possess greater pressure rating (and/or may be greater cost).

Note:

Reservoir '2' and/or reservoir '1' may be anchored or connected or fixed or tethered to the land on the bottom of the body of liquid (e.g. body of water).

Note:

Storage reservoirs or tanks may include, but are not limited to, one or more or a combination of the following: a pillow tank, or an onion tank, or a balloon tank, or a bag tank, or a fabric tank, or a bladder tank, or a folding tank, or a flexible tank, or a bellows tank, or an accordion tank, or a liner tank, or a rigid tank, or a piston tank, or an actuator tank, or a valve tank, or a basin tank, or a cement tank, or a wood tank, or a plastic tank, or a ceramic tank, or a fiber tank, or a composite tank, or a rubber tank, or a flexible tank.

Note:

Pipe materials may include, but are not limited to, one or more or a combination of the following: plastic pipes, composite pipes, metallic pipes, fiber pipes, resin pipes, wood pipes, cement pipes, flexible pipes, rubber pipes, rigid pipes.

Note:

It may be desirable to attach the first and/or second reservoirs to higher density materials to reduce the buoyance of the reservoirs. In the case of the first reservoir, the distance between the reservoir and land at the bottom of a water body be substantial enough to justify the attachment of higher density materials to the first reservoir to reduce the cost of tethering cables. Tethering cables may be employed to counteract the buoyancy of a reservoir and/or to ensure the reservoir is in an appropriate location relative to the other reservoir(s). In some embodiments, the distance between the first reservoir and land at the bottom of a water body may be sufficiently substantial the attachment of higher density materials to the first reservoir costs less than the cost reduction in the of tethering cables.

Note:

In some embodiments, the location of the first reservoir may be maintained using a dynamic positioning system. A dynamic positioning system may employ various sensors, or GPS, or radar, or other positioning instruments to inform an operating system of changes in the current position and/or changes in position of the first reservoir and/or external thrust vectors, such as currents. If the position changes of the first reservoir changes and/or if a thrust vector is detected, aquatic or marine engines may be employed to counteract said external thrust vectors and/or changes in position to ensure the first reservoir maintains a desirable position. If desirable, the higher density material attachments to the first reservoir may make the first reservoir at a similar density or neutral density relative to the surrounding water body. If desirably the first reservoir may employ mechanisms to dynamically adjust its density, using, for example, the addition of higher density material, the addition of lower density material (for example: low density liquid or a gas, such as air), the release of higher density material, or the release of lower density material). Said mechanism(s) to dynamically adjust density may also be incorporated within a dynamic positioning system. A dynamic positioning system may also be employed in the second reservoir.

Note:

Collapsible or contractable may involve a structure or vessel or tank which can decrease in occupied volume or storage capacity reversibly.

Note:

Expandable may involve a structure or vessel or tank which can increase in occupied volume or storage capacity reversibly.

Note:

Lower density liquid may be soluble or partially soluble in the higher density liquid. Advantageously, the lower density liquid may be separate from the higher density liquid with a physical barrier, which may prevent the dissolution of lower density liquid in higher density liquid. For example, said physical barrier may involve a storage tank liner or walls or pipes or a combination thereof.

Note:

In some instances, low density liquids or liquids with a density less than water may have a boiling point near or less than the outside air or water temperature and/or may possess a large vapor pressure at the temperature of the outside air or water. In said instances, it may be desirable for the first reservoir to be a pressurized or rigid tank. For example, a pressurized or rigid storage tank may enable low density liquid to remain at a liquid phase while being at a temperature above the low density liquid's atmospheric pressure boiling point. In said instances wherein a rigid or pressurized tank is employed at the first storage reservoir, when liquid, such as low density liquid, is removed from the first storage reservoir, the total volume of the rigid or pressurized tank may remain the same. A volume in the tank formerly occupied by liquid phase low density liquid may instead be occupied by gas phase low density liquid. Said gas phase low density liquid may exist in the head space above liquid phase inside the tank, such as liquid phase low density liquid. When liquid, such as low density liquid, is added to the first storage reservoir, the total volume of the rigid or pressurized tank may remain the same. A volume in the tank formerly occupied by gas phase low density liquid may instead be occupied by liquid phase low density liquid. Example low density liquids which may be applicable may include, but not limited to, Liquefied Petroleum Gas (LPG), or propane, or butane, or diethyl ether, or dimethyl ether, or methoxypropane, or methanol, or acetone, or pentane, or hexane, or petroleum ether, or methoxyethane, or liquid natural gas (LNG), or gasoline, or Diisopropyl ether, or alkanes, or alkenes, or alkynes, or cycloalkanes, or a combination thereof.

Note:

The present invention may employ devices for leak detection and/or leak prevention. Additionally, the present invention may employ methods to minimize losses or damage caused by a leak. For example, a containment mechanism, such as, for example, including but not limited to, a liner, or blanket, or tarp, or fabric, or funnel, or float, or other containment mechanism, or a combination thereof, may be placed above or suspended above the second reservoir and/or pipes and/or pipe connections. In the event of a leak, low density liquid may rise from the leak and may be captured or caught by said containment mechanism. Said containment mechanism may be effective because low density liquid may tend to float and said containment mechanism may cover a portion or the entire surface area of the second reservoir and/or pipes and/or pipe connections above said second reservoir and/or pipes and/or pipe connections. Low density liquid captured by said containment mechanism may be, if desirable, funneled within said containment mechanism and, if desirable, may be transferred to the surface using a return pipe, where the low density liquid may be recovered. The contact of low density liquid with a portion of the containment vessel or pipe may trigger a sensor or sensors which alert system operators of the need to fix a leak. For example, the said sensor may involve a mechanism for measuring the increased buoyancy of the containment mechanism due to the capturing or containment of leaked low density liquid. For example, said sensor may involve a mechanism for measuring the flow rate of liquid in said return pipe, wherein the presence of at least a certain liquid flow rate may indicate the presence of a low density liquid leak. For example, said sensor may involve a mechanism for detecting low density liquid using spectroscopy or measurements of density or molecular weight or a combination thereof. For example, said sensor may involve measuring the change in mass or pressure or volume in a container connected to said return pipe. For example, said sensor may involve measuring changes in mass or capacity in the first or second reservoir, which may include changes in said mass or energy storage capacity when the process is at a steady state or unexplained changes in mass or energy storage capacity. A first reservoir may employ said containment mechanisms and/or sensors. For example, a first reservoir and/or pump and/or generator may employ said containment mechanisms and/or sensors if, for example, a first reservoir and/or pump and/or generator is located beneath the surface of a water body.

Note:

Low density liquid or pipes or vessels or reservoirs or a combination thereof may contain a medium which reacts in the event of or at the site of a leak. For example, a material in the walls of a pipe or vessel or reservoir may react with low density liquid if low density liquid begins to leak. Said reaction may inhibit or block or prevent a leak. Said reaction may involve, including, but not limited to one or more or a combination of the following: an absorption reaction, or a swelling reaction, or a foaming reaction, or an expansion reaction, a reaction to form a solid, a reaction to form a viscous liquid, or a combination thereof. Alternatively, or additionally, the low density liquid or walls of pipes or vessels or reservoirs or a combination thereof may contain a reagent which reacts with water or air or salt in water upon exposure to water or air. Said reaction may inhibit or block or prevent a leak. Said reaction may involve, including, but not limited to one or more or a combination of the following: an absorption reaction, or a swelling reaction, or a foaming reaction, or an expansion reaction, a reaction to form a solid, a reaction to form a viscous liquid, or a combination thereof. Said reaction may involve forming a material which is more easily or readily captured, or a material which is more environmentally friendly, or a material which may inhibit further leakage, or a material which may simplify or facilitate the process of leakage detection, or a material which may reduce the cost or damage associated with a leakage. For example, said reaction may involve forming a liquid of a certain color or said reaction may involve a tracing reagent.

Note:

Low density liquid or pipes or vessels or reservoir or a combination thereof may contain a tracing chemical or reagent which may facilitate leak detection. For example, parts or components of pipes or vessels or reservoir may contain a material, which, when exposed to water, or salt water, or low density liquid, or air, or a combination thereof, may change one or more properties to facilitate detection of leaks or wear or other forms of damage or exposure. For example, said properties may include, but are not limited to, color, electrical conductivity, electrical resistivity, thermal conductivity, surface texture, surface morphology, absorbance spectra, vibration frequency, flexibility, temperature, density, rigidity, or a combination thereof.

Note:

The temperature beneath a water body and the temperature above a water body may be different. Additionally, water bodies themselves may possess a range of different temperatures, which may correlate with depth. The temperature of a water body relative to its depth may be known as a water body thermocline. In ultra-deep water bodies, such as an ocean or lake, the temperature of a water body below about 1000 meters or about 1250 meters or about 1500 meters ranges from about 3 to 8° C. because water is generally most dense at about 4° C. For example, in the ocean, the temperature of the water below 1500 meters is generally near 4° C., even if the temperature of the water at the ocean surface is warm, such as, for example, greater than 15° C. or greater than 20° C. In the present invention, the second reservoir may be located at a different depth than the first reservoir. The temperature of the water surrounding the second reservoir may be relatively constant or stable, if, for example, the second reservoir is located at a depth beneath a water body of greater than 100 meters, or 200 meters, or 300 meters, or 500 meters, or 700 meters, or 900 meters, or 1000 meters, or 1250 meters, or 1500 meters. The temperature of the air or water adjacent to or surrounding the first reservoir may be different from the temperature off the water surrounding the second reservoir. The temperature difference between the second reservoir and the first reservoir may be beneficially utilized or harnessed. For example, if the temperature of the second reservoir is less than the first reservoir or the temperature of things adjacent to the first reservoir, power may be generated from the difference in temperature between liquid returning from the second reservoir and the surrounding ambient temperature near the first reservoir or the temperature inside the first reservoir or another heat source or thermal source or enthalpy source. For example, if the temperature of the second reservoir is greater than the first reservoir or the temperature of things adjacent to the first reservoir, power may be generated from the difference in temperature between liquid returning from the second reservoir and the surrounding ambient temperature near the first reservoir or the temperature inside the first reservoir or another cold source or heat sink or enthalpy sink. For example, if the temperature of the second reservoir is less than the first reservoir or the temperature of things adjacent to the first reservoir, liquid from the second reservoir may be employed as a cooling medium or cooling source or for district cooling to provide valuable or useful cooling to one or more applications requiring cooling. For example, if the temperature of the second reservoir is greater than the first reservoir or the temperature of things adjacent to the first reservoir, liquid from the second reservoir may be employed as a heating medium or heat source or for district heating to provide valuable or useful heating to one or more applications requiring heating. For example, if the temperature of the second reservoir is less than the first reservoir or the temperature of things adjacent to the first reservoir, liquid from the second reservoir may be employed as a cooling source to power or facilitate a desalination process or a process for removing water from gas streams or air. For example, if the temperature of the second reservoir is less than the first reservoir or the temperature of things adjacent to the first reservoir, it may be desirable to insulate said first reservoir or one or more pipes. Said insulation may enable the first reservoir to remain at a cooler temperature, which may be advantageous, for example, if the low density liquid has a low boiling point or is volatile and minimizing temperature in the first reservoir minimizes pressure in the first reservoir. Said insulation may also prevent the formation of condensation on a tank.

Note:

The present invention may also be employed as a means for ocean thermal energy conversion (OTEC).

Note:

If desirable, one or more components of the present invention may be heated or cooled or temperature controlled or a combination thereof.

Note:

Low density liquid may possess a freezing point less than water, which may be advantageously utilized. For example, the first reservoir may be employed as a cold or thermal storage unit, for, for example, providing cooling for a refrigerated or frozen storage facility. Said cold storage may be employed, for example, to optimize energy consumption or for grid load shifting or load curtailment. For example, the first reservoir may be employed as a cryogenic cold storage or thermal storage unit. Alternatively or additionally, cool low density liquid may be employed as a low temperature heat transfer fluid and/or as a low temperature thermal storage medium. For example, low density liquid may be employed in applications which require cooling, which may include, but are not limited to, one or more or a combination of the following: district cooling, or cooling for a desalination facility, or cooling for a power plant, or cooling for an air separation unit, or cooling for a liquification facility, or cooling for a HVAC system. For example, LNG gasification facilities may produce significant waste cooling. LNG gasification facilities may employ low density liquid in or from said first reservoir as a heat source or enthalpy source, cooling said low density liquid in the process. Due to its potentially lower freezing point, low density liquid may be cooled to a lower temperature than water while remaining at a liquid phase, enabling heat transfer or large scale thermal storage or both at temperatures near, at, or below the freezing point of water. Additionally, because the first reservoir is interconnected to the second reservoir and the second reservoir may be located at a relatively consistent 'cold' temperature, 'warm' low density liquid may be near 4° C. or otherwise below ambient temperature. Advantageously, because 'warm' low density liquid may be significantly less than ambient temperatures, more energy may be recovered from 'cold sources' than if said low density liquid was near or at ambient temperatures.

Note:

Low density liquid or high density liquid or both may be employed as a heat transfer fluid, or as a thermal storage fluid, or may be employed in ocean thermal energy conversion.

Example Exemplary Embodiments

1. A system for storing or generating electricity comprising: a first storage reservoir configured to be near the surface of a body of water and configured to store a fluid which has a lower density than water;
a second storage reservoir configured to be located below the surface of the body of water; a pump; and
a generator;
wherein the pump, generator, and the first and second reservoir are operatively connected such that electricity is stored by displacing water adjacent the second storage reservoir by pumping low density fluid in the first storage reservoir to the second storage reservoir and electricity is generated or discharged by allowing the low density fluid in the second storage reservoir to return to the first storage reservoir; and,
wherein the water and the fluid which has a lower density than water are both in liquid form.
2. The system of Embodiment 1 wherein said second storage reservoir is expandable, contractible, or collapsible.
3. The system of Embodiment 1 wherein said second storage reservoir is a pillow tank, an onion tank, a balloon tank, a bag tank, a fabric tank, a bladder tank, a folding tank, a flexible tank, a bellows tank, an accordion tank, or a liner tank.
4. The system of Embodiment 1 wherein said second storage reservoir comprises a concave region with an opening near the bottom of said concave region wherein said opening is open to the body of water.
5. A system for storing or generating electricity comprising: a first storage reservoir configured to store a fluid which has a lower density than water;
a second storage reservoir configured to be located below a surface of a body of water wherein the second storage reservoir is at a greater depth beneath the surface of a water body than the first storage reservoir;
a pump; and
a generator;
wherein the pump, generator, and the first and second reservoir are operatively connected such that
(1) electricity is stored by pumping low density fluid in the first storage reservoir to the second storage reservoir to displace water; or
(2) electricity is generated or discharged by allowing low density fluid in the second storage reservoir to return to the first storage reservoir; or
(3) both (1) and (2);
wherein the water and the fluid which has a lower density than water are both in liquid form.
6. The system of Embodiment 5 wherein the displaced water is in the second storage reservoir.
7. The system of Embodiment 5 wherein the displaced water is water within the body of water and wherein the displaced water is adjacent the second storage reservoir.
8. The system of Embodiment 5 wherein the water pump and the generator are the same unit.
9. The system of Embodiment 5 wherein said first storage reservoir, said second storage reservoir, or both comprise an expandable or contractible or collapsible structure.
10. The system of Embodiment 5 wherein said first storage reservoir, said second storage reservoir, or both comprise a pillow tank, an onion tank, a balloon tank, a bag tank, a fabric tank, a bladder tank, a folding tank, a flexible tank, a bellows tank, an accordion tank, or a liner tank.
11. The system of Embodiment 5 wherein said second storage reservoir comprises a concave region with an opening near the bottom of said concave region open to the body of water.
12. The system of Embodiment 5 wherein said second storage reservoir is tethered to the bottom of said water body.
13. The system of Embodiment 5 wherein the fluid having a lower density than water comprises a hydrocarbon liquid.
14. The system of Embodiment 5 which further comprises a dynamic positioning system to maintain or adjust a position of the first reservoir, the second reservoir or both.
15. The system of Embodiment 5 further comprising an operative connection to an electricity grid or electricity transmission infrastructure.
16. The system of Embodiment 5 wherein said second storage reservoir is configured to store a fluid which has a lower density than water.
17. The system of Embodiment 5 wherein said first and second reservoirs are connected by one or more pipes.
18. The system of Embodiment 5 wherein said pump and generator comprise a single unit.
19. The system of Embodiment 5 wherein said first reservoir is configured to be located beneath the surface of a water body.
20. The system of Embodiment 5 wherein the fluid having a lower density than water comprises propane, butane, LPG, pentane, hexane, or a mixture thereof.
21. The system of Embodiment 5 wherein the fluid having a lower density than water comprises an alcohol, an ether, an ester, or a mixture thereof.
22. The system of Embodiment 5 wherein the fluid having a lower density than water comprises methanol, ethanol, propanol, acetone, dimethyl ether, diethyl ether, or a mixture thereof.
23. The system of Embodiment 9 wherein said second reservoir is configured to collapse or contract during discharge.
24. The system of Embodiment 26 wherein said collapsing or contracting is due to water adjacent said second reservoir displacing the fluid having a lower density than water.
25. The system of Embodiment 9 wherein said second reservoir expands during charging.
26. The system of Embodiment 25 wherein said expanding is due to the fluid having a lower density than water entering the second reservoir and displacing water adjacent said second reservoir.
27. The system of Embodiment 19 wherein said first reservoir is configured to be tethered to a bottom of the water body.
28. The system of Embodiment 19 wherein said first reservoir is configured to be attached to a material with a greater density than water to reduce buoyancy.
29. The system of Embodiment 19 wherein said first reservoir is configured to be attached to a material with a greater density than water, be neutrally buoyant, and wherein the first reservoir is configured such that its position is maintained or adjusted with a dynamic positioning system.
30. The system of Embodiment 5 wherein said second reservoir is attached to a material with a greater density than water to reduce buoyancy.

Summary of Additional Embodiment Relating to Liquid Displacement

The present invention pertains to systems and methods for storing or generating electricity. Some embodiments pertain to systems or methods for the storage of energy by displacing a higher density liquid with a lower density liquid. Some embodiments relate to systems or methods for facilitating the storage or generation of electricity. Some embodiments relate to environmental, health, and safety mechanisms. Some embodiments related to systems and configurations to enable energy storage in particular geography types. Some embodiments related to systems and configurations to enable energy storage with low density liquid working fluids with various levels of volatility or vapor pressure. Some embodiments pertain to ensuring optimal energy storage performance.

Example Definitions

Condensable Gas: A chemical or mixture of chemicals which phase transitions from a liquid to a gas or a gas to a liquid or both reversibly or possesses a boiling point or a combination thereof at the following conditions:
  Vapor pressures less than 2.5 atm, or less than 5 atm, or less than 10 atm, or less than 15 atm, or less than 20 atm
  Vapor pressures greater than 0.1 atm, or greater than 0.2 atm, or greater than 0.3 atm, or greater than 0.4 atm, or greater than 0.5 atm, or greater than 0.6 atm, or greater than 0.7 atm, or greater than 0.8 atm, or greater than 0.9 atm, or greater than 1.0 atm
  Temperature in the range of 230 Kelvin to 380 Kelvin Partially Discharged or Partially Charged: A state where the energy storage system contains stored energy, although the stored energy is less than the energy storage system's full capacity to store energy. For example, when a surface LDL storage tank contains an amount of LDL greater than its minimum capacity and less than its maximum capacity. For example, when an underwater LDL storage tank contains an amount of LDL greater than its minimum capacity and less than its maximum capacity.

Maximum Capacity: Maximum capacity may comprise the maximum amount of HDL or water and/or the maximum amount of LDL or both which can be stored in a given storage tank or in a region of the energy storage device or in general. For example, the maximum capacity of LDL in a subsea tank may comprise the maximum amount of LDL which can be stored in a subsea tank before the LDL is at risk of or may enter or enters a pipeline designed for transferring water. For example, the maximum capacity of HDL in a subsea tank may comprise the maximum amount of water or HDL which can be stored in a subsea tank before the HDL is at risk of or may enter or enters a pipeline designed for transferring LDL. For example, the maximum capacity of LDL in a subsea tank may comprise the maximum amount of LDL which can be stored in a subsea tank before the LDL is at risk of or may enter or enters a surface HDL or water tank. For example, the maximum capacity of HDL in a subsea tank may comprise the maximum amount of water or HDL which can be stored in a subsea tank before the HDL is at risk of or may enter or enters a surface LDL tank.

Minimum Capacity: Minimum capacity may comprise the minimum amount of HDL or water and/or the maximum amount of LDL or both which can be stored in a given storage tank or in a region of the energy storage device or in general. For example, the minimum capacity of a tank for LDL or HDL may comprise the tank containing no or very little LDL or HDL. For example, the minimum capacity of LDL in a subsea tank may comprise the minimum amount of LDL which can be stored in a subsea tank before the HDL is at risk of or may enter or enters a pipeline designed for transferring LDL. For example, the minimum capacity of HDL in a subsea tank may comprise the minimum amount of water or HDL which can be stored in a subsea tank before the LDL is at risk of or may enter or enters a pipeline designed for transferring HDL. For example, the minimum capacity of LDL in a subsea tank may comprise the minimum amount of LDL which can be stored in a subsea tank before the HDL is at risk of or may enter or enters a surface LDL tank. For example, the minimum capacity of HDL in a subsea tank may comprise the minimum amount of water or HDL which can be stored in a subsea tank before the LDL is at risk of or may enter or enters a surface HDL or water tank. The minimum volume or amount of LDL in the floating underwater tank may comprise the minimum amount of LDL required to ensure the floating underwater tank is buoyant.

A Pump and a Generator or A pump; and a generator: A pump and a generator may comprise a combined pump/generator unit, which may include, but is not limited to, a hydraulic power recovery turbine (HPRT). Alternatively, or additionally, some embodiments may employ a separate pump and a separate generator.

First Reservoir: The first reservoir comprises one or more or a combination of tanks configured to store low density liquid and may be located at an elevation higher or greater than a second reservoir.

Second Reservoir: The second reservoir comprises one or more or a combination of tanks configured to store low density liquid and may be located at an elevation lower or less than the first reservoir. The second reservoir may be configured to store both low density liquid and water. The second reservoir may be configured to store both low density liquid and water in a manner which low density liquid and water exchange volume or pressure, while preventing mixing or direct physical contact between the water and the low density liquid.

Third Reservoir: The third reservoir may be interconnected to or comprise the ocean. The third reservoir may comprise a water tank or storage vessel. Said water tank or storage device may be on the surface, or above water, or underwater, or a combination thereof. An underwater water reservoir may comprise a tank or storage vessel or reservoir or water body comprising water interconnected to the second reservoir via a pipe. If desirable, at least a portion of the water tank or storage vessel third reservoir or water interconnected to the third reservoir may possess similar pressures or equilibrium pressure with the hydrostatic pressure of the ocean. If the density of the liquid inside the third reservoir is the same as ocean water, the third reservoir may be located at any elevation between the elevation of the first storage reservoir and the second storage reservoir or any elevation underwater.

Storage Vessel: A storage vessel or tank may comprise a barrier to contain a material, such as a liquid, solid, or gas. A storage vessel or tank may comprise various configurations or materials, and may include, but is not limited to, storage tanks or vessels employed for storing liquid or multiphase media or a combination thereof known in the art.

Treated Ocean Water: Treated ocean water may comprise water or aqueous solution origination from ocean water which is less corrosive than ocean water, or possesses a lower dissolved oxygen concentration than ocean water, or is less prone to the formation of biofouling or scaling than ocean water, or a combination thereof. It may be desirable for treated ocean water to possess a similar density to ocean water.

Tether: A tether may comprise a cable or line or connector which connects a floating or buoyant structure with another structure. Said 'another structure' may comprise, including, but not limited to: the seafloor or a mooring or a vessel or another tank or an anchor, or a combination thereof.

Configured to Store a Fluid which has a Lower Density than Water and Water: The present term may describe a reservoir or storage which is designed for the storage of water and a lower density liquid. The present term may include configuring storage which prevents water and lower density liquid from reacting, or dissolving, or forming a new phase. The present term may include configuring storage which ensures water and lower density liquid are physically separate while stored the same storage vessel.

Low Density Liquid: A liquid with a lower density than a higher density liquid. A liquid with a lower density than the density of water. A liquid with a lower density than liquid water at a temperature greater than 3° C. and/or less than 50° C.

Substantial Low Density Liquid—Water Hydrates: "Substantial" may mean an amount or location or combination thereof of Low Density Liquid—Water Hydrates such that Low Density Liquid—Water Hydrates interferes with or disrupts the operation of the energy storage system.

Close to or About Equivalent to: 'Close to or About Equivalent to' may represent a value which is within 10% of another value.

Sub-Tank: A sub-tank may comprise a tank within or located on the inside of another tank or enclosed structure or concave structure or a combination thereof.

Rigid Containment Structure: A rigid containment structure may comprise an enclosure or cover which holds a sub-tank or one or more other structures. A rigid containment structure may capture or recover low density liquid and/or debris in the event of a breach in a sub-tank or one or more other structures.

Mechanically Isolated: An underwater tank mechanically isolated from ocean water surrounding or adjacent to it may involve a tank in which contents inside the tank operate under pressures isolated or independent from the pressure of the contents surrounding the tank. A mechanically isolated tank may be a tank which does not exchange pressure with fluids or materials outside or surrounding the tank. For example, an underwater tank may possess a pressure inside the tank which is different from the pressure of the water surrounding the underwater tank—the shape and/or volume of the tank may remain unchanged. In some embodiments herein, the pressure inside an underwater tank may be close to or about equivalent to the hydrostatic pressure of water at the same depth as the tank, however the internal contents of the tank may not be exchanging pressure with the ocean water adjacent to or surrounding the tank. Achieving similar pressures inside a tank as outside a tank without exchanging pressure between the inside and outside of a tank may involve one or more or a combination of engineering systems and/or methods. For example, an engineered head space gas or condensable head space gas may be engineered to have a vapor pressure in the pressure range of the hydrostatic pressure of ocean water at the same depth as tank at a temperature in the range of the temperature inside the tank and/or the temperature of water surrounding or adjacent to said tank. By achieving similar pressures inside a tank as outside a tank without exchanging pressure between the inside and outside of a tank, an underwater tank or underwater rigid tank, for example, can be made from less material or less expensive materials or a combination thereof.

Breach: A breach may comprise a break or leak or disconnection or accidental release which may result in the release of internal liquids, which may include, but is not limited to, low density liquid and/or water.

Detailed Figure Descriptions and Descriptions of Example Embodiments

FIG. 34: The present figure may show an energy storage system which stores electricity by pumping a low density liquid from a tank at a higher elevation to a tank at a lower elevation, displacing water in the tank at a lower elevation. The present figure may show the present embodiment charging or storing electricity. The tank with low density liquid at a higher elevation may comprise a first reservoir. The tank with low density liquid and water at a lower elevation may comprise a second reservoir. The tank with water at a higher elevation may comprise a third reservoir or surface water tank. The density of water in the surface water tank may be close to or equal to the density of the ocean water. The pressure inside the second reservoir may be close to or about equivalent to the hydrostatic pressure of the ocean at the underwater depth of the second reservoir.

FIG. 35: The present figure may comprise the same embodiment as FIG. 34. The present figure may show the present embodiment at a nearly fully charged state.

FIG. 36: The present figure may comprise the same embodiment as FIG. 34. The present figure may show the present embodiment discharging or generating electricity.

FIG. 37: The present figure may comprise the same embodiment as FIG. 34. The present figure may show the present embodiment at a nearly fully discharged state.

FIG. 38: Figure key for FIGS. 34, 35, 36, and 37.

FIG. 39: An energy storage system which stores electricity by pumping low density liquid from a first reservoir ("1") near the surface into an underwater second reservoir ("2"), displacing ocean water surrounding said second reservoir. The present figure shows the energy storage system charging by pumping low density liquid from the first reservoir to a second reservoir, displacement water surrounding the second reservoir. The first reservoir ("1") near the surface may be at an elevation greater than the elevation of the second reservoir ("2"). The first reservoir may be above water on land, or floating in the water, or underwater. In the present figure, the second reservoir is floating above the ocean floor. In the present figure, the second reservoir may be suspended above the ocean floor and may be buoyant. In the present figure, the second reservoir may be tethered to the ocean floor and/or anchored to the ocean bottom. In the present figure, the second reservoir may be surrounded by ocean water. The second reservoir may comprise a piston tank. The second reservoir may comprise an expandable or collapsible structure, such as an onion tank, or a bladder tank, or a pillow tank, or a storage bag. In the present figure, the internal pressure of the second reservoir may be close to or about equivalent to the hydrostatic pressure of water in contact with the bottom of the second reservoir.

FIG. 40: An energy storage system which stores electricity by pumping low density liquid from a first reservoir ("1") near the surface into an underwater second reservoir ("2"), displacing ocean water surrounding said second reservoir. The present figure shows the energy storage system fully charged at a steady state. The first reservoir ("1") near the surface may be at an elevation greater than the elevation of the second reservoir ("2"). The first reservoir may be above water on land, or floating in the water, or underwater. In the present figure, the second reservoir is floating above the ocean floor. In the present figure, the second reservoir may be suspended above the ocean floor and may be buoyant. In the present figure, the second reservoir may be tethered to the ocean floor and/or anchored to the ocean bottom. In the present figure, the second reservoir may be surrounded by ocean water. The second reservoir may comprise a piston tank. The second reservoir may comprise an expandable or collapsible structure, such as an onion tank, or a bladder tank, or a pillow tank, or a storage bag. In the present figure, the internal pressure of the second reservoir may be close to or about equivalent to the hydrostatic pressure of water in contact with the bottom of the second reservoir.

FIG. 41: An energy storage system which stores electricity by pumping low density liquid from a first reservoir ("1") near the surface into an underwater second reservoir ("2"), displacing ocean water surrounding said second reservoir. The present figure shows the energy storage system discharging or generating electricity, wherein low density liquid inside the second reservoir is displaced by water surrounding the second reservoir ("2") and transferred through a pipe, through a generator, generating electricity, and into the first reservoir ("1"). The first reservoir ("1") near the surface may be at an elevation greater than the elevation of the second reservoir ("2"). The first reservoir may be above water on land, or floating in the water, or underwater. In the present figure, the second reservoir is floating above the ocean floor. In the present figure, the second reservoir may be suspended above the ocean floor and may be buoyant. In the present figure, the second reservoir may be tethered to the ocean floor and/or anchored to the ocean bottom. In the present figure, the second reservoir may be surrounded by ocean water. The second reservoir may comprise a piston tank. The second reservoir may comprise an expandable or collapsible structure, such as an onion tank, or a bladder tank, or a pillow tank, or a storage bag. In the present figure, the internal pressure of the second reservoir may be close to or about equivalent to the hydrostatic pressure of water in contact with the bottom of the second reservoir.

FIG. 42: An energy storage system which stores electricity by pumping low density liquid from a first reservoir ("1") near the surface into an underwater second reservoir ("2"), displacing ocean water surrounding said second reservoir. The present figure shows the energy storage system at a fully discharged state. The first reservoir ("1") near the surface may be at an elevation greater than the elevation of the second reservoir ("2"). The first reservoir may be above water on land, or floating in the water, or underwater. In the present figure, the second reservoir is floating above the ocean floor. In the present figure, the second reservoir may be suspended above the ocean floor and may be buoyant. In the present figure, the second reservoir may be tethered to the ocean floor and/or anchored to the ocean bottom. In the present figure, the second reservoir may be surrounded by ocean water. The second reservoir may comprise a piston tank. The second reservoir may comprise an expandable or collapsible structure, such as an onion tank, or a bladder tank, or a pillow tank, or a storage bag. In the present figure, the internal pressure of the second reservoir may be close to or about equivalent to the hydrostatic pressure of water in contact with the bottom of the second reservoir.

FIG. 43: FIG. 43 is an energy storage system with tethers or anchors or tie down tethers labeled. "C" is labeling the tethers or anchors or tie downs. Said tethers or anchors or tie downs may be employed to connect an underwater tank (e.g. '2') to the seafloor, which may enable an underwater tank (e.g. '2') to be floating above the seafloor.

FIG. 44: FIG. 44 shows a water or HDL storage tank with a condensable gas in the headspace. The storage tank may be rigid in construction. "A" is labeling the yellow layer (light colored in black/white). "A" represents a practically insoluble condensed liquid comprising a condensable gas at a condensed (i.e. liquid) state. The said insoluble condensed liquid may comprise the same composition as the at least a portion of the gas in the headspace, "B", and/or said insoluble condensed liquid vapor pression may be at equilibrium or in equilibrium with the headspace gas. "B" represents the gases occupying the headspace. "A" contains less liquid in FIG. 44 than FIG. 45 because more condensable gas is at a condensed liquid state in FIG. 45 compared to FIG. 44. "6" may represent the third reservoir. A condensable headspace gas may enable the water tank to be drained of water while maintaining a relatively stable pressure inside said tank or without substantially reducing the pressure inside the water tank. A condensable headspace gas may enable the inside of an underwater rigid water tank to have an internal pressure close to the hydrostatic pressure of ocean water at the depth of the underwater rigid tank, while remaining mechanically isolated from the ocean water at the depth of the underwater rigid tank. A condensable headspace gas may have a vapor pressure or boiling point engineered to match a design pressure range within a design temperature range.

FIG. 45: FIG. 45 shows a water or HDL storage tank with a condensable gas in the headspace. The storage tank may be rigid in construction. "A" is labeling the yellow layer (light colored in black/white). "A" represents a practically insoluble condensed liquid comprising a condensable gas at a condensed (i.e. liquid) state. The said insoluble condensed liquid may comprise the same composition as the at least a portion of the gas in the headspace, "B", and/or said insoluble condensed liquid vapor pression may be at equilibrium or in equilibrium with the headspace gas. "B" represents the gases occupying the headspace. "A" contains more liquid in FIG. 45 than FIG. 44 because more condensable gas is at a condensed liquid state in FIG. 45 compared to FIG. 44, which may be due to water occupying a greater proportion of the volume in FIG. 45. "6" may represent the third reservoir. A condensable headspace gas may enable the water tank to be drained of water while maintaining a relatively stable pressure inside said tank or without substantially reducing the pressure inside the water tank. A condensable headspace gas may enable the inside of an underwater rigid water tank to have an internal pressure close to the hydrostatic pressure of ocean water at the depth of the underwater rigid tank, while remaining mechanically isolated from the ocean water at the depth of the underwater rigid tank. A condensable headspace gas may have a vapor pressure or boiling point engineered to match a design pressure range within a design temperature range.

FIG. 46: An energy storage system which stores electricity by pumping low density liquid into a rigid underwater tank to displace water inside said rigid tank, wherein said water is displaced to an external underwater water reservoir. The present figure shows the present embodiment at a state of charging, for example, wherein electricity is powering a pump ("4") to transfer low density liquid from a reservoir near the surface ("1") to an underwater reservoir ("2"), for example, whereby low density liquid displaces water inside said underwater reservoir. The pressure inside the second reservoir may be close to or about equivalent to the hydrostatic pressure of the ocean at the underwater depth of the second reservoir.

FIG. 46: An energy storage system which stores electricity by pumping low density liquid into a rigid underwater tank to displace water inside said rigid tank, wherein said water is displaced to an external underwater water reservoir. The present figure shows the present embodiment at a fully charged, steady state. The pressure inside the second reservoir may be close to or about equivalent to the hydrostatic pressure of the ocean at the underwater depth of the second reservoir.

FIG. 48: An energy storage system which stores electricity by pumping low density liquid into a rigid underwater tank to displace water inside said rigid tank, wherein said water is displaced to an external underwater water reservoir. The present figure shows the present embodiment at a state of generating electricity or discharging. For example, a valve ("5") may open, allowing water inside an underwater reservoir ("2") to displace low density liquid from said underwater reservoir through a pipe ("3"), through a generator ("4"), generating electricity or discharging stored electricity, and into the reservoir near the surface ("1"). The pressure inside the second reservoir may be close to or about equivalent to the hydrostatic pressure of the ocean at the underwater depth of the second reservoir.

FIG. 49: An energy storage system which stores electricity by pumping low density liquid into a rigid underwater tank to displace water inside said rigid tank, wherein said water is displaced to an external underwater water reservoir. The present figure shows the present embodiment at a fully discharged, steady state. The pressure inside the second reservoir may be close to or about equivalent to the hydrostatic pressure of the ocean at the underwater depth of the second reservoir.

FIG. 50: An energy storage system which stores electricity by pumping low density liquid into an underwater tank (second reservoir) to displace water inside said second reservoir, wherein said water is displaced to an external underwater water reservoir (third reservoir). The present figure shows the present embodiment at a fully discharged, steady state. "2" may represent a rigid underwater tank, which may comprise the second reservoir. "S" may represent a separator or barrier, which may be located between the low density liquid and the water or may physically separate or prevent or minimize direct contact between the low density liquid and the water. Said separator or barrier may prevent direct contact between the low density liquid and water and/or may provide a physical separation between the low density liquid and water. Said separator or barrier may allow the low density liquid to displace the water, while, for example, preventing or minimizing direct contact between the water and the low density liquid. "8" may represent an external water reservoir or the third reservoir. In the present figure, the external water reservoir may be located underwater. In the present figure, the external water reservoir may be underwater at a similar depth to the second reservoir. "9" may represent a water pipe interconnecting an external water reservoir to the second reservoir. In the present figure, the external water reservoir, or the pipe interconnecting the external water reservoir to the second reservoir, or a combination thereof may possess an internal pressure close to the hydrostatic pressure of the ocean water at or near the depth of the second reservoir. The pressure inside the second reservoir may be close to or about equivalent to the hydrostatic pressure of the ocean at the underwater depth of the second reservoir.

FIG. 51: An energy storage system which stores electricity by pumping low density liquid into an underwater tank (second reservoir) to displace water inside said second reservoir, wherein said water is displaced to an external underwater water reservoir (third reservoir). The present figure shows the present embodiment at a state of charging, for example, wherein electricity is powering a pump ("4") to transfer low density liquid from a reservoir near the surface ("1") to a underwater reservoir ("2"), for example, whereby low density liquid displaces water inside said underwater reservoir. "2" may represent a rigid underwater tank, which may comprise the second reservoir. "S" may represent a separator or barrier, which may be located between the low density liquid and the water or may physically separate or prevent or minimize direct contact between the low density liquid and the water. Said separator or barrier may prevent direct contact between the low density liquid and water and/or may provide a physical separation between the low density liquid and water. Said separator or barrier may allow the low density liquid to displace the water, while, for example, preventing or minimizing direct contact between the water and the low density liquid. "8" may represent an external water reservoir or the third reservoir. In the present figure, the external water reservoir may be located underwater. In the present figure, the external water reservoir may be underwater at a similar depth to the second reservoir. "9" may represent a water pipe interconnecting an external water reservoir to the second reservoir. In the present figure, the external water reservoir, or the pipe interconnecting the external water reservoir to the second reservoir, or a combination thereof may possess an internal pressure close to the hydrostatic pressure of the ocean water at or near the depth of the second reservoir. The pressure inside the second reservoir may be close to or about equivalent to the hydrostatic pressure of the ocean at the underwater depth of the second reservoir.

FIG. 52: An energy storage system which stores electricity by pumping low density liquid into an underwater tank (second reservoir) to displace water inside said second reservoir, wherein said water is displaced to an external underwater water reservoir (third reservoir). The present figure shows the present embodiment at a fully charged, steady state. "2" may represent a rigid underwater tank, which may comprise the second reservoir. "S" may represent a separator or barrier, which may be located between the low density liquid and the water or may physically separate or prevent or minimize direct contact between the low density liquid and the water. Said separator or barrier may prevent direct contact between the low density liquid and water and/or may provide a physical separation between the low density liquid and water. Said separator or barrier may allow the low density liquid to displace the water, while, for example, preventing or minimizing direct contact between the water and the low density liquid. "8" may represent an external water reservoir or the third reservoir. Said physical separation or barrier may comprise a membrane. In the present figure, the external water reservoir may be located underwater. In the present figure, the external water reservoir may be underwater at a similar depth to the second reservoir. "9" may represent a water pipe interconnecting an external water reservoir to the second reservoir. In the present figure, the external water reservoir, or the pipe interconnecting the external water reservoir to the second reservoir, or a combination thereof may possess an internal pressure close to the hydrostatic pressure of the ocean water at or near the depth of the second reservoir. The pressure inside the second reservoir may be close to or about equivalent to the hydrostatic pressure of the ocean at the underwater depth of the second reservoir.

FIG. 53: An energy storage system which stores electricity by pumping low density liquid into an underwater tank (second reservoir) to displace water inside said second reservoir, wherein said water is displaced to an external underwater water reservoir (third reservoir). The present figure shows the present embodiment at a state of generating electricity or discharging. For example, a valve ("5") may open, allowing water inside an underwater reservoir ("2") to displace low density liquid from said underwater reservoir through a pipe ("3"), through a generator ("4"), generating electricity or discharging stored electricity, and into the reservoir near the surface ("1"). "2" may represent a rigid underwater tank, which may comprise the second reservoir. "S" may represent a separator or barrier, which may be located between the low density liquid and the water or may physically separate or prevent or minimize direct contact between the low density liquid and the water. Said separator or barrier may prevent direct contact between the low density liquid and water and/or may provide a physical separation between the low density liquid and water. Said separator or barrier may allow the low density liquid to displace the water, while, for example, preventing or minimizing direct contact between the water and the low density liquid. "8" may represent an external water reservoir or the third reservoir. In the present figure, the external water reservoir may be located underwater. In the present figure, the external water reservoir may be underwater at a similar depth to the second reservoir. "9" may represent a water pipe interconnecting an external water reservoir to the second reservoir. In the present figure, the external water reservoir, or the pipe interconnecting the external water reservoir to the second reservoir, or a combination thereof may possess an internal pressure close to the hydrostatic pressure of the ocean water at or near the depth of the second reservoir. The pressure inside the second reservoir may be close to or about equivalent to the hydrostatic pressure of the ocean at the underwater depth of the second reservoir.

FIG. 54: An energy storage system which stores electricity by pumping low density liquid into an underwater tank (second reservoir) to displace water inside said second reservoir into a separate water reservoir (third reservoir). The third reservoir may comprise a tank at a higher elevation than the second reservoir and/or a tank which is at a lower elevation than the second reservoir and/or a rigid tank which is mechanically isolated from the water submerging the tank and/or a tank on or above the surface of the water body and/or a tank located on land. The present figure shows the present embodiment at or near a fully discharged, steady state. "2" may comprise an underwater second reservoir, which may comprise low density liquid and water inside an underwater tank. In the second reservoir, the low density liquid may be physically separate from the water by a physical barrier or separator ("S"). The physical barrier or separator may enable low density liquid to exchange pressure with the water, while ensuring the water and low density liquid are physically separate or not in direct contact. The physical barrier or separator may be rigid, or flexible, or a combination thereof. The physical separation or barrier may comprise a membrane. The physical barrier or separator may be removable or replaceable or adjustable or a combination thereof, which may facilitate operations, or maintenance, or efficiency, or system longevity, or cost, or a combination thereof. Said separator or barrier may prevent direct contact between the low density liquid and water and/or may provide a physical separation between the low density liquid and water. Said separator or barrier may allow the low density liquid to displace the water, while, for example, preventing or minimizing direct contact between the water and the low density liquid. "6" may comprise a third reservoir, which, in the present figure, comprises storage for displaced water and may be located on land. "1" may comprise a first reservoir, which may comprise storage for low density liquid and may be located at a greater elevation than a second reservoir. Electricity may be stored by powering a pump ("4") to pump low density liquid from the first reservoir through a pipe ("3") to the second reservoir ("2") and displace water from the second reservoir through a pipe ("7") to the third reservoir ("6"). Electricity may be generated or discharged by allowing low density liquid in the second reservoir to be displaced by water from the third reservoir, wherein water from the third reservoir displaces low density liquid from the second reservoir through a pipe ("3"), through a generator ("4"), generating electricity, and into the first reservoir. The pump and generator may comprise the same unit(s) which can reversibly function as a pump and a generator, which may comprise a hydraulic power recovery turbine (HPRT). The pressure inside the second reservoir may be close to or about equivalent to the hydrostatic pressure of the ocean at the underwater depth of the second reservoir.

FIG. 55: An energy storage system which stores electricity by pumping low density liquid into an underwater tank (second reservoir) to displace water inside said second reservoir into a separate water reservoir (third reservoir). The third reservoir may comprise a tank at a higher elevation than the second reservoir and/or a tank which is at a lower elevation than the second reservoir and/or a rigid tank which is mechanically isolated from the water submerging the tank and/or a tank on or above the surface of the water body and/or a tank located on land. The present figure shows the present embodiment at a state of storing electricity or charging, wherein electricity may be stored by powering a pump to transfer low density liquid from the first reservoir to the second reservoir, displacing water in the second reservoir. "2" may comprise an underwater second reservoir, which may comprise low density liquid and water inside an underwater tank. In the second reservoir, the low density liquid may be physically separate from the water by a physical barrier or separator ("S"). The physical barrier or separator may enable low density liquid to exchange pressure with the water, while ensuring the water and low density liquid are physically separate or not in direct contact. The physical barrier or separator may be rigid, or flexible, or a combination thereof. The physical barrier or separator may be removable or replaceable or adjustable or a combination thereof, which may facilitate operations, or maintenance, or efficiency, or system longevity, or cost, or a combination thereof. Said separator or barrier may prevent direct contact between the low density liquid and water and/or may provide a physical separation between the low density liquid and water. Said separator or barrier may allow the low density liquid to displace the water, while, for example, preventing or minimizing direct contact between the water and the low density liquid. "6" may comprise a third reservoir, which, in the present figure, comprises storage for displaced water and may be located on land. "1" may comprise a first reservoir, which may comprise storage for low density liquid and may be located at a greater elevation than a second reservoir. Electricity may be stored by powering a pump ("4") to pump low density liquid from the first reservoir through a pipe ("3") to the second reservoir ("2") and displace water from the second reservoir through a pipe ("7") to the third reservoir ("6"). Electricity may be generated or discharged by allowing low density liquid in the second reservoir to be displaced by water from the third reservoir, wherein water from the third reservoir displaces low density liquid from the second reservoir through a pipe ("3"), through a generator ("4"), generating electricity, and into the first reservoir. The pump and generator may comprise the same unit(s) which can reversibly function as a pump and a generator, which may comprise a hydraulic power recovery turbine (HPRT). The pressure inside the second reservoir may be close to or about equivalent to the hydrostatic pressure of the ocean at the underwater depth of the second reservoir.

FIG. 56: An energy storage system which stores electricity by pumping low density liquid into an underwater tank (second reservoir) to displace water inside said second reservoir into a separate water reservoir (third reservoir). The third reservoir may comprise a tank at a higher elevation than the second reservoir and/or a tank which is at a lower elevation than the second reservoir and/or a rigid tank which is mechanically isolated from the water submerging the tank and/or a tank on or above the surface of the water body and/or a tank located on land. The present figure shows the present embodiment at or near a fully charged, steady state. "2" may comprise an underwater second reservoir, which may comprise low density liquid and water inside an underwater tank. In the second reservoir, the low density liquid may be physically separate from the water by a physical barrier or separator ("S"). The physical barrier or separator may enable low density liquid to exchange pressure with the water, while ensuring the water and low density liquid are physically separate or not in direct contact. The physical barrier or separator may be rigid, or flexible, or a combination thereof. The physical barrier or separator may be removable or replaceable or adjustable or a combination thereof, which may facilitate operations, or maintenance, or efficiency, or system longevity, or cost, or a combination thereof. Said separator or barrier may prevent direct contact between the low density liquid and water and/or may provide a physical separation between the low density liquid and water. Said separator or barrier may allow the low density liquid to displace the water, while, for example, preventing or minimizing direct contact between the water and the low density liquid. "6" may comprise a third reservoir, which, in the present figure, comprises storage for displaced water and may be located on land. "1" may comprise a first reservoir, which may comprise storage for low density liquid and may be located at a greater elevation than a second reservoir. Electricity may be stored by powering a pump ("4") to pump low density liquid from the first reservoir through a pipe ("3") to the second reservoir ("2") and displace water from the second reservoir through a pipe ("7") to the third reservoir ("6"). Electricity may be generated or discharged by allowing low density liquid in the second reservoir to be displaced by water from the third reservoir, wherein water from the third reservoir displaces low density liquid from the second reservoir through a pipe ("3"), through a generator ("4"), generating electricity, and into the first reservoir. The pump and generator may comprise the same unit(s) which can reversibly function as a pump and a generator, which may comprise a hydraulic power recovery turbine (HPRT). The pressure inside the second reservoir may be close to or about equivalent to the hydrostatic pressure of the ocean at the underwater depth of the second reservoir.

FIG. 57: An energy storage system which stores electricity by pumping low density liquid into an underwater tank (second reservoir) to displace water inside said second reservoir into a separate water reservoir (third reservoir). The third reservoir may comprise a tank at a higher elevation than the second reservoir and/or a tank which is at a lower elevation than the second reservoir and/or a rigid tank which is mechanically isolated from the water submerging the tank and/or a tank on or above the surface of the water body and/or a tank located on land. The present figure shows the present embodiment at an electricity generating or discharging state. Electricity may be generated by allowing low density liquid to be displaced from the second reservoir, through a pipe, into a generator, generating electricity, and into the first reservoir. Low density liquid in the second reservoir may be allowed to be displaced by water. Said allowing may involve opening a valve ("5") in a low density liquid pipe. "2" may comprise an underwater second reservoir, which may comprise low density liquid and water inside an underwater tank. In the second reservoir, the low density liquid may be physically separate from the water by a physical barrier or separator ("S"). The physical barrier or separator may enable low density liquid to exchange pressure with the water, while ensuring the water and low density liquid are physically separate or not in direct contact. The physical barrier or separator may be rigid, or flexible, or a combination thereof. The physical barrier or separator may be removable or replaceable or adjustable or a combination thereof, which may facilitate operations, or maintenance, or efficiency, or system longevity, or cost, or a combination thereof. Said separator or barrier may prevent direct contact between the low density liquid and water and/or may provide a physical separation between the low density liquid and water. Said separator or barrier may allow the low density liquid to displace the water, while, for example, preventing or minimizing direct contact between the water and the low density liquid. "6" may comprise a third reservoir, which, in the present figure, comprises storage for displaced water and may be located on land. "1" may comprise a first reservoir, which may comprise storage for low density liquid and may be located at a greater elevation than a second reservoir. Electricity may be stored by powering a pump ("4") to pump low density liquid from the first reservoir through a pipe ("3") to the second reservoir ("2") and displace water from the second reservoir through a pipe ("7") to the third reservoir ("6"). Electricity may be generated or discharged by allowing low density liquid in the second reservoir to be displaced by water from the third reservoir, wherein water from the third reservoir displaces low density liquid from the second reservoir through a pipe ("3"), through a generator ("4"), generating electricity, and into the first reservoir. The pump and generator may comprise the same unit(s) which can reversibly function as a pump and a generator, which may comprise a hydraulic power recovery turbine (HPRT). The pressure inside the second reservoir may be close to or about equivalent to the hydrostatic pressure of the ocean at the underwater depth of the second reservoir.

FIG. 58: An energy storage system which stores electricity by pumping low density liquid into an underwater tank ("2") (second reservoir) to displace water inside said second reservoir into a separate water reservoir ("8") (third reservoir). The second reservoir may comprise an underwater rigid tank which may contain both low density liquid and water. Inside said second reservoir, low density liquid may be stored in a sub-reservoir or sub-tank ("10") which may comprise an expandable or collapsible structure, such as a bladder tank or piston or a combination thereof. Said sub-tank may be employed to prevent direct contact between low density liquid and water in the second reservoir. In the event the internal sub-tank breaks or leaks, the leaked low density liquid may remain inside this rigid tank or rigid containment structure, preventing exposure of the low density liquid to the surrounding environment. Said sub-tank may be considered a physical barrier or separator, and may be removable or replaceable or adjustable or a combination thereof, which may facilitate operations, or maintenance, or efficiency, or system longevity, or cost, or a combination thereof. The present figure shows the present embodiment at a near fully discharged state. The third reservoir, which may be connected to the second reservoir using a pipe, may comprise nearby ocean water, or a water tank at pressure equilibrium with the ocean, or a rigid water tank mechanically isolated from nearby ocean and at similar pressure to the hydrostatic pressure of the nearby ocean, or a water tank on or near the ocean surface, or a water tank on land. If the third reservoir is at pressure equilibrium with the surrounding ocean and/or the density of the liquid inside the third reservoir is close to the density of ocean water, the third reservoir may be located at any elevation relative to the second reservoir. For example, the third reservoir may be located at the same elevation as or similar elevation to the second reservoir, as is shown in the present figure. For example, the third reservoir may be located at a deeper depth or lower elevation than the second reservoir. For example, the third reservoir may be located at a shallower depth or greater elevation than the second reservoir. For example, the third reservoir may be located on land. Electricity may be stored by powering a pump ("4") to pump low density liquid from the first reservoir through a pipe ("3") to the second reservoir ("2") and displace water from the second reservoir through a pipe ("7") to the third reservoir ("6"). Electricity may be stored by powering a pump ("4") to pump low density liquid from the first reservoir through a pipe ("3") to the second reservoir ("2"), specifically the low density liquid second reservoir sub-tank ("10"), and displace water from the second reservoir through a pipe ("9") to a third reservoir ("8"). Electricity may be generated or discharged by allowing low density liquid in the second reservoir, specifically the low density liquid second reservoir sub-tank ("10"), to be displaced by water from the third reservoir, wherein water from the third reservoir displaces low density liquid from the second reservoir through a pipe ("3"), through a generator ("4"), generating electricity, and into the first reservoir ("1"). The pump and generator may comprise the same unit(s) which can reversibly function as a pump and a generator, which may comprise a hydraulic power recovery turbine (HPRT). The pressure inside the second reservoir may be close to or about equivalent to the hydrostatic pressure of the ocean at the underwater depth of the second reservoir.

An electricity storage system with a surface tank ('1'), an underwater rigid tank ('2'), a bladder sub-tank configured to store low density liquid ('10'), and an interconnected external bladder tank configured to store water ('8').

The present embodiment at a nearly fully discharged state.

FIG. 59: An energy storage system which stores electricity by pumping low density liquid into an underwater tank ("2") (second reservoir) to displace water inside said second reservoir into a separate water reservoir ("8") (third reservoir). The second reservoir may comprise an underwater rigid tank which may contain both low density liquid and water. Inside said second reservoir, low density liquid may be stored in a sub-reservoir or sub-tank ("10") which may comprise an expandable or collapsible structure, such as a bladder tank or piston or a combination thereof. Said sub-tank may be employed to prevent direct contact between low density liquid and water in the second reservoir. In the event the internal sub-tank breaks or leaks, the leaked low density liquid may remain inside this rigid tank or rigid containment structure, preventing exposure of the low density liquid to the surrounding environment. Said sub-tank may be considered a physical barrier or separator, and may be removable or replaceable or adjustable or a combination thereof, which may facilitate operations, or maintenance, or efficiency, or system longevity, or cost, or a combination thereof. The present figure shows the present embodiment storing electricity or 'charging', wherein low density liquid is pumped from the first reservoir to the second reservoir, displacing water from the second reservoir into the third reservoir. The third reservoir, which may be connected to the second reservoir using a pipe, may comprise nearby ocean water, or a water tank at pressure equilibrium with the ocean, or a rigid water tank mechanically isolated from nearby ocean and at similar pressure to the hydrostatic pressure of the nearby ocean, or a water tank on or near the ocean surface, or a water tank on land. If the third reservoir is at pressure equilibrium with the surrounding ocean and/or the density of the liquid inside the third reservoir is close to the density of ocean water, the third reservoir may be located at any elevation relative to the second reservoir. For example, the third reservoir may be located at the same elevation as or similar elevation to the second reservoir, as is shown in the present figure. For example, the third reservoir may be located at a deeper depth or lower elevation than the second reservoir. For example, the third reservoir may be located at a shallower depth or greater elevation than the second reservoir. For example, the third reservoir may be located on land. Electricity may be stored by powering a pump ("4") to pump low density liquid from the first reservoir through a pipe ("3") to the second reservoir ("2") and displace water from the second reservoir through a pipe ("7") to the third reservoir ("6"). Electricity may be stored by powering a pump ("4") to pump low density liquid from the first reservoir through a pipe ("3") to the second reservoir ("2"), specifically the low density liquid second reservoir sub-tank ("10"), and displace water from the second reservoir through a pipe ("9") to a third reservoir ("8"). Electricity may be generated or discharged by allowing low density liquid in the second reservoir, specifically the low density liquid second reservoir sub-tank ("10"), to be displaced by water from the third reservoir, wherein water from the third reservoir displaces low density liquid from the second reservoir through a pipe ("3"), through a generator ("4"), generating electricity, and into the first reservoir ("1"). The pump and generator may comprise the same unit(s) which can reversibly function as a pump and a generator, which may comprise a hydraulic power recovery turbine (HPRT). The pressure inside the second reservoir may be close to or about equivalent to the hydrostatic pressure of the ocean at the underwater depth of the second reservoir.

The present embodiment storing electricity ('charging'). Low density liquid is pumped ('4') from the surface tank ('1'), through a pipe ('3'), to the underwater rigid tank ('2'), displacing water in the underwater rigid tank ('2'). The displaced water travels through a pipe ('9') into the external bladder tank ('8').

FIG. 60: An energy storage system which stores electricity by pumping low density liquid into an underwater tank ("2") (second reservoir) to displace water inside said second reservoir into a separate water reservoir ("8") (third reservoir). The second reservoir may comprise an underwater rigid tank which may contain both low density liquid and water. Inside said second reservoir, low density liquid may be stored in a sub-reservoir or sub-tank ("10") which may comprise an expandable or collapsible structure, such as a bladder tank or piston or a combination thereof. Said sub-tank may be employed to prevent direct contact between low density liquid and water in the second reservoir. In the event the internal sub-tank breaks or leaks, the leaked low density liquid may remain inside this rigid tank or rigid containment structure, preventing exposure of the low density liquid to the surrounding environment. Said sub-tank may be considered a physical barrier or separator, and may be removable or replaceable or adjustable or a combination thereof, which may facilitate operations, or maintenance, or efficiency, or system longevity, or cost, or a combination thereof. The present figure shows the present embodiment at a near fully charged state. The third reservoir, which may be connected to the second reservoir using a pipe, may comprise nearby ocean water, or a water tank at pressure equilibrium with the ocean, or a rigid water tank mechanically isolated from nearby ocean and at similar pressure to the hydrostatic pressure of the nearby ocean, or a water tank on or near the ocean surface, or a water tank on land. If the third reservoir is at pressure equilibrium with the surrounding ocean and/or the density of the liquid inside the third reservoir is close to the density of ocean water, the third reservoir may be located at any elevation relative to the second reservoir. For example, the third reservoir may be located at the same elevation as or similar elevation to the second reservoir, as is shown in the present figure. For example, the third reservoir may be located at a deeper depth or lower elevation than the second reservoir. For example, the third reservoir may be located at a shallower depth or greater elevation than the second reservoir. For example, the third reservoir may be located on land. Electricity may be stored by powering a pump ("4") to pump low density liquid from the first reservoir through a pipe ("3") to the second reservoir ("2") and displace water from the second reservoir through a pipe ("7") to the third reservoir ("6"). Electricity may be stored by powering a pump ("4") to pump low density liquid from the first reservoir through a pipe ("3") to the second reservoir ("2"), specifically the low density liquid second reservoir sub-tank ("10"), and displace water from the second reservoir through a pipe ("9") to a third reservoir ("8"). Electricity may be generated or discharged by allowing low density liquid in the second reservoir, specifically the low density liquid second reservoir sub-tank ("10"), to be displaced by water from the third reservoir, wherein water from the third reservoir displaces low density liquid from the second reservoir through a pipe ("3"), through a generator ("4"), generating electricity, and into the first reservoir ("1"). The pump and generator may comprise the same unit(s) which can reversibly function as a pump and a generator, which may comprise a hydraulic power recovery turbine (HPRT). The pressure inside the second reservoir may be close to or about equivalent to the hydrostatic pressure of the ocean at the underwater depth of the second reservoir.

The present embodiment at a nearly fully charged state.

FIG. 61: An energy storage system which stores electricity by pumping low density liquid into an underwater tank ("2") (second reservoir) to displace water inside said second reservoir into a separate water reservoir ("8") (third reservoir). The second reservoir may comprise an underwater rigid tank which may contain both low density liquid and water. Inside said second reservoir, low density liquid may be stored in a sub-reservoir or sub-tank ("10") which may comprise an expandable or collapsible structure, such as a bladder tank or piston or a combination thereof. Said sub-tank may be employed to prevent direct contact between low density liquid and water in the second reservoir. In the event the internal sub-tank breaks or leaks, the leaked low density liquid may remain inside this rigid tank or rigid containment structure, preventing exposure of the low density liquid to the surrounding environment. Said sub-tank may be considered a physical barrier or separator, and may be removable or replaceable or adjustable or a combination thereof, which may facilitate operations, or maintenance, or efficiency, or system longevity, or cost, or a combination thereof. The present figure shows the present embodiment generating electricity or 'discharging'. For example, discharging may involve allowing low density liquid in the second reservoir to be displaced by water in the third reservoir, and wherein said low density liquid is displaced into a pipe, into a generator, generating electricity, and into the first reservoir. The third reservoir, which may be connected to the second reservoir using a pipe, may comprise nearby ocean water, or a water tank at pressure equilibrium with the ocean, or a rigid water tank mechanically isolated from nearby ocean and at similar pressure to the hydrostatic pressure of the nearby ocean, or a water tank on or near the ocean surface, or a water tank on land. If the third reservoir is at pressure equilibrium with the surrounding ocean and/or the density of the liquid inside the third reservoir is close to the density of ocean water, the third reservoir may be located at any elevation relative to the second reservoir. For example, the third reservoir may be located at the same elevation as or similar elevation to the second reservoir, as is shown in the present figure. For example, the third reservoir may be located at a deeper depth or lower elevation than the second reservoir. For example, the third reservoir may be located at a shallower depth or greater elevation than the second reservoir. For example, the third reservoir may be located on land. Electricity may be stored by powering a pump ("4") to pump low density liquid from the first reservoir through a pipe ("3") to the second reservoir ("2") and displace water from the second reservoir through a pipe ("7") to the third reservoir ("6"). Electricity may be stored by powering a pump ("4") to pump low density liquid from the first reservoir through a pipe ("3") to the second reservoir ("2"), specifically the low density liquid second reservoir sub-tank ("10"), and displace water from the second reservoir through a pipe ("9") to a third reservoir ("8"). Electricity may be generated or discharged by allowing low density liquid in the second reservoir, specifically the low density liquid second reservoir sub-tank ("10"), to be displaced by water from the third reservoir, wherein water from the third reservoir displaces low density liquid from the second reservoir through a pipe ("3"), through a generator ("4"), generating electricity, and into the first reservoir ("1"). The pump and generator may comprise the same unit(s) which can reversibly function as a pump and a generator, which may comprise a hydraulic power recovery turbine (HPRT). The pressure inside the second reservoir may be close to or about equivalent to the hydrostatic pressure of the ocean at the underwater depth of the second reservoir.

The present embodiment generating electricity ('discharging'). Water in the external bladder tank ('8') is allowed to displace low density liquid in the underwater rigid tank ('2'). The displaced low density liquid travels through a pipe ('3'), through a generator ('4'), to the surface tank ('1').

FIG. 62: The present figure may comprise a similar embodiment to FIGS. 58-61. The present figure may show the present embodiment as a near fully discharged state. The present figure may employ a third reservoir comprising nearby ocean water or open ocean water. The sub-tank within the second reservoir ("10"), the second reservoir, and the external water pipe connected to the second reservoir ("11") may be configured such that when low density liquid is pumped into "10", water displaced from the second reservoir exits the second reservoir in a manner which prevents low density liquid from exiting the second reservoir in the event of a release or leak of low density liquid. For example, said configuration may comprise a pipe and/or tank setup such that a liquid or material exiting the tank must have a density greater than or equal to or close to the density of water. For example, said configuration may involve the external water pipe "11" possessing an outlet or external outlet which faces toward the seafloor or faces downward or a bend which faces downward. For example, said configuration may involve the external water pipe "11" possessing a pipe inside the underwater tank which has a bend upward and/or faces upward and/or faces toward the sea surface and/or faces away from the seafloor and/or possesses an opening inside the underwater tank which faces upward. For example, said configuration may involve the external water pipe containing a chemical or reagent or material which will swell or absorb low density liquid or react with low density liquid when in presence or contact with low density liquid, which may occur in the event of, for example, a low density liquid leak or release from the sub-tank, which may, for example, trigger the closure of a valve inside the pipe or passively clog or close the pipe or a combination thereof in the event of a low density liquid leak or release from the sub-tank. "11" may be removable or replaceable. The second reservoir internal sub-tank, or the external water pipe, or the third reservoir (if comprising a tank), or a combination thereof may be removable, or replicable. For example, second reservoir internal sub-tank, or the external water pipe, or the third reservoir (if comprising a tank), or a combination thereof may be removed or replaced while the second storage reservoir remains in operation. For example, second reservoir internal sub-tank, or the external water pipe, or the third reservoir (if comprising a tank), or a combination thereof may be removed or replaced while the second storage reservoir remains installed. For example, second reservoir internal sub-tank, or the external water pipe, or the third reservoir (if comprising a tank), or a combination thereof may be removed or replaced or maintained while one or more or components remain installed and/or operating, which may include one or more or a combination of the previously described components or other parts of the present invention described herein.

An electricity storage system with a surface tank ('1'), an underwater rigid tank ('2'), and a bladder sub-tank configured to store low density liquid ('10'). The underwater rigid tank ('2') is in direct fluid communication with the adjacent deep sea ocean water by a pipe ('11').

The present embodiment at a nearly fully discharged state.

FIG. 63: The present figure may comprise the embodiment described in the description of FIG. 62. The present figure shows the present embodiment at a state of 'charging' or storing energy or electricity. Charging may involve pumping low density liquid from the first reservoir to the second reservoir, displacing water in the second reservoir. Water may exit the second reservoir during said displacing such that, even if even the low density liquid leaks from the internal sub-tank within the second reservoir, the low density liquid may remain in the second reservoir.

The present embodiment storing electricity ('charging'). Low density liquid is pumped ('4') from the surface tank ('1'), through a pipe ('3'), to the underwater rigid tank ('2'), displacing ocean water from the underwater rigid tank ('2'). The displaced ocean water travels through a pipe ('11') into the ocean adjacent the underwater rigid tank ('2').

FIG. 64: The present figure may comprise the embodiment described in the description of FIG. 62. The present figure shows the present embodiment at a nearly fully charged state.

FIG. 65: The present figure may comprise the embodiment described in the description of FIG. 62. The present figure shows the present embodiment at a state of 'discharging' or generating energy or generating electricity. Discharging may involve allowing low density liquid to be displaced from the second reservoir into a pipe, through a generator, generating electricity, and into the first reservoir. Said displacing may involve ocean water passing through a pipe ("11") into the second reservoir. Water may exit the second reservoir during said displacing such that, even if even the low density liquid leaks from the internal sub-tank within the second reservoir, the low density liquid may remain in the second reservoir.

The present embodiment generating electricity ('discharging'). Ocean water adjacent to the underwater tank in direct fluid communication with the underwater rigid tank ('2') through a pipe ('11') is allowed to displace low density liquid in the underwater rigid tank ('2'). The displaced low density liquid travels through a pipe ('3'), through a generator ('4'), to the surface tank ('1').

FIG. 66: An energy storage embodiment with a second reservoir and/or third reservoir with a containment cover or containment barrier ("CB" or "CCB"). Said CB may comprise a cover located over or above one or more components of the system. Said CB may comprise a cover located over or above components of the system which may hold or contain low density liquid. In the event low density liquid escapes from the second reservoir, the low density liquid may float upward, due to, for example, its low density than the water, and may be captured by the CB.

FIG. 67: An energy storage embodiment with a second reservoir and/or third reservoir with a containment cover or containment barrier ("CB" or "CCB"). Said CB may comprise a cover located over or above one or more components of the system. Said CB may comprise a cover located over or above components of the system which may hold or contain low density liquid. In the event low density liquid escapes from the second reservoir, the low density liquid may float upward, due to, for example, its low density than the water, and may be captured by the CB.

FIG. 68: An energy storage embodiment with a second reservoir and/or third reservoir with a containment cover or containment barrier ("CB" or "CCB"). Said CB may comprise a cover located over or above one or more components of the system. Said CB may comprise a cover located over or above components of the system which may hold or contain low density liquid. In the event low density liquid escapes from the second reservoir, the low density liquid may float upward, due to, for example, its low density than the water, and may be captured by the CB.

FIG. 69: An energy storage embodiment with a second reservoir and/or third reservoir with a containment cover or containment barrier ("CB" or "CCB"). Said CB may comprise a cover located over or above one or more components of the system. Said CB may comprise a cover located over or above components of the system which may hold or contain low density liquid. In the event low density liquid escapes from the second reservoir, the low density liquid may float upward, due to, for example, its low density than the water, and may be captured by the CB. In the present figure, "S" may comprise a separator or barrier, which may prevent or minimize the physical or direct contact between low density liquid and water within the second reservoir.

FIG. 70: An energy storage system which stores electricity by pumping low density liquid into a sub-tank ("5") within ta second reservoir ("2") to displace water inside said second reservoir. The second reservoir may comprise a rigid tank or rigid containment structure, which may surround or contain a sub-tank ("5") configured to store low density liquid. Said sub-tank may comprise an expandable or collapsible tank. Said sub-tank may be situated above a water port or hole or pipe or the outlet or a combination thereof to, for example, ensure low density liquid remains in the second reservoir in the event of a leak or accidental release of low density liquid. Said water port or hole or pipe or the outlet or a combination thereof may be employed to enable displaced water during the 'storing' of electricity to exit the second reservoir; and/or enable water to enter the second reservoir to displace low density liquid during the discharging or generating of electricity. The sub-tank may comprise a membrane or membrane-like structure. A rigid tank or rigid containment structure may surround the sub-tank and/ or cover the top portion of the sub-tank. An example characteristic of the rigid tank or rigid containment structure may comprise the ability to control the entering or exiting of water or other liquids or substances from the second reservoir, which may include, but is not limited to, the ability to open or close a valve or port which may enable or disable or both the flow of water, or other liquids or other substances to and/or from the second reservoir. The present figure shows the present embodiment 'charging'/. Said charging may involve pumping low density liquid from the first reservoir to the second reservoir, displacing water from the second reservoir with the low density liquid.

FIG. 71: An energy storage system which stores electricity by pumping low density liquid into a sub-tank ("5") within a second reservoir ("2") to displace water inside said second reservoir. The second reservoir may comprise a rigid tank or rigid containment structure, which may surround or contain a sub-tank ("5") configured to store low density liquid. Said sub-tank may comprise an expandable or collapsible tank. Said sub-tank may be situated above a water port or hole or pipe or the outlet or a combination thereof to, for example, ensure low density liquid remains in the second reservoir in the event of a leak or accidental release of low density liquid. Said water port or hole or pipe or the outlet or a combination thereof may be employed to enable displaced water during the 'storing' of electricity to exit the second reservoir; and/or enable water to enter the second reservoir to displace low density liquid during the discharging or generating of electricity. A rigid tank or rigid containment structure may surround the sub-tank and/or cover the top portion of the sub-tank. An example characteristic of the rigid tank or rigid containment structure may comprise the ability to control the entering or exiting of water or other liquids or substances from the second reservoir, which may include, but is not limited to, the ability to open or close a valve or port which may enable or disable or both the flow of water, or other liquids or other substances to and/or from the second reservoir. The present figure shows the present embodiment at a nearly fully charged state.

FIG. 72: An energy storage system which stores electricity by pumping low density liquid into a sub-tank ("5") within a second reservoir ("2") to displace water inside said second reservoir. The second reservoir may comprise a rigid tank or rigid containment structure, which may surround or contain a sub-tank ("5") configured to store low density liquid. Said sub-tank may comprise an expandable or collapsible tank. Said sub-tank may be situated above a water port or hole or pipe or the outlet or a combination thereof to, for example, ensure low density liquid remains in the second reservoir in the event of a leak or accidental release of low density liquid. Said water port or hole or pipe or the outlet or a combination thereof may be employed to enable displaced water during the 'storing' of electricity to exit the second reservoir; and/or enable water to enter the second reservoir to displace low density liquid during the discharging or generating of electricity. A rigid tank or rigid containment structure may surround the sub-tank and/or cover the top portion of the sub-tank. An example characteristic of the rigid tank or rigid containment structure may comprise the ability to control the entering or exiting of water or other liquids or substances from the second reservoir, which may include, but is not limited to, the ability to open or close a valve or port which may enable or disable or both the flow of water, or other liquids or other substances to and/or from the second reservoir. The present figure shows the present embodiment discharging or generating electricity. Discharging or generating electricity may involve low density liquid from the second reservoir being displaced into a pipe, through a generator, generating electricity and into the first reservoir. The displacement of low density liquid from the second reservoir may be allowed by opening a valve near or within the pump or generator or a valve near or within the second reservoir tank or a combination thereof. The displacement of low density liquid in the second reservoir may comprise water entering the second reservoir and displacing the low density liquid in the second reservoir.

FIG. 73: An energy storage system which stores electricity by pumping low density liquid into a sub-tank ("5") within a second reservoir ("2") to displace water inside said second reservoir. The second reservoir may comprise a rigid tank or rigid containment structure, which may surround or contain a sub-tank ("5") configured to store low density liquid. Said sub-tank may comprise an expandable or collapsible tank. Said sub-tank may be situated above a water port or hole or pipe or the outlet or a combination thereof to, for example, ensure low density liquid remains in the second reservoir in the event of a leak or accidental release of low density liquid. Said water port or hole or pipe or the outlet or a combination thereof may be employed to enable displaced water during the 'storing' of electricity to exit the second reservoir; and/or enable water to enter the second reservoir to displace low density liquid during the discharging or generating of electricity. A rigid tank or rigid containment structure may surround the sub-tank and/or cover the top portion of the sub-tank. An example characteristic of the rigid tank or rigid containment structure may comprise the ability to control the entering or exiting of water or other liquids or substances from the second reservoir, which may include, but is not limited to, the ability to open or close a valve or port which may enable or disable or both the flow of water, or other liquids or other substances to and/or from the second reservoir. The present figure shows the present embodiment at a nearly fully discharged state.

FIG. 74: The present figure shows the present embodiment charging or storing electricity. The present figure shows an embodiment where the first reservoir ("1") and/or pump ("4") and/or generator ("4") is located underwater at a higher elevation or lesser water depth than the second reservoir. The first reservoir may comprise a rigid tank or a bladder tank. In the present figure, the first reservoir is shown as a rigid tank. In the present embodiment shown in the present figure, a subsea power cable ("15") connects the pump and/or generator ("4") to electricity power sources, and/or electricity demand sources, and/or an electricity grid. Electricity power sources, and/or electricity demand sources, and/or an electricity grid, which may include transmission infrastructure, may be represented by "13" and "14" in the present figure and may be located on land or underwater. The subsea power cable may interconnect the present energy storage system with offshore power sources, such as, for example, including, but not limited to, one or more or a combination of the following: offshore wind, offshore solar, and offshore rigs, offshore generating, or other power sources. The subsea power cable may interconnect the present energy storage system with offshore demand sources, such as, for example, including, but not limited to, offshore pipelines, offshore transmission stations, offshore compression stations, offshore drilling, heated flow lines, offshore oil rigs, offshore production systems, hydrogen production, ammonia production, $CO_2$ conversion, gas processing facilities, and/or other energy consumption sources. The subsea power cable may interconnect the present energy storage system with on-shore energy demand and on-shore power production sources, which may include, but are not limited to, one or more or a combination of the following: industrial electricity demand, commercial electricity demand, residential electricity demand, transportation electricity demand, renewable power sources, residential power sources, electricity grid load balancing, electricity grid services, on-shore solar plant, on-shore wind, on-shore hydropower, on-shore combustion power generation, hydrogen production, storing excess renewable electricity, discharging electricity during peak demand or when intermittent renewables are underproducing power. The present figure may show an energy storage system which stores electricity by pumping low density liquid into a sub-tank ("5") within a second reservoir ("2") to displace water inside said second reservoir.

The present embodiment leverages multiple aspects of the technical limitations of offshore technologies, and the geography of many offshore regions.

The offshore seafloor in most of the world is relatively shallow within 10 miles, or 20 miles, or 30 miles, or 40 miles or 50 miles, or 60 miles or 70 miles, or 80 miles, or 90 miles, or 100 miles or a combination thereof of shore. Relatively shallow water depth may comprise a water depth less deep than 1,000 meters, or 900 meters, or 800 meters, or 700 meters, or 600 meters, or 500 meters, or 400 meters, or 300 meters, or 200 meters, or 100 meters or a combination thereof. Furthermore, in most geographies, said relatively shallow water eventually reaches a precipitous ledge or continental shelf, which drops to a water depth of 1,500 meters, or 2,000 meters, or 2,500 meters, or 3,000 meters, or even greater depths. The present embodiment places the first reservoir and/or pump and generator at a near said ledge or continental shelf, which may minimize the length of the pipeline from the first reservoir to the second reservoir. Minimizing the length of the pipeline increases round-trip energy efficiency and reduces capital cost.

In the present embodiment, the pump and/or generator may be interconnected to a power source or power demand or an electricity grid or a combination thereof by a subsea power cable. Subsea power cables are least expensive and/or simplest to install on relatively shallow and/or relatively flat subsea terrain. The subsea cable in the present may be installed on relatively shallow and/or relatively flat subsea terrain.

Modern day offshore wind farms require relatively shallow water depths, generally less than 1,000 meters in water depth, to be economically viable. The present embodiment enables the present invention to be integrated with current day offshore wind farms by being located relatively close to shallow water ideal for offshore wind farms. Also, by being able to co-locate with offshore wind or offshore solar or offshore rigs or a combination thereof, the present invention may integrate with pre-existing or pre-planned subsea power cables or power transmission infrastructure. Alternatively, or additionally, by being able to co-locate with offshore wind or offshore solar or offshore rigs or other offshore technologies, the present invention may improve the economics of said technologies and other technologies, facilitating the construction of the subsea power infrastructure and/or the present invention. For example, offshore Virginia, North Carolina, Delaware, and Maryland (all locations with proposed offshore wind farms) possess shallow water and a nearby precipitous ledges and/or continental shelf.

Due to the first reservoir and/or generating being located 'offshore', the only 'shore crossing infrastructure' in the present embodiment may be a subsea power cable and related transmission interconnections and infrastructure. The minimal 'shore crossing' and 'on-shore' infrastructure of the present embodiment may reduce the required permitting and/or approvals and/or timeline and/or regulatory bodies. Additionally, the lack of tanks or generators on-shore may enable the present embodiment to occupy less onshore land and/or may enable the present embodiment to be less visually obvious and/or make the present embodiment more visually appealing In the present embodiment, the first reservoir and/or pump and/or generator may be located at a water depth sufficiently deep to be minimally exposed to ocean waves and/or ocean weather. In the present embodiment, the first reservoir and/or pump and/or generator may be located at a water depth sufficiently shallow to enable a significant elevation difference between the first and second reservoirs. For example, a significant elevation difference may comprise an elevation or depth difference greater than or equal to 500 meters, or 1,000 meters, or 1,500 meters, or 2,000 meters. In the present embodiment, it may be advantageous for the first reservoir and/or pump and/or generator may be located at a water depth sufficiently shallow to enable professional divers and/or professional diving vessels access or convenient access for monitoring and/or maintenance.

The present embodiment possesses practically limitless land area and/or geographic area for energy storage.

The amount of subsea seafloor with suitable geography vastly exceeds the seafloor land area required for multi-hour, or multi-day, or even multi-month electricity storage using the present embodiment.

FIG. 75: The present figure comprises the same embodiment as FIG. 74. The present figure shows the present embodiment at a nearly fully charged state.

FIG. 76: The present figure comprises the same embodiment as FIG. 74. The present figure shows the present embodiment discharging or generating electricity.

FIG. 77: The present figure comprises the same embodiment as FIG. 74. The present figure shows the present embodiment at a nearly fully discharged state.

FIG. 78: The present figure shows the present embodiment charging or storing electricity. The present figure shows an embodiment where the first reservoir ("1") and/or pump ("4") and/or generator ("4") is located in a floating vessel ("16"). Said floating vessel may comprise a carrier, or a carrier retrofitted to enable greater unloading or loading flow rates than conventional carriers, or a specially designed carrier, or a combination thereof. Said carrier may comprise a ship, such as, for example, an LPG carrier. Said floating vessel may be interconnected to a subsea power cable and/or subsea low density liquid pipeline using or facilitated by one or more buoys. For example, the present figure may show the low density liquid pipeline interconnect buoy as "L" and the subsea cable electricity interconnect buoy as "X". One or more or multiple or a combination of subsea pipelines, floating vessels, buoys, subsea tanks, or subsea tanks may be employed.

Floating vessels may be connectable or disconnectable or both. Floating vessels may be connectable or disconnectable to each other. Floating vessels may be connectable or disconnectable to or from floating buoys. For example, said floating vessels may be added or removed (connected or disconnected) when more or less energy storage or power capacity or both is required. Floating vessels may be transferred between one or more installations or projects to, for example, optimize required resources. For example, in some regions, greater electricity storage or power capacity may be required during certain time periods or seasons and/or less electricity storage or power capacity may be required during certain other time periods or seasons. Floating vessels may be transferred to and added to some regions during time periods of greater demand. Floating vessels may be disconnected and/or transferred away during time periods of lesser demand. Floating vessels may be transferred from regions of lesser demand to regions of greater demand as needed. For example, a futures market or spot market or both may be created to lease floating vessels. Floating vessels may be employed as LPG carriers or other forms of carriers when demand for energy storage is low. In some instances, it may be desirable for one or more of the floating vessels and/or the low density liquid and/or a portion of the low density liquid to be leased by the project operator or owner instead of, for example, outright owned.

Floating vessels may disconnect to avoid severe weather, such as hurricanes. Floating vessels may be disconnected for maintenance. Floating vessels may be updated or replaced over time. For example, new technology advances or application needs or performance needs may be integrated into floating vessels as a retrofit or new floating vessels may be constructed or both. Floating vessels may be disconnected or connected due to changes in demand.

Floating vessels may exist in multiple forms. For example, a floating vessel may comprise a low density liquid storage unit. For example, a floating vessel may comprise both a low density liquid storage unit and the pump and/or generator. For example, a floating vessel may comprise a pump and/or generator. Floating vessels of multiple forms may be combined or integrated as needed. Floating vessels may be changed or exchanged or integrated differently or possess updated configurations or a combination thereof, which may be simple to conduct in response to, for example, changing needs from one or more application.

A floating vessel connection buoy may contain an anchor connection or similar device to enable the floating vessel to remain in a general position without or with minimal need for a dynamic positioning system.

The use of floating vessels may enable practically unlimited energy storage capacity. For example, floating vessels may be interconnected to increase energy storage capacity or power capacity or both. The present embodiment may benefit from the current global capacity to construct and ship large scale floating carriers for LPG and other hydrocarbons and/or the available of floating carriers currently used for, for example, transporting hydrocarbons or offshore floating storage or both.

The use of floating vessels for the first reservoir and/or pump and/or generator may minimize the permitting and/or approvals required due to, for example, pre-existing permitting for carrier vessels.

The floating vessels may connect to the buoy by means of a Turret and Swivel Stack, which may be located on the floating vessel. A turret and swivel stack may allows ships to rotate to face the wind or otherwise move while being interconnected a low density liquid pipeline and/or subsea electric cable.

FIG. 79: The present figure comprises the embodiment in FIG. 78. The present figure shows the present embodiment at a nearly fully charged state.

FIG. 80: The present figure comprises the embodiment in FIG. 78. The present figure shows the present embodiment discharging or generating electricity.

FIG. 81: The present figure comprises the embodiment in FIG. 78. The present figure shows the present embodiment at a nearly fully discharged state.

FIG. 82: The present figure shows an embodiment where the first reservoir ("1") and/or pump ("4") and/or generator ("4") is located in a floating vessel ("16"). The present figure may show an embodiment where a floating vessel is capable of connecting to a subsea low density liquid pipeline ("3") and a subsea electrical cable ("15") by a combined buoy ("LX"). Said combined buoy may be capable of connecting to and/or disconnecting from the floating vessel. Said combined buoy may simplify the connection and/or disconnection process between the floating vessel and the combined buoy. In the present figure, the combined buoy may be shown disconnected from the floating carrier.

FIG. 83: The present figure may comprise the same embodiment as FIG. 82. In the present figure, the combined buoy may be shown connected to the floating carrier.

FIG. 84: An electricity storage system with a surface low density liquid tank ('1'), an underwater rigid tank ('2'), a bladder sub-tank configured to store low density liquid ('10'), and a surface water tank ('6').

The present embodiment at a nearly fully discharged state.

FIG. 85: The present embodiment comprises the embodiment in FIG. 84.

The present embodiment storing electricity ('charging'). Low density liquid is pumped ('4') from the surface low density liquid tank ('1'), through a pipe ('3'), to the underwater rigid tank ('2'), displacing water from the underwater rigid tank ('2'). The displaced water travels through a pipe ('7') into surface water tank ('6').

FIG. 86: The present embodiment comprises the embodiment in FIG. 84. The present embodiment at a nearly fully discharged state.

FIG. 87: The present embodiment comprises the embodiment in FIG. 84.

An electricity storage system generating electricity ('discharging'). Water in the surface water tank ('6') is transferred through a pipe ('7') into the underwater rigid tank ('2'), where it is allowed to displace low density liquid in the underwater rigid tank ('2'). The displaced low density liquid travels through a pipe ('3'), through a generator ('4'), to the surface tank ('1').

FIGURE KEYS

Please note: Drawing or figures are not drawn to scale.

| FIGS. 39-43, 68 Key | |
|---|---|
| 1 | A first storage reservoir. A surface storage reservoir. A reservoir at a higher elevation than the second reservoir. A storage tank which is configured to store low density liquid. The storage tank may be rigid, or a bladder tank, or a combination thereof. The storage tank may be pressurized. The low density liquid inside the storage tank may comprise a liquid, a pressurized liquid, a gas-liquid, a liquid and head space gases comprising liquid vapor pressure, or a combination thereof. |
| 2 | Second storage reservoir. The second storage reservoir in the present figure may be configured to store low density liquid. The second storage reservoir may possess a pressure inside the storage tank which is near the same as the hydrostatic pressure of the water at the same depth as the second storage reservoir. The second storage reservoir may be buoyant and may float above the ocean floor. The second storage reservoir may be anchored or tethered or both to the ocean floor and may be suspended above the ocean floor. The pressure inside the second storage reservoir may be at equilibrium with the hydrostatic pressure of water at the water depth of the second storage reservoir. In the present figure, '2' may comprise an expandable or collapsible tank, which may comprise, for example, a bladder tank or piston tank or membrane tank or a combination thereof. |
| 3 | A pipe, which may comprise a pipeline for transferring low density liquid between the first and second storage reservoirs during storing electricity or 'charging' and during generating electricity or 'discharging'. The pipe may be capable of handling the pressure difference between the low density liquid inside the pipe and the pressure surrounding the pipe. Said pressure difference may be at its maximum near the pump/generator, '4', and at its minimum near the second reservoir, '2'. It may be desirable to optimize the cost of the pipe, by, for example, making the wall thickness and/or maximum pressure capacity of the pipe greater near the surface and less as the pipe approaches the second reservoir. It is important to note the pipe may be located on the sea floor, which is not shown in the present figure. |
| 4 | Pump/generator. A pump and/or generator unit. '4' may comprise a Hydraulic Power Recovery Turbine (HPRT), which can reversibly function as both a pump and a generator. '4' may function as the pump and/or generator for the low density liquid. |
| 5 | A valve or control system, which may be employed to stop or start or limit or adjust the flow of low density liquid to the generator. Alternatively, or additionally, '5' may comprise an emergency shutoff valve, which may close in the event of a disruption or breach. |
| Land | Land, which may comprise both land above and below the ocean. Land may comprise a solid. |
| Ocean | Ocean may comprise liquid water located in the ocean. |
| Electricity | Electricity may present the flow of electricity to or from the system. If the electricity arrow is pointing toward '4', the system may be storing electricity, by, for example, pumping low density liquid from the first reservoir to the second reservoir. Electricity may be supplied from one or more or a combination of sources, which may include, but are not limited to, an electricity grid, a power generation source, or other sources of electricity. If the electricity arrow is pointing away from '4'. the system may be generating or discharging electricity, by, for example, allowing low density liquid from the second reservoir to pass through a generator, generating electricity, and into the first reservoir. Electricity may be supplied to one or more or a combination of applications requiring electricity, which may include, but are not limited to, an electricity grid, a commercial demand, a residential demand, an industrial demand, a transportation demand, or other application for electricity. |
| C | The dashed lines may represent a label. 'C' may be labeling or representing the tethering or anchoring or mooring or a combination thereof of the second reservoir to the ocean floor. The second reservoir may be buoyant and mechanisms, such as mechanisms represented by 'C', may be employed to suspend the second reservoir above the ocean floor and/or prevent the second reservoir from floating to the ocean surface. |
| CB | The dashed lines may represent a label. 'CB' may be labeling or representing a containment barrier or cover, which may cover over at least a portion of the second reservoir. Said containment barrier or cover may capture low density liquid or derivatives of low density liquid in the event of a breach or accidental release of low density liquid from the second reservoir. CB may enable the recovery of said low density liquid in the event of a breach. |
| FIGS. 44-45 Key | |
| 6 | '6' may represent a rigid tank comprising a third reservoir configured to store water. In FIG. 45, the number '6' may be located in the portion of the third reservoir containing water. '6'may alternatively represent a rigid tank configured to store a non-volatile or low volatility liquid or low vapor pressure liquid. |

-continued

| | |
|---|---|
| A | 'A' and the line surrounding 'A' may comprise a label. 'A' may be a label for a condensed gas, which may be floating on the surface of the water inside the third reservoir. A condensed gas may be at a liquid phase and may be practically insoluble in water. A condensed gas may possess a sufficient vapor pressure to ensure the pressure inside the third reservoir or rigid water tank is close to the pressure outside the third reservoir or rigid water tank. A condensed gas may possess a sufficient vapor pressure to ensure the pressure inside the third reservoir or rigid water tank is greater than or equal to the pressure outside the third reservoir or rigid water tank. A condensed gas may possess a sufficient vapor pressure to ensure the pressure inside the third reservoir or rigid water tank is greater than or equal to the pressure outside the third reservoir or rigid water tank while water is emptied from the tank. A condensed gas may be condensable to ensure, for example, the pressure inside the water tank remains relatively consistent while water is added to the tank or while the tank is being filled with water. The pressure inside the tank may remain relatively close to the vapor pressure of the condensable gas at the temperature of the tank. |
| B | 'B' and the line surrounding 'B' may comprise a label. 'B' may be a label for the gas phase of a condensable gas and may comprise the headspace of a rigid water tank or a third reservoir water tank. If a portion of water is added to the tank. 'B' may be compressed to a pressure equal to or greater than the vapor pressure of 'B'. which may result in a portion of 'B' condensing on the surface of the water, forming additional condensed gas, or 'A'. If a portion of water is emptied or removed from the tank, the pressure of 'B' may be reduced to equal to or less than the vapor pressure of 'B', which may result in a portion of 'A' vaporizing or boiling, forming additional 'B'. The equilibrium between 'A' and 'B' may be employed to ensure the water tank possesses a relatively consistent internal pressure regardless of whether the water tank is filling with water, emptying of water, or the water tank is at a steady volume of water. |

FIGS. 46-53 Key

| | |
|---|---|
| 1 | '1' may comprise a first reservoir, which may comprise a reservoir at a higher elevation than a second reservoir. '1' may comprise a tank configured to store a low density liquid. '1' may comprise a pressurized tank, if, for example, the low density liquid possesses a significant vapor pressure or a vapor pressure equal to or greater than the pressure adjacent to the tank. |
| 2 | '2' may comprise the second storage reservoir. '2' may be located at a lower elevation or at a deeper water depth than the first reservoir. '2' may be configured to store both water and/or low density liquid. '2' may be configured to prevent water from directly contacting low density liquid, while enabling water and low density liquid to exchange pressure. 2' may be configured to prevent water from mixing with low density liquid or prevent low density liquid from dispersing in w ater or vice versa, while enabling water and low density liquid to exchange pressure. The second reservoir may possess an inside pressure which is near or about the same as the hydrostatic pressure of the water at the same depth as the second storage reservoir. |
| 3 | A pipe, which may comprise a pipeline for transferring low density liquid between the first and second storage reservoirs during storing electricity or 'charging' and during generating electricity or 'discharging'. The pipe may be capable of handling the pressure difference between the low density liquid inside the pipe and the pressure surrounding the pipe. Said pressure difference may be at its maximum near the pump/generator. '4', and at its minimum near the second reservoir. '2'. It may be desirable to optimize the cost of the pipe, by, for example, making the wall thickness and/or maximum pressure capacity of the pipe greater near the surface and less as the pipe approaches the second reservoir. The pipeline may comprise the same pipeline material or wall thickness or both for the full length of the pipeline if desired. It is important to note the pipe may be located on the sea floor, which is not shown in the present figure. '3' may comprise one or more or a combination of pipes. '3' may comprise onshore and/or offshore pipeline. '3' may be located on the seafloor. |
| 4 | Pump/generator. A pump and/or generator unit. '4' may comprise a Hydraulic Power Recovery Turbine (HPRT), which can reversibly function as both a pump and a generator. '4' may function as the pump and/or generator for the low density liquid. One or more or a combination of pump/generator units. Low density liquid may comprise the hydraulic fluid in the pump/generator, which may comprise a HPRT unit. |
| 5 | A valve or control system, which may be employed to stop or start or limit or adjust the flow of low density liquid to the generator. Alternatively, or additionally, '5' may comprise an emergency shutoff valve, which may close in the event of a disruption or breach. |
| 8 | A third reservoir which stores water. In the present embodiment, the third reservoir may comprise an external water tank which possesses an internal pressure near the pressure water at the depth of the external water tank and/or second reservoir. The external water reservoir may comprise a bladder tank or a floating bladder tank. The external water tank may be interconnected to the second reservoir via a pipe. The third reservoir may store water displaced by low density liquid during charging and provide water to displace low density liquid during discharging. |
| 9 | A water pipe. '9' may comprise a water pipe which interconnect the external water reservoir, '8', to the second reservoir. |
| Land | Land, which may comprise both land above and below the ocean. Land may comprise a solid. |
| Ocean | Ocean may comprise liquid water located in the ocean. |
| Electricity | Electricity may present the flow of electricity to or from the system. If the electricity arrow is pointing toward '4', the system may be storing electricity, by, for example, pumping low density liquid from the first reservoir to the second reservoir. Electricity |

| | -continued |
|---|---|
| | may be supplied from one or more or a combination of sources, which may include, but are not limited to, an electricity grid, a power generation source, or other sources of electricity. If the electricity arrow is pointing away from '4', the system may be generating or discharging electricity, by, for example, allowing low density liquid from the second reservoir to pass through a generator, generating electricity, and into the first reservoir. Electricity may be supplied to one or more or a combination of applications requiring electricity, which may include, but are not limited to, an electricity grid, a commercial demand, a residential demand, an industrial demand, a transportation demand, or other application for electricity. |
| S | 'S' and the dashed lines may comprise a label. 'S' may label a separator or physical barrier which may prevent or minimize the mixing or direct contact or both between low density liquid and water in the second reservoir. 'S' may comprise a solid or a liquid. 'S' may comprise a medium with a density greater than low density liquid and less than water. 'S' may comprise a flexible solid. 'S' may comprise a floating barrier. 'S' may comprise a fabric or liner. 'S' may comprise low density liquid - water hydrates, which may be a solid. 'S' may comprise a piston. 'S' may possess a density greater than both water and low density liquid and/or may comprise a component attached internally to a rigid tank comprising the second reservoir. 'S' may comprise an internal sub-tank, which may be located inside a rigid tank and may be employed to store low density liquid or water or both. |

FIGS. 54-57, 69, 84-87 Key

| | |
|---|---|
| 1 | '1' may comprise a first reservoir, which may comprise a reservoir at a higher elevation than a second reservoir. '1' may comprise a tank configured to store a low density liquid. '1' may comprise a pressurized tank, if, for example, the low density liquid possesses a significant vapor pressure or a vapor pressure equal to or greater than the pressure adjacent to the tank. |
| 2 | '2' may comprise the second storage reservoir. '2' may be located at a lower elevation or at a deeper water depth than the first reservoir. '2' may be configured to store both water and/or low density liquid. '2' may be configured to prevent water from directly contacting low density liquid, while enabling water and low density liquid to exchange pressure. 2' may be configured to prevent water from mixing with low density liquid or prevent low density liquid from dispersing in water or vice versa, while enabling water and low density liquid to exchange pressure. The second reservoir may possess an inside pressure which is near or about the same as the hydrostatic pressure of the water at the same depth as the second storage reservoir. The second storage reservoir may be rigid in construction. In the present figure, the low density liquid and/or water inside the second storage reservoir may be mechanically isolated from the ocean water adjacent to or outside the second storage reservoir. |
| 3 | A pipe, which may comprise a pipeline for transferring low density liquid between the first and second storage reservoirs during storing electricity or 'charging' and during generating electricity or 'discharging'. The pipe may be capable of handling the pressure difference between the low density liquid inside the pipe and the pressure surrounding the pipe. Said pressure difference may be at its maximum near the pump/generator, '4', and at its minimum near the second reservoir, '2'. It may be desirable to optimize the cost of the pipe, by, for example, making the wall thickness and/or maximum pressure capacity of the pipe greater near the surface and less as the pipe approaches the second reservoir. It is important to note the pipe may be located on the sea floor, which is not shown in the present figure. '3' may comprise one or more or a combination of pipes. '3' may comprise onshore and/or offshore pipeline. '3' may be located on the seafloor. |
| 4 | Pump/generator. A pump and/or generator unit. '4' may comprise a Hydraulic Power Recovery Turbine (HPRT), which can reversibly function as both a pump and a generator. '4' may function as the pump and/or generator for the low density liquid. One or more or a combination of pump/generator units. Low density liquid may comprise the hydraulic fluid in the pump/generator, which may comprise a HPRT unit. |
| 5 | A valve or control system, which may be employed to stop or start or limit or adjust the flow of low density liquid to the generator. Alternatively, or additionally, '5' may comprise an emergency shutoff valve, which may close in the event of a disruption or breach. |
| 6 | A third reservoir. In the present figure, the third reservoir may be located on the surface or on the ocean or above the ocean or on land or at a higher elevation than the second reservoir or a combination thereof. In the present embodiment, the third reservoir may comprise a bladder tank or a rigid tank or a combination thereof. In the present figure, the third reservoir may comprise a rigid tank. In the present figure, the third reservoir may be configured similar to the embodiment shown in FIGS. 44 and 45. The pressure inside the third reservoir in the present figure may be near or equal to the pressure outside the third reservoir or the pressure inside the third reservoir may be within 5 atm or within 10 atm of the pressure outside the third reservoir. |
| 7 | A pipe, which may comprise a pipeline for transferring water between the first and third storage reservoirs during storing electricity or 'charging' and during generating electricity or 'discharging'. The water in the pipe may comprise a similar density or the same density as the ocean water outside the pipe, which may enable a minimal pressure difference between the inside and outside of the pipe and may reduce pipe material cost. It is important to note the pipe may be located on the sea floor, which is not shown in the present figure. '7' may comprise one or more or a combination of pipes. '7' may comprise onshore and/or offshore pipeline. '7' may be located on the seafloor. |

-continued

| | |
|---|---|
| Land | Land, which may comprise both land above and below the ocean. Land may comprise a solid. |
| Ocean | Ocean may comprise liquid water located in the ocean. |
| Electricity | Electricity may present the flow of electricity to or from the system. If the electricity arrow is pointing toward '4', the system may be storing electricity, by, for example, pumping low density liquid from the first reservoir to the second reservoir. Electricity may be supplied from one or more or a combination of sources, which may include, but are not limited to, an electricity grid, a power generation source, or other sources of electricity. If the electricity arrow is pointing away from '4', the system may be generating or discharging electricity, by, for example, allowing low density liquid from the second reservoir to pass through a generator, generating electricity, and into the first reservoir. Electricity may be supplied to one or more or a combination of applications requiring electricity, which may include, but are not limited to, an electricity grid, a commercial demand, a residential demand, an industrial demand, a transportation demand, or other application for electricity. |
| CB | The dashed lines may represent a label. 'CB' may be labeling or representing a containment barrier or cover, which may cover over at least a portion of the second reservoir. Said containment barrier or cover may capture low density liquid or derivatives of low density liquid in the event of a breach or accidental release of low density liquid from the second reservoir. CB may enable the recovery of said low density liquid in the event of a breach. |

FIGS. 58-61, 67 Key

| | |
|---|---|
| 1 | '1' may comprise a first reservoir, which may comprise a reservoir at a higher elevation than a second reservoir. '1' may comprise a tank configured to store a low density liquid. '1' may comprise a pressurized tank, if, for example, the low density liquid possesses a significant vapor pressure or a vapor pressure equal to or greater than the pressure adjacent to the tank. |
| 2 | '2' may comprise the second storage reservoir. '2' may be located at a lower elevation or at a deeper water depth than the first reservoir. '2' may be configured to store both water and/or low density liquid. '2' may be configured to prevent water from directly contacting low density liquid, while enabling water and low density liquid to exchange pressure. '2' may be configured to prevent water from mixing with low density liquid or prevent low density liquid from dispersing in water or vice versa, while enabling water and low density liquid to exchange pressure. A sub-tank may be located inside '2' which stores low density liquid or water. In the present figure, the sub-tank stores low density liquid. The sub-tank may comprise a membrane or flexible liner. The subtank may comprise a bladder tank, which may be entirely contained within the rigid tank. The sub-tank may be attached to the inside walls of a rigid tank. The subtank may be connected to directly to the low density liquid pipe, '3', and/or directly connected to the inside or outside walls of the rigid tank. The second reservoir may possess an inside pressure which is near or about the same as the hydrostatic pressure of the water at the same depth as the second storage reservoir. |
| 3 | A pipe, which may comprise a pipeline for transferring low density liquid between the first and second storage reservoirs during storing electricity or 'charging' and during generating electricity or 'discharging'. The pipe may be capable of handling the pressure difference between the low density liquid inside the pipe and the pressure surrounding the pipe. Said pressure difference may be at its maximum near the pump/generator, '4', and at its minimum near the second reservoir. '2'. It may be desirable to optimize the cost of the pipe, by, for example, making the wall thickness and/or maximum pressure capacity of the pipe greater near the surface and less as the pipe approaches the second reservoir. The pipeline may comprise the same pipeline material or wall thickness or both for the full length of the pipeline if desired. It is important to note the pipe may be located on the sea floor, which is not shown in the present figure. '3' may comprise one or more or a combination of pipes. '3' may comprise onshore and/or offshore pipeline. '3' may be located on the seafloor. |
| 4 | Pump/generator. A pump and/or generator unit. '4' may comprise a Hydraulic Power Recovery Turbine (HPRT), which can reversibly function as both a pump and a generator. '4' may function as the pump and/or generator for the low density liquid. One or more or a combination of pump/generator units. Low density liquid may comprise the hydraulic fluid in the pump/generator, which may comprise a HPRT unit. |
| 5 | A valve or control system, which may be employed to stop or start or limit or adjust the flow of low density liquid to the generator. Alternatively, or additionally, '5' may comprise an emergency shutoff valve, which may close in the event of a disruption or breach. |
| 8 | A third reservoir which stores water. In the present embodiment, the third reservoir may comprise an external water tank which possesses an internal pressure near the pressure water at the depth of the external water tank and/or second reservoir. The external water reservoir may comprise a bladder tank or a floating bladder tank. The external water tank may be interconnected to the second reservoir via a pipe. The third reservoir may store water displaced by low density liquid during charging and provide water to displace low density liquid during discharging. |
| 9 | A water pipe. '9' may comprise a water pipe which interconnect the external water reservoir, '8', to the second reservoir. |
| 10 | A subtank, which may be located on the inside of the second reservoir or the second reservoir comprising a rigid tank. '10' may be directly connected to the low density liquid pipeline, '3', and/or may be directly connected to the internal and/or external wall of the second reservoir or the second reservoir comprising a rigid tank. '10' may comprise a sub-tank for storing low density liquid within the second reservoir. '10' may |

| | |
|---|---|
| | be configured such that if there were a breach in '10', low density liquid would be contained within the internal walls of the second reservoir. '10' may be configured such that if there were a breach in '8', low density liquid would remain in the second storage reservoir and the system may continue operability. Said subtank may comprise liner or membrane. Said subtank may comprise a bladder tank, or a piston tank, or an expandable or collapsible tank or a combination thereof. |
| Land | Land, which may comprise both land above and below the ocean. Land may comprise a solid. |
| Ocean | Ocean may comprise liquid water located in the ocean. |
| Electricity | Electricity may present the flow of electricity to or from the system. If the electricity arrow is pointing toward '4', the system may be storing electricity, by, for example, pumping low density liquid from the first reservoir to the second reservoir. Electricity may be supplied from one or more or a combination of sources, which may include, but are not limited to, an electricity grid, a power generation source, or other sources of electricity. If the electricity arrow is pointing away from '4', the system may be generating or discharging electricity, by, for example, allowing low density liquid from the second reservoir to pass through a generator, generating electricity, and into the first reservoir. Electricity may be supplied to one or more or a combination of applications requiring electricity, which may include, but are not limited to, an electricity grid, a commercial demand, a residential demand, an industrial demand, a transportation demand, or other application for electricity. |
| CB | The dashed lines may represent a label. 'CB' may be labeling or representing a containment barrier or cover, which may cover over at least a portion of the second reservoir. Said containment barrier or cover may capture low density liquid or derivatives of low density liquid in the event of a breach or accidental release of low density liquid from the second reservoir. CB may enable the recovery of said low density liquid in the event of a breach. |

FIGS. 62-66 Key

| | |
|---|---|
| 1 | '1' may comprise a first reservoir, which may comprise a reservoir at a higher elevation than a second reservoir. '1' may comprise a tank configured to store a low density liquid. '1' may comprise a pressurized tank, if, for example, the low density liquid possesses a significant vapor pressure or a vapor pressure equal to or greater than the pressure adjacent to the tank. |
| 2 | '2' may comprise the second storage reservoir. '2' may be located at a lower elevation or at a deeper water depth than the first reservoir. '2' may be configured to store both water and/or low density liquid. '2' may be configured to prevent water from directly contacting low density liquid, while enabling water and low density liquid to exchange pressure. '2' may be configured to prevent water from mixing with low density liquid or prevent low density liquid from dispersing in water or vice versa, while enabling water and low density liquid to exchange pressure. A sub-tank may be located inside '2' which stores low density liquid. In the present figure, the sub-tank stores low density liquid. The sub-tank may comprise a membrane or flexible liner. The subtank may comprise a bladder tank, which may be entirely contained within the rigid tank. The sub-tank may be attached to the inside walls of a rigid tank. The subtank may be connected to directly to the low density liquid pipe, '3', and/or directly connected to the inside or outside walls of the rigid tank.<br>The embodiment may employ a second reservoir which is interconnected directly or in fluid communication with open ocean. For example, the present embodiment may involve a second reservoir with a port or pipe or a combination thereof open to the ocean. Said port or pipe may contain a flow control mechanism, such as a valve, which may close or narrow or open or a combination thereof if desired. Said flow control mechanism may enable the second storage reservoir to close or isolate its internal contents in the event of or before, for example, a breach of the subtank ('10') or adverse environment or surrounding conditions or as a preventative measure. In the present embodiment, the open ocean may be considered the 'third reservoir'.<br>The second reservoir may contain sensors or other mechanisms for detecting a leak or breach of the subtank or rigid tank or an accidental release or leak or breach of low density liquid. The second reservoir may contain mechanisms for containing or preventing release of low density liquid, which may be activated or initiated passively or automatically or with input from an operator or a combination thereof.<br>Deep ocean water may contain low dissolved oxygen concentration levels, which may prevent or minimize corrosion or biofouling or scaling on one or more components or system inside or connected to the second reservoir.<br>The second reservoir may possess an inside pressure which is near or about the same as the hydrostatic pressure of the water at the same depth as the second storage reservoir. |
| 3 | A pipe, which may comprise a pipeline for transferring low density liquid between the first and second storage reservoirs during storing electricity or 'charging' and during generating electricity or 'discharging'. The pipe may be capable of handling the pressure difference between the low density liquid inside the pipe and the pressure surrounding the pipe. Said pressure difference may be at its maximum near the pump/generator, '4', and at its minimum near the second reservoir, '2'. It may be desirable to optimize the cost of the pipe, by, for example, making the wall thickness and/or maximum pressure capacity of the pipe greater near the surface and less as the pipe approaches the second reservoir. The pipeline may comprise the same pipeline material or wall thickness or both for the full length of the pipeline if desired. It is important to note the pipe may be located on the sea floor, which is not shown in the present figure. '3' may comprise one or more or a combination of pipes. '3' may comprise onshore and/or offshore pipeline. '3' may be located on the seafloor. |

| | |
|---|---|
| 4 | Pump/generator. A pump and/or generator unit. '4' may comprise a Hydraulic Power Recovery Turbine (HPRT), which can reversibly function as both a pump and a generator. '4' may function as the pump and/or generator for the low density liquid. One or more or a combination of pump/generator units. Low density liquid may comprise the hydraulic fluid in the pump/generator, which may comprise a HPRT unit. |
| 5 | A valve or control system, which may be employed to stop or start or limit or adjust the flow of low density liquid to the generator. Alternatively, or additionally, '5' may comprise an emergency shutoff valve, which may close in the event of a disruption or breach. |
| 11 | A pipe or port or a combination thereof which enables transfer of ocean water between, for example, the inside and outside of the second storage reservoir. '11' may contain one or more or a combination of fluid control mechanisms, such as valves, or flow meters, or flow rate controllers. One of the openings of '11' may be located near the bottom of the second reservoir to, for example, prevent low density liquid from entering '11' in the event of an accidental release or breach of the subtank within the second reservoir. |
| Land | Land, which may comprise both land above and below the ocean. Land may comprise a solid. |
| Ocean | Ocean may comprise liquid water located in the ocean. |
| Electricity | Electricity may present the flow of electricity to or from the system. If the electricity arrow is pointing toward '4', the system may be storing electricity, by, for example, pumping low density liquid from the first reservoir to the second reservoir. Electricity may be supplied from one or more or a combination of sources, which may include, but are not limited to, an electricity grid, a power generation source, or other sources of electricity. If the electricity arrow is pointing away from '4', the system may be generating or discharging electricity, by, for example, allowing low density liquid from the second reservoir to pass through a generator, generating electricity, and into the first reservoir. Electricity may be supplied to one or more or a combination of applications requiring electricity, which may include, but are not limited to, an electricity grid, a commercial demand, a residential demand, an industrial demand, a transportation demand, or other application for electricity. |
| CB | The dashed lines may represent a label. 'CB' may be labeling or representing a containment barrier or cover, which may cover over at least a portion of the second reservoir. Said containment barrier or cover may capture low density liquid or derivatives of low density liquid in the event of a breach or accidental release of low density liquid from the second reservoir. CB may enable the recovery of said low density liquid in the event of a breach. |

FIGS. 70-73 Key

| | |
|---|---|
| 1 | '1' may comprise a first reservoir, which may comprise a reservoir at a higher elevation than a second reservoir. '1' may comprise a tank configured to store a low density liquid. '1' may comprise a pressurized tank, if, for example, the low density liquid possesses a significant vapor pressure or a vapor pressure equal to or greater than the pressure adjacent to the tank. |
| 2 | Second reservoir which may be configured to contain water and low density liquid. A rigid structure. May comprise a tank. May comprise a rigid tank with an opening or port or pipe or a combination thereof interconnected with the ocean. May comprise a compartment or concave structure or containment structure. The second reservoir may be configured to store water and low density liquid. The second reservoir may be configured to comprise a subtank configured to store low density liquid. Said subtank may be water tight. Said subtank may be directly connected to the low density liquid pipe ('3'). The second reservoir may be configured to contain or prevent release of low density liquid into the surrounding ocean in the event of, for example, a breach of the subtank or release of low density liquid or a combination thereof. |
| 3 | A pipe, which may comprise a pipeline for transferring low density liquid between the first and second storage reservoirs during storing electricity or 'charging' and during generating electricity or 'discharging'. The pipe may be capable of handling the pressure difference between the low density liquid inside the pipe and the pressure surrounding the pipe. Said pressure difference may be at its maximum near the pump/generator, '4'. and at its minimum near the second reservoir, '2'. It may be desirable to optimize the cost of the pipe, by, for example, making the wall thickness and/or maximum pressure capacity of the pipe greater near the surface and less as the pipe approaches the second reservoir. The pipeline may comprise the same pipeline material or wall thickness or both for the full length of the pipeline if desired. '3' may comprise one or more or a combination of pipes. '3' may comprise onshore and/or offshore pipeline. |
| 4 | Pump/generator. A pump and/or generator unit. '4' may comprise a Hydraulic Power Recovery Turbine (HPRT), which can reversibly function as both a pump and a generator. '4' may function as the pump and/or generator for the low density liquid. One or more or a combination of pump/generator units. Low density liquid may comprise the hydraulic fluid in the pump/generator, which may comprise a HPRT unit. |
| 5 | A subtank, which may be located on the inside of the second reservoir or the second reservoir comprising a rigid tank. '5' may be directly connected to the low density liquid pipeline, '3', and/or may be directly connected to the internal and/or external wall of the second reservoir or the second reservoir comprising a rigid tank. '5' may comprise a sub-tank for storing low density liquid within the second reservoir. '5' may be configured such that if there were a breach in '5', low density liquid would be contained within the internal walls of the second reservoir. Said subtank may comprise liner or membrane. Said subtank may comprise a bladder tank, or a piston tank, or an expandable or collapsible tank or a combination thereof. |

| | |
|---|---|
| Land | Land, which may comprise both land above and below the ocean. Land may comprise a solid. |
| Ocean | Ocean may comprise liquid water located in the ocean. |
| Electricity | Electricity may present the flow of electricity to or from the system. If the electricity arrow is pointing toward '4', the system may be storing electricity, by, for example, pumping low density liquid from the first reservoir to the second reservoir. Electricity may be supplied from one or more or a combination of sources, which may include, but are not limited to, an electricity grid, a power generation source, or other sources of electricity. If the electricity arrow is pointing away from '4', the system may be generating or discharging electricity, by, for example, allowing low density liquid from the second reservoir to pass through a generator, generating electricity, and into the first reservoir. Electricity may be supplied to one or more or a combination of applications requiring electricity, which may include, but are not limited to, an electricity grid, a commercial demand, a residential demand, an industrial demand, a transportation demand, or other application for electricity. |

FIGS. 74-77 Key

| | |
|---|---|
| 1 | '1' may comprise a first reservoir, which may comprise a reservoir at a higher elevation than a second reservoir. '1' may comprise a tank configured to store a low density liquid. In the present figure, the first reservoir may be located underwater.<br>The first reservoir may be a rigid tank. The low density liquid in the first reservoir may possess a vapor pressure about the same as the hydrostatic pressure of the water at the same depth of the first reservoir at the temperature of the low density liquid and/or the temperature of the water at the same depth as the first reservoir. The vapor pressure may be within 10 atm of the pressure of the hydrostatic pressure of the water at the depth of the first reservoir.<br>The underwater depth of the first reservoir may be sufficiently deep to ensure the first reservoir allows boat traffic (if any) travel above it. The underwater depth of the first reservoir may be sufficiently deep to prevent or minimize the presence of ocean currents, ocean waves, or other potentially damaging elements. The underwater depth of the first reservoir may be sufficiently deep to ensure the temperature surrounding the tank is consistently below a certain temperature range to, for example, ensure the vapor pressure of the low-density liquid is below a pre-designed pressure range.<br>The first reservoir may comprise a bladder tank. The first reservoir may possess about the same pressure inside the tank as the hydrostatic of water at the same ocean water depth or a vapor pressure less than the hydrostatic of water at the same ocean water depth. |
| 2 | '2' may comprise the second storage reservoir. '2' may be located at a lower elevation or at a deeper water depth than the first reservoir. '2' may be configured to store both water and/or low density liquid. '2' may be configured to prevent water from directly contacting low density liquid, while enabling water and low density liquid to exchange pressure. '2' may be configured to prevent water from mixing with low density liquid or prevent low density liquid from dispersing in water or vice versa, while enabling water and low density liquid to exchange pressure. A sub-tank may be located inside '2' which stores low density liquid. In the present figure, the sub-tank stores low density liquid. The sub-tank may comprise a membrane or flexible liner. The subtank may comprise a bladder tank, which may be entirely contained within the rigid tank. The sub-tank may be attached to the inside walls of a rigid tank. The subtank may be connected to directly to the low density liquid pipe, '3', and/or directly connected to the inside or outside walls of the rigid tank.<br>The embodiment may employ a second reservoir which is interconnected directly or in fluid communication with open ocean. For example, the present embodiment may involve a second reservoir with a port or pipe or a combination thereof open to the ocean. Said port or pipe may contain a flow control mechanism, such as a valve, which may close or narrow or open or a combination thereof if desired. Said flow control mechanism may enable the second storage reservoir to close or isolate its internal contents in the event of or before, for example, a breach of the subtank ('5') or adverse environment or surrounding conditions or as a preventative measure. In the present embodiment, the open ocean may be considered the 'third reservoir'.<br>The second reservoir may contain sensors or other mechanisms for detecting a leak or breach of the subtank or rigid tank or an accidental release or leak or breach of low density liquid. The second reservoir may contain mechanisms for containing or preventing release of low density liquid, which may be activated or initiated passively or automatically or with input from an operator or a combination thereof.<br>Deep ocean water may contain low dissolved oxygen concentration levels, which may prevent or minimize corrosion or biofouling or scaling on one or more components or system inside or connected to the second reservoir.<br>The second reservoir may possess an inside pressure which is near or about the same as the hydrostatic pressure of the water at the same depth as the second storage reservoir. Note the dashed lines represent a label. |
| 3 | A pipe, which may comprise a pipeline for transferring low density liquid between the first and second storage reservoirs during storing electricity or 'charging' and during generating electricity or 'discharging'. The pipe may be capable of handling the pressure difference between the low density liquid inside the pipe and the pressure surrounding the pipe. Said pressure difference may be at its maximum near the pump/generator, '4', and at its minimum near the second reservoir, '2'. It may be desirable to optimize the cost of the pipe, by, for example, making the wall thickness and/or maximum pressure capacity of the pipe greater near the surface and less as the pipe approaches the second reservoir. The pipeline may comprise the same pipeline material or wall thickness or |

| | -continued |
|---|---|
| | both for the full length of the pipeline if desired. '3' may comprise one or more or a combination of pipes. In the present embodiment, '3' may comprise an entirely offshore pipeline.<br>Note the dashed lines represent a label. |
| 4 | Pump/generator. A pump and/or generator unit. '4' may comprise a Hydraulic Power Recovery Turbine (HPRT), which can reversibly function as both a pump and a generator. '4' may function as the pump and/or generator for the low density liquid. One or more or a combination of pump/generator units. Low density liquid may comprise the hydraulic fluid in the pump/generator. In the present embodiment, '4' may be configured to operate underwater. |
| 5 | A subtank, which may be located on the inside of the second reservoir or the second reservoir comprising a rigid tank. '5' may be directly connected to the low density liquid pipeline, '3', and/or may be directly connected to the internal and/or external wall of the second reservoir or the second reservoir comprising a rigid tank. '5' may comprise a sub-tank for storing low density liquid within the second reservoir. '5' may be configured such that if there were a breach in '5', low density liquid would be contained within the internal walls of the second reservoir. Said subtank may comprise liner or membrane. Said subtank may comprise a bladder tank, or a piston tank, or an expandable or collapsible tank or a combination thereof. |
| 13 | A power source or a power demand source or both. For example, '13' may comprise an electricity grid or an interconnection to an electricity grid or a combination thereof. |
| 14 | A power transmission station or power handling site. '14' may comprise a control station or power control station or a combination thereof. '14' may comprise a power interconnection between a subsea power cable and on-land power infrastructure. |
| 15 | A subsea electric power transmission cable. The subsea cable may transfer electricity to and from the pump/generator or first reservoir. The subsea cable may transfer electricity from one or more electricity sources, such as on-shore and/or offshore power sources, to the energy storage system. The subsea cable may transfer electricity from the energy storage system to one or more applications requiring electricity, which may be located onshore or offshore.<br>Note the dashed lines represent a label. |
| Land | Land may comprise land, which may be above water or below water. The land may exist at various water depths and with various topographies. |
| Ocean | Ocean may comprise liquid water located in the ocean. |
| E | 'E' may represent electricity. Electricity may present the flow of electricity to or from the system. Electricity may be supplied from one or more or a combination of sources, which may include, but are not limited to, an electricity grid, a power generation source, or other sources of electricity. Electricity may be supplied to one or more or a combination of applications requiring electricity, which may include, but are not limited to, an electricity grid, a commercial demand, a residential demand, an industrial demand, a transportation demand, or other application for electricity. |

FIGS. 78-83 Key

| | |
|---|---|
| 1 | '1' may comprise a first reservoir, which may comprise a reservoir at a higher elevation than a second reservoir. '1' may comprise a tank configured to store a low density liquid. In the present figure, the first reservoir may be located on or in a floating vessel ('16'). The first reservoir may be configured similar to hydrocarbons storage or butane storage or LPG storage or propane storage or other low density liquids storage on ships. The first reservoir may be interconnected to a pump and/or generator ('4'), which may be co-located on a floating vessel or on the same floating vessel or underwater or a combination thereof. |
| 2 | '2' may comprise the second storage reservoir. '2' may be located at a lower elevation or at a deeper water depth than the first reservoir. '2' may be configured to store both water and/or low density liquid. '2' may be configured to prevent water from directly contacting low density liquid, while enabling water and low density liquid to exchange pressure. '2' may be configured to prevent water from mixing with low density liquid or prevent low density liquid from dispersing in water or vice versa, while enabling water and low density liquid to exchange pressure. A sub-tank may be located inside '2' which stores low density liquid. In the present figure, the sub-tank stores low density liquid. The sub-tank may comprise a membrane or flexible liner. The subtank may comprise a bladder tank, which may be entirely contained within the rigid tank. The sub-tank may be attached to the inside walls of a rigid tank. The subtank may be connected to directly to the low density liquid pipe, '3', and/or directly connected to the inside or outside walls of the rigid tank.<br>The embodiment may employ a second reservoir which is interconnected directly or in fluid communication with open ocean. For example, the present embodiment may involve a second reservoir with a port or pipe or a combination thereof open to the ocean. Said port or pipe may contain a flow control mechanism, such as a valve, which may close or narrow or open or a combination thereof if desired. Said flow control mechanism may enable the second storage reservoir to close or isolate its internal contents in the event of or before, for example, a breach of the subtank ('5') or adverse environment or surrounding conditions or as a preventative measure. In the present embodiment, the open ocean may be considered the 'third reservoir'.<br>The second reservoir may contain sensors or other mechanisms for detecting a leak or breach of the subtank or rigid tank or an accidental release or leak or breach of low density liquid. The second reservoir may contain mechanisms for containing or preventing release of low density liquid, which may be activated or initiated passively or automatically or with input from an operator or a combination thereof.<br>Deep ocean water may contain low dissolved oxygen concentration levels, which may |

| | |
|---|---|
| | prevent or minimize corrosion or biofouling or scaling on one or more components or system inside or connected to the second reservoir.<br>The second reservoir may possess an inside pressure which is near or about the same as the hydrostatic pressure of the water at the same depth as the second storage reservoir.<br>Note the dashed lines represent a label. |
| 3 | A pipe, which may comprise a pipeline for transferring low density liquid between the first and second storage reservoirs during storing electricity or 'charging' and during generating electricity or 'discharging'. The pipe may be capable of handling the pressure difference between the low density liquid inside the pipe and the pressure surrounding the pipe. Said pressure difference may be at its maximum near the pump/generator, '4', and at its minimum near the second reservoir, '2'.<br>'3' may include flow risers and/or an interconnected buoy ('L' or 'LX') to enable connection of '3' to the pump/generator ('4') and the first reservoir ('1') on a floating vessel ('16'). '3' may interconnect low density liquid in the second reservoir with a surface buoy and/or with a floating vessel comprising a first storage reservoir. |
| 4 | Pump/generator. A pump and/or generator unit. '4' may comprise a Hydraulic Power Recovery Turbine (HPRT), which can reversibly function as both a pump and a generator. '4' may function as the pump and/or generator for the low density liquid. One or more or a combination of pump/generator units. Low density liquid may comprise the hydraulic fluid in the pump/generator. In the present embodiment, '4' may be located on a floating vessel. |
| 5 | A subtank, which may be located on the inside of the second reservoir or the second reservoir comprising a rigid tank. '5' may be directly connected to the low density liquid pipeline, '3', and/or may be directly connected to the internal and/or external wall of the second reservoir or the second reservoir comprising a rigid tank. '5' may comprise a sub-tank for storing low density liquid within the second reservoir. '5' may be configured such that if there were a breach in '5', low density liquid would be contained within the internal walls of the second reservoir. Said subtank may comprise liner or membrane. Said subtank may comprise a bladder tank, or a piston tank, or an expandable or collapsible tank or a combination thereof. |
| 13 | A power source or a power demand source or both. For example, '13' may comprise an electricity grid or an interconnection to an electricity grid or a combination thereof. |
| 14 | A power transmission station or power handling site. '14' may comprise a control station or power control station or a combination thereof. '14' may comprise a power interconnection between a subsea power cable and on-land power infrastructure. |
| 15 | A subsea electric power transmission cable. The subsea cable may transfer electricity to and from the pump/generator or first reservoir. The subsea cable may transfer electricity from one or more electricity sources, such as on-shore and/or offshore power sources, to the energy storage system. The subsea cable may transfer electricity from the energy storage system to one or more applications requiring electricity, which may be located onshore or offshore.<br>'15' may include flow risers and/or an interconnected buoy ('X' or 'LX') to enable connection of '15' to the pump/generator ('4') on a floating vessel ('16').<br>Note the dashed lines represent a label. |
| 16 | A floating vessel comprising a first reservoir ('1') and/or a pump/generator ('4'). The pump and/or generator may be configured to pump low density liquid and/or convert the hydraulic power of the low density liquid into electricity. '16' may also comprise a connection and/or disconnection system to connect 'L' or 'X' or 'LX' and/or interconnect the low density liquid and electricity to the appropriate areas of '4'.<br>'16' may comprise a carrier ship or hydrocarbon carrier ship or a LPG carrier or a butane carrier or a hydrocarbon carrier or a retrofitted ship or a custom designed ship or a combination thereof. |
| Land | Land may comprise land, which may be above water or below water. The land may exist at various water depths and with various topographies. |
| Ocean | Ocean may comprise liquid water located in the ocean. |
| E | 'E' may represent electricity. Electricity may present the flow of electricity to or from the system. Electricity may be supplied from one or more or a combination of sources, which may include, but are not limited to, an electricity grid, a power generation source, or other sources of electricity. Electricity may be supplied to one or more or a combination of applications requiring electricity, which may include, but are not limited to, an electricity grid, a commercial demand, a residential demand, an industrial demand, a transportation demand, or other application for electricity. |
| L | 'L' may comprise a disconnectable buoy designed for the interconnection of a low density liquid pipeline to a floating vessel. 'L' may comprise flow control and flow interconnection mechanisms to enable, for example, connection and/or disconnection with a floating vessel. |
| X | 'X' may comprise a disconnectable buoy designed for the interconnection of a subsea power cable with a pump and/or generator located on a floating vessel. 'X' may comprise flow control and flow interconnection mechanisms to enable, for example, connection and/or disconnection with a floating vessel. |
| LX | 'LX' may comprise a disconnectable buoy designed to enable the interconnection of a low density liquid pipeline to a floating vessel and the interconnection of a subsea cable to a floating vessel. 'LX' may comprise a combined buoy in which both an interconnection system for a low density liquid pipeline and an interconnection system for a subsea power cable are located. 'LX' may comprise flow control and flow interconnection mechanisms to enable, for example, connection and/or disconnection with a floating vessel. |

FIGS. 84-87 Key

| | |
|---|---|
| 1 | '1' may comprise a first reservoir, which may comprise a reservoir at a higher elevation than a second reservoir. '1' may comprise a tank configured to store a low density liquid. '1' may comprise a pressurized tank, if, for example, the low density liquid possesses a significant vapor pressure or a vapor pressure equal to or greater than the pressure adjacent to the tank. |
| 2 | '2' may comprise the second storage reservoir. '2' may be located at a lower elevation or at a deeper water depth than the first reservoir. '2' may be configured to store both water and/or low density liquid. '2' may be configured to prevent water from directly contacting low density liquid, while enabling water and low density liquid to exchange pressure. '2' may be configured to prevent water from mixing with low density liquid or prevent low density liquid from dispersing in water or vice versa, while enabling water and low density liquid to exchange pressure. A sub-tank may be located inside '2' which stores low density liquid or water. In the present figure, the sub-tank stores low density liquid. The sub-tank may comprise a membrane or flexible liner. The subtank may comprise a bladder tank, which may be entirely contained within the rigid tank. The sub-tank may be attached to the inside walls of a rigid tank. The subtank may be connected to directly to the low density liquid pipe, '3', and/or directly connected to the inside or outside walls of the rigid tank.<br>The second reservoir may possess an inside pressure which is near or about the same as the hydrostatic pressure of the water at the same depth as the second storage reservoir. The second reservoir in the present embodiment may be mechanically isolated from the ocean at the water depth of the second reservoir. |
| 3 | A pipe, which may comprise a pipeline for transferring low density liquid between the first and second storage reservoirs during storing electricity or 'charging' and during generating electricity or 'discharging'. The pipe may be capable of handling the pressure difference between the low density liquid inside the pipe and the pressure surrounding the pipe. Said pressure difference may be at its maximum near the pump/generator, '4', and at its minimum near the second reservoir, '2'. It may be desirable to optimize the cost of the pipe, by, for example, making the wall thickness and/or maximum pressure capacity of the pipe greater near the surface and less as the pipe approaches the second reservoir. The pipeline may comprise the same pipeline material or wall thickness or both for the full length of the pipeline if desired. It is important to note the pipe may be located on the sea floor, which is not shown in the present figure. '3' may comprise one or more or a combination of pipes. '3' may comprise onshore and/or offshore pipeline. '3' may be located on the seafloor. |
| 4 | Pump/generator. A pump and/or generator unit. '4' may comprise a Hydraulic Power Recovery Turbine (HPRT), which can reversibly function as both a pump and a generator. '4' may function as the pump and/or generator for the low density liquid. One or more or a combination of pump/generator units. Low density liquid may comprise the hydraulic fluid in the pump/generator, which may comprise a HPRT unit. |
| 5 | A valve or control system, which may be employed to stop or start or limit or adjust the flow of low density liquid to the generator. Alternatively, or additionally, '5' may comprise an emergency shutoff valve, which may close in the event of a disruption or breach. |
| 6 | A third reservoir. In the present figure, the third reservoir may be located on the surface or on the ocean or above the ocean or on land or at a higher elevation than the second reservoir or a combination thereof. In the present embodiment, the third reservoir may comprise a bladder tank or a rigid tank or a combination thereof. In the present figure, the third reservoir may comprise a rigid tank. In the present figure, the third reservoir may be configured similar to the embodiment shown in FIGS. 44 and 45. The pressure inside the third reservoir in the present figure may be near or equal to the pressure outside the third reservoir or the pressure inside the third reservoir may be within 5 atm or within 10 atm of the pressure outside the third reservoir. |
| 7 | A pipe, which may comprise a pipeline for transferring water between the first and third storage reservoirs during storing electricity or 'charging' and during generating electricity or 'discharging'. The water in the pipe may comprise a similar density or the same density as the ocean water outside the pipe, which may enable a minimal pressure difference between the inside and outside of the pipe and may reduce pipe material cost. It is important to note the pipe may be located on the sea floor, which is not shown in the present figure. '7' may comprise one or more or a combination of pipes. '7' may comprise onshore and/or offshore pipeline. '7' may be located on the seafloor. |
| 10 | A subtank, which may be located on the inside of the second reservoir or the second reservoir comprising a rigid tank. '10' may be directly connected to the low density liquid pipeline, '3', and/or may be directly connected to the internal and/or external wall of the second reservoir or the second reservoir comprising a rigid tank. '10' may comprise a sub-tank for storing low density liquid within the second reservoir. '10' may be configured such that if there were a breach in '10', low density liquid would be contained within the internal walls of the second reservoir. Said subtank may comprise liner or membrane. Said subtank may comprise a bladder tank, or a piston tank, or an expandable or collapsible tank or a combination thereof. |
| Land | Land, which may comprise both land above and below the ocean. Land may comprise a solid. |
| Ocean | Ocean may comprise liquid water located in the ocean. |
| Electricity | Electricity may present the flow of electricity to or from the system. If the electricity arrow is pointing toward '4', the system may be storing electricity, by, for example, pumping low density liquid from the first reservoir to the second reservoir. Electricity may be supplied from one or more or a combination of sources, which may include, but | are not limited to, an electricity grid, a power generation source, or other sources of electricity. If the electricity arrow is pointing away from '4', the system may be generating or discharging electricity, by, for example, allowing low density liquid from the second reservoir to pass through a generator, generating electricity, and into the first reservoir. Electricity may be supplied to one or more or a combination of applications requiring electricity, which may include, but are not limited to, an electricity grid, a commercial demand, a residential demand, an industrial demand, a transportation demand, or other application for electricity.

Additional Description

High Vapor Pressure Low Density Liquids and/or Subsea First Reservoir

There may be key advantages to placing the first reservoir underwater. For example, by placing the first reservoir underwater, a low density liquid possessing a high vapor pressure may be employed as the low density liquid working fluid. The system may be designed such that the underwater first reservoir is located at a water depth where the hydrostatic pressure of the water is close to the vapor pressure of the low density liquid at the temperature of the ocean water. By placing the tank at a water depth where the vapor pressure inside the underwater first reservoir is similar to the pressure of the water surrounding the first reservoir, the tank installed may require less pressure difference resistance and may possess relatively thinner walls or may be lower cost than a tank storing the same liquid on the surface. Also, advantageously, the temperature of water beneath the ocean may be relatively consistent depending on the climate and location, which my enable simpler prediction of low density liquid vapor pressure and/or design of tank pressure requirement and/or design water depth. Also, advantageously, the temperature of water beneath the ocean may be relatively consistently below a certain temperature range, which my enable simpler prediction of low density liquid vapor pressure and/or design of tank pressure requirement and/or design water depth.

As an example, liquid Ethane has a vapor pressure of 2807 kPa at 280° K and 4357 kPa at 300° K, which is equivalent to the hydrostatic pressure of water at about a 286 meter water depth and 445 meter water depth, respectively. The first reservoir and/or pump and/or generator may be placed at, for example, a water depth deeper than 150 meters deep and less deep than 500 meters deep. Ethane remains at a liquid phase, rather than a supercritical phase, below its critical point of 305.322° K. Advantageously, the temperature of ocean water at greater than 150 meter water depth, even in equatorial regions, is generally consistently less than 300° K, which may ensure ethane remains at a liquid phase rather than a supercritical phase. At its liquid phase, Ethane has a density of 304 kg/m$^3$ at 300° K and 383 kg/m$^3$ at 280° K. The present embodiment may be configured similar to the configuration of FIG. 74. Alternatively, or additionally, the present embodiment may be configured similar to FIG. 55, except where '1', '6', and/or '4' are located underwater, although still at a higher elevation than '2'. Alternatively, or additionally, the present embodiment may be configured similar to other figures herein, although the first reservoir, or third reservoir, or pump/generator, or a combination thereof may be placed under the ocean in figures wherein the first reservoir, or third reservoir, or pump/generator, or a combination thereof may be shown above the ocean or on land adjacent to the ocean. Advantageously, liquid ethane may be more abundant and/or less expensive than other low density liquid options. Advantageously, liquid ethane may possess a lower density liquid than other low density liquid options.

Liquid-Liquid Displacement

The present embodiment pertains to an energy storage device employing a low density liquid and a high density liquid. Electricity is stored by displacing a high density liquid with a low density liquid and electricity is generated by allowing a high density liquid to displace a low density liquid. In the present embodiment, said displacing occurs in an underwater storage reservoir configured to store both low density liquid and high density liquid. An example high density liquid may include, but is not limited to, water. An example low density liquid may include, but is not limited to, propane, butane, ethane, or LPG. In some embodiments, the underwater storage reservoir may comprise a rigid storage tank. In some embodiments, low density liquid comprises the hydraulic fluid employed in the pump and generator for generating electricity.

In the underwater storage reservoir in some embodiments, the low-density liquid floats above the high-density liquid. The low density liquid may comprise the hydraulic fluid or working fluid employed in a pump or generator. There are multiple benefits resulting from allowing the low density liquid to float above or be located above the high density liquid inside the underwater storage reservoir. Said benefits may include, but are not limited to, the following:

By allowing low density liquid to float above high-density liquid the present invention may employ a rigid underwater tank. A rigid underwater tank or rigid underwater structure may be employed to contain or store at least a portion of the low-density liquid. A rigid underwater tank may possess numerous advantages, which may include, but are not limited to, longer lifespan, lower risk of leaks or breaks, and resiliency to the elements.

In the event of a catastrophic failure or a leak or a break in the underwater storage region which, one or more or a combination of the following beneficial outcomes may occur:

The energy storage system may continue to remain operational

Low density liquid may be safely removed and/or recoverable by allowing the electricity storage system to generate electricity or 'discharge' by allowing low density liquid to be transferred from the underwater reservoir to the reservoir near the surface.

Low density liquid may remain within the underwater storage region

Low density liquid may not leak or escape the underwater storage region

Low density liquid may be contained within a rigid region of the underwater storage tank, which may possess longer lasting or safer storage characteristics.

Low density liquid and water may directly displace each other, while being physically separated The present embodiment can employ density-based methods for passive risk mitigation, error correction, and emergency response, which may include, but are not limited to, the following:

For example, the present embodiment may employ a floating plug which possesses a density greater than low density liquid and less than water. Said plug may stop liquid flow into the low-density liquid pipe when the water level in the second reservoir is above a pre-defined level. Said plug may prevent water from entering the low-density liquid pipe. Said plug may be employed to ensure a pre-defined minimum volume of low-density liquid is present in the underwater storage reservoir.

If a barrier or separator breaks, within or

During charging, low density liquid may displace water downwards and out of the underwater tank through a bottom port in the underwater tank.

In some embodiments, low density liquid may be prevented from coming into direct contact with the high density liquid by means of a physical separation.

Said physical separation may comprise a liquid with a density greater than the low density liquid and less than the high density liquid, while being insoluble in both the low density liquid and high density liquid.

Said physical separation may comprise a solid.

Said physical separation may comprise a barrier which possesses a density greater than low density liquid and less than high density liquid.

Said physical separation may comprise an impermeable material, such as a synthetic fabric or liner.

Said physical separation may be employed to prevent the formation of hydrates.

Said physical separation may be located below the low density liquid and above the water within the underwater storage reservoir or within a rigid underwater storage tank.

Said physical separation may be located within the underwater storage reservoir.

Said physical separation may be present within a tank which comprises rigid construction, which may comprise the underwater storage reservoir.

Containment Cover or Barrier or Boundary ("CB" or "CCB")

The present invention may involve a containment cover or boundary or barrier (CB or CBB) over the underwater storage reservoir. CB may capture low density liquid in the event of a leak or accidental release of low density liquid. CB may be located over or above the underwater storage reservoir. CB may comprise a liner or fabric or solid or a sheet or a combination thereof. CB may be configured to funnel low density liquid (if captured) into particular regions of the CB to, for example, facilitate recovery of the LDL. In the event of an accidental release or leak of LDL, LDL or LDL hydrate or LDL composition may rise above the underwater reservoir and may be captured by or float into the CB. CB may be floating above the underwater reservoir and may be anchored to the ocean bottom. CB may be less dense than the ocean water, which may facilitate floatation. Alternatively, or additionally, the CB itself may be suspended or floating due to float(s) attached to the CB. In some embodiments, CB may cover or be above a surface area greater than or equal to the surface area of the underwater reservoir and/or underwater valves or connections. In some embodiments, CB may only cover or be above certain sections of the underwater reservoir, such as, for example, only covering the surface area above a connection or port. There may be more than one CB. For example, there may be a CB above certain connection points or ports. In some embodiments there may be redundant CBs. For example, a CB may cover a particular port, while another CB may cover the port and/or an entire section of the underwater reservoir.

CB may comprise materials which are compatible with water and/or the LDL. CB may comprise materials that repel both water and LDL. CB may comprise hydrophobic materials which absorb LDL.

CB may contain sensors or systems or mechanisms to determine if there is a LDL leak or if LDL has been captured by the CB. For example, said sensors may involve measuring the buoyancy force acting on a CB. If LDL is released and floats into a CB, the buoyancy force acting on the CB will increase, which may be measured by one or more sensors. For example, a sensor or indicator may involve a hydrophobic material which absorbs LDL. If LDL contacts said hydrophobic material, LDL may be absorbed, which may trigger the sensor and/or provide an indicator of the occurrence of a leak or accidental release of LDL. For example, a sensor may involve spectroscopy, which may provide indication of the presence of a new liquid other than ocean water, such as LDL. For example, a sensor may involve a float, which is less density than water and more density than LDL. If LDL leaks in sufficient quantities and collects in the CB, the float may begin to sink within a LDL layer which may form. Other mechanisms for sensors may include, but is not limited to, conductivity, spectroscopy, spectrometric, visible color, absorbance, viscosity, pH, dissolution, polarity, dielectric constant, or a combination thereof.

A system may be employed to notify system operators of the occurrence of a LDL release. Passive and/or active systems may be employed to remediate the problem or shut down the system or undergo pre-defined procedures or undergo new procedures or a combination thereof autonomously or semi-autonomously or with the presence of a human system operator, or a combination thereof.

Rigid Tank with Interconnected Water Reservoir

An example embodiment or configuration may comprise a rigid tank with a bladder tank inside to store LDL. The remaining storage volume not occupied by the LDL bladder tank may be occupied by water. The water may be interconnected to or comprise the surrounding or adjacent ocean. The water may comprise water from an interconnected to a water reservoir. Said water reservoir may comprise a surface water reservoir or an underwater reservoir. An underwater water reservoir may comprise a tank containing water interconnected to the rigid tank via a pipe. The water reservoir may possess similar pressures or equilibrium pressure with the hydrostatic pressure of the ocean.

Below are some characteristics and attributes of an example embodiment:

The LDL port in the rigid tank and/or the LDL bladder within the rigid tank may be located in the top portion of the rigid tank and/or away from the water port.

The water port maybe located at the bottom or in the bottom portion of the rigid tank and/or away from the LDL and/or the LDL port.

The water reservoir may contain freshwater or Deionized water if desired. Freshwater or deionized water may be advantageous to prevent corrosion inside the underwater rigid tank.

In the event of a break or burst in one or all of the expandable/bladder containment devices, the LDL will remain in the rigid tank. LDL may be safely removed through the LDL port, which may involve the same procedure as is typically employed for discharging/generating electricity in the present invention Because LDL port is near the top of the rigid tank and/or LDL is stored near top of tank, LDL may rise to the top of the rigid tank, which may prevent LDL from leaking and/or escaping to the surrounding water body or ensure LDL is contained within the system or ensure the LDL is salvageable for the system.

If LDL were to mix with water inside the underwater rigid tank, LDL hydrates may form, which may be significantly more dense than the LDL. If the underwater tank is full of LDL, the underwater reservoir may be designed to ensure the rigid tank water port clogs with LDL hydrates to prevent escape of LDL from the water port. Said design may include, but is not limited to, a filter or screen in the port which may intentionally clog or collect solids in the event LDL hydrates form.

If LDL hydrates form, LDL hydrates may sink to the bottom of the tank or float in the interface between water and the LDL In the event of a leak or rupture or a detection of hydrate formation, one or more valves may close. For example, the water pipe or port may possess a valve which closes. Similarly, the LDL port or pipe may possess a valve which closes.

The present embodiment possesses multiple redundancies. The present embodiment may enable LDL to remain contained within a rigid structure or rigid tank, which may ensure the LDL does not escape into the surrounding ocean and/or may ensure LDL is recoverable of salvageable and/or the process is operational, even in the event one or more bladders or barriers fail or burst or break. Additionally, the present embodiment may enable the inside of the rigid tank to be in contact with a water with less corrosive species than ocean water.

Floating Bladder Tank:

The present invention may pertain to a gravitational energy storage system involving the displacement of water with a low-density liquid, wherein an underwater storage tank is floating above the ocean floor. The floating underwater storage tank may be buoyant due to the floating underwater storage possessing a lower density or lower average density than the surrounding ocean water.

Example Exemplary Embodiments

Reservoir with Low Density Liquid—Water with Physical Barrier or Separation Between Low Density Liquid and Water Exemplary Embodiment 1. A system for storing or generating electricity comprising:
a first storage reservoir configured to be located at a higher elevation and configured to store a fluid which has a lower density than water;
a second storage reservoir configured to be located at a lower elevation and configured to store a fluid which has a lower density than water and water;
a third storage reservoir configured to store water;
a pump; and
a generator;
wherein the pump, generator, and the first, second, and third reservoirs are operatively connected such that electricity is stored by displacing water inside the second storage reservoir into the third reservoir by pumping low density fluid in the first storage reservoir to the second storage reservoir; and
electricity is generated or discharged by allowing water in the third reservoir to displace low density fluid in the second storage reservoir to the first storage reservoir.

Exemplary Embodiment

1. A system for storing or generating electricity comprising:
a first storage reservoir configured to be near the surface of a body of water and configured to store a fluid which has a lower density than water;
a second storage reservoir configured to be located below the surface of the body of water;
a pump; and
a generator;
wherein the pump, generator, and the first and second reservoir are operatively connected such that electricity is stored by displacing water inside the second storage reservoir by pumping low density fluid in the first storage reservoir to the second storage reservoir and electricity is generated or discharged by allowing the low density fluid in the second storage reservoir to return to the first storage reservoir;
wherein the second storage reservoir is configured to store water and a low-density liquid.

Exemplary Embodiment

1. A system for storing or generating electricity comprising:
a first storage reservoir configured to be near the surface of a body of water and configured to store a fluid which has a lower density than water;
a second storage reservoir configured to be located below the surface of the body of water;
a pump; and
a generator;
wherein the pump, generator, and the first and second reservoir are operatively connected such that electricity is stored by displacing water inside the second storage reservoir by pumping low density fluid in the first storage reservoir to the second storage reservoir and electricity is generated or discharged by allowing the low density fluid in the second storage reservoir to return to the first storage reservoir;
wherein the second storage reservoir is a rigid tank configured to store water and a low-density liquid.

Example Exemplary Embodiment

1. A system for storing or generating electricity comprising:
a first storage reservoir configured to be near the surface of a body of water and configured to store a low density liquid;
a second storage reservoir configured to be located below the surface of the body of water;
a pump; and
a generator;
wherein the pump, generator, and the first and second reservoir are operatively connected such that electricity is stored by displacing water inside the second storage reservoir by pumping the low density liquid in the first storage reservoir to the second storage reservoir and electricity is generated or discharged by allowing the low density liquid in the second storage reservoir to return to the first storage reservoir;

wherein the second storage reservoir is configured to store the water and the low density liquid and wherein the low density liquid has a density below the density of liquid water.

Example Exemplary Subembodiments

2. The system of exemplary embodiment 1 wherein said second storage reservoir comprises a rigid tank.
3. The system of exemplary embodiment 1 wherein the low density liquid is located above water inside the second reservoir.
4. The system of exemplary embodiment 1 wherein the low density liquid floats above water inside the second reservoir.
5. The system of exemplary embodiment 1 wherein the system further comprises a hydraulic fluid in the pump and wherein the hydraulic fluid is the same as the low density liquid.
6. The system of exemplary embodiment 1 wherein the pump, generator, and the first and second reservoir are operatively connected by a pipe.
7. The system of exemplary embodiment 6 wherein the low density liquid is transferred between said first reservoir and said second reservoir using said pipe.
8. The system of exemplary embodiment 1 further comprising a physical barrier within the second reservoir for separating the low density liquid and water in the second reservoir.
9. The system of exemplary embodiment 8 wherein the second reservoir is configured to prevent leakage of the low density liquid in the event of damage to said physical barrier.
10. The system of exemplary embodiment 8 wherein said physical barrier comprises a material with an average density less than liquid water and more than the low density liquid at a temperature greater than 3° C. and less than 50° C. at the same hydrostatic pressure.
11. The system of exemplary embodiment 8 wherein at least a portion of said physical barrier is located above water and at least a portion of said physical barrier is located below the low density liquid.
12. The system of exemplary embodiment 8 wherein said physical barrier comprises a liquid.
13. The system of exemplary embodiment 8 wherein said physical barrier comprises a solid.
14. The system of exemplary embodiment 8 wherein said physical barrier is configured to prevent (1) substantial dissolution of the low density liquid in water, (2) substantial dissolution of water in the low density liquid, (3) the formation of substantial low density liquid—water hydrates, or a combination thereof.
15. The system of exemplary embodiment 1 which further comprises a barrier situated above at least a portion of the second reservoir.
16. The system of exemplary embodiment 15 wherein said barrier is configured to contain low density liquid, a low density liquid—water composition, or a combination thereof in the event of a breach in the second reservoir.
17. The system of exemplary embodiment 15 wherein said barrier comprises an instrument for detecting low density liquid.
18. The system of exemplary embodiment 15 wherein said barrier is configured to funnel low density liquid to facilitate recovery.
19. The system of exemplary embodiment 15 wherein said barrier is suspended above at least a portion of the second reservoir.
20. The system of exemplary embodiment 19 wherein the barrier is suspended by a tether connected to a mooring, an anchor, the ocean floor, or a combination thereof.
21. The system of exemplary embodiment 15 wherein said barrier is buoyant, connected to buoyant floats, or a combination thereof.
22. The system of exemplary embodiment 1 wherein the second reservoir is buoyant, connected to buoyant floats, or a combination thereof.
23. The system of exemplary embodiment 22 wherein said second reservoir is floating or suspended above the ocean floor.
24. The system of exemplary embodiment 23 wherein the second reservoir is suspended by a tether connected to a mooring, an anchor, the ocean floor, or a combination thereof.
25. The system of exemplary embodiment 1 further comprising a third reservoir operably connected to transfer water displaced by low density liquid during the storing of electricity from the second reservoir to the third reservoir.
26. The system of exemplary embodiment 25 wherein the water has a density which is within +/−5% the density of ocean water at a temperature greater than 3° C. and less than 40° C. at the same hydrostatic pressure.
27. The system of exemplary embodiment 25 wherein at least a portion of said third reservoir comprises ocean water.
28. The system of exemplary embodiment 25 wherein at least a portion of said third reservoir comprises treated ocean water.
29. The system of exemplary embodiment 26 wherein at least a portion of said third reservoir possesses a pressure within +/−10 atm of the hydrostatic pressure of the ocean water at the depth of the second reservoir.

Exemplary Subembodiments

2. The system of embodiment 1 wherein the fluid which has a lower density than water is located above water inside the second reservoir
3. The system of embodiment 1 wherein a fluid which has a lower density than water floats above water inside the second reservoir
4. The system of embodiment 1 wherein the hydraulic fluid or working fluid in the pump and generator comprises the fluid which has a lower density than water
5. The system of embodiment 4 wherein the pump, generator, and the first and second reservoir are operatively connected by a pipe
6. The system of embodiment 5 wherein the fluid which has a lower density than water is transferred between said first reservoir and said second reservoir using said pipe
7. The system of embodiment 1 wherein the fluid which has a lower density than water and water in the second reservoir are separated by a physical barrier
8. The system of embodiment 7 wherein said physical barrier is floating
9. The system of embodiment 7 wherein said physical barrier possesses an average density less dense than water and more dense than the fluid which has a lower density than water
10. The system of embodiment 7 wherein at least a portion of said physical barrier is located above water and below the fluid which has a lower density than water
11. The system of embodiment 7 wherein said physical barrier comprises a liquid
12. The system of embodiment 7 wherein said physical barrier comprises a solid 13. The system of embodiment 7 wherein said physical barrier prevents the dissolution of the fluid which has a lower density than water in water, the dissolution of water in the fluid which has a lower density than water, the formation of fluid which has a lower density than water—water hydrates, or a combination thereof 14. The system of embodiment 1 wherein a containment cover or barrier is situated above one or more parts of the second reservoir 15. The system of embodiment 14 wherein said containment cover or barrier captures or recovers fluid which has a lower density than water or derivatives thereof in the event of a leak or break or accidental release 16. The system of embodiment 14 wherein said containment cover or barrier contains systems for detecting the capture of fluid which has a lower density than water 17. The system of embodiment 14 wherein said containment cover or barrier is configured to funnel fluid which has a lower density than water or derivatives thereof to facilitate capture or recovery 18. The system of embodiment 14 wherein said containment cover or barrier is suspended above at least a portion of the second reservoir, third reservoir, or both 19. The system of embodiment 18 wherein said suspending is conducted by a tether which is connected to a mooring or an anchor or the ocean floor or a combination thereof 20. The system of embodiment 14 wherein said containment cover or barrier is buoyant or connected to buoyant floats or a combination thereof 21. The system of embodiment 1 wherein the second reservoir is buoyant or connected to buoyant floats or a combination thereof 22. The system of embodiment 21 wherein said second reservoir is floating above the ocean floor 23. The system of embodiment 22 wherein said second reservoir is suspended above the ocean floor 24. The system of embodiment 23 wherein said suspending is conducted by a tether which is connected to a mooring or an anchor or the ocean floor or a combination thereof 25. The system of embodiment 1 wherein the third reservoir comprises a liquid with the same density as ocean water 26. The system of embodiment 1 wherein the third reservoir comprises a liquid with a density which is within +/−0.5%, or 1%, or 2%, or 3%, or 4%, or 5%, or 6%, or 7%, or 8%, or 9%, or 10% of the density of ocean water 26. The system of embodiment 1 wherein the third reservoir comprises a liquid with a density which is within +/−0.5%, or 1%, or 2%, or 3%, or 4%, or 5%, or 6%, or 7%, or 8%, or 9%, or 10% of the density of ocean water, which may be a liquid at a temperature greater than 3° C. and less than 40° C. at the same hydrostatic pressure 27. The system of embodiment 1 wherein the third reservoir comprises at least a portion ocean water 28. The system of embodiment 26 wherein said liquid is less corrosive than ocean water, or is less prone to the formation of biofouling or scaling than ocean water, or a combination thereof 29. The system of embodiment 26 wherein said liquid comprises treated ocean water 30. The system of embodiment 26 wherein at least a portion of said liquid is at a pressure with 10 atm of the hydrostatic pressure of ocean water near the second reservoir 1. A system for storing or generating electricity comprising:
a first storage reservoir configured to be located at a higher elevation and configured to store a fluid which has a lower density than water;
a second storage reservoir configured to be located at a lower elevation;
a third storage reservoir configured to store water;
a pump; and
a generator;
wherein the pump, generator, and the first, second, and third reservoirs are operatively connected such that electricity is stored by displacing water inside the second storage reservoir into the third reservoir by pumping low density fluid in the first storage reservoir to the second storage reservoir; and
electricity is generated or discharged by allowing water in the third reservoir to displace low density fluid in the second storage reservoir to the first storage reservoir;
wherein the second storage reservoir is configured to store water and a low-density liquid.

1. A system for storing or generating electricity comprising:
a first storage reservoir configured to be located at a higher elevation and configured to store a fluid which has a lower density than water;
a second storage reservoir configured to be located at a lower elevation and configured to store low density liquid and water;
a third storage reservoir configured to store water;
a pump; and
a generator;
wherein the pump, generator, and the first, second, and third reservoirs are operatively connected such that electricity is stored by displacing water inside the second storage reservoir into the third reservoir by pumping low density fluid in the first storage reservoir to the second storage reservoir; and
electricity is generated or discharged by allowing water in the third reservoir to displace low density fluid in the second storage reservoir to the first storage reservoir.

1. A system for storing or generating electricity comprising:
a first storage reservoir configured to be near the surface of a body of water and configured to store a fluid which has a lower density than water;
a second storage reservoir configured to be located below the surface of the body of water;
a pump; and
a generator;
wherein the pump, generator, and the first and second reservoir are operatively connected such that electricity is stored by displacing water inside the second storage reservoir by pumping low density fluid in the first storage reservoir to the second storage reservoir and electricity is generated or discharged by allowing the low density fluid in the second storage reservoir to return to the first storage reservoir;
wherein the second storage reservoir is configured to store water and a low-density liquid.

1. A system for storing or generating electricity comprising:
a first storage reservoir configured to be near the surface of a body of water and configured to store a fluid which has a lower density than water;
a second storage reservoir configured to be located below the surface of the body of water;
a pump; and
a generator;
wherein the pump, generator, and the first and second reservoir are operatively connected such that electricity is stored by displacing water inside the second storage reservoir by pumping low density fluid in the first storage reservoir to the second storage reservoir and electricity is generated or discharged by allowing the low density fluid in the second storage reservoir to return to the first storage reservoir;

wherein the second storage reservoir is configured to store water and a low-density liquid;

wherein low density liquid comprises the hydraulic fluid in the pump and generator;

wherein low density liquid is located above water inside the second storage reservoir 2. The system of embodiment 1 wherein the low-density liquid is located above water inside the second reservoir 3. The system of embodiment 1 wherein the low-density liquid floats above water inside the second reservoir 4. The system of embodiment 1 wherein the hydraulic fluid or working fluid in the pump and generator comprises low density liquid 5. The system of embodiment 4 wherein the pump, generator, and the first and second reservoir are operatively connected by a pipe 6. The system of embodiment 5 wherein said low density liquid is transferred between said first reservoir and said second reservoir using said pipe 7. The system of embodiment 1 wherein the water and low-density liquid in the second reservoir are separated by a physical barrier 8. The system of embodiment 7 wherein said physical barrier is floating 9. The system of embodiment 7 wherein said physical barrier possesses an average density less dense than water and more dense than low density liquid 10. The system of embodiment 7 wherein said physical barrier is located above water and below low density liquid 11. The system of embodiment 7 wherein said physical barrier comprises a liquid 12. The system of embodiment 7 wherein said physical barrier comprises a solid 13. The system of embodiment 1 wherein said physical barrier prevents the dissolution of low density liquid in water, the dissolution of water in low density liquid, the formation of low density liquid—water hydrates, or a combination thereof 1. A system for storing or generating electricity comprising:
    a first storage reservoir configured to be near the surface of a body of water and configured to store a fluid which has a lower density than water;
    a second storage reservoir configured to be located below the surface of the body of water;
    a pump; and
    a generator;
    wherein the pump, generator, and the first and second reservoir are operatively connected such that electricity is stored by displacing water inside the second storage reservoir by pumping low density fluid in the first storage reservoir to the second storage reservoir and electricity is generated or discharged by allowing the low density fluid in the second storage reservoir to return to the first storage reservoir;
    wherein the second storage reservoir is configured to store water and low-density liquid;
    wherein the water and low density liquid are separated by a physical barrier 1. A system for storing or generating electricity comprising:
    a first storage reservoir configured to be near the surface of a body of water and configured to store a fluid which has a lower density than water;
    a second storage reservoir configured to be located below the surface of the body of water;
    a pump; and
    a generator;
    wherein the pump, generator, and the first and second reservoir are operatively connected such that electricity is stored by displacing water inside the second storage reservoir by pumping low density fluid in the first storage reservoir to the second storage reservoir and electricity is generated or discharged by allowing the low density fluid in the second storage reservoir to return to the first storage reservoir;
    wherein the second storage reservoir is configured to store water and low-density liquid;
    wherein the water and low density liquid are separated by a floating physical barrier 1. A system for storing or generating electricity comprising:
    a first storage reservoir configured to be near the surface of a body of water and configured to store a fluid which has a lower density than water;
    a second storage reservoir configured to be located below the surface of the body of water;
    a pump; and
    a generator;
    wherein the pump, generator, and the first and second reservoir are operatively connected such that electricity is stored by displacing water inside the second storage reservoir by pumping low density fluid in the first storage reservoir to the second storage reservoir and electricity is generated or discharged by allowing the low density fluid in the second storage reservoir to return to the first storage reservoir;
    wherein the water and low-density liquid in the second storage reservoir are in direct contact in a water—low density liquid liquid-liquid interface 1. A system for storing or generating electricity comprising:
    a first storage reservoir configured to be near the surface of a body of water and configured to store a fluid which has a lower density than water;
    a second storage reservoir configured to be located below the surface of the body of water;
    a pump; and
    a generator;
    wherein the pump, generator, and the first and second reservoir are operatively connected such that electricity is stored by displacing water inside the second storage reservoir by pumping low density fluid in the first storage reservoir to the second storage reservoir and electricity is generated or discharged by allowing the low density fluid in the second storage reservoir to return to the first storage reservoir;
    wherein the second storage reservoir contains a low density liquid—water liquid-liquid interface Containment Cover or Containment Barrier ("CB" or "CCB"):

Floating/Buoyant Tank:

1. A system for storing or generating electricity comprising:
    a first storage reservoir configured to be near the surface of a body of water and configured to store a fluid which has a lower density than water;
    a second storage reservoir configured to be located below the surface of the body of water and configured to store a fluid which has a lower density than water;
    a pump; and
    a generator;
    wherein the pump, generator, and the first and second reservoir are operatively connected such that electricity is stored by displacing water adjacent the second storage reservoir by pumping low density liquid in the first storage reservoir to the second storage reservoir and electricity is generated by allowing the low density fluid in the second storage reservoir to return to the first
storage reservoir; and,
wherein the water and the fluid which has a lower density than water are both in liquid form; and,
wherein the second storage reservoir is floating.
2. The system of embodiment 1 wherein said floating is anchored to the bottom of the ocean
3. The system of embodiment 1 wherein said floating is suspended above the bottom of the ocean Condensable Gas in Surface Water Tank:

Rigid Tank with Example Interconnected Pressure Equalizing

1. An energy storage system comprising:
A surface tank, A Subsea tank, A pipe, A pump, and A generator;
Wherein Energy is stored by displacing water in said subsea tank using a low density liquid
Wherein Energy is generated by allowing water to displace low density liquid in said Subsea tank
1. An energy storage system comprising:
A surface tank, A Subsea tank, A pipe, A pump, and A generator;
Wherein Energy is stored by pumping low density liquid into the Subsea tank to displace water in said subsea tank
2. Wherein the pressure inside said Subsea tank is at equilibrium with the hydrostatic pressure of the surrounding water
3. Wherein the Subsea tank contains a water—low density liquid interface
4. Wherein water inside the Subsea tank is in direct contact with the low density liquid
5. Wherein water inside the Subsea tank is separated from the low density liquid by a floating barrier
1. A rigid tank with a low density liquid and water configured to store LDL and water; and,
A bladder tank configured to store water;
2. Wherein the bladder tank is located at the same elevation as the rigid tank;
3. Wherein the bladder tank is located at an elevation different from the rigid tank
Note:
The location of the bladder tank and elevation of the bladder tank relative to the rigid tank may be virtually any elevation beneath the water body because the water inside the tank is at the same density as the water in the surrounding water body.

Notes

Note: Bladder tank is sunk as a fully collapsed tank and may be connected to the rigid tank, via, for example, a pipe. The rigid tank is sunk by flooding the rigid tank. As the water in the rigid taak is being displaced by the LDL, the displaced water filled the bladder tank. The bladder tank may be floating or sit on the ocean bottom.
Note: The energy storage system may be charged when at a partially charged state.
Note: The energy storage system may be charged when at a fully discharged state.
Note: The energy storage system may be discharged when at a partially charged or partially discharged state.
Note: The energy storage system may be discharged when at a fully charged state.
Note: It may be desirable for the pressure of the water transferred to or from the surface water tank ('inside water') to equal to the gravitational hydrostatic pressure of the water surrounding the pipes ('outside water'), Alternatively, or additionally, the pressure of the inside water may be less than or greater than the outside water by the pressure tolerance of a subsea tank, or one or more components or parts in contact with inside water, or a combination thereof. An example method to ensure the pressure of inside water and outside water is similar is to place a valve or pressure regulator between surface water tank(s) and subsea tank(s). For example, said valve or pressure regulator may be attached to or inside a pipeline connecting surface water tank(s) and subsea tank(s).
Note: It may be desirable for the pressure inside the second reservoir to be the same as the hydrostatic pressure surrounding or adjacent to the second reservoir. The pressure inside the second reservoir may differ from the pressure of the hydrostatic pressure surrounding or adjacent to the second reservoir by less than 10 PSI, or 15 PSI, or 20 PSI, or 1 atm, or 2 atm, or 3 atm, or 4 atm, or 5 atm, or 6 atm, or 7 atm, or 8 atm, or 9 atm, or 10 atm, or 11 atm, or 12 atm, or 15 atm, or 20 atm, or 30 atm, or 40 atm, or 50 atm, or 60 atm, or 70 atm, or 80 atm, or 90 atm, or 100 atm.
Note: Inside the underwater storage reservoir, the low density liquid or the high density liquid may be enclosed in a bladder tank within a rigid underwater tank. For example, the water may be enclosed within a bladder tank inside the rigid underwater tank, while the low density liquid may float above said bladder tank. For example, the low density liquid may be enclosed within a bladder tank inside the rigid underwater tank, while the water may sink below or may be present below said bladder tank. Water inside the rigid underwater tank may comprise or be fluid connected or may be in hydrostatic pressure equilibrium with adjacent or surrounding ocean water.
Note: In some embodiments, the separator or physical barrier may comprise a layer of a solid hydrate of low density liquid. Said solid hydrate may possess a density greater than low density liquid and less than water. Said solid hydrate layer may inhibit further mixing or formation of hydrate.
Note: The pump/generator in the present invention may comprise a Hydraulic Power Recovery Turbine (HPRT). HPRTs may be currently employed as pump/generator in, including, but not limited to, the hydrocarbon transport, processing, and refining industries. HPRTs are known to be more energy efficient with lower viscosity of the working fluid. The present invention may employ ultra-low viscosity liquids, such as liquid propane, liquid butane, or LPG, which may possess a substantially lower viscosity than water, which may enable the HPRT to possess a round trip efficiency greater than the round-trip efficiencies associated with water.
Note: The surface water tank or the third reservoir configured to store water on the surface or at a higher elevation than the second reservoir may comprise a rigid tank or a bladder tank or a combination thereof. For example, the third reservoir configured to store water and/or located near, on, or above the ocean surface may comprise a bladder tank, which may be at a pressure in equilibrium with the pressure outside or adjacent to said third reservoir.
Note: Fluid properties affect HPRT efficiency in the same manner as in centrifugal pumps, with higher-viscosity fluids reducing the efficiency. The fact that propane and some other example LDLs have a lower viscosity than water means some LDLs may have a greater energy efficiency/round trip efficiency in an HPRT than water Note: HPRTs can operate most efficiently at certain ranges of capacity utilization (flow rate) and pressure head. HPRTs are generally most efficient closer to their maximum capacity utilization and pressure head. There are multiple methods to ensure near maximum efficiency in the pump/generator, when, for example, employing HPRTs, which may include, but are not limited to, one or more or a combination of the following:

Multiple smaller HPRTs may be employed, wherein HPRTs which are running are run at or near maximum efficiency and/or maximum capacity (highest efficiency is near or at highest capacity). If the demand for storing power changes, the number and/or capacity of the HPRTs online or 'on' for storing power may be adjusted. If the demand for generating power changes, the number and/or capacity of the HPRTs online or 'on' for generating power may be adjusted.

If the energy requiring storing is less than the capacity of the HPRTs there may be a few options:

Design the system with an additional lower capacity HPRTs (e.g. 2 or 3 or 4 or 5 or more HPRTs which are each a fraction of the total capacity of each of the larger HPRTs). Each of said lower capacity HPRTs may operate at near maximum efficiency and/or maximum capacity when in operation For charging variations which are a fraction of the capacity of the few lower capacity HPRTs or the lowest capacity HPRT, fly-wheels or capacitors or Li-Ion batteries or other standard energy storage devices may be employed to fill in this relatively smaller storage need. Said 'other standard energy storage devices' may be discharged to charge the liquid displacement energy storage technology by powering a pump (such as a HPRT) when desirable or may supply electricity directly to the grid or application or a combination thereof.

Note: The floating subsea tank may be rigid or collapsible/expandable or a combination thereof. The floating subsea tank may be suspended over the seafloor by tethers or anchors or attachment lines or other mechanisms.

Note: In the event of a subsea landslide or other catastrophic event, the floating subsea tank may be designed to disconnect from its tether(s) and/or pipeline(s) as part of an emergency disconnect system. Said emergency disconnect system may enable the subsea tank to float to the surface, which may enable to subsea tank to avoid rupture or other catastrophic failure, which may otherwise occur due to debris from an underwater landslide or other catastrophic event.

Note: A floating subsea tank may enable the tank to be easier to implement when, for example, the seafloor is uneven or steep or otherwise challenging for the placement of a tank on the seafloor surface.

Note: Installation of a floating subsea bladder tank may involve, for example:
1) Sinking a fully collapsed bladder tank to the ocean floor
2) Attaching bladder tank tethers and/or anchors to the ocean floor and/or to moorings or weights. Attaching LDL pipeline to the bladder tank.
3) Using the LDL pipeline, add LDL to the bladder tank, resulting in the bladder tank becoming buoyant. The bladder tank may be floating above the ocean floor and/or suspended above the ocean floor due to, including, but not limited to, one or more or a combination of the following: tethers or anchors.

Note: LDL pipeline may be placed or sunk to the ocean bottom while containing or full of LDL. LDL pipeline may be weighted or attached to anchors or weights or a combination thereof to, for example, prevent the LDL pipeline from floating to the ocean surface.

Note: LDL pipeline may be placed or sunk to the ocean bottom. LDL pipeline may be flooded with ocean water during the sinking process. Once on the ocean bottom or once placed in the appropriate location, water in the LDL pipeline may be displaced with LDL by pumping LDL into the pipeline and/or allowing displaced ocean water to exit the pipeline. Displaced ocean water may exit the pipeline, for example, into the surrounding ocean or into a separate containment tank. Said separate containment tank, if employed may be temporary or permanent. When the pipeline is sufficiently full of LDL, one or valves may be closed to, for example, prevent the escape of LDL to the surround ocean and/or prevent the intrusion of ocean water into the LDL pipeline. Alternatively, or additionally, said pipeline may be attached to an underwater tank or a floating underwater tank, when, for example, the pipeline is sufficiently full of LDL. LDL pipeline may be weighted or attached to anchors or weights or a combination thereof to, for example, prevent the LDL pipeline from floating to the ocean surface.

Note: The minimum volume or amount of LDL in the floating underwater tank may comprise the minimum amount of LDL required to ensure the floating underwater tank is buoyant.

Note: One or more or a combination of components of the present invention may be located underground or partially underground. For example, the first storage reservoir, which may comprise a rigid tank on land or underwater, may be located underground. For example, one or more or a portion of or a combination of pipes or valves or pumps or generators may be located underground or partially underground. For example, the second reservoir, which may comprise an underwater rigid tank, may be located underground.

Note: Placing one or more tanks or other components underground may conceal the tanks from public view, which may increase safety and/or reduce the potential eyesore of a tank. Placing one or more tanks or other components underground may increase the longevity of said tanks. Placing one or more tanks or other components underground may increase the system's resilience to severe weather, natural disasters, or man-made risks.

Note: '8' may be buoyant, or neutrally buoyant, or may be at a greater density than the surrounding water body, or a combination thereof. For example, the density of a subsea tank may vary depending on the volume or amount of liquid stored in the tank.

Note: LPG, propane, butane, or other liquified gases, which may be employed as low density liquids, may be semi-refrigerated or partial refrigerated or refrigerated in the surface storage tanks. By employing semi-refrigerated storage, the surface storage tanks or floating storage tanks or the first reservoir may be capable of greater carrying capacity or may be lower capital cost or a combination thereof.

Note: The low density liquid may be stored at ambient temperatures and/or temperatures matching or near the temperature of the water surrounding the second storage reservoir and/or may be stored pressurized.

Note: It may be desirable to employ butane or butane-propane mixtures or a combination thereof due to butane's higher boiling point and lower vapor pressure than propane and the potential to build larger, lower cost pressure vessels.

Note: Refrigerated or semi-refrigerated or partially refrigerated or cooled vessels may comprise temperatures less than or equal to one or more or a combination of the following: 50° C., or 40° C., or 30° C., or 20° C., or 10° C., or 5° C., or, 0° C., or −10° C., or −20° C., or −30° C., or −40° C., or −50° C.

Note: A configuration involving a subsea rigid tank configured to store water and LDL and a separate or interconnected bladder tank configured to stored water may be advantageous, due to, for example, including but not limited to, one or more or a combination of the following:
No need for a water pipeline to the surface or for a tank on the surface
Bladder tank underwater is storing primarily water, instead of LDL.
  A bladder tank may possess a longer longevity or lifespan with water compared to LDL
  A bladder tank configured for water may be less expensive or comprise less expensive materials than a bladder tank configured for LDL
  In the event of a rupture or catastrophic failure of the bladder tank, a valve in the pipe connecting the bladder tank to the rigid tank may be closed, which may comprise an emergency shutdown procedure. If said valve fails to close, LDL in the rigid tank will naturally remain in the rigid tank, For example, LDL may remain in the rigid tank due to the location or configuration of the pipe connecting the rigid tank to the bladder tank. Advantageously, in the event of a catastrophic failure or rupture of the bladder tank, the pressure inside the rigid tank will likely remain constant and the composition of the water inside the rigid tank may remain constant.
Bladder tank enables the rigid underwater tank to experience the same pressure inside the tank as the pressure outside the tank or the pressure of the surrounding hydrostatic pressure.

Note: Some embodiments may involve a floating separator separating water from the LDL in an underwater tank Note: The round trip electrical efficiency may be greater than or equal to 30%, or 40%, or 50%, or 60%, or 70%, or 80%, or 90%

Note: The present invention may contain multiple pipelines, surface tanks, subsea tanks, HPRT units or pump generator units, valves, other components or a combination thereof.

Note: Rigid tank or rigid containment structure, which may surround at least a portion or the top of an internal sub-reservoir or sub-tank, which may comprise a flexible structure or expandable or collapsible structure, such as a bladder. Said rigid structure may comprise a steel tank or composite tank or a combination thereof. In the event the internal sub-tank breaks or leaks, the leaked low density liquid may remain inside the rigid tank or rigid containment structure, preventing exposure of the low density liquid to the surrounding environment. Alternatively, or additionally, the internal sub-tank may store water, while low density liquid may be stored in the rigid tank. Alternatively, or additionally, the low density liquid and the water are stored in internal sub-tank inside the rigid tank or rigid containment structure. The 'rigid containment structure' may also or alternatively be a flexible structure Note: Dashed line in figure may indicate a labelling line. The dashed line or dashed box may indicate a label only. Dashed lines or dashed boxes may not be process elements in and of themselves.

Note: Boxes with dashed lines in the figures and dash lines in figures are labels only and are no in and of themselves components of the figure.

Note: The figures may not be to scale. The water depth of, for example, the second reservoir, may be deeper than or equal to, one or more or a combination of the following: 200 meters, or 300 meters, or 400 meters, or 500 meters, or 600 meters, or 700 meters, or 800 meters, 900 meters, or 1,000 meters, 1,100 meters, or 1,200 meters, or 1,300 meters, or 1,400 meters, or 1,500 meters, or 1,600 meters, or 1,700 meters, 1,800 meters, or 1,900 meters, or 2,000 meters, 2,100 meters, or 2,200 meters, or 2,300 meters, or 2,400 meters, or 2,500 meters, or 2,600 meters, or 2,700 meters, 2,800 meters, or 2,900, or 3,000 meters Note:
The water reservoir may comprise a liquid of the same density as the surrounding or adjacent ocean water and in pressure equilibrium with the surrounding or adjacent ocean water.
It may be desirable to prevent mixing between the water in the water reservoir and the surrounding ocean water. The prevent said mixing, it may be desirable to employ a flexible barrier between the water reservoir and the surrounding ocean water, which may be classified as a water reservoir boundary layer.
If the water reservoir were to break or experience catastrophic failure or is at risk of breaking or catastrophic failure, a valve in a pipe interconnecting the water reservoir with the rigid tank may close, if desired. Said valve may prevent low density liquid or other contents of the rigid tank or end-to-end system from leaking or contaminating the surrounding ocean. If said valve were to fail to close, the rigid tank and pipes may be configured such that low-density liquid naturally remains in the tank and/or minimally escapes or leaks from the rigid tank. For example, said low density liquid may be present floating above water in the second reservoir and said pipe interconnecting the water reservoir with the rigid tank may be located beneath the low density liquid—water liquid-liquid interface.

Note: Reservoirs may comprise multiple interconnected reservoirs or tanks or storage vessels or multiple interconnected process elements or a combination thereof. For example, the an underwater storage reservoir may comprise multiple interconnected underwater tanks.

Note: The third reservoir may enable the same hydrostatic pressure as ocean water, while possessing properties which are less corrosive or less prone to biofouling than ocean water. For example, the third reservoir may comprise ocean water treated with an oxygen scavenger to remove dissolved oxygen and/or prevent corrosion. For example, the third reservoir may comprise ocean water treated with a biocide or a non-corrosive or non-oxidizing biocide. For example, the third reservoir may comprise an aqueous solution with the same or similar density as ocean water, except comprising a different mixture or compositions of salts and/or other reagents than ocean water which may be less corrosive or possess other advantageous properties compared to ocean water. For example, the third reservoir may comprise an aqueous solution with the same or similar density as ocean water, except comprising reagents which inhibit the formation of low density liquid—water hydrates For example, the third reservoir may comprise deep sea ocean water, which may comprise low dissolved oxygen concentrations and may be less corrosive compared to surface ocean water.

Note: Separator or Flexible tank or bladder inside rigid tank may removable or replaceable. This enables the separator or Flexible tank or bladder inside rigid tank to undergo maintenance or be replaced at or near its end of life Note: Low density liquid may include, but is not limited to, one or more or a combination of the following: propane, butane, ethane, pentane, hexane, LPG, gas-liquids, oils, or other low density liquids described herein, or other liquids described in the art.

Note: Ocean water temperature is generally between $-2°$ C. and $40°$ C. Deep ocean water is generally about $4°$ C.

Note: The density of the Low Density Liquid is less than water at least in the temperature range of greater than $3°$ C. and/or less than $40°$ C.

Note: If the third reservoir is located underwater, a condensable gas in the headspace may ensure the pressure inside the third reservoir is close to the hydrostatic pressure of the ocean at the same underwater depth, which may be beneficial if, for example, said the third reservoir is a rigid tank. The vapor pressure of the condensable headspace gas may be tuned or engineered to ensure it matches or is close to hydrostatic pressure of the ocean at the same underwater depth at the expected operating temperature. The expected operating temperature may range from, for example, $-2°$ C. to $50°$ C., depending on the water body, the depth, the time of year, the surface temperature, the local climate, the water temperature surrounding or in contact with one or more components of the system, other conditions, or a combination thereof.

Note: The pipe connection between an underwater tank and a pipe may be designed to be capable of safe disconnection or re-connection or both. An underwater tank may be disconnected from a pipe for maintenance or replacement or expansion or monitoring of the underwater tank, underwater pipe, other underwater component, or a combination thereof. In some instances, an underwater tank or pipe or both may contain low density liquid during disconnection. An underwater tank may be disconnected from a pipe for maintenance or replacement. In some instances, an underwater tank or pipe or both may contain low density liquid during disconnection. In some instances, low density liquid may be removed from an underwater tank before disconnecting said underwater tank. Safe disconnection may involve minimal or no leaks of low density liquid. Some embodiments of the present invention may be designed to enable replacement or maintenance of an underwater tank. Some embodiments of the present invention may be designed to enable the transfer of an underwater tank to the surface and/or return of said underwater tank to its original location. Some embodiments of the present invention may enable one or more components or subcomponents of an underwater tank or other underwater components to be removed, or replaced, or maintained if desirable. Some embodiments of the present invention may enable the addition of one or more tanks underwater while integrating with pre-existing underwater infrastructure and/or surface infrastructure. For example, a Separator or Flexible tank or bladder inside a rigid tank may be removable or replaceable.

Removability or replaceability may involve the ability to remove or replace a component while maintaining operations or with minimal disruption to operations, Additional Notes:

Example Cost Drivers

The larger the scale, the lower the cost per kWh energy storage capacity and cost per kW of power capacity The deeper the ocean water depth, the greater the energy density and the smaller the required tank volume and pipe diameter per a kWh and kW of storage capacity, respectively. To ensure the project can be constructed with pipelaying techniques and subsea services, projects may initially employ depths less than or equal to a 3,000 meter ocean water depth. As pipelaying techniques and subsea services advance, depths greater than a 3,000 meter ocean water depth may be employed.

The more hours of energy storage (i.e. the more energy storage capacity relative to power capacity), the lower the cost per kWh Pipe diameter is driven by the energy density and required 'power capacity'

Tank volume is driven by the energy density and required 'energy storage capacity'

The distance to electricity grid and electricity grid transmission equipment and/or upgrades to electricity grid infrastructure The proximity to onshore and offshore EPC assets and logistics for the delivery and installation of equipment and materials Example Revenue Drivers (Maximizing Revenue and ROI)

Price per kWh of electricity in local electricity market and expected power purchase agreement prices/terms Demand for grid services due to intermittency of renewables on electricity grid Potential of solar or wind in location Structure of electricity market and relationship with the electricity grid and/or local electric power utility Economic Model: Solar+Storage Project (PPA) vs. Grid Services Additional Notes:

Propane gas or LPG gas or refrigerant or near room temperature boiling point liquid or liquid condensable at room temperature or a combination thereof in the headspace of the rigid water tank on the surface.

Example purpose of condensable gas in water tank 1) to enable to the tank to remain rigid without forming a vacuum when water exits 2) to enable the water to not release any propane into the air. A dilute concentration of propane may exist in the water due to the high pressures under the water enabling some propane solubility. Because the present embodiment is closed/not open to air, the propane cannot be released into the air.

Note:

The headspace may be occupied by a hydrocarbon refrigerant which boils at around room temperature. For example, a combination of butane and pentane. As the water fills the tank, refrigerant compresses and condensed into a liquid (significantly reducing the amount of compression required). The condensed refrigerant forms a floating layer on the water. When the water exits, the refrigerant boils on the surface of the water.

Note:

When water fills up the tank, propane or butane gas may be removed from the tank headspace to enable the water to occupy the space without compressing the propane. The propane gas may be removed via compression into a separate tank.

Note:

Gas inside a water tank or in the headspace of a water tank compressed as water enters the tank. If desirable, said gas may, at least in part, condense.

Flywheel you compensate for lulls in startup

It may be desirable for the near room temperature boiling point liquid to be non-flammable. Said near room temperature boiling point liquid may comprise a refrigerant or a combination of refrigerants. For example, said near room temperature boiling point liquid may comprise a fluorinated hydrocarbon Overview:

The present invention may store electricity by displacing water with a low-density liquid (LDL). Electricity may be stored in the form of gravitational potential energy from the gravitational hydrostatic pressure difference between the LDL and water.

Summary Step-by-Step Description:

1. Storing Electricity: The valve at the surface is opened (5). LDL in the rigid LDL surface tank (1) is pumped (4) through the pipe (3) into the underwater rigid tank (2). As LDL fills the underwater rigid tank, water inside the tank is displaced. Displaced water travels through the water pipe (7) to the surface water tank (6). When charging is complete, the valve at the surface (5) is closed.
2. Generating Electricity: The surface valve (5) is opened. Water inside the surface water tank (6) travels through the water pipe (7) and naturally displaces LDL inside the underwater rigid tank (2). Displaced LDL travels through the LDL pipe (3) and into the generator (4) at the surface, generating electricity, and flowing LDL into the rigid LDL surface tank. When charging is complete, the surface valve (5) is closed.

What is claimed is:

1. A system for storing or generating electricity comprising:
    a first storage reservoir configured to be near the surface of a body of water and configured to store a low density liquid;
    a second storage reservoir configured to be located below the surface of the body of water;
    a pump; and
    a generator;
    wherein the pump, generator, and the first and second reservoirs are operatively connected such that electricity is stored by displacing water inside the second storage reservoir by pumping the low density liquid in the first storage reservoir to the second storage reservoir and electricity is generated or discharged by allowing the low density liquid in the second storage reservoir to return to the first storage reservoir;
    wherein the second storage reservoir is configured to store the water and the low density liquid and wherein the low density liquid has a density below the density of liquid water and wherein the low density liquid is incompressible.

2. The system of claim 1 wherein the low density liquid is located above water inside the second reservoir.

3. The system of claim 1 wherein the low density liquid floats above water inside the second reservoir.

4. The system of claim 1 wherein the system further comprises a hydraulic fluid in the pump and wherein the hydraulic fluid is the same as the low density liquid.

5. The system of claim 1 wherein the pump, generator, and the first and second reservoirs are operatively connected by a pipe.

6. The system of claim 5 wherein the low density liquid is transferred between said first reservoir and said second reservoir using said pipe.

7. The system of claim 1 further comprising a physical barrier within the second reservoir for separating the low density liquid and water in the second reservoir.

8. The system of claim 7 wherein the second reservoir is configured to prevent leakage of the low density liquid in the event of damage to said physical barrier.

9. The system of claim 7 wherein said physical barrier comprises a material with an average density less than liquid water and more than the low density liquid at a temperature greater than 3° C. and less than 50° C. at the same hydrostatic pressure.

10. The system of claim 7 wherein at least a portion of said physical barrier is located above water and at least a portion of said physical barrier is located below the low density liquid.

11. The system of claim 7 wherein said physical barrier comprises a liquid.

12. The system of claim 7 wherein said physical barrier comprises a solid.

13. The system of claim 7 wherein said physical barrier is configured to prevent (1) substantial dissolution of the low density liquid in water, (2) substantial dissolution of water in the low density liquid, (3) the formation of substantial low density liquid water hydrates, or a combination thereof.

14. The system of claim 1 which further comprises a barrier situated above at least a portion of the second reservoir.

15. The system of claim 14 wherein said barrier is configured to contain the low density liquid, a low density liquid water composition, or a combination thereof in the event of a breach in the second reservoir.

16. The system of claim 14 wherein said barrier comprises an instrument for detecting the low density liquid.

17. The system of claim 14 wherein said barrier is configured to funnel the low density liquid to facilitate recovery.

18. The system of claim 14 wherein said barrier is suspended above at least a portion of the second reservoir.

19. The system of claim 18 wherein the barrier is suspended by a tether connected to a mooring, an anchor, an ocean floor, or a combination thereof.

20. The system of claim 14 wherein said barrier is buoyant, connected to buoyant floats, or a combination thereof.

21. The system of claim 1 wherein the second reservoir is buoyant, connected to buoyant floats, or a combination thereof.

22. The system of claim 21 wherein said second reservoir is floating or suspended above an ocean floor.

23. The system of claim 22 wherein the second reservoir is suspended by a tether connected to a mooring, an anchor, the ocean floor, or a combination thereof.

24. The system of claim 1 further comprising a third reservoir operably connected to transfer water displaced by low density liquid during the storing of electricity from the second reservoir to the third reservoir.

25. The system of claim 24 wherein the water has a density which is within +/−5% the density of ocean water at a temperature greater than 3° C. and less than 40° C. at the same hydrostatic pressure.

26. The system of claim 25 wherein at least a portion of said third reservoir possesses a pressure within +/−10 atm of the hydrostatic pressure of the ocean water at the depth of the second reservoir.

27. The system of claim 24 wherein at least a portion of said third reservoir comprises ocean water.

28. The system of claim 24 wherein at least a portion of said third reservoir comprises treated ocean water.

29. The system of claim 1 which further comprises a barrier situated above at least a portion of the second reservoir wherein the barrier is configured to capture the low density liquid in the event of a leak or accidental release.

* * * * *